US012617905B2

(12) United States Patent
Furusako et al.

(10) Patent No.: US 12,617,905 B2
(45) Date of Patent: May 5, 2026

(54) CROSSLINKED ALGINIC ACID

(71) Applicant: MOCHIDA PHARMACEUTICAL CO., LTD., Tokyo (JP)

(72) Inventors: Shoji Furusako, Tokyo (JP); Tsutomu Satoh, Tokyo (JP); Tomohiro Narumi, Tokyo (JP)

(73) Assignee: MOCHIDA PHARMACEUTICAL CO., LTD., Tokyo (JP)

( * ) Notice: Subject to any disclaimer, the term of this patent is extended or adjusted under 35 U.S.C. 154(b) by 905 days.

(21) Appl. No.: 17/842,115

(22) Filed: Jun. 16, 2022

(65) Prior Publication Data

US 2023/0035986 A1 Feb. 2, 2023

Related U.S. Application Data

(63) Continuation of application No. PCT/JP2020/047100, filed on Dec. 17, 2020.

(30) Foreign Application Priority Data

Dec. 18, 2019 (JP) ................................ 2019-227866

(51) Int. Cl.
*C08J 3/24* (2006.01)
*C08L 5/04* (2006.01)

(52) U.S. Cl.
CPC . *C08J 3/24* (2013.01); *C08L 5/04* (2013.01); *C08J 2305/04* (2013.01); *C08L 2312/00* (2013.01)

(58) Field of Classification Search
CPC . C08J 3/24; C08J 2305/04; C08L 5/04; C08L 2312/00
USPC ............................................................. 536/3
See application file for complete search history.

(56) References Cited

U.S. PATENT DOCUMENTS

| | | | |
|---|---|---|---|
| 8,133,515 B2 * | 3/2012 | Boons | A61K 47/61 548/304.1 |
| 11,932,708 B2 * | 3/2024 | Furusako | C08L 5/04 |
| 12,312,574 B2 * | 5/2025 | Furusako | C12N 11/10 |
| 2007/0009579 A1 | 1/2007 | Sato | |
| 2010/0152423 A1 | 6/2010 | Song | |
| 2014/0256831 A1 | 9/2014 | Ito et al. | |
| 2016/0030360 A1 | 2/2016 | Vegas et al. | |
| 2016/0114046 A1 | 4/2016 | Brudno et al. | |
| 2018/0326073 A1 | 11/2018 | Mooney et al. | |
| 2019/0100628 A1 | 4/2019 | Garigapati et al. | |
| 2021/0095053 A1 | 4/2021 | Furusako et al. | |

FOREIGN PATENT DOCUMENTS

| | | | |
|---|---|---|---|
| CN | 104672484 A | | 6/2015 |
| CN | 106140040 A | * | 11/2016 |
| EP | 0 713 859 A2 | | 5/1996 |
| JP | 9-87236 A | | 3/1997 |
| JP | 2017-512813 A | | 5/2017 |
| JP | 2017-524768 A | | 8/2017 |
| JP | 2019-512522 A | | 5/2019 |
| WO | WO 89/10941 A1 | | 11/1989 |
| WO | WO 2005/026214 A1 | | 3/2005 |
| WO | WO 2008/031525 A1 | | 3/2008 |
| WO | WO 2008/071058 A1 | | 6/2008 |
| WO | WO 2009/073437 A1 | | 6/2009 |
| WO | WO 2011/028031 A2 | | 3/2011 |
| WO | WO 2012/165462 A1 | | 12/2012 |
| WO | WO 2015/020206 A1 | | 2/2015 |
| WO | WO 2016/019391 A1 | | 2/2016 |
| WO | WO 2017/165389 A2 | | 9/2017 |
| WO | WO 2019/240219 A1 | | 12/2019 |

OTHER PUBLICATIONS

Dommerholt et al. Highly accelerated inverse electron-demand cycloaddition of electron-deficient azides with aliphatic cyclooctynes. Nature Communications 5:5378, 2014, p. 1-7. DOI: 10.1038/ncomms6378 (Year: 2014).*

Chinese Office Action for Chinese Application No. 202080087386.8, dated Dec. 19, 2023, with an English translation.

International Search Report for PCT/JP2020/047100 mailed on Mar. 9, 2021.

Nagahama et al., "Living functional hydrogels generated by bioorthogonal cross-linking reactions of azide-modified cells with alkyne-modified polymers", Nature Communications, 2018, vol. 9, No. 2195, pp. 1-11.

Nagahama et al., "Preparation of hydrogels having cells cross-linked with polymers and function emergence of gels using cell reaction", Polymer Preprints, Japan, 2017, vol. 66, No. 2, 3M04, total 9 pages.

Written Opinion of the International Searching Authority for PCT/JP2020/047100 (PCT/ISA/237) mailed on Mar. 9, 2021.

Extended European Search Report for European Application No. 20902157.5, dated Nov. 29, 2023.

Japanese Office Action for Japanese Application No. 2021-565639, dated Oct. 1, 2024, with English translation.

(Continued)

*Primary Examiner* — Yih-Horng Shiao
(74) *Attorney, Agent, or Firm* — Birch, Stewart, Kolasch & Birch, LLP

(57) ABSTRACT

Provided are novel alginic acid derivatives and a novel crosslinked alginic acid. The alginic acid derivatives are represented by formula (I) and formula (II). The novel crosslinked alginic acid obtained by Huisgen reaction using an alginic acid derivative of formula (I) and an alginic acid derivative of formula (II).

[C172]

(I)

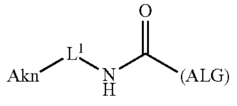

(II)

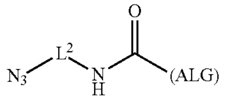

9 Claims, 5 Drawing Sheets

(56) References Cited

OTHER PUBLICATIONS

Chinese Office Action and Search Report for Chinese Application No. 202080087386.8, dated Mar. 31, 2023, with an English translation.
U.S. Appl. No. 18/428,348, filed Jan. 31, 2024.
Chinese Review Notice for Chinese Application No. 202080087386.8, dated Mar. 17, 2025, with English translation.
Chinese Office Action for Chinese Application No. 202080087386.8, dated Jul. 31, 2025, with English translation.
Agard et al., "A Strain-Promoted [3+2] Azide-Alkyne Cycloaddition for Covalent Modification of Biomolecules in Living Systems," American Chemical Society, vol. 126, No. 46, XP002362785, Nov. 24, 2004, pp. 15046-15047.
Crescenzi et al., "Novel Hydrogels via Click Chemistry: Synthesis and Potential Biomedical Applications," Biomacromolecules, vol. 8, No. 6, XP002461327, Jun. 1, 2007, pp. 1844-1850.
European Communication pursuant to Article 94(3) EPC for European Application No. 20 902 157.5, dated Jun. 12, 2025.
Gattas-Asfura et al., "Chemoselective Cross-Linking and Functionalization of Alginate via Staudinger Ligation," Biomacromolecules, vol. 10, No. 11, XP055145946, Nov. 9, 2009, pp. 3122-3129.
Kimura et al., "Regeneration of skeletal muscles using injectable cell cross-linked gels," Polymer Preprints, vol. 67, No. 2, 2018, 5 pages total, with English translation.
Sanada et al., "Cancer Treatment Strategy Without Drugs: Induction of Cell Death by Gel Formation on the Surface of Cancer Cells," The 39th Annual Meeting of the Japanese Society for Biomaterials, 2017, p. 128 (4 pages total), with English translation.
Japanese Office Action for Japanese Application No. 2025-107884, dated Dec. 16, 2025, with English translation.
Vegas et al., "Combinatorial hydrogel library enables identification of materials that mitigate the foreign body response in primates," Nature Biotechnology, vol. 34, No. 3, Mar. 2016, pp. 1-31.
Wang et al., "Injectable dextran hydrogels fabricated by metal-free click chemistry for cartilage tissue engineering," Materials Science and Engineering C, vol. 73, 2017, pp. 21-30.

* cited by examiner

CROSSLINKED ALGINIC ACID

CROSS REFERENCE TO RELATED APPLICATIONS

This application is a Continuation of PCT International Application No. PCT/JP2020/047100, filed on Dec. 17, 2020, which claims priority under 35 U.S.C. 119(a) to Patent Application No. 2019-227866, filed in Japan on Dec. 18, 2019, all of which are hereby expressly incorporated by reference into the present application.

TECHNICAL FIELD

The present invention relates to novel alginic acid derivatives, to a novel crosslinked alginic acid, a novel crosslinked alginic acid structure, and methods of manufacturing these.

BACKGROUND ART

Alginic acid, a high-molecular-weight acidic polysaccharide molecule that is extracted from the cell walls of natural brown algae such as *Lessonia, Macrocystis, Laminaria*, Ascophyllum, Durvillea, *Ecklonia cava, Eisenia bicyclis* and *Saccharina japonica*, is a linear heteropolymer of two kinds of uronic acid, β-D-mannuronate (M component) and its C-5 epimer α-L-guluronate (G component), connected by 1-4 linkages. Specifically, in terms of its chemical structure it is a block copolymer made up of homopolymer blocks of mannuronic acid (MM), homopolymer blocks of guluronic acid (GG), and randomly arranged blocks of mannuronic acid and guluronic acid (MG), in complex combination with arbitrary permutations and proportions. Alginic acid is widely used in such fields as medicine, biotechnology, cosmetics, fibers, paper and foodstuffs.

While monovalent alkali metal salts of alginic acid (such as sodium alginate) are water soluble, divalent alkali earth metal salts of alginic acid (such as calcium alginate) have the property of being gelled (insolubilized) by crosslinking with metal ions, and these properties have been used to modify or mold these into suitable forms for various applications.

To investigate ways of modifying or molding polysaccharides (such as hyaluronic acid, chondroitin sulfate and alginic acid) into various materials and improving their physical properties (such as strength and swelling properties), much research has already been done into crosslinked polysaccharides crosslinked by covalent bonds.

Methods of obtaining crosslinked polysaccharides include (1) crosslinking methods using aldehyde crosslinking agents such as formaldehyde (Patent Literature 1: WO 2011/028031A), (2) self-crosslinking methods via carboxyl groups and hydroxyl groups in polysaccharides (Patent Literature 2: WO 1989/10941A), and (3) crosslinking methods using homo-bifunctional crosslinking agents (diepoxides, divinylsulfones, diamines, dihydrazines, etc.) or hetero-bifunctional crosslinking agents (epihalohydrins, etc.) (Patent Literature 3: WO 2009/073437A).

Other known methods include (4) methods of crosslinking by light exposure after introduction of a photoreactive group (such as cinnamic acid, substituted cinnamic acid, acrylic acid, maleic acid, fumaric acid, furyl acrylic acid, thiophen acrylic acid, cinnamylidene acetic acid, sorbic acid, thymine or coumarin) (Patent Literatures 4 and 5: WO 2005/026214A, and JP H 09-87236A) and (5) methods of crosslinking by disulfide bonds between polysaccharides having introduced thiol groups, and methods of crosslinking by a Michael addition reaction using a polysaccharide having an introduced thiol group and a polysaccharide having an introduced maleimide group (Patent Literature 6: WO 2008/071058A).

Another method of crosslinking by covalent binding between polysaccharides is (6) a method of crosslinking by a Huisgen reaction (1,3-dipolar cycloaddition reaction) using a polysaccharide having an introduced alkyne group and a polysaccharide having an introduced azide.

Crosslinked polysaccharides obtained by subjecting polysaccharides to a Huisgen reaction are disclosed in (i) WO 2008/031525A (Patent Literature 7), (ii), WO 2012/165462A (Patent Literature 8), (iii) WO 2015/020206A (Patent Literature 9), (iv) CN 106140040A (Patent Literature 10), and (v) WO 2019/240219A (Patent Literature 13).

However, (i) Patent Literature 7 relates to a crosslinked polysaccharide obtained by performing a Huisgen reaction in the presence of a copper catalyst on a chain-like alkyne group and azide group introduced via linkers into a first polysaccharide (hyaluronic acid) and a second polysaccharide selected from chondroitin, sulfated dermatan, alginic acid or its salt and the like, and does not disclose the novel crosslinked alginic acid described below.

Meanwhile, (ii) Patent Literature 8 relates to a crosslinked polysaccharide obtained using polysaccharides selected from hyaluronic acid, carboxymethyl dextran, cellulose derivatives and chitosan as first and second polysaccharides (the first and second polysaccharide may be the same or different) by performing a Huisgen reaction on a cyclic alkyne group and azide group introduced into the respective polysaccharides via linkers (by ester bonds between the polysaccharides and the linkers), and does not disclose the novel crosslinked alginic acid described below.

Furthermore, (iii) Patent Literature 9 relates to a crosslinked polysaccharide obtained using hyaluronic acid as a first polysaccharide and chondroitin sulfate as a second polysaccharide by performing a Huisgen reaction on a cyclic alkyne group and azide group introduced into the respective polysaccharides via linkers, and does not disclose the novel crosslinked alginic acid described below.

Moreover, (iv) Patent Literature 10 relates to a crosslinked polysaccharide obtained using chitosan as a first polysaccharide and sodium alginate as a second polysaccharide by performing a Huisgen reaction on a cyclic alkyne group and azide group introduced into the respective polysaccharides via linkers (by ester bonds between the polysaccharides and the linkers), and does not disclose the novel crosslinked alginic acid described below.

Furthermore, WO 2016/019391A (Patent Literature 11) and WO 2017/165389A (Patent Literature 12) describe alginic acids having azide groups introduced into the side chains, but do not disclose a crosslinked alginic acid structure formed from alginic acid having alkyne groups introduced into the side chains, and the purpose of use is also different from the present invention.

(vi) Non Patent Literature 1 describes a branched alginic acid (bAlg-DBCO) having a cyclooctyne side chain introduced into the side chain, but this is obtained by reacting an aminated cyclooctyne (DBCO-PEG-amine) with a branched alginic acid (bAlg) synthesized from alginic acid and a branched polyethylene glycol (4-arm PEG-$NH_2$), and differs from the novel alginic acid derivatives described below both in structure and purpose.

CITATION LIST

Patent Literature

[Patent Literature 1] WO 2011/028031A
[Patent Literature 2] WO 1989/10941A

[Patent Literature 3] WO 2009/073437A
[Patent Literature 4] WO 2005/026214A
[Patent Literature 5] JP H 09-87236A
[Patent Literature 6] WO 2008/071058A
[Patent Literature 7] WO 2008/031525A
[Patent Literature 8] WO 2012/165462A
[Patent Literature 9] WO 2015-020206A
[Patent Literature 10] CN 106140040A
[Patent Literature 11] WO 2016/019391A
[Patent Literature 12] WO 2017/165389A
[Patent Literature 13] WO 2019/240219A Non Patent Literature

[Non Patent Literature 1] Nat. Commun. 9(1), pp. 2195-, 2018

SUMMARY OF INVENTION

Technical Problem

Under these circumstances, there is demand for novel alginic acid derivatives, for a novel crosslinked alginic acid formed from those novel alginic acid derivatives, for a crosslinked alginic acid structure and for methods of manufacturing these.

Solution to Problem

As a result of earnest research aimed at solving these problems, the inventors discovered the novel alginic acid derivatives represented by formula (I) and formula (II). The inventors perfected the present invention after discovering that when a novel crosslinked alginic acid obtained by performing a Huisgen reaction on the novel alginic acid derivatives of formula (I) and formula (II) was used for being molded into a bead (dye-containing bead), namely one of crosslinked alginic acid structures, the bead was highly stable and could be used to prepare a gel having a permeability more suited to the purpose in comparison with conventional gels.

The novel alginic acid derivatives (formula (I) and formula (II)) provided here can be used in chemical crosslink formation for example, meaning that they have an introduced reactive group and a reactive group complementary to that reactive group which can be used in chemical crosslink formation.

This chemical crosslink formation is accomplished for example by crosslinking using a Huisgen reaction (1,3-dipolar cycloaddition reaction), and can be performed for example between the alginic acid derivatives of formula (I) and formula (II), or between the alginic acid derivative of formula (I) and another molecule having an azide group, or between the alginic acid derivative of formula (II) and another molecule having an alkyne group.

Because a Huisgen reaction between a terminal alkyne group and a terminal azide group normally requires heating at 100° C. or more, this reaction has not been suitable for chemical modification of biological molecules. However, reaction conditions have been found under which a cycloadduct (triazole ring) is formed with a yield of roughly 100% at room temperature when a copper catalyst (such as Cu(I)) is included in the reaction (Angew. Chem. Int. Ed. Engl., 41, pp. 2596-2599, 2002; J. Org. Chem., 67, pp. 3057-3064, 2002), allowing this reaction to be used for chemical modification of biological molecules. However, the concern has been that when attempting to obtain a crosslinked alginic acid by a Huisgen reaction in the presence of a copper catalyst, a trace amount of the copper catalyst may remain in the crosslinked alginic acid, and copper-derived cytotoxicity may be expressed in the crosslinked alginic acid or crosslinked alginic acid structure.

In order to avoid copper-derived cytotoxicity in the crosslinked alginic acid, a crosslinked alginic acid can be obtained by a Huisgen reaction that does not require a copper catalyst in a preferred embodiment. Specifically, such a reaction has been achieved without the need for a copper catalyst or high-temperature conditions of 100° C. or more by using a cyclooctyne derivative (high strained cyclic alkyne group) for the alkyne group introduced into the alginic acid derivative. Consequently, because the novel alginic acid of a preferred embodiment does not contain a copper catalyst, it is superior in that it does not cause copper-derived toxicity even when molded into a final formed product (crosslinked alginic acid structure).

As shown in the following embodiments, an alginic acid derivative of formula (I) or formula (II) comprising a cyclic alkyne group or azide group introduced via an amide bond and a divalent linker at any one or more carboxyl groups of alginic acid, a novel crosslinked alginic acid obtained by performing a Huisgen reaction (1,3-dipolar cycloaddition reaction) using the alginic acid derivatives of formula (I) and formula (II), a novel crosslinked alginic acid structure, and methods for manufacturing the above alginic acid derivatives, crosslinked alginic acid, and crosslinked alginic acid structure are provided here. That is, exemplary embodiments may be as shown in [1] to [23] below.

[1] A crosslinked alginic acid obtained by performing a crosslinking reaction using an alginic acid derivative represented by formula (I) below comprising a cyclic alkyne group (Akn) introduced via an amide bond and a divalent linker ($-L^1-$) at any one or more carboxyl groups of alginic acid:

[C1]

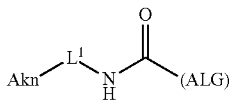

(I)

[in formula (I), Akn-$L^1$-, —NHCO— and (ALG) are defined as in Embodiment 1 below] and an alginic acid derivative represented by formula (II) below comprising an azide group introduced via an amide bond and a divalent linker ($-L^2-$) at any one or more carboxyl groups of alginic acid:

[C2]

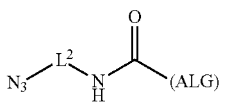

(II)

[in formula (II), $-L^2-$, —NHCO— and (ALG) are defined as in Embodiment 1 below].

[1-Ia] The alginic acid derivative represented by formula (I) according to the [1], wherein the introduction rate of the Akn-$L^1$-$NH_2$ group (in which Akn and $-L^1-$ are defined as in Embodiment 1 below) is 0.1% to 30%.

[1-Ib] The alginic acid derivative represented by formula (I) according to the [1], wherein the weight-average molecular weight as measured by gel filtration chromatography of the alginic acid derivative is 100,000 Da to 3,000,000 Da.

[1-IIa] The alginic acid derivative represented by formula (II) according to [1] above, wherein the introduction rate of the $N_3$-$L^2$-$NH_2$ group (in which -$L^2$- is defined as in Embodiment 1 below) is from 0.1% to 30%.

[1-IIb] The alginic acid derivative represented by formula (II) according to [1] above, wherein the weight-average molecular weight of the alginic acid derivative as measured by gel filtration chromatography is from 100,000 Da to 3,000,000 Da.

[2] An alginic acid derivative represented by the following formula (I) comprising a cyclic alkyne group (Akn) introduced via an amide bond and a divalent linker (-$L^1$-) at any one or more carboxyl groups of alginic acid:

[C3]

(I)

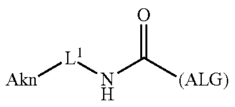

[in formula (I), (ALG), -$L^1$- and Akn are defined as in Embodiment 2 below].

[3] The alginic acid derivative represented by formula (I) according to [2] above, wherein the introduction rate of the Akn-$L^1$-$NH_2$ group (in which Akn and -$L^1$- are defined as in Embodiment 3 below) is from 0.1% to 30%.

[4] The alginic acid derivative represented by formula (I) according to [2] above, wherein the weight-average molecular weight of the alginic acid derivative as measured by gel filtration chromatography is from 100,000 Da to 3,000,000 Da.

[5] An alginic acid derivative represented by the following formula (II), comprising an azide group introduced via an amide bond and a divalent linker (-$L^2$-) at any one or more carboxyl groups of alginic acid:

[C4]

(II)

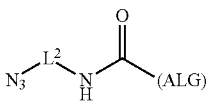

[in formula (II), (ALG) and -$L^2$- are defined as in Embodiment 5 below].

[6] The alginic acid derivative represented by formula (II) according to the [5], wherein the introduction rate of the $N_3$-$L^2$-$NH_2$ group (in which -$L^2$- is defined as in Embodiment 6 below) is from 0.1% to 30%.

[7] The alginic acid derivative represented by formula (II) according to [4], wherein the weight-average molecular weight as measured by gel filtration chromatography of the alginic acid derivative is from 100,000 Da to 3,000,000 Da.

[8] The crosslinked alginic acid according to [1] above, wherein any carboxyl group of a first alginic acid and any carboxyl group of a second alginic acid are bound together via the following formula (III-L):

[C5]

(III-L)

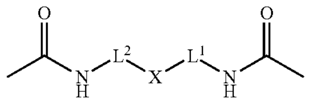

[in formula (III-L), the —CONH— and —NHCO— at either end represent amide bonds via any carboxyl group of alginic acid, and -$L^1$-, -$L^2$- and X are defined as in Embodiment 8 below].

[8a] A crosslinked alginic acid in which any carboxyl group of a first alginic acid and any carboxyl group of a second alginic acid are bound together via the following formula (III-L):

[C5]

(III-L)

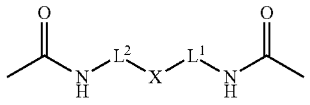

[in formula (III-L), the —CONH— and —NHCO— at either end represent amide bonds via any carboxyl group of alginic acid, and -$L^1$-, -$L^2$- and X are defined as in Embodiment 8a below].

[8-1] The crosslinked alginic acid according to [1] or [8a] above, comprising as crosslinking both chemical crosslinking by triazole rings formed by a Huisgen reaction and ionic crosslinking partially formed by a divalent metal ion.

[8-2] The crosslinked alginic acid according to [1] or [8a] above, comprising, as crosslinking, chemical crosslinking by triazole rings formed by a Huisgen reaction.

[8-3-1] In [8-1] above, the divalent metal ion is an ion selected from the group consisting of a calcium ion, a magnesium ion, a barium ion, a strontium ion and a zinc ion.

[8-3-2] In [8-1] above, the source of the divalent metal ion is an aqueous solution selected from the group consisting of a calcium chloride aqueous solution, a calcium carbonate aqueous solution, a calcium gluconate aqueous solution, a barium chloride aqueous solution and the like.

[9] A method of manufacturing a crosslinked alginic acid, the method comprising mixing the alginic acid derivative represented by formula (I) and the alginic acid derivative represented by formula (II) according to [1] above and performing a crosslinking reaction (Huisgen reaction) to obtain a crosslinked alginic acid according to [1] or [8a] above.

[9-1] A method of manufacturing a crosslinked alginic acid, the method comprising adding a solution of the alginic acid derivative represented by formula (I) according to [1] above to a solution of the alginic acid derivative represented by formula (II) according to [1] above and performing a crosslinking reaction (Huisgen reaction) to thereby obtain the crosslinked alginic acid according to [1] or [8a] above.

[9-2] A method of manufacturing a crosslinked alginic acid, the method comprising adding a solution of the alginic acid derivative represented by formula (II) according to [1] above to a solution of the alginic acid derivative represented by formula (I) according to [1] above and performing a crosslinking reaction (Huisgen reaction) to thereby obtain the crosslinked alginic acid according to [1] or [8a] above.

[10] A method of manufacturing a crosslinked alginic acid, the method comprising obtaining a crosslinked alginic acid according to [1] or [8a] above in which the chemical crosslinking formed by performing a Huisgen reaction (crosslinking reaction) using the alginic acid derivative represented by formula (I) and the alginic acid derivative represented by formula (II) according to [1] above is the structure of formula (III-L) below:

[C7]

(III-L)

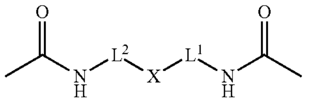

[In formula (III-L), the —CONH— and —NHCO— at either end and -$L^1$- and -$L^2$- are defined as in Embodiment 10 below].

[11] A crosslinked alginic acid structure obtained by dripping a mixed solution of the alginic acid derivative represented by formula (I) mixed with the alginic acid derivative represented by formula (II) according to [1] above into a solution containing a divalent metal ion.

[11-1] A crosslinked alginic acid structure obtained by dripping a solution of the alginic acid derivative represented by formula (I) according to [1] above into a solution containing a divalent metal ion to obtain a gel that is then added to a solution of the alginic acid derivative represented by formula (II) according to [1] above to perform a crosslinking reaction.

[11-2] A crosslinked alginic acid structure obtained by dripping a solution of the alginic acid derivative represented by formula (II) according to [1] above into a solution containing a divalent metal ion to obtain a gel that is then added to a solution of the alginic acid derivative represented by formula (I) according to [1] above to perform a crosslinking reaction.

[12-1] The crosslinked alginic acid structure according to any one of [11] to [11-2] above, comprising, as crosslinking, both of chemical crosslinking by triazole rings formed by a Huisgen reaction and ionic crosslinking partially formed by a divalent metal ion.

[12-2] The crosslinked alginic acid structure according to any one of [11] to [11-2] above, comprising as crosslinking chemical crosslinking by triazole rings formed by a Huisgen reaction.

[12-3-1] In [12-1] above, the divalent metal ion is an ion selected from the group consisting of a calcium ion, a magnesium ion, a barium ion, a strontium ion and a zinc ion.

[12-3-2] In [12-1] above, the source of the divalent metal ion is an aqueous solution selected from the group consisting of a calcium chloride aqueous solution, a calcium carbonate aqueous solution, a calcium gluconate aqueous solution, a barium chloride aqueous solution and the like.

[13-1] A crosslinked alginic acid structure having the ability to retain contents, obtained by subjecting the alginic acid derivative represented by formula (I) and the alginic acid derivative represented by formula (II) according to [1] above to ionic crosslinking by a divalent metal ion and chemical crosslinking by a Huisgen reaction.

[13-2] A crosslinked alginic acid structure having the ability to retain contents, obtained by subjecting the alginic acid derivative represented by formula (I) and the alginic acid derivative represented by formula (II) according to [1] above to chemical crosslinking by a Huisgen reaction.

[13-3-1] In [13-1] above, the divalent metal ion is an ion selected from the group consisting of a calcium ion, a magnesium ion, a barium ion, a strontium ion and a zinc ion.

[13-3-2] In [13-1] above, the source of the divalent metal ion is an aqueous solution selected from the group consisting of a calcium chloride aqueous solution, a calcium carbonate aqueous solution, a calcium gluconate aqueous solution, a barium chloride aqueous solution and the like.

[14] The alginic acid structure according to [11] to [13-2] above, wherein the chemical crosslinking formed by performing a Huisgen reaction using the alginic acid derivative represented by formula (I) and the alginic acid derivative represented by formula (II) according to [1] above is the structure of formula (III-L) below:

[C8]

(III-L)

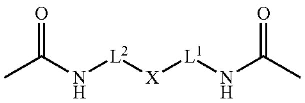

[In formula (III-L), the —CONH— and —NHCO— at either end and -$L^1$- and -$L^2$- are defined as in Embodiment 14 below].

[15] A method of manufacturing a crosslinked alginic acid structure that is obtained by mixing the alginic acid derivative represented by formula (I) and the alginic acid derivative represented by formula (II) according to [1] above to obtain a mixed solution of alginic acid derivatives that is then dripped into a solution containing a divalent metal ion to perform a crosslinking reaction.

[15-1] A method of manufacturing a crosslinked alginic acid structure that is obtained by dripping a solution of the alginic acid derivative represented by formula (I) according to [1] above into a solution containing a divalent metal ion to obtain a gel that is then added to a solution of the alginic acid derivative represented by formula (II) according to (1) above to perform a crosslinking reaction.

[15-2] A method of manufacturing a crosslinked alginic acid structure that is obtained by dripping a solution of the alginic acid derivative represented by formula (II) according to [1] above into a solution containing a divalent metal ion to obtain a gel that is then added to a solution of the alginic acid derivative represented by formula (I) according to (1) above to perform a crosslinking reaction.

[16-1] A method of manufacturing the crosslinked alginic acid structure according to any one of [15] to [15-2] above, comprising, as crosslinking, both of chemical crosslinking by triazole rings formed by a Huisgen reaction and ionic crosslinking partly formed by a divalent metal ion.

[16-2] The method of manufacturing a crosslinked alginic acid structure according to any one of [15] to [15-2] above, comprising, as crosslinking, chemical crosslinking by triazole rings formed by a Huisgen reaction.

[16-3-1] In [16-1] above, the divalent metal ion is an ion selected from the group consisting of a calcium ion, a magnesium ion, a barium ion, a strontium ion and a zinc ion.

[16-3-2] In [16-1] above, the source of the divalent metal ion is an aqueous solution selected from the group consisting of a calcium chloride aqueous solution, a calcium carbonate aqueous solution, a calcium gluconate aqueous solution, a barium chloride aqueous solution and the like.

[17] The method of manufacturing a crosslinked alginic acid structure according to any one of [15] to [16-2] above, wherein the chemical crosslinking formed by performing a Huisgen reaction using any one of the alginic acid derivative represented by formula (I) and the alginic acid derivative represented by formula (II) according to [1] above is the structure of formula (III-L) below:

[C9]

(III-L)

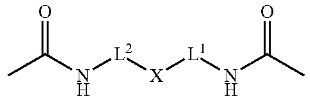

[In formula (III-L), the —CONH— and —NHCO— at either end and $-L^1-$ and $-L^2-$ are defined as in Embodiment 17 below].

[18] The crosslinked alginic acid structure according to any one of [11] to [14] above, which is beads or a semi-spherical gel.

[19] The medical material containing a crosslinked alginic acid structure according to any one of [11] to [14] above.

[20] The medical material according to [19] above, which is beads or a semi-spherical gel.

[21] The crosslinked alginic acid according to [1] or [8a] above, the alginic acid derivative according to [2] or [5] above, or the crosslinked alginic acid structure according to any one of [11] to [14] above, having biocompatibility.

[22] An amino compound represented by formula (AM-1) below, or its pharmaceutically acceptable salt or a solvate of these:

[C10]

(AM-1)

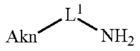

[in formula (AM-1), $-L^1-$ and Akn are defined as in Embodiment 22 below].

[23] An amino compound represented by formula (AM-2) below, or its pharmaceutically acceptable salt or a solvate of these:

[C11]

(AM-2)

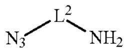

[in formula (II), $-L^2-$ is defined by being selected from definition of $-L^2-$ as in Embodiment 23 below].

Effect of the Invention

The present invention provides novel alginic acid derivatives that can be used in chemical crosslink formation for example, a novel crosslinked alginic acid, and a novel alginic acid structure, and the like.

Preferably, the alginic acid derivatives have introduced reactive groups that do not exist in living bodies, and are expected to be safe for living organism, with no risk of ongoing crosslinking reactions with cells and other biological components even if unreacted groups remain. Moreover, the crosslinking reaction is preferably safe and easy to use because the reaction is completed at room temperature without the use of a metal catalyst.

The crosslinked alginic acid of some embodiments is chemically crosslinked by a Huisgen reaction (1,3-dipolar cycloaddition reaction). The crosslinking can be used in combination with chemical crosslinking and ionic crosslinking using divalent metal ion (For example, a calcium ion), and preferably the reaction conditions are adjusted so that stability is improved in comparison with a non-crosslinked alginic acid or non-chemically crosslinked alginic acid (For example, an alginic acid crosslinked with a calcium ion). Moreover, preferably the gel properties of the crosslinked product can be adjusted to adjust the substance permeability. The present invention has at least one of these effects.

DESCRIPTION OF EMBODIMENTS

Specific Embodiments

Figure 1:
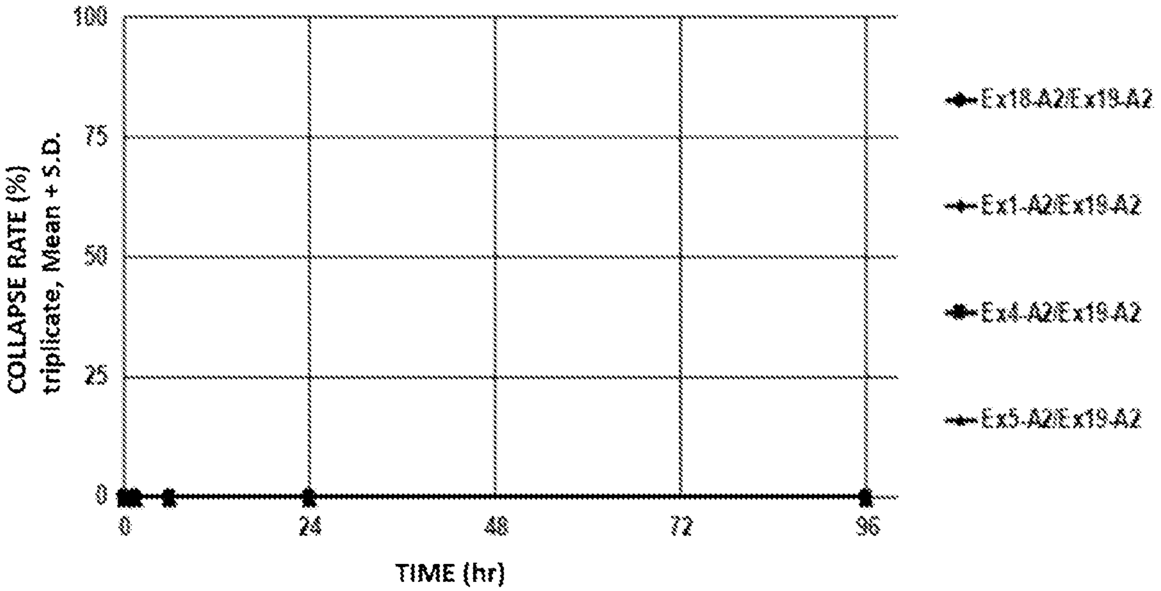
FIG. 1 shows an evaluation of the stability of gels of crosslinked alginic acid structures.

The following Embodiments [1] to [23] may be included.

[1] Embodiment 1 is as follows: A crosslinked alginic acid obtained by performing a crosslinking reaction using an alginic acid derivative represented by the following formula (I) comprising a cyclic alkyne group (Akn) introduced via an amide bond and a divalent linker ($-L^1-$) at any one or more carboxyl groups of alginic acid and an alginic acid derivative represented by the following formula (II) comprising an azide group introduced via an amide bond and a divalent linker ($-L^2-$) at any one or more carboxyl groups of alginic acid.

[Alginic Acid Derivative Represented by Formula (I)]

This is an alginic acid derivative represented by the following formula (I):

[C12]

(I)

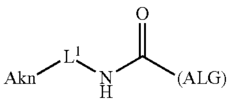

[in formula (I), (ALG) represents alginic acid; —NHCO— represents an amide bond via any carboxyl group of alginic acid; -L¹- represents a linker selected from the group consisting of the partial structural formulae shown in the following tables [excluding the parts outside the broken lines at both ends of each formula]:

TABLE 1-1

| No. | —L¹— | |
|---|---|---|
| (L1-1) | 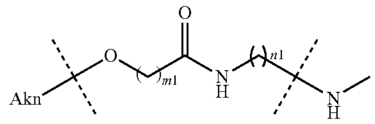 | m1 = 1-6<br>n1 = 2-6 |
| (L1-2a) | 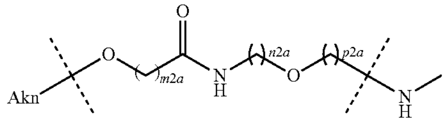 | m2a = 1-6<br>n2a = 2-6<br>p2a = 2-6 |
| (L1-2b) | 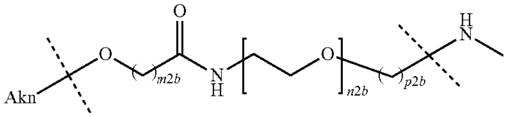 | m2b = 1-6<br>n2b = 1-6<br>p2b = 2-6 |
| (L1-3) | 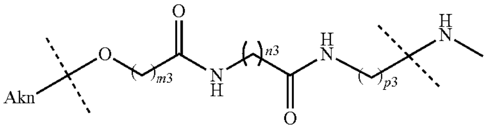 | m3 = 1-6<br>n3 = 1-6<br>p3 = 2-6 |
| (L1-4a) | 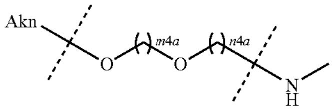 | m4a = 2-6<br>n4a = 2-6 |
| (L1-4b) | 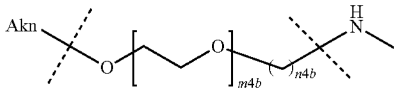 | m4b = 0-6<br>n4b = 2-6 |
| (L1-5a) | 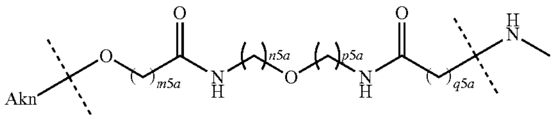 | m5a = 1-6<br>n5a = 2-6<br>p5a = 2-6<br>q5a = 1-6 |
| (L1-5b) | 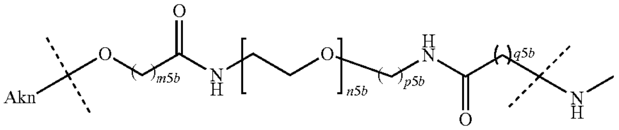 | m5b = 1-6<br>n5b = 1-6<br>p5b = 2-6<br>q5b = 1-6 |
| (L1-6a) | 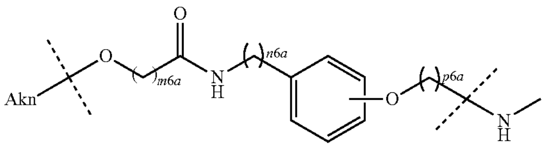 | m6a = 1-6<br>n6a = 0-6<br>p6a = 2-6 |
| (L1-6b) | 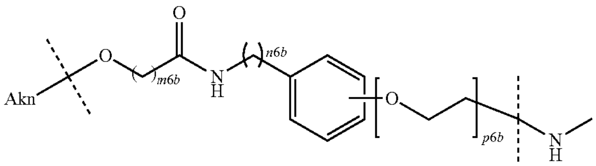 | m6b = 1-6<br>n6b = 1-6<br>p6b = 2-6 |

TABLE 1-2

| No. | —$L^1$— | |
|---|---|---|
| (L1-7) | 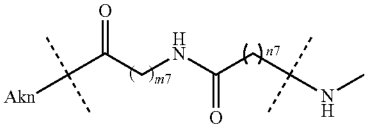 | m7 = 1-6<br>n7 = 1-6 |
| (L1-8a) | 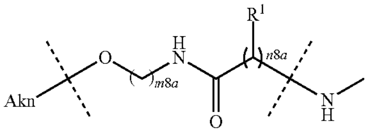 | m8a = 2-6<br>n8a = 1-6<br>$R^1$ = H, Me, Et, Bn |
| (L1-8b) | 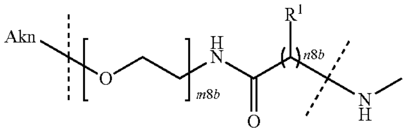 | m8b = 1-6<br>n8b = 1-6<br>$R^1$ = H, Me, Et, Bn |
| (L1-9a) | 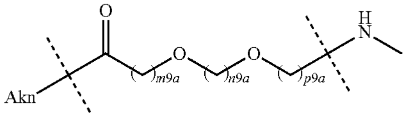 | m9a = 1-6<br>n9a = 2-6<br>p9a = 2-6 |
| (L1-9b) | 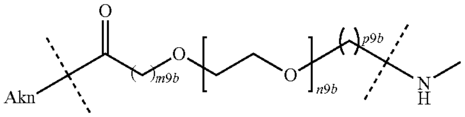 | m9b = 1-6<br>n9b = 1-6<br>p9b = 2-6 |
| (L1-10) | 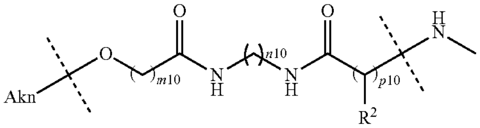 | m10 = 1-6<br>n10 = 2-6<br>p10 = 1-6<br>$R^2$ = H, Me, Et, Bn |
| (L1-11) | 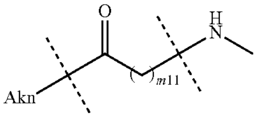 | m11 = 2-6 |
| (L1-12) | 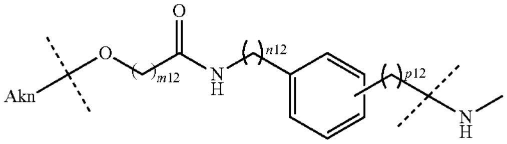 | m12 = 1-6<br>n12 = 0-6<br>p12 = 1-6 |

and Akn represents a cyclic alkyne group selected from the group consisting of the partial structural formulae shown in the following table [excluding the part to the right of the broken line in each formula]:

TABLE 2

| No. | Akn |
|---|---|
| (AK-1) | 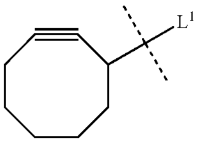 |

TABLE 2-continued

| No. | Akn |
|---|---|
| (AK-2) | 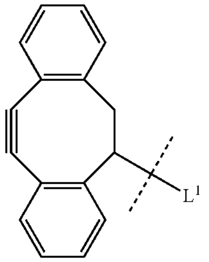 |

TABLE 2-continued

| No. | Akn |
|---|---|
| (AK-3) | 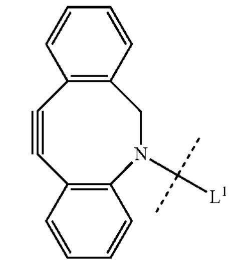 |
| (AK-4) | 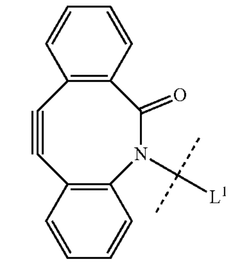 |
| (AK-5) | 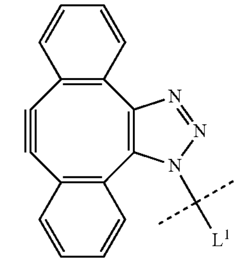 |
| (AK-6) | 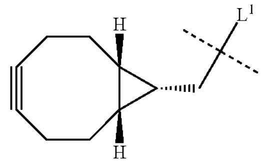 |
| (AK-7) | 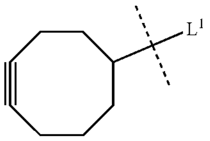 |
| (AK-8) | 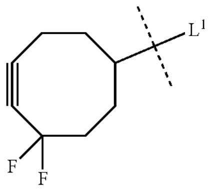 |

TABLE 2-continued

| No. | Akn |
|---|---|
| (AK-9) | 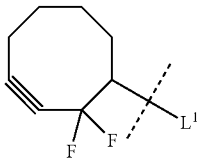 |
| (AK-10) | 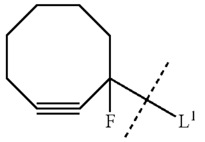 |
| (AK-11) | 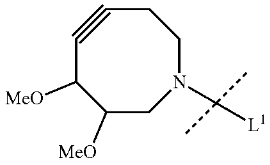 |
| (AK-12) | 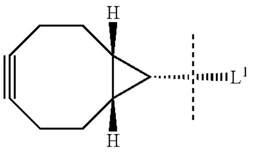 |

[Alginic Acid Derivative Represented by Formula (II)]

This is an alginic acid derivative represented by the following formula (II):

[C13]

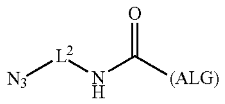

(II)

[in formula (II), (ALG) represents alginic acid; —NHCO— represents an amide bond via any carboxyl group of alginic acid; and -$L^2$- represents a linker selected from the group consisting of the partial structural formulae shown in the following tables [excluding the parts outside the broken lines at both ends of each formula]:

TABLE 3-1

| No. | —$L^2$— | |
|---|---|---|
| (L2-1) | 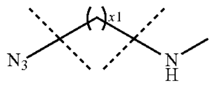 | x1 = 2-6 |

TABLE 3-1-continued
| No. | —$L^2$— | |
|---|---|---|
| (L2-2a) | 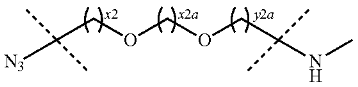 | x2 = 2-6<br>x2a = 2-6<br>y2a = 2-6 |
| (L2-2b) | 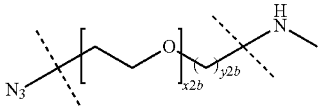 | x2b = 1-6<br>y2b = 2-6 |
| (L2-3) | 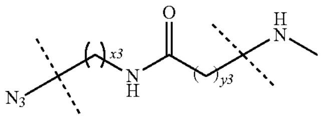 | x3 = 2-6<br>y3 = 1-6 |
| (L2-4) | 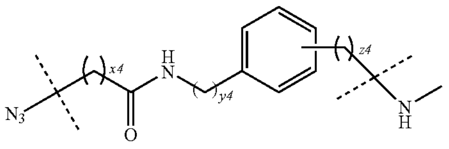 | x4 = 1-6<br>y4 = 1-6<br>z4 = 1-6 |
| (L2-5a) | 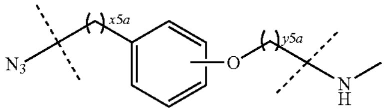 | x5a = 0-4<br>y5a = 2-6 |
| (L2-5b) | 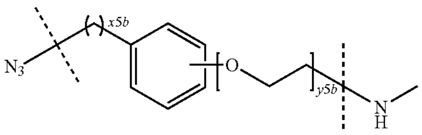 | x5b = 0-4<br>y5b = 1-6 |
| (L2-6a) | 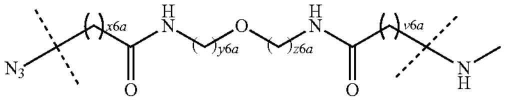 | x6a = 1-6<br>y6a = 2-6<br>z6a = 2-6<br>v6a = 1-6 |
| (L2-6b) | 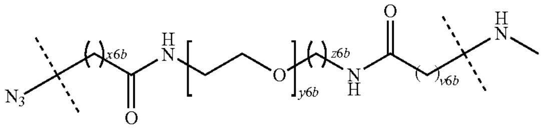 | x6b = 1-6<br>y6b = 1-6<br>z6b = 2-6<br>v6b = 1-6 |
| (L2-7a) | 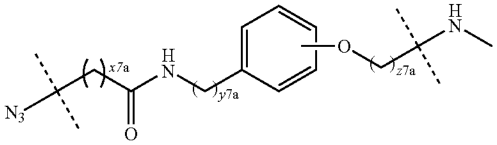 | x7a = 1-6<br>y7a = 1-6<br>z7a = 2-6 |
TABLE 3-2
| No. | —$L^2$— | |
|---|---|---|
| (L2-7b) | 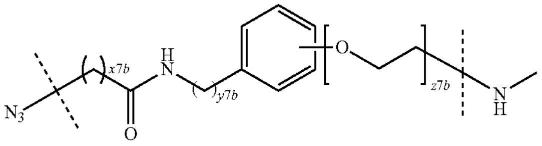 | x7b = 1-6<br>y7b = 1-6<br>z7b = 1-6 |

TABLE 3-2-continued

| No. | —$L^2$— | |
|---|---|---|
| (L2-8a) | 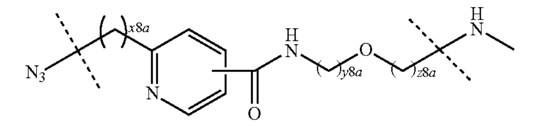 | x8a = 0-4<br>y8a = 2-6<br>z8a = 3-6 |
| (L2-8b) | 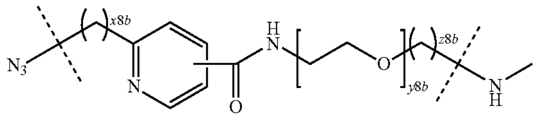 | x8b = 0-4<br>y8b = 1-6<br>z8b = 3-6 |
| (L2-9a) | 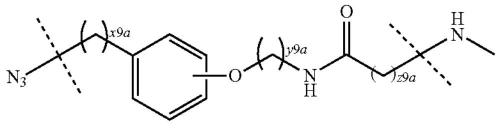 | x9a = 0-4<br>y9a = 2-6<br>z9a = 1-6 |
| (L2-9b) | 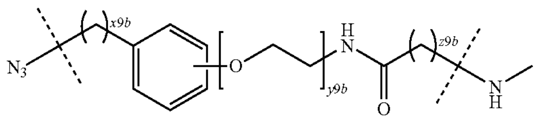 | x9b = 0-4<br>y9b = 1-6<br>z9b = 1-6 |
| (L2-10) | 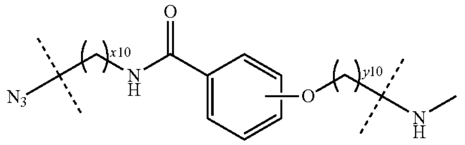 | x10 = 2-6<br>y10 = 2-6 |

(with the proviso that, crosslinked alginic acids obtained by performing a crosslinking reaction using a derivative in which $-L^1-$ is any one linker selected from the group consisting of (L1-1), (L1-2a), (L1-2b), (L1-11) or (L1-12) in the alginic acid derivative represented by formula (I) and a derivative in which $-L^2-$ is the linker (L2-10) in the alginic acid derivative represented by formula (II) are excluded).

[1-1-1] In formula (I) of the Embodiment [1], $-L^1-$ is preferably a linker selected from the group consisting of the partial structural formulae shown in the following tables [excluding the parts outside the broken lines at both ends of each formula]:

TABLE 4-1

| No. | —$L^1$— | |
|---|---|---|
| (L1-1) | 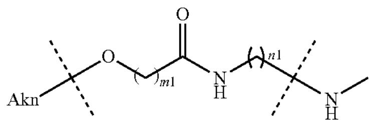 | m1 = 1-6<br>n1 = 2-6 |
| (L1-2a) | 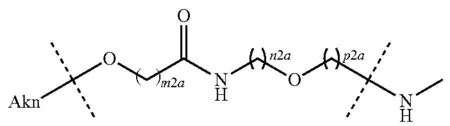 | m2a = 1-6<br>n2a = 2-6<br>p2a = 2-6 |
| (L1-2b) | 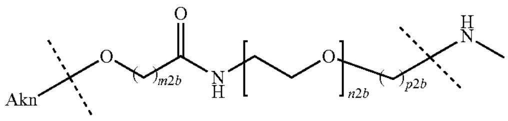 | m2b = 1-6<br>n2b = 1-6<br>p2b = 2-6 |
| (L1-3) | 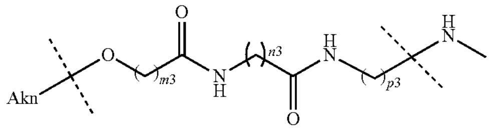 | m3 = 1-6<br>n3 = 1-6<br>p3 = 2-6 |

TABLE 4-1-continued
| No. | —L[1]— | |
|---|---|---|
| (L1-4a) | 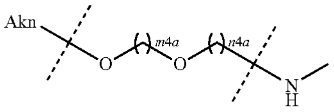 | m4a = 2-6<br>n4a = 2-6 |
| (L1-4b) | 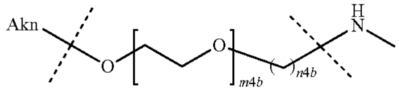 | m4b = 0-6<br>n4b = 2-6 |
| (L1-5a) | 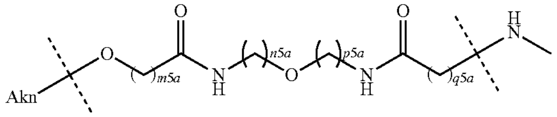 | m5a = 1-6<br>n5a = 2-6<br>p5a = 2-6<br>q5a = 1-6 |
| (L1-5b) | 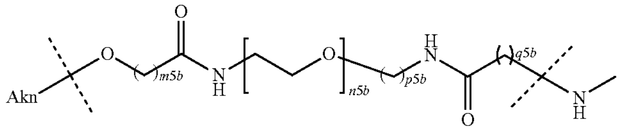 | m5b = 1-6<br>n5b = 1-6<br>p5b = 2-6<br>q5b = 1-6 |
| (L1-6a-p1) | 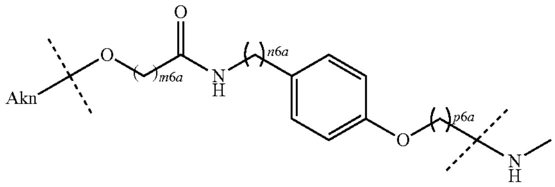 | m6a = 1-6<br>n6a = 0-6<br>p6a = 2-6 |
TABLE 4-2
| No. | —L[1]— | |
|---|---|---|
| (L1-6b-p1) | 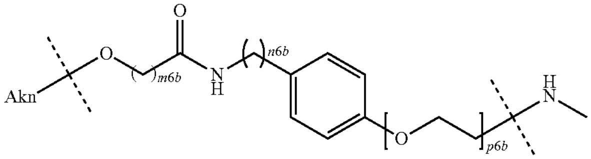 | m6b = 1-6<br>n6b = 1-6<br>p6b = 2-6 |
| (L1-7) | 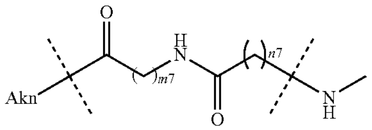 | m7 = 1-6<br>n7 = 1-6 |
| (L1-8a) | 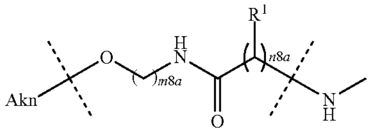 | m8a = 2-6<br>n8a = 1-6<br>$R^1$ = H, Me, Et, Bn |
| (L1-8b) | 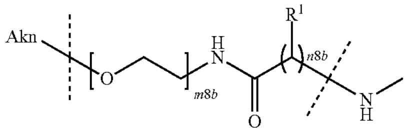 | m8b = 1-6<br>n8b = 1-6<br>$R^1$ = H, Me, Et, Bn |
| (L1-11) | 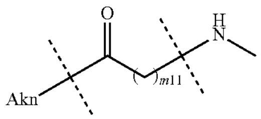 | m11 = 2-6 |

TABLE 4-2-continued

| No. | —$L^1$— | |
|---|---|---|
| (L1-12-p1) | 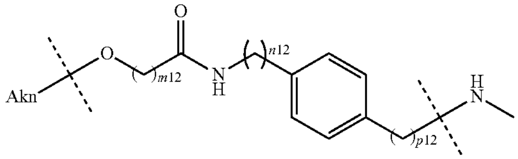 | m12 = 1-6<br>n12 = 0-6<br>p12 = 1-6 |

(with the proviso that, preferred embodiments do not include cases in which -$L^1$- is the linker (L1-1), (L1-2a), (L1-2b), (L1-11) or (L1-12-p1) from the tables when using an alginic acid derivative represented by formula (II) in which -$L^2$- is any one linker selected from the group consisting of (L2-10), (L2-10-p1), (L2-10-p2) and (L2-10-X) when performing the crosslinking reaction).

[1-1-2] In formula (I) of the Embodiment [1], -$L^1$- is more preferably a linker selected from the group consisting of the partial structural formulae shown in the following tables [excluding the parts outside the broken lines at both ends of each formula]:

TABLE 5-1

| No. | —$L^1$— | |
|---|---|---|
| (L1-1-1) | 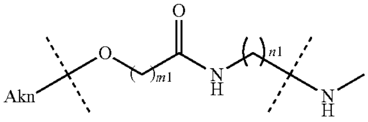 | m1 = 1-3<br>n1 = 2-4 |
| (L1-2a-1) | 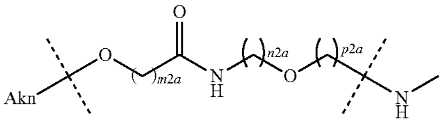 | m2a = 1-3<br>n2a = 2-4<br>p2a = 2-4 |
| (L1-2b-1) | 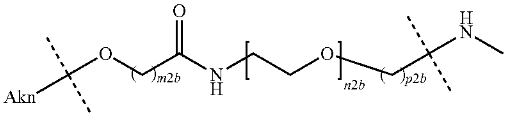 | m2b = 1-3<br>m2b = 1-3<br>p2b = 2-4 |
| (L1-3-1) | 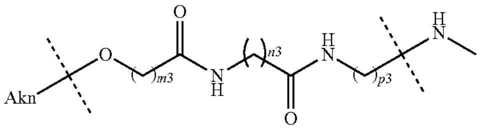 | m3 = 1-3<br>n3 = 1-3<br>p3 = 2-4 |
| (L1-4a-1) | 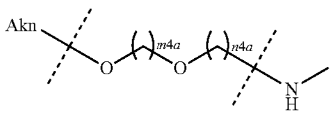 | m4a = 2-4<br>n4a = 2-4 |
| (L1-4b-1) | 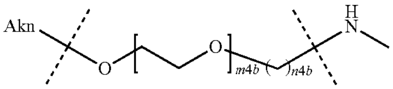 | m4b = 0-3<br>n4b = 2-4 |
| (L1-5a-1) | 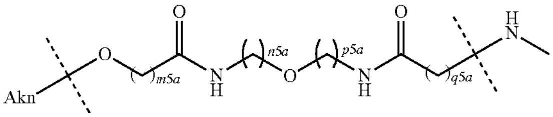 | m5a = 1-3<br>n5a = 2-4<br>p5a = 2-4<br>q5a = 1-3 |

TABLE 5-1-continued

| No. | —$L^1$— | |
|---|---|---|
| (L1-5b-1) | 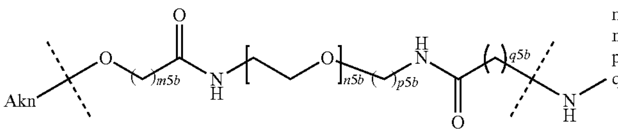 | m5b = 1-3<br>n5b = 1-3<br>p5b = 2-4<br>q5b = 1-3 |
| (L1-6a-p2) | 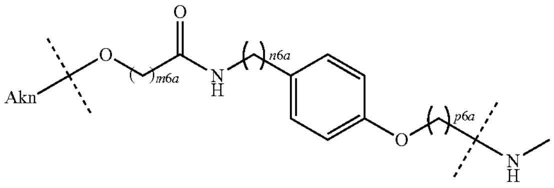 | m6a = 1-3<br>n6a = 0-3<br>p6a = 2-4 |

TABLE 5-2

| No. | —$L^1$— | |
|---|---|---|
| (L1-6b-p2) | 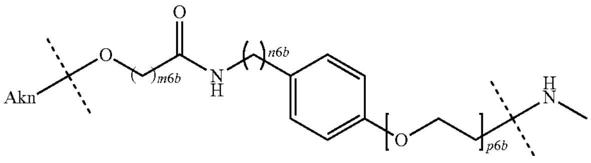 | m6b = 1-3<br>n6b = 1-3<br>p6b = 2-4 |
| (L1-7-1) | 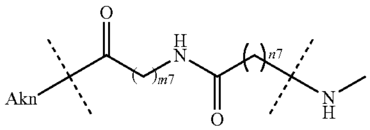 | m7 = 1-3<br>n7 = 1-3 |
| (L1-8a-1) | 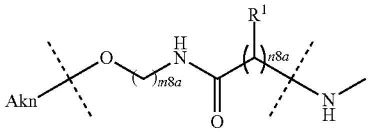 | m8a = 2-4<br>n8a = 1-3<br>$R^1$ = H, Me, Et, Bn |
| (L1-8b-1) | 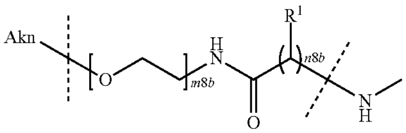 | m8b = 1-3<br>n8b = 1-3<br>$R^1$ = H, Me, Et, Bn |
| (L1-11-1) | 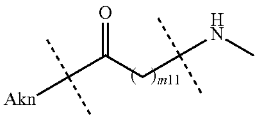 | m11 = 2-4 |
| (L1-12-p2) | 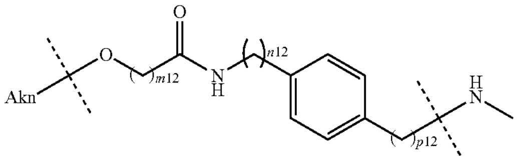 | m12 = 1-3<br>n12 = 0-3<br>p12 = 1-3 |

(with the proviso that, more preferred embodiments do not include cases in which -$L^1$- is the linker (L1-1-1), (L1-2a-1), (L1-2b-1), (L1-11-1) or (L1-12-p2) from the tables when using an alginic acid derivative represented by formula (II) in which $L^2$ is any one linker selected from the group consisting of (L2-10), (L2-10-p1), (L2-10-p2) and (L2-10-X) when performing the crosslinking reaction).

[1-1-3] In formula (I) of the Embodiment [1], -$L^1$- is still more preferably a linker selected from the group consisting of the partial structural formulae shown in the following tables [excluding the parts outside the broken lines at both ends of each formula]:

TABLE 6-1
| No. | —L¹— |
| --- | --- |
| (L1-1-X) | 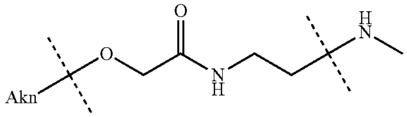 |
| (L1-2-X) | 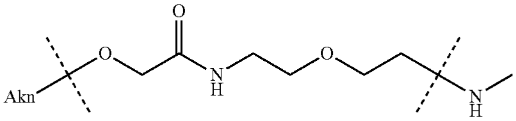 |
| (L1-3-X1) | 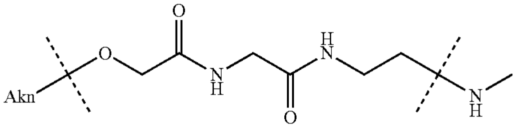 |
| (L1-3-X2) | 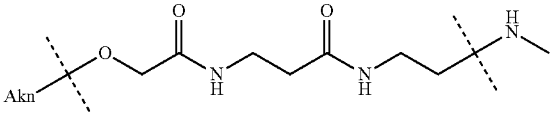 |
| (L1-4-X1) | 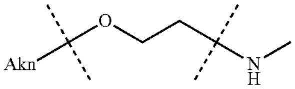 |
| (L1-4-X2) | 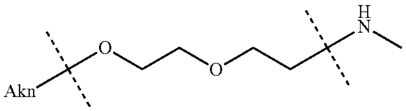 |
| (L1-5-X) | 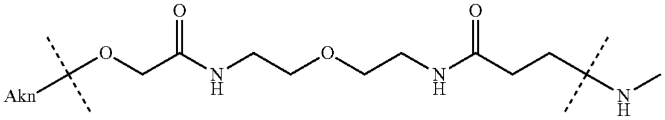 |
| (L1-6-X) | 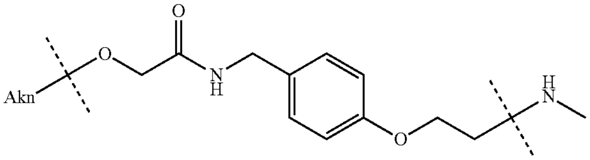 |
| (L1-7-X) | 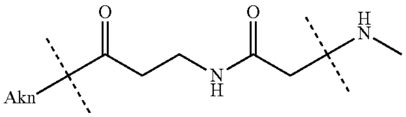 |
| (L1-8-X1) | 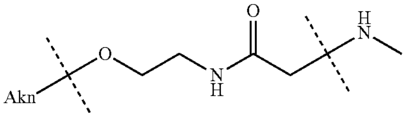 |
| (L1-8-X2) | 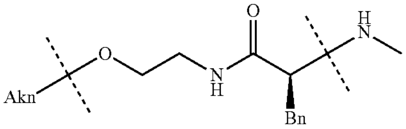 |

TABLE 6-2

| No. | —L¹— |
| --- | --- |
| (L1-11-X) | 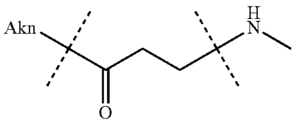 |
| (L1-12-X) | 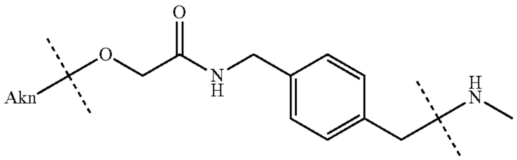 |

(with the proviso that, still more preferred embodiments do not include cases in which $-L^1-$ is the linker (L1-1-X), (L1-2-X), (L1-11-X) or (L1-12-X) when using an alginic acid derivative represented by formula (II) in which $-L^2-$ is any one linker selected from the group consisting of (L2-10), (L2-10-p1), (L2-10-p2) and (L2-10-X) when performing the crosslinking reaction).

[1-2-1] In formula (I) of the Embodiment [1], Akn is preferably a cyclic alkyne group selected from the group consisting of the partial structural formulae shown in the following table [excluding the part to the right of the broken line in each formula]:

TABLE 7

| No. | Akn |
| --- | --- |
| (AK-1) | 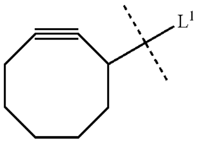 |
| (AK-2) | 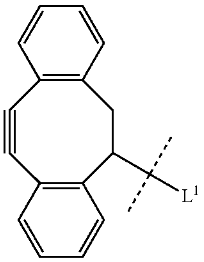 |
| (AK-3) | 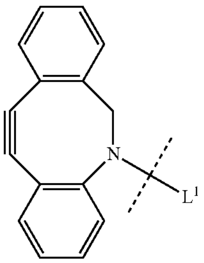 |

TABLE 7-continued

| No. | Akn |
| --- | --- |
| (AK-4) | 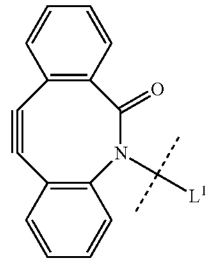 |
| (AK-5) | 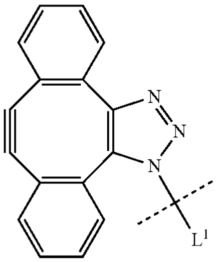 |
| (AK-6) | 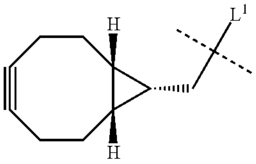 |
| (AK-10) | 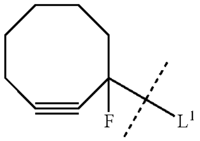 |

[1-2-2] In formula (I) of the Embodiment [1], Akn is more preferably a cyclic alkyne group selected from the group consisting of the partial structural formulae shown in the following table [excluding the part to the right of the broken line in each formula]:

TABLE 8

| No. | Akn |
| --- | --- |
| (AK-1) | 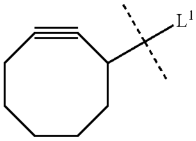 |
| (AK-3) | 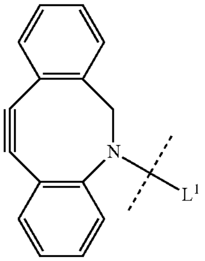 |

TABLE 8-continued

| No. | Akn |
|---|---|
| (AK-4) | 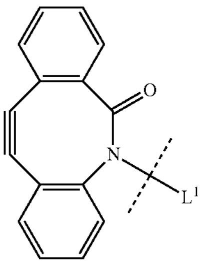 |
| (AK-10) | 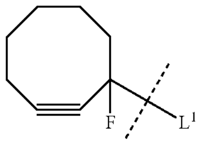 |

[1-2-3] In formula (I) of the Embodiment [1], Akn is still more preferably a cyclic alkyne group selected from the group consisting of the partial structural formulae shown in the following table [excluding the part to the right of the broken line in each formula]:

TABLE 9

| No. | Akn |
|---|---|
| (AK-1) | 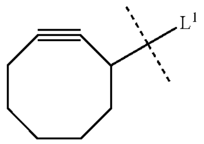 |
| (AK-3) | 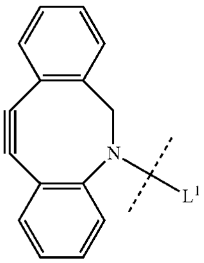 |

[1-3-1] In formula (II) of the Embodiment [1], $-L^2-$ is preferably a linker selected from the group consisting of the partial structural formulae shown in the following table [excluding the parts outside the broken lines at both ends of each formula]:

TABLE 10

| No. | $—L^2—$ | |
|---|---|---|
| (L2-1) | 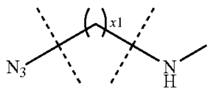 | x1 = 2-6 |
| (L2-2a) | 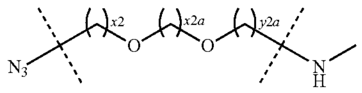 | x2 = 2-6<br>x2a = 2-6<br>y2a = 2-6 |
| (L2-2b) | 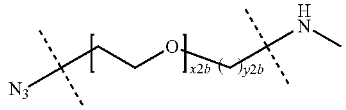 | x2b = 1-6<br>y2b = 2-6 |
| (L2-3) | 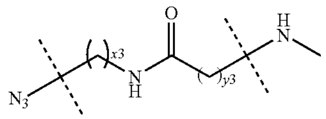 | x3 = 2-6<br>y3 = 1-6 |
| (L2-4-p1) | 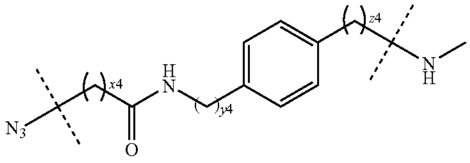 | x4 = 1-6<br>y4 = 1-6<br>z4 = 1-6 |
| (L2-5a-p1) | 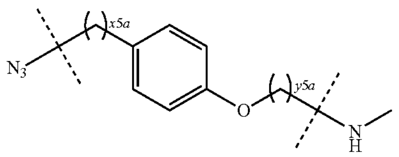 | x5a = 0-4<br>y5a = 2-6 |

TABLE 10-continued

| No. | —L²— | |
|---|---|---|
| (L2-5b-p1) | 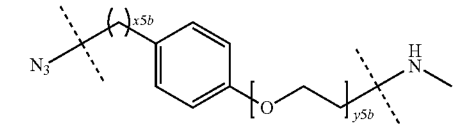 | x5b = 0-4<br>y5b = 1-6 |
| (L2-10-p1) | 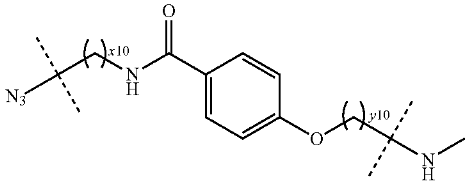 | x10 = 2-6<br>y10 = 2-6 |

(with the proviso that, preferred embodiments do not include cases in which -$L^2$- is the linker (L2-10-p1) from the table when using an alginic acid derivative represented by formula (I) in which -$L^1$- is any one linker selected from the group consisting of (L1-1), (L1-2a), (L1-2b), (L1-11), (L1-12), (L1-1-1), (L1-2a-1), (L1-2b-1), (L1-11-1), (L1-12-p1), (L1-1-X), (L1-2-X), (L1-11-X) and (L1-12-X) when performing the crosslinking reaction).

[1-3-2] In formula (II) of the Embodiment [1], -$L^2$- is more preferably a linker selected from the group consisting of the partial structural formulae shown in the following table [excluding the parts outside the broken lines at both ends of each formula]:

TABLE 11

| No. | —L²— | |
|---|---|---|
| (L2-1-1) | 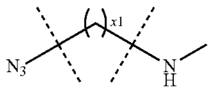 | x1 = 2-4 |
| (L2-2a-1) | 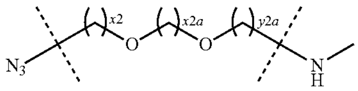 | x2 = 2-4<br>x2a = 2-4<br>y2a = 2-4 |
| (L2-2b-1) | 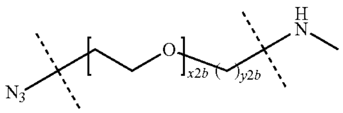 | x2b = 1-3<br>y2b = 2-4 |
| (L2-3-1) | 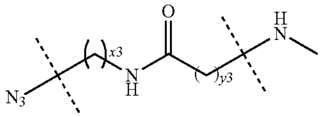 | x3 = 2-4<br>y3 = 1-3 |
| (L2-4-p2) | 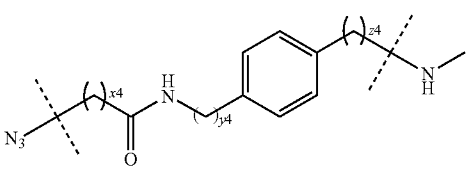 | x4 = 1-3<br>y4 = 1-3<br>z4 = 1-3 |
| (L2-5a-p2) | 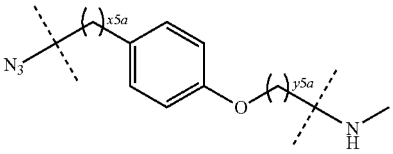 | x5a = 0-2<br>y5a = 2-4 |

TABLE 11-continued

| No. | —$L^2$— | |
|---|---|---|
| (L2-5b-p2) | 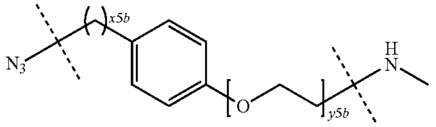 | x5b = 0-2<br>y5b = 1-3 |
| (L2-10-p2) | 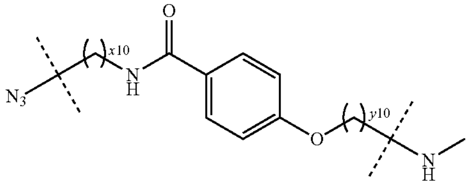 | x10 = 2-4<br>y10 = 2-4 |

(with the proviso that, more preferred embodiments do not include cases in which -$L^2$- is the linker (L2-10-p2) from the table when using an alginic acid derivative represented by formula (I) in which -$L^1$- is any one linker selected from the group consisting of (L1-1), (L1-2a), (L1-2b), (L1-11), (L1-12), (L1-1-1), (L1-2a-1), (L1-2b-1), (L1-11-1), (L1-12-p1), (L1-1-X), (L1-2-X), (L1-11-X) and (L1-12-X) when performing the crosslinking reaction).

[1-3-3] In formula (II) of the Embodiment [1], -$L^2$- is still more preferably a linker selected from the group consisting of the partial structural formulae shown in the following table [excluding the parts outside the broken lines at both ends of each formula]:

TABLE 12

| No. | —$L^2$— |
|---|---|
| (L2-1-X) | 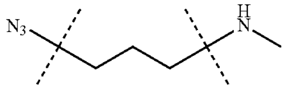 |
| (L2-2-X) | 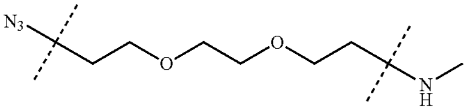 |
| (L2-3-X1) | 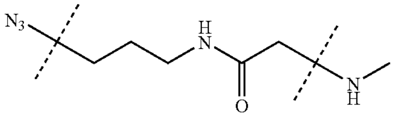 |
| (L2-3-X2) | 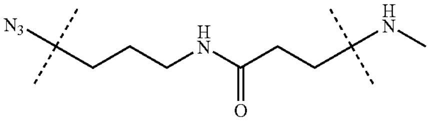 |
| (L2-4-X) | 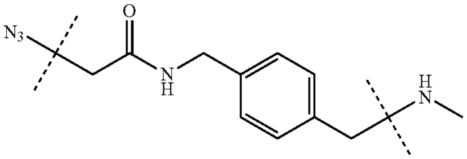 |
| (L2-5-X) | 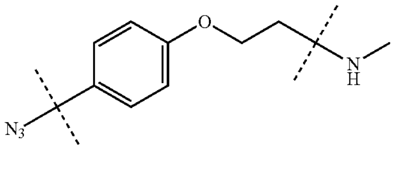 |

TABLE 12-continued

| No. | —L²— |
| --- | --- |
| (L2-10-X) | 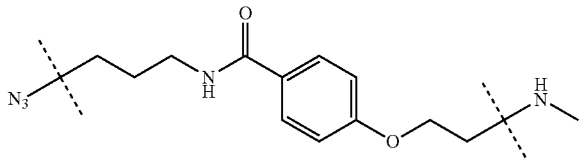 |

(with the proviso that, still more preferred embodiments do not include cases in which -$L^2$- is the linker (L2-10-X) from the table when using an alginic acid derivative represented by formula (I) in which -$L^1$- is any one linker selected from the group consisting of (L1-1), (L1-2a), (L1-2b), (L1-11), (L1-12), (L1-1-1), (L1-2a-1), (L1-2b-1), (L1-11-1), (L1-12-p1), (L1-1-X), (L1-2-X), (L1-11-X) and (L1-12-X) when performing the crosslinking reaction).

[1-4-1] In formula (I) of the Embodiment [1], the combination of Akn and -$L^1$- is preferably as shown by partial structures selected from the groups of formulae in the following table (in which the formulae for Akn and -$L^1$- in the table are as described in the Embodiment [1]):

TABLE 13

| Akn | -$L^1$- |
| --- | --- |
| (AK-1) | Any one linker selected from the group consisting of (L1-1), (L1-2a), (L1-2b), (L1-3), (L1-4a), (L1-4b), (L1-5a), (L1-5b), (L1-6a-p1), (L1-6b-p1), (L1-7), (L1-8a), (L1-8b), (L1-11) and (L1-12) |
| (AK-2) | Any one linker selected from the group consisting of (L1-1), (L1-2a), (L1-2b), (L1-3), (L1-4a), (L1-4b), (L1-5a), (L1-5b), (L1-6a-p1), (L1-6b-p1), (L1-7), (L1-8a), (L1-8b), (L1-11) and (L1-12) |
| (AK-3) | Linker (L1-7) or (L1-11) |
| (AK-4) | Linker (L1-7) or (L1-11) |
| (AK-5) | Linker (L1-7) or (L1-11) |
| (AK-6) | Any one linker selected from the group consisting of (L1-1), (L1-2a), (L1-2b), (L1-3), (L1-4a), (L1-4b), (L1-5a), (L1-5b), (L1-6a-p1), (L1-6b-p1), (L1-7), (L1-8a) and (L1-8b) |
| (AK-7) | Any one linker selected from the group consisting of (L1-1), (L1-2a), (L1-2b), (L1-3), (L1-4a), (L1-4b), (L1-5a), (L1-5b), (L1-6a-p1), (L1-6b-p1), (L1-7), (L1-8a), (L1-8b), (L1-11) and (L1-12) |
| (AK-8) | Any one linker selected from the group consisting of (L1-1), (L1-2a), (L1-2b), (L1-3), (L1-4a), (L1-4b), (L1-5a), (L1-5b), (L1-6a-p1), (L1-6b-p1), (L1-7), (L1-8a), (L1-8b), (L1-11) and (L1-12) |
| (AK-9) | Any one linker selected from the group consisting of (L1-1), (L1-2a), (L1-2b), (L1-3), (L1-4a), (L1-4b), (L1-5a), (L1-5b), (L1-6a-p1), (L1-6b-p1), (L1-7), (L1-8a), (L1-8b), (L1-11) and (L1-12) |
| (AK-10) | Any one linker selected from the group consisting of (L1-1), (L1-2a), (L1-2b), (L1-3), (L1-4a), (L1-4b), (L1-5a), (L1-5b), (L1-6a-p1), (L1-6b-p1), (L1-7), (L1-8a), (L1-8b), (L1-11) and (L1-12) |
| (AK-11) | Linker (L1-7) or (L1-11) |
| (AK-12) | Any one linker selected from the group consisting of (L1-1), (L1-2a), (L1-2b), (L1-3), (L1-4a), (L1-4b), (L1-5a), (L1-5b), (L1-6a-p1), (L1-6b-p1), (L1-7), (L1-8a), (L1-8b), (L1-11) and (L1-12) |

(with the proviso that, preferred embodiments do not include cases in which -$L^1$- is the linker (L1-1), (L1-2a), (L1-2b), (L1-11) or (L1-12) from the table when using an alginic acid derivative represented by formula (II) in which -$L^2$- is any one linker selected from the group consisting of (L2-10), (L2-10-p1), (L2-10-p2) and (L2-10-X) when performing the crosslinking reaction, when performing the crosslinking reaction).

[1-4-2] In formula (I) of the Embodiment [1], the combination of Akn and -$L^1$- is more preferably as shown by partial structures selected from the groups of formulae in the following table (in which the formulae for Akn and -$L^1$- are as described in the Embodiment [1-1]):

TABLE 14

| Akn | -$L^1$- |
| --- | --- |
| (AK-1) | Any one linker selected from the group consisting of (L1-1-1), (L1-2a-1), (L1-2b-1), (L1-3-1), (L1-4a-1), (L1-4b-1), (L1-5a-1), (L1-5b-1), (L1-6a-p2), (L1-6b-p2), (L1-7-1), (L1-8a-1), (L1-8b-1), (L1-11-1) and (L1-12-p1) |
| (AK-2) | Any one linker selected from the group consisting of (L1-1-1), (L1-2a-1), (L1-2b-1), (L1-3-1), (L1-4a-1), (L1-4b-1), (L1-5a-1), (L1-5b-1), (L1-6a-p2), (L1-6b-p2), (L1-7-1), (L1-8a-1), (L1-8b-1), (L1-11-1) and (L1-12-p1) |
| (AK-3) | Linker (L1-7-1) or (L1-11-1) |
| (AK-4) | Linker (L1-7-1) or (L1-11-1) |
| (AK-5) | Linker (L1-7-1) or (L1-11-1) |
| (AK-6) | Any one linker selected from the group consisting of (L1-1-1), (L1-2a-1), (L1-2b-1), (L1-3-1), (L1-4a-1), (L1-4b-1), (L1-5a-1), (L1-5b-1), (L1-6a-p2), (L1-6b-p2), (L1-7-1), (L1-8a-1), (L1-8b-1), (L1-11-1) and (L1-12-p1) |
| (AK-10) | Any one linker selected from the group consisting of (L1-1-1), (L1-2a-1), (L1-2b-1), (L1-3-1), (L1-4a-1), (L1-4b-1), (L1-5a-1), (L1-5b-1), (L1-6a-p2), (L1-6b-p2), (L1-7-1), (L1-8a-1), (L1-8b-1), (L1-11-1) and (L1-12-p1) |

(with the proviso that, more preferred embodiments do not include cases in which -$L^1$- is the linker (L1-1-1), (L1-2a-1), (L1-2b-1), (L1-11-1) or (L1-12-p1) when using an alginic acid derivative represented by formula (II) in which -$L^2$- is any one linker selected from the group consisting of (L2-10), (L2-10-p1), (L2-10-p2) and (L2-10-X) when performing the crosslinking reaction).

[1-4-3] In formula (I) of the Embodiment [1], the combination of Akn and -$L^1$- is still more preferably as shown by partial structures selected from the groups of formulae in the following table (in which the formulae for Akn and -$L^1$- are as described in the Embodiment [1-1]):

TABLE 15

| Akn | -$L^1$- |
| --- | --- |
| (AK-1) | Any one linker selected from the group consisting of (L1-1-X), (L1-2-X), (L1-3-X1), (L1-3-X2), (L1-4-X1), (L1-4-X2), (L1-5-X), (L1-6-X), (L1-7-X), (L1-8-X1), (L1-8-X2), (L1-11-X) and (L1-12-X) |
| (AK-3) | Linker (L1-7-X) or (L1-11-X) |

(with the proviso that, still more preferred embodiments do not include cases in which -$L^1$- is the linker (L1-1-X), (L1-2-X), (L1-11-X) or (L1-12-X) when using an alginic acid derivative represented by formula (II) in which -$L^2$- is any one linker selected from the group consisting of (L2-10), (L2-10-p1), (L2-10-p2) and (L2-10-X) when performing the crosslinking reaction).

[1-4-4] In formula (I) of the Embodiment [1], the combination of Akn and -$L^2$- is particularly preferably as shown by a partial structure selected from the group consisting of the following partial structural formulae:

[C14]

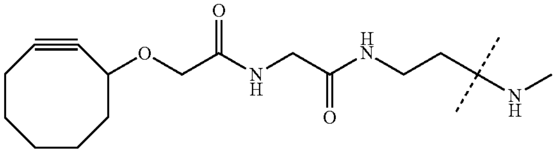

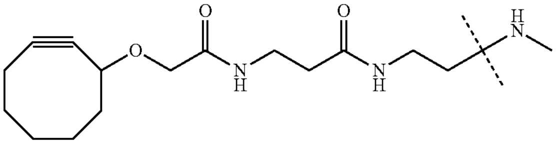

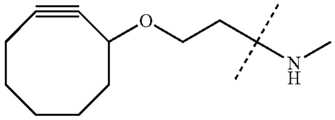

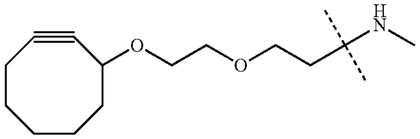

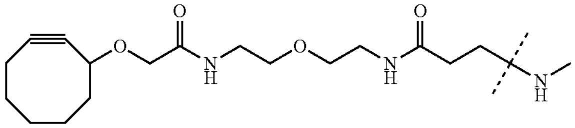

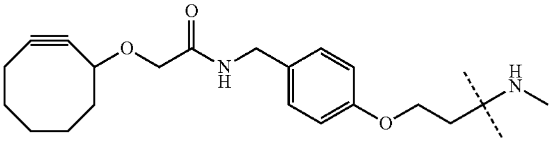

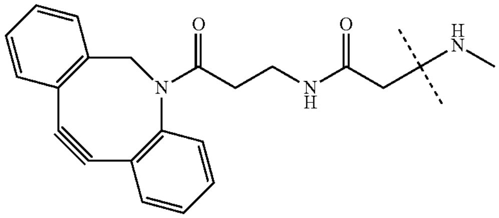

-continued

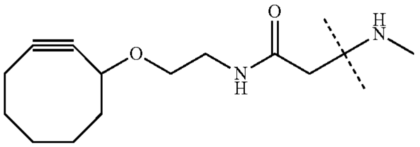

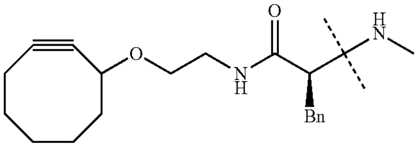

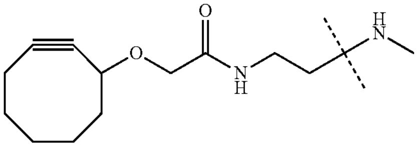

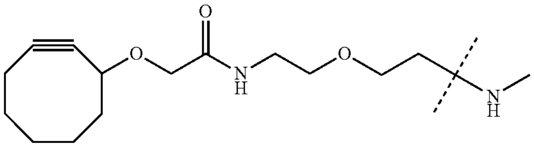

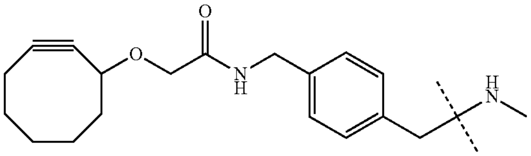

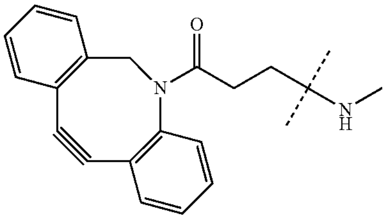

(with the proviso that, partial structures selected from the group consisting of the following partial structural formulae:

[C15]

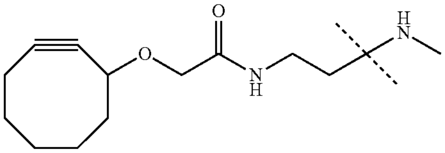

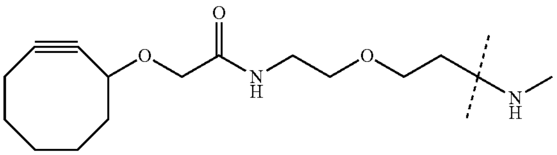

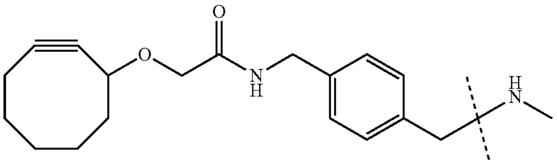

-continued

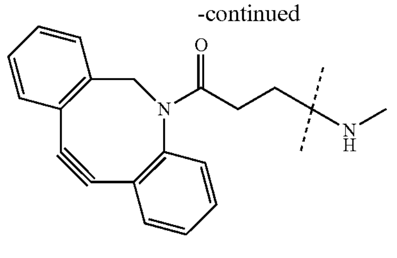

are excluded from the particularly preferred embodiments when using an alginic acid derivative represented by formula (II) in which $-L^2-$ is any one linker selected from the group consisting of (L2-10), (L2-10-p1), (L2-10-p2) and (L2-10-X) when performing the crosslinking reaction).

[1-Ia] Embodiment 1-Ia is as follows: The alginic acid derivative represented by formula (I) according to the Embodiment [1], in which the introduction rate of the Akn-$L^1$-$NH_2$ group (in which Akn and $-L^1-$ are defined as in the Embodiment [1]) is from about 0.1% to about 30%.

[1-Ia-1] In the Embodiment 1-Ia, the introduction rate of the Akn-$L^1$-$NH_2$ group is preferably from about 1.0% to about 20%, or more preferably from about 2.0% to 10%.

[1-Ib] Embodiment 1-Ib is as follows: The alginic acid derivative represented by formula (I) according to the Embodiment [1], in which the weight-average molecular weight of the alginic acid derivative as measured by gel filtration chromatography is from about 100,000 Da to about 3,000,000 Da.

[1-Ib-1] In the Embodiment [1-Ib], the weight-average molecular weight of the alginic acid derivative as measured by gel filtration chromatography is preferably from about 300,000 Da to about 2,500,000 Da, or more preferably from about 500,000 Da to about 1,000,000 Da.

[1-Ic] Embodiment 1-Ic is as follows: The alginic acid derivative represented by formula (II) according to the Embodiment [1], in which the introduction rate of the $N_3$-$L^2$-$NH_2$ group (in which $-L^2-$ is defined as in the Embodiment [1]) is from about 0.1% to about 30%.

[1-Ic-1] In the Embodiment [1-Ic], the introduction rate of the $N_3$-$L^2$-$NH_2$ group is preferably from about 1.0% to about 20%, or more preferably from about 2.0% to 10%.

[1-Id] Embodiment 1-Id is as follows: The alginic acid derivative represented by formula (II) according to the Embodiment [1], in which the weight-average molecular weight of the alginic acid derivative as measured by gel filtration chromatography is from about 100,000 Da to about 3,000,000 Da.

[1-Id-1] In the Embodiment 1-Id, the weight-average molecular weight of the alginic acid derivative of formula (II) as measured by gel filtration chromatography is preferably from about 300,000 Da to about 2,500,000 Da, or more preferably from about 500,000 Da to about 1,000,000 Da.

Preferred embodiments of the crosslinked alginic acid of the Embodiment [1] can be formed arbitrarily by appropriately combining the preferred embodiments of the Embodiment [1] and the definitions of Akn, 42- and $-L^2-$.

[2] Embodiment 2 is as follows: An alginic acid derivative represented by the following formula (I) comprising a cyclic alkyne group (Akn) introduced via an amide bond and a divalent linker ($-L^1-$) at any one or more carboxyl groups of alginic acid:

[C16]

(I)

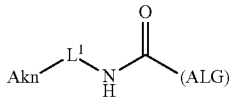

[in formula (I), (ALG) represents alginic acid; —NHCO— represents an amide bond via any carboxyl group of alginic acid; $-L^1-$ represents a linker selected from the group consisting of the partial structural formulae shown in the following tables [excluding the parts outside the broken lines at both ends of each formula]:

TABLE 16-1

| No. | —$L^1$— | |
|---|---|---|
| (L1-1-A) | 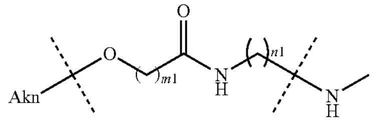 | m1 = 5, 6<br>n1 = 2-6 |
| (L1-2a-A) | 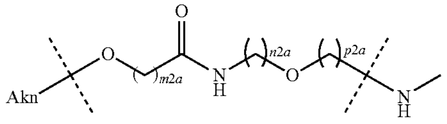 | m2a = 1-6<br>n2a = 2-6<br>p2a = 2-6<br>(Excluding combination of m2a = 1, n2a = 2, p2a = 2) |
| (L1-2b-A) | 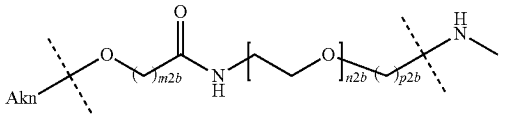 | m2b = 1-6<br>n2b = 1-6<br>p2b = 3-6 |
| (L1-3) | 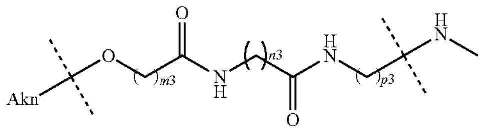 | m3 = 1-6<br>n3 = 1-6<br>p3 = 2-6 |

TABLE 16-1-continued
| No. | —$L^1$— | |
|---|---|---|
| (L1-4a) | 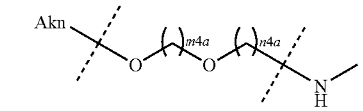 | m4a = 2-6<br>n4a = 2-6 |
| (L1-4b) | 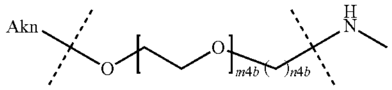 | m4b = 0-6<br>n4b = 2-6 |
| (L1-5a) | 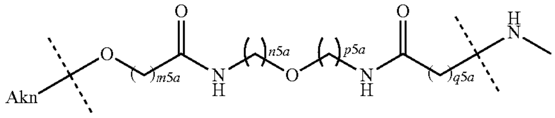 | m5a = 1-6<br>n5a = 2-6<br>p5a = 2-6<br>q5a = 1-6 |
| (L1-5b) | 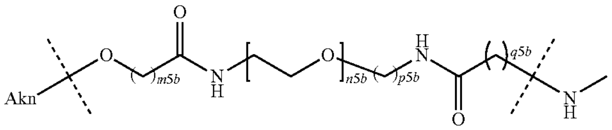 | m5b = 1-6<br>n5b = 1-6<br>p5b = 2-6<br>q5b = 1-6 |
| (L1-6a) | 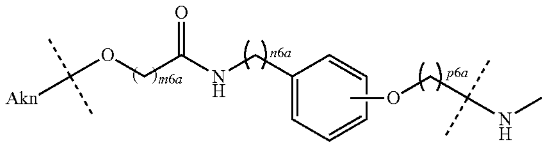 | m6a = 1-6<br>n6a = 0-6<br>p6a = 2-6 |
TABLE 16-2
| No. | —$L^1$— | |
|---|---|---|
| (L1-6b) | 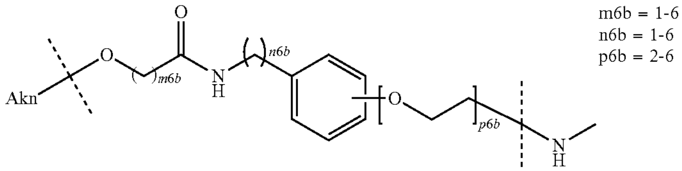 | m6b = 1-6<br>n6b = 1-6<br>p6b = 2-6 |
| (L1-7) | 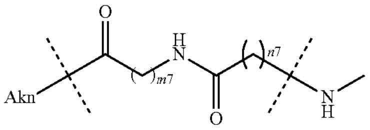 | m7 = 1-6<br>n7 = 1-6 |
| (L1-8a) | 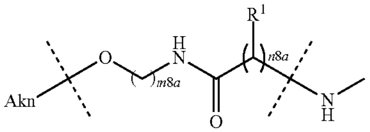 | m8a = 2-6<br>n8a = 1-6<br>$R^1$ = H, Me, Et, Bn |
| (L1-8b) | 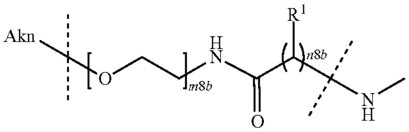 | m8b = 1-6<br>n8b = 1-6<br>$R^1$ = H, Me, Et, Bn |
| (L1-9a) | 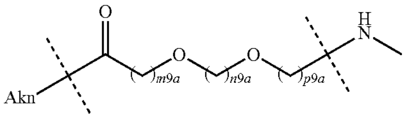 | m9a = 1-6<br>n9a = 2-6<br>p9a = 2-6 |

TABLE 16-2-continued
| No. | —$L^1$— | |
|---|---|---|
| (L1-9b) | 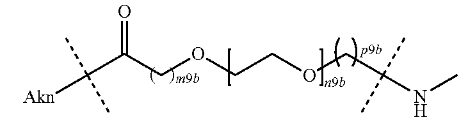 | m9b = 1-6<br>n9b = 1-6<br>p9b = 2-6 |
| (L1-10) | 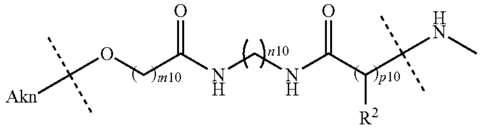 | m10 = 1-6<br>n10 = 2-6<br>p10 = 1-6<br>R2 = H, Me, Et, Bn |
and Akn represents a cyclic alkyne group selected from the group consisting of the partial structural formulae shown in the following table [excluding the part to the right of the broken line in each formula]:
TABLE 17
| No. | Akn |
|---|---|
| (AK-1) | 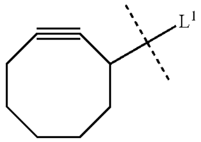 |
| (AK-2) | 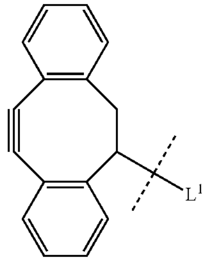 |
| (AK-3) | 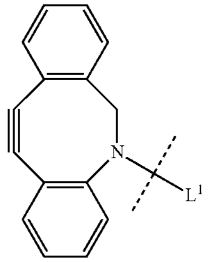 |
| (AK-4) | 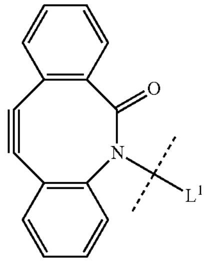 |
TABLE 17-continued
| No. | Akn |
|---|---|
| (AK-5) | 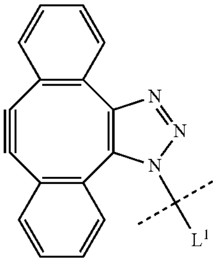 |
| (AK-6) | 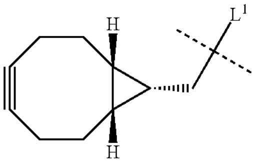 |
| (AK-7) | 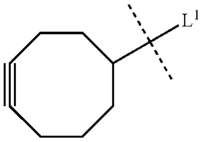 |
| (AK-8) | 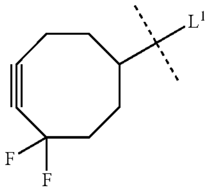 |
| (AK-9) | 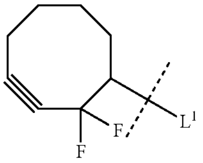 |

TABLE 17-continued

| No. | Akn |
|---|---|
| (AK-10) | 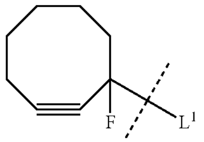 |
| (AK-11) | 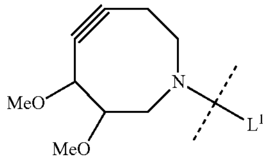 |

TABLE 17-continued

| No. | Akn |
|---|---|
| (AK-12) | 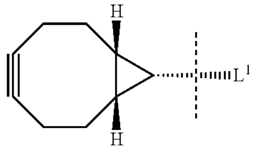 |

[2-1] In the formula (I) of the Embodiment [2], $-L^1-$ is preferably a linker selected from the group consisting of the partial structural formulae shown in the following tables [excluding the parts outside the broken lines at both ends of each formula]:

TABLE 18-1

| No. | $—L^1—$ | |
|---|---|---|
| (L1-1-A) | 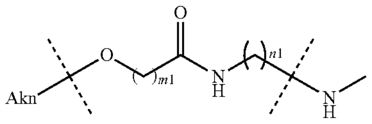 | m1 = 5, 6<br>n1 = 2-6 |
| (L1-2a-A) | 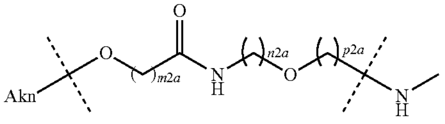 | m2a = 1-6<br>n2a = 2-6<br>p2a = 2-6<br>(excluding combination of m2a = 1, n2a = 2, p2a = 2) |
| (L1-2b-A) | 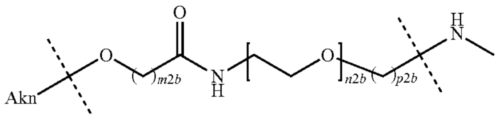 | m2b = 1-6<br>n2b = 1-6<br>p2b = 3-6 |
| (L1-3) | 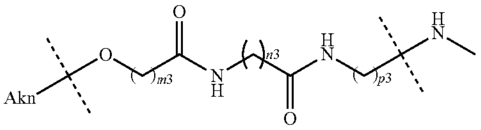 | m3 = 1-6<br>n3 = 1-6<br>p3 = 2-6 |
| (L1-4a) | 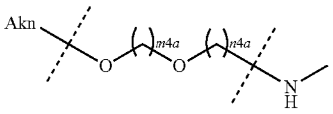 | m4a = 2-6<br>n4a = 2-6 |
| (L1-4b) | 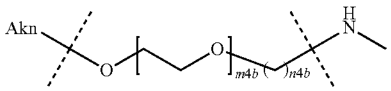 | m4b = 0-6<br>n4b = 2-6 |
| (L1-5a) | 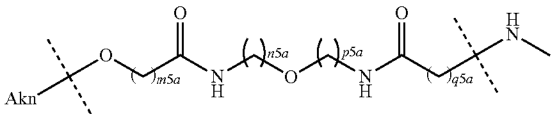 | m5a = 1-6<br>n5a = 2-6<br>p5a = 2-6<br>q5a = 1-6 |
| (L1-5b) | 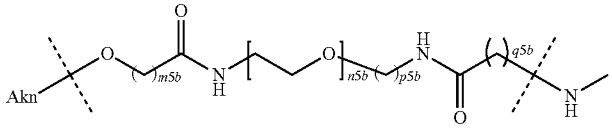 | m5 = 1-6<br>n5b = 1-6<br>p5 = 2-6<br>q5 = 1-6 |

TABLE 18-1-continued

| No. | —$L^1$— | |
|---|---|---|
| (L1-6a-p1) | 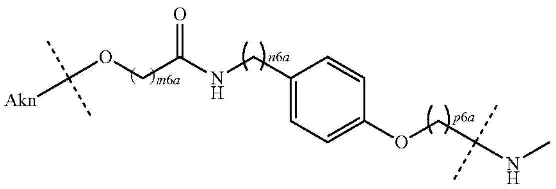 | m6a = 1-6<br>n6a = 0-6<br>p6a = 2-6 |

TABLE 18-2

| No. | —$L^1$— | |
|---|---|---|
| (L1-6b-p1) | 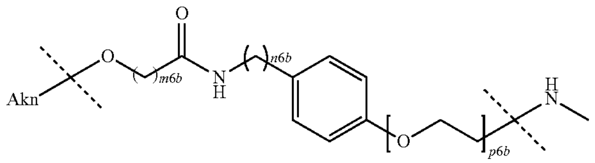 | m6b = 1-6<br>n6b = 1-6<br>p6b = 2-6 |
| (L1-7) | 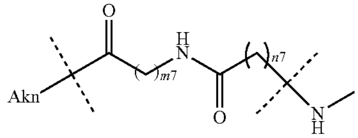 | m7 = 1-6<br>n7 = 1-6 |
| (L1-8a) | 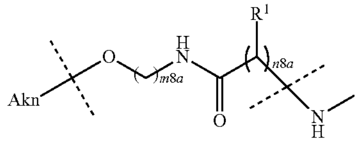 | m8a = 2-6<br>n8a = 1-6<br>$R^1$ = H, Me, Et, Bn |
| (L1-8b) | 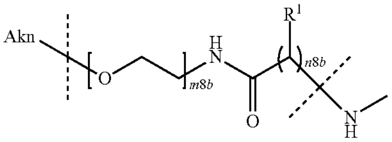 | m8b = 1-6<br>n8b = 1-6<br>$R^1$ = H, Me, Et, Bn |

or more preferably a linker selected from the group consisting of the partial structural formulae shown in the following tables [excluding the parts outside the broken lines at both ends of each formula]:

TABLE 19-1

| No. | —$L^1$— | |
|---|---|---|
| (L1-1-B) | 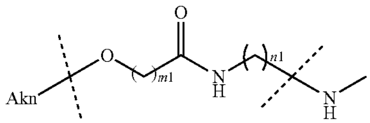 | m1 = 5, 6<br>n1 = 2-4 |
| (L1-2a-B) | 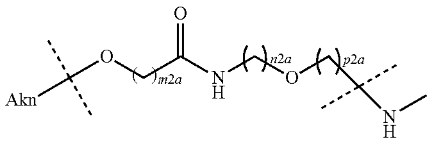 | m2a = 1-3<br>n2a = 2-4<br>p2a = 2-4<br>(excluding combination of<br>m2a = 1,<br>n2a = 2,<br>p2a = 2) |

TABLE 19-1-continued
| No. | —L¹— | |
|---|---|---|
| (L1-2b-B) | 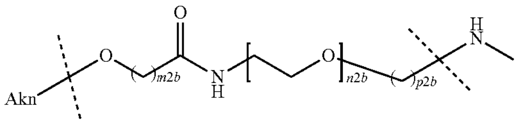 | m2b = 1-3<br>n2b = 1-3<br>p2b = 3, 4 |
| (L1-3-1) | 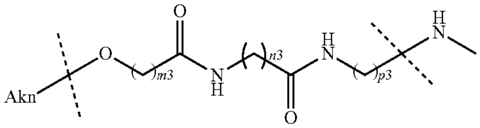 | m3 = 1-3<br>n3 = 1-3<br>p3 = 2-4 |
| (L1-4a-1) | 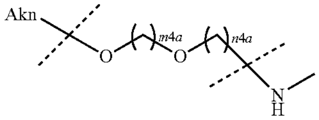 | m4a = 2-4<br>n4a = 2-4 |
| (L1-4b-1) | 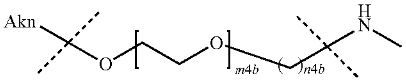 | m4b = 0-3<br>n4b = 2-4 |
| (L1-5a-1) | 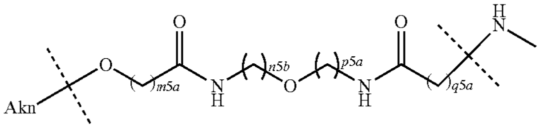 | m5a = 1-3<br>n5a = 2-4<br>p5a = 2-4<br>q5a = 1-3 |
| (L1-5b-1) | 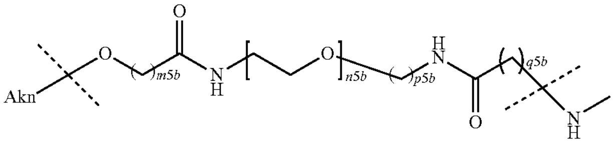 | m5b = 1-3<br>n5b = 1-3<br>p5b = 2-4<br>q5b = 1-3 |
| (L1-6a-p2) | 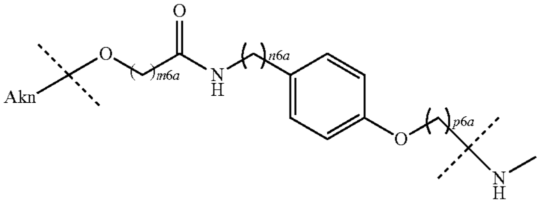 | m6a = 1-3<br>n6a = 0-3<br>p6a = 2-4 |
TABLE 19-2
| No. | —L¹— | |
|---|---|---|
| (L1-6b-p2) | 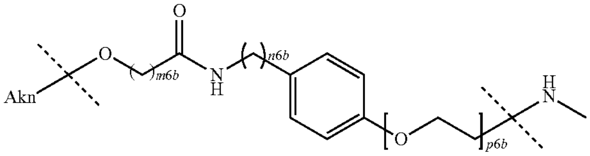 | m6b = 1-3<br>n6b = 1-3<br>p6b = 2-4 |
| (L1-7-1) | 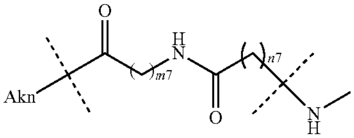 | m7 = 1-3<br>n7 = 1-3 |

TABLE 19-2-continued
| No. | —$L^1$— | |
|---|---|---|
| (L1-8a-1) | 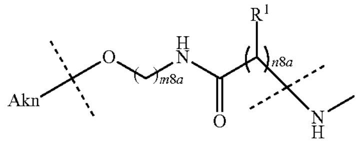 | m8a = 2-4<br>n8a = 1-3<br>R1 = H, Me, Et, Bn |
| (L1-8b-1) | 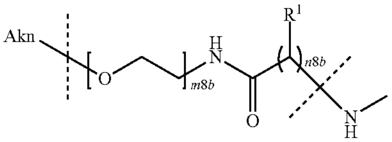 | m8b = 1-3<br>n8b = 1-3<br>R1 = H, Me, Et, Bn |
or still more preferably a linker selected from the group consisting of the partial structural formulae shown in the following tables [excluding the parts outside the broken lines at both ends of each formula]:
TABLE 20-1
| No. | —$L^1$— |
|---|---|
| (L1-3-X1) | 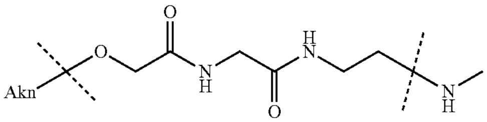 |
| (L1-3-X2) | 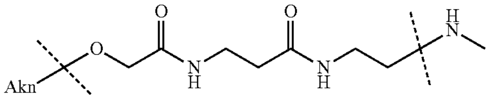 |
TABLE 20-1-continued
| No. | —$L^1$— |
|---|---|
| (L1-4-X1) | 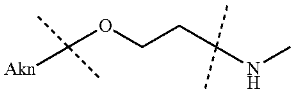 |
| (L1-4-X2) | 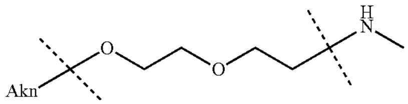 |
TABLE 20-2
| No. | —$L^1$— |
|---|---|
| (L1-5-X) | 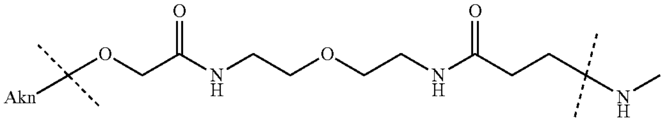 |
| (L1-6-X) | 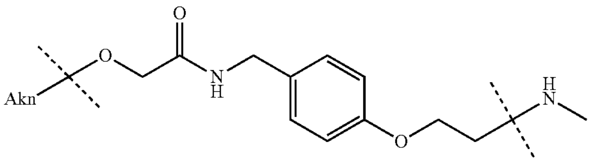 |
| (L1-7-X) | 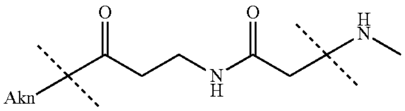 |
| (L1-8-X1) | 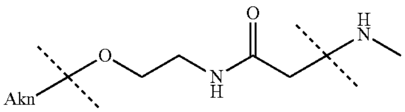 |

TABLE 20-2-continued

| No. | —L¹— |
| --- | --- |
| (L1-8-X2) | 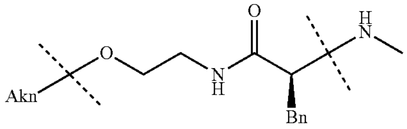 |

[2-2] In the formula (I) of the Embodiment [2], Akn is preferably a cyclic alkyne group selected from the group consisting of the partial structural formulae shown in the following table [excluding the part to the right of the broken line in each formula]:

TABLE 21

| No. | Akn |
| --- | --- |
| (AK-1) | 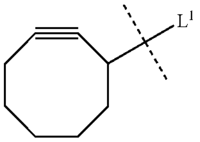 |
| (AK-2) | 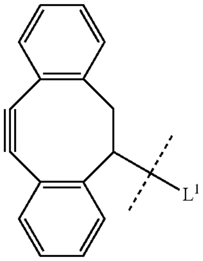 |
| (AK-3) | 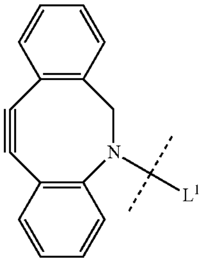 |
| (AK-4) | 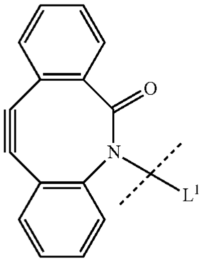 |

TABLE 21-continued

| No. | Akn |
| --- | --- |
| (AK-5) | 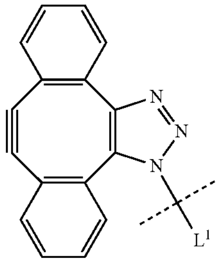 |
| (AK-6) | 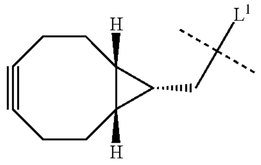 |
| (AK-10) | 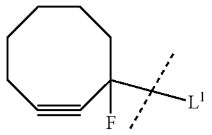 |

or more preferably a cyclic alkyne group selected from the group consisting of the partial structural formulae shown in the following table [excluding the part to the right of the broken line in each formula]:

TABLE 22

| No. | Akn |
| --- | --- |
| (AK-1) | 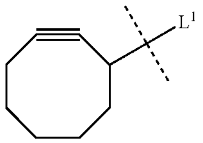 |
| (AK-3) | 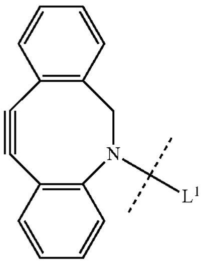 |

TABLE 22-continued

| No. | Akn |
|---|---|
| (AK-4) | 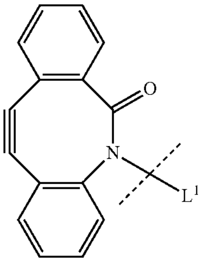 |
| (AK-10) | 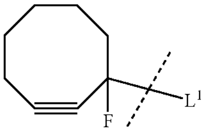 |

or still more preferably a cyclic alkyne group selected from the group consisting of the partial structural formulae shown in the following table [excluding the part to the right of the broken line in each formula]:

TABLE 23

| No. | Akn |
|---|---|
| (AK-1) | 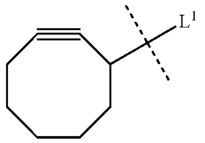 |
| (AK-3) | 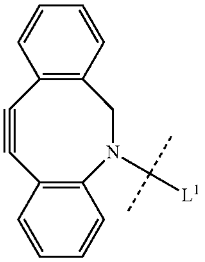 |

[2-3] In formula (I) of the Embodiment [2], the combination of Akn and -L$^1$- is preferably as shown by partial structures selected from the groups of formulae in the following table (in which the formulae for Akn and -L$^1$- in the table are as described in the Embodiment [2]):

TABLE 24

| Akn | -L$^1$- |
|---|---|
| (AK-1) | Any one linker selected from the group consisting of (L1-1-A), (L1-2a-A), (L1-2b-A), (L1-3), (L1-4a), (L1-4b), (L1-5a), (L1-5b), (L1-6a-p1), (L1-6b-p1), (L1-7), (L1-8a) and (L1-8b) |
| (AK-2) | Any one linker selected from the group consisting of (L1-1-A), (L1-2a-A), (L1-2b-A), (L1-3), (L1-4a), (L1-4b), (L1-5a), (L1-5b), (L1-6a-p1), (L1-6b-p1), (L1-7), (L1-8a) and (L1-8b) |
| (AK-3) | (L1-7) |
| (AK-4) | (L1-7) |
| (AK-5) | (L1-7) |
| (AK-6) | Any one linker selected from the group consisting of (L1-1-A), (L1-2a-A), (L1-2b-A), (L1-3), (L1-4a), (L1-4b), (L1-5a), (L1-5b), (L1-6a-p1), (L1-6b-p1), (L1-7), (L1-8a) and (L1-8b) |
| (AK-7) | Any one linker selected from the group consisting of (L1-1-A), (L1-2a-A), (L1-2b-A), (L1-3), (L1-4a), (L1-4b), (L1-5a), (L1-5b), (L1-6a-p1), (L1-6b-p1), (L1-7), (L1-8a) and (L1-8b) |
| (AK-8) | Any one linker selected from the group consisting of (L1-1-A), (L1-2a-A), (L1-2b-A), (L1-3), (L1-4a), (L1-4b), (L1-5a), (L1-5b), (L1-6a-p1), (L1-6b-p1), (L1-7), (L1-8a) and (L1-8b) |
| (AK-9) | Any one linker selected from the group consisting of (L1-1-A), (L1-2a-A), (L1-2b-A), (L1-3), (L1-4a), (L1-4b), (L1-5a), (L1-5b), (L1-6a-p1), (L1-6b-p1), (L1-7), (L1-8a) and (L1-8b) |
| (AK-10) | Any one linker selected from the group consisting of (L1-1-A), (L1-2a-A), (L1-2b-A), (L1-3), (L1-4a), (L1-4b), (L1-5a), (L1-5b), (L1-6a-p1), (L1-6b-p1), (L1-7), (L1-8a) and (L1-8b) |
| (AK-11) | (L1-7) |
| (AK-12) | Any one linker selected from the group consisting of (L1-1-A), (L1-2a-A), (L1-2b-A), (L1-3), (L1-4a), (L1-4b), (L1-5a), (L1-5b), (L1-6a-p1), (L1-6b-p1), (L1-7), (L1-8a) and (L1-8b) |

or more preferably the combination of Akn and is as shown by partial structures selected from the groups of formulae in the following table (in which the formulae for Akn and -L$^1$- in the table are as described in the Embodiments [2-1] and [2-2]):

TABLE 25

| Akn | -L$^1$- |
|---|---|
| (AK-1) | Any one linker selected from the group consisting of (L1-1-B), (L1-2a-B), (L1-2b-B), (L1-3-1), (L1-4a-1), (L1-4b-1), (L1-5a-1), (L1-5b-1), (L1-6a-p2), (L1-6b-p2), (L1-7-1), (L1-8a-1) and (L1-8b-1) |
| (AK-2) | Any one linker selected from the group consisting of (L1-1-B), (L1-2a-B), (L1-2b-B), (L1-3-1), (L1-4a-1), (L1-4b-1), (L1-5a-1), (L1-5b-1), (L1-6a-p2), (L1-6b-p2), (L1-7-1), (L1-8a-1) and (L1-8b-1) |
| (AK-3) | (L1-7-1) |
| (AK-4) | (L1-7-1) |
| (AK-5) | (L1-7-1) |
| (AK-6) | Any one linker selected from the group consisting of (L1-1-B), (L1-2a-B), (L1-2b-B), (L1-3-1), (L1-4a-1), (L1-4b-1), (L1-5a-1), (L1-5b-1), (L1-6a-p2), (L1-6b-p2), (L1-7-1), (L1-8a-1) and (L1-8b-1) |
| (AK-10) | Any one linker selected from the group consisting of (L1-1-B), (L1-2a-B), (L1-2b-B), (L1-3-1), (L1-4a-1), (L1-4b-1), (L1-5a-1), (L1-5b-1), (L1-6a-p2), (L1-6b-p2), (L1-7-1), (L1-8a-1) and (L1-8b-1) |

or still more preferably the combination of Akn and -L$^1$- is as shown by partial structures selected from the groups of formulae in the following table (in which the formulae for Akn and -L$^1$- in the table are as described in the Embodiments [2-1] and [2-2]):

TABLE 26

| Akn | $-L^1-$ |
|---|---|
| (AK-1) | Any one linker selected from the group consisting of (L1-3-X1), (L1-3-X2), (L1-4-X1), (L1-4-X2), (L1-5-X), (L1-6-X), (L1-7-X), (L1-8-X1) and (L1-8-X2) |
| (AK-3) | (L1-7-X) |

or especially preferably the combination of Akn and $-L^1-$ is represented by a partial structure selected from the group consisting of the following partial structural formulae:

[C17]

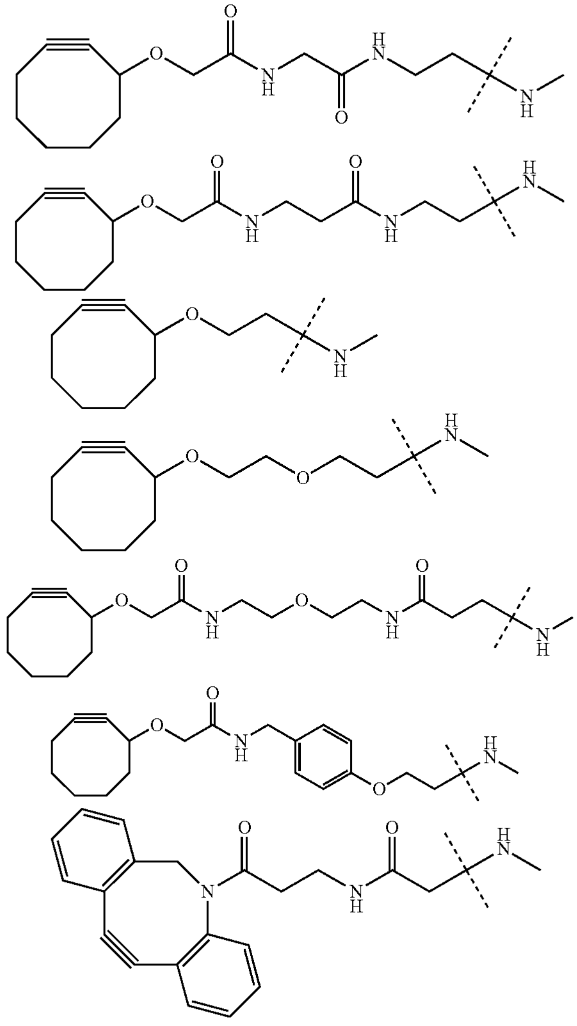

-continued

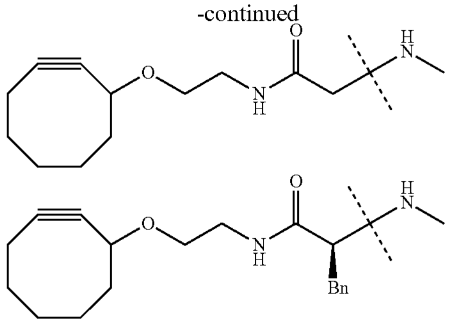

Preferred embodiments of the alginic acid derivative represented by the formula (I) of the Embodiment [2] can be formed arbitrarily by appropriately combining the preferred embodiments of the Embodiment [2] and the definitions of Akn and $-L^1-$.

[3] Embodiment 3 is as follows: the alginic acid derivative represented by formula (I) as described in the Embodiment [2], wherein the introduction rate of the $Akn-L^1-NH_2$ group (in which Akn and $-L^1-$ are defined as in the Embodiment [2]) is from about 0.1% to about 30%.

[3-1] In the Embodiment [3], the introduction rate of the $Akn-L^1-NH_2$ group is preferably from about 1.0% to about 20%, or more preferably from about 2.0% to 10%.

[4] Embodiment 4 is as follows: the alginic acid derivative represented by formula (I) according to the Embodiment [2], wherein the weight-average molecular weight of the alginic acid derivative as measured by gel filtration chromatography is from about 100,000 Da to about 3,000,000 Da.

[4-1] In the Embodiment [4], the weight-average molecular weight of the alginic acid derivative as measured by gel filtration chromatography is preferably from about 300,000 Da to about 2,500,000 Da, or more preferably from about 500,000 Da to about 1,000,000 Da.

[5] Embodiment 5 is as follows: An alginic acid derivative represented by the following formula (II), comprising an azide group introduced via an amide bond and a divalent linker $(-L^2-)$ at any one or more carboxyl groups of alginic acid:

[C18]

(II)

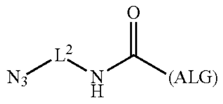

[in formula (II), (ALG) represents alginic acid; —NHCO— represents an amide bond via any carboxyl group of alginic acid; and $-L^2-$ represents a linker selected from the group consisting of the partial structural formulae shown in the following tables [excluding the parts outside the broken lines at both ends of each formula]:

TABLE 27-1

| No. | $—L^2—$ | |
|---|---|---|
| (L2-1-A) | 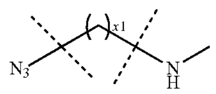 | x1 = 2, 4, 5, 6 |

TABLE 27-1-continued
| No. | —$L^2$— | |
|---|---|---|
| (L2-2a) | 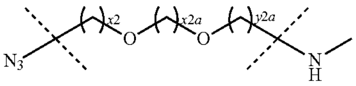 | x2 = 2-6<br>x2a = 2-6<br>y2a = 2-6 |
| (L2-2b-A) | 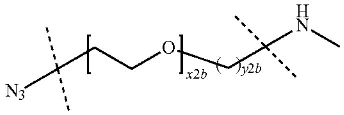 | x2b = 1-6<br>y2b = 2-6<br>excluding<br>combination<br>of<br>x2b = 3,<br>y2b = 2,<br>x2b = 6,<br>y2b = 2 |
| (L2-3) | 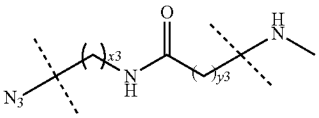 | x3 = 2-6<br>y3 = 1-6 |
| (L2-4) | 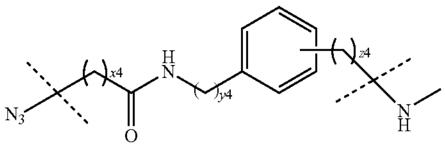 | x4 = 1-6<br>y4 = 1-6<br>z4 = 1-6 |
| (L2-5a) | 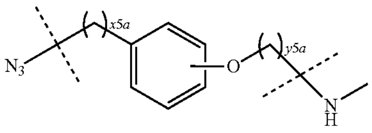 | x5a = 0-4<br>y5a = 2-6 |
| (L2-5b) | 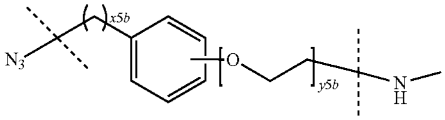 | x5b = 0-4<br>y5b = 1-6 |
| (L2-6a) | 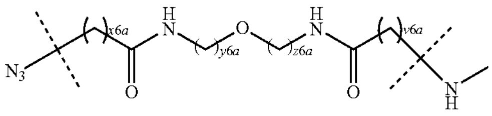 | x6a = 1-6<br>y6a = 2-6<br>z6a = 2-6<br>v6a = 1-6 |
| (L2-6b) | 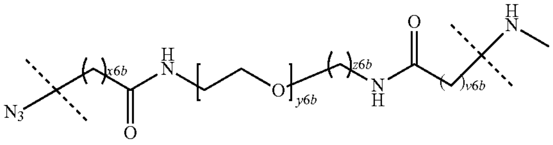 | x6b = 1-6<br>y6b = 1-6<br>z6b = 2-6<br>v6b = 1-6 |
| (L2-7a) | 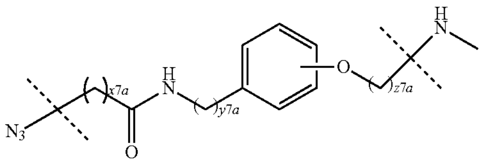 | x7a = 1-6<br>y7a = 1-6<br>z7a = 2-6 |

TABLE 27-2

| No. | —$L^2$— | |
|---|---|---|
| (L2-7b) | 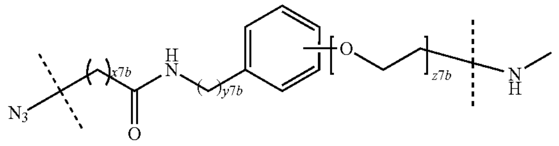 | x7b = 1-6<br>y7b = 1-6<br>z7b = 1-6 |
| (L2-8a) | 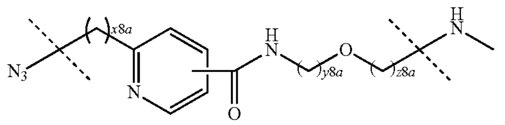 | x8a = 0-4<br>y8a = 2-6<br>z8a = 3-6 |
| (L2-8b) | 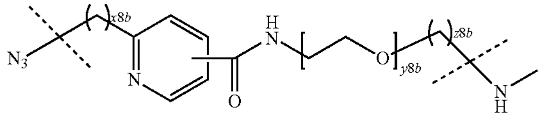 | x8b = 0-4<br>y8b = 1-6<br>z8b = 3-6 |
| (L2-9a) | 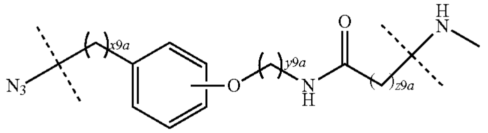 | x9a = 0-4<br>y9a = 2-6<br>z9a = 1-6 |
| (L2-9b) | 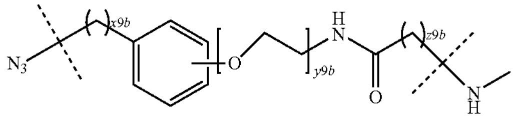 | x9b = 0-4<br>y9b = 1-6<br>z9b = 1-6 |

[5-1] In the alginic acid derivative of formula (II) in the Embodiment [5], $-L^2-$ is preferably a linker selected from the group consisting of the partial structural formulae shown in the following table [excluding the parts outside the broken lines at both ends of each formula]:

TABLE 28

| No. | —$L^2$— | |
|---|---|---|
| (L2-1-A) | 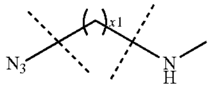 | x1 = 2, 4, 5, 6 |
| (L2-2a) | 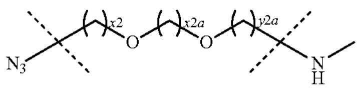 | x2 = 2-6<br>x2a = 2-6<br>y2a = 2-6 |
| (L2-2b-A) | 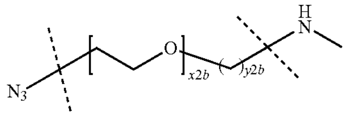 | x2b = 1-6<br>y2b = 2-6<br>excluding combination of x2b = 3, y2b = 2, x2b = 6, y2b = 2 |
| (L2-3) | 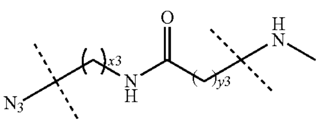 | x3 = 2-6<br>y3 = 1-6 |

TABLE 28-continued

| No. | —$L^2$— | |
|---|---|---|
| (L2-4-p1) | 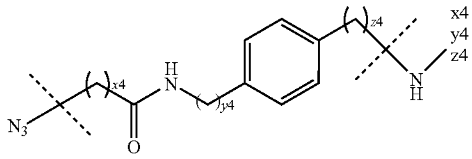 | x4 = 1-6<br>y4 = 1-6<br>z4 = 1-6 |
| (L2-5a-p1) | 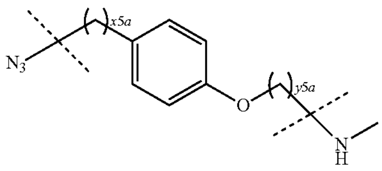 | x5a = 0-4<br>y5a = 2-6 |
| (L2-5b-p1) | 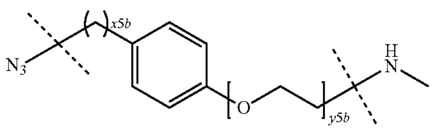 | x5b = 0-4<br>y5b = 1-6 |

or more preferably a linker selected from the group consisting of the partial structural formulae shown in the following table [excluding the parts outside the broken lines at both ends of each formula]:

TABLE 29

| No. | —$L^2$— | |
|---|---|---|
| (L2-1-B) | 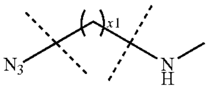 | x1 = 2, 4 |
| (L2-2a-1) | 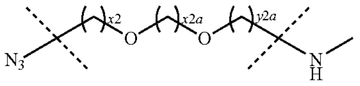 | x2 = 2-4<br>x2a = 2-4<br>y2a = 2-4 |
| (L2-2b-B) | 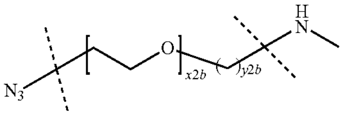 | x2b = 1-3<br>y2b = 2-4<br>excluding combination of x2b = 3, y2b = 2 |
| (L2-3-1) | 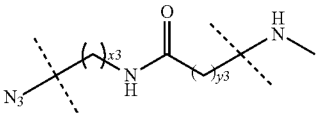 | x3 = 2-4<br>y3 = 1-3 |
| (L2-4-p2) | 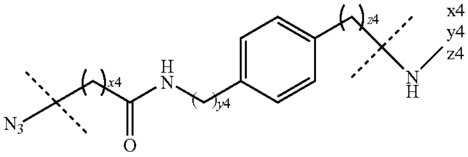 | x4 = 1-3<br>y4 = 1-3<br>z4 = 1-3 |
| (L2-5a-p2) | 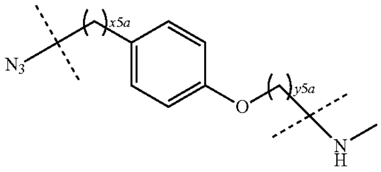 | x5a = 0-2<br>y5a = 2-4 |
| (L2-5b-p2) | 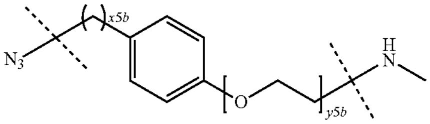 | x5b = 0-2<br>y5b = 1-3 |

or still more preferably a linker selected from the group consisting of the partial structural formulae shown in the following table [excluding the parts outside the broken lines at both ends of each formula]:

TABLE 30

| No. | —$L^2$— |
|---|---|
| (L2-2-X) | 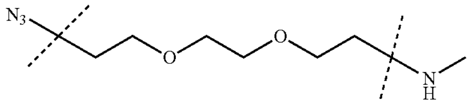 |
| (L2-3-X1) | 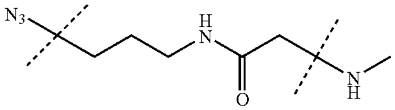 |
| (L2-3-X2) | 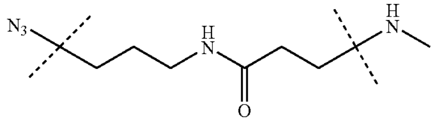 |
| (L2-4-X) | 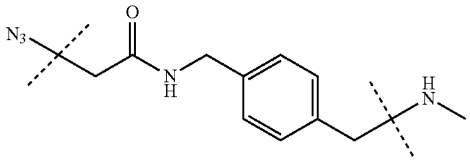 |
| (L2-5-X) | 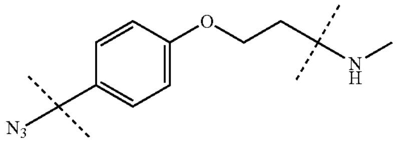 |

[5a] Embodiment 5a is as follows: An alginic acid derivative represented by the following formula (II), comprising an azide group introduced via an amide bond and a divalent linker (-$L^2$-) at any one or more carboxyl groups of alginic acid:

[C19]

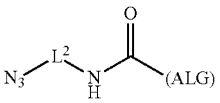

(II)

[in formula (II), (ALG) represents alginic acid; —NHCO— represents an amide bond via any carboxyl group of alginic acid; and -$L^2$- represents a linker selected from the group consisting of the partial structural formulae shown in the following tables [excluding the parts outside the broken lines at both ends of each formula]:

TABLE 31-1

| No. | —$L^2$— | |
|---|---|---|
| (L2-3) | 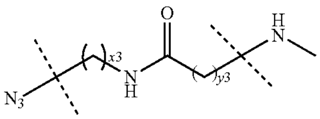 | x3 = 2-6<br>y3 = 1-6 |

TABLE 31-1-continued
| No. | —$L^2$— | |
|---|---|---|
| (L2-4) | 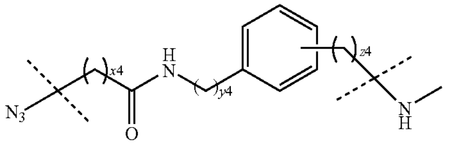 | x4 = 1-6<br>y4 = 1-6<br>z4 = 1-6 |
| (L2-5a) | 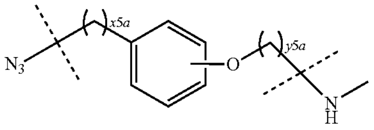 | x5a = 0-4<br>y5a = 2-6 |
| (L2-5b) | 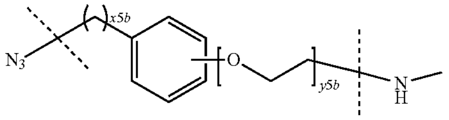 | x5b = 0-4<br>y5b = 1-6 |
| (L2-6a) | 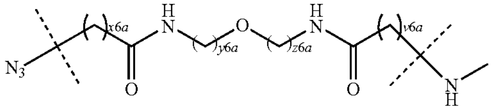 | x6a = 1-6<br>y6a = 2-6<br>z6a = 2-6<br>v6a = 1-6 |
| (L2-6b) | 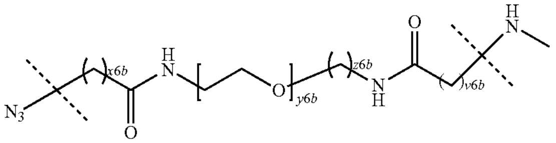 | x6b = 1-6<br>y6b = 1-6<br>z6b = 2-6<br>v6b = 1-6 |
| (L2-7a) | 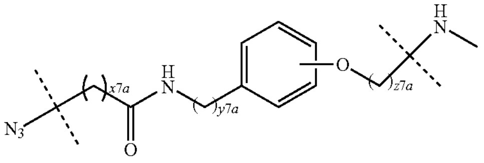 | x7a = 1-6<br>y7a = 1-6<br>z7a = 2-6 |
TABLE 31-2
| No. | —$L^2$— | |
|---|---|---|
| (L2-7b) | 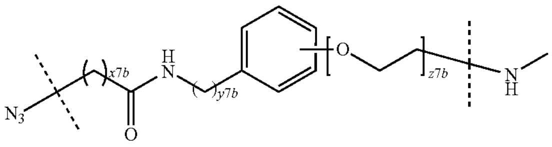 | x7b = 1-6<br>y7b = 1-6<br>z7b = 1-6 |
| (L2-8a) | 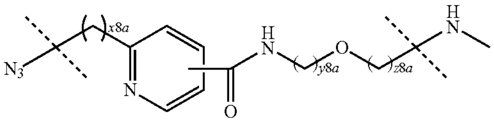 | x8a = 0-4<br>y8a = 2-6<br>z8a = 3-6 |
| (L2-8b) | 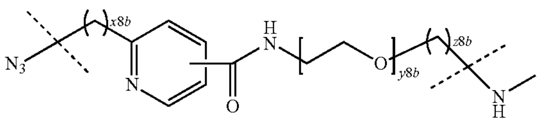 | x8b = 0-4<br>y8b = 1-6<br>z8b = 3-6 |

TABLE 31-2-continued

| No. | —L²— | |
|---|---|---|
| (L2-9a) | 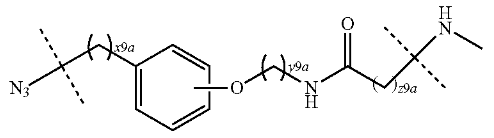 | x9a = 0-4<br>y9a = 2-6<br>z9a = 1-6 |
| (L2-9b) | 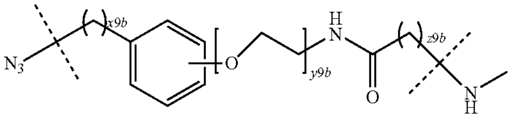 | x9b = 0-4<br>y9b = 1-6<br>z9b = 1-6 |

[5a-1] In the alginic acid derivative of the formula (II) in the Embodiment [5a], -L²- is preferably a linker selected from the group consisting of the partial structural formulae shown in the following table [excluding the parts outside the broken lines at both ends of each formula]:

TABLE 32

| No. | —L²— | |
|---|---|---|
| (L2-3) | 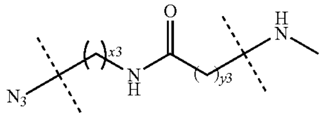 | x3 = 2-6<br>y3 = 1-6 |
| (L2-4-p1) | 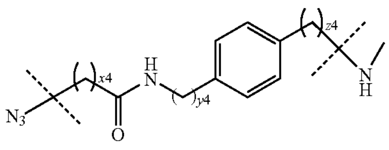 | x4 = 1-6<br>y4 = 1-6<br>z4 = 1-6 |
| (L2-5a-p1) | 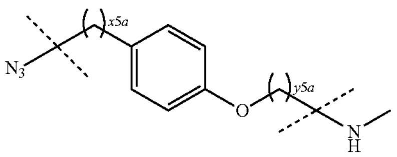 | x5a = 0-4<br>y5a = 2-6 |
| (L2-5b-p1) | 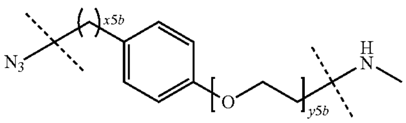 | x5b = 0-4<br>y5b = 1-6 |

or more preferably a linker selected from the group consisting of the partial structural formulae shown in the following table [excluding the parts outside the broken lines at both ends of each formula]:

TABLE 33

| No. | —L²— | |
|---|---|---|
| (L2-3-1) | 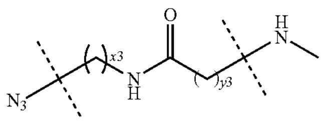 | x3 = 2-4<br>y3 = 1-3 |

TABLE 33-continued

| No. | —L²— | |
|---|---|---|
| (L2-4-p2) | 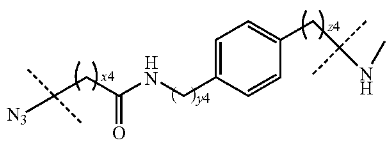 | x4 = 1-3<br>y4 = 1-3<br>z4 = 1-3 |
| (L2-5a-p2) | 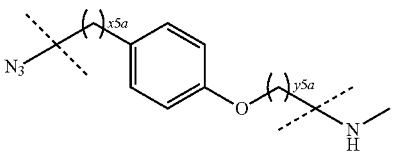 | x5a = 0-2<br>y5a = 2-4 |
| (L2-5b-p2) | 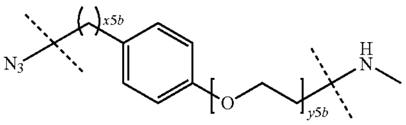 | x5b = 0-2<br>y5b = 1-3 |

or still more preferably a linker selected from the group consisting of the partial structural formulae shown in the following table [excluding the parts outside the broken lines at both ends of each formula]:

TABLE 34

| No. | —L²— |
|---|---|
| (L2-3-X1) | 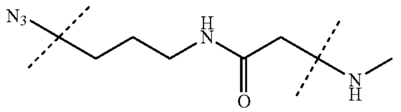 |
| (L2-3-X2) | 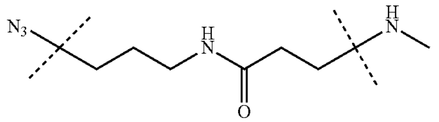 |
| (L2-4-X) | 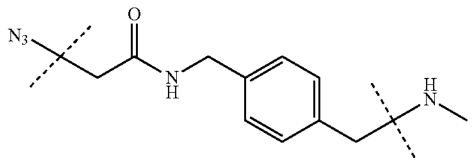 |

TABLE 34-continued

| No. | —$L^2$— |
|---|---|
| (L2-5-X) | 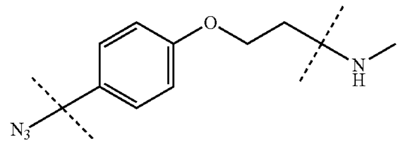 |

[6] Embodiment 6 is as follows: The alginic acid derivative of formula (II) according to the Embodiment [5] or [5a], wherein the introduction rate of the $N_3$-$L^2$-$NH_2$ group (in which -$L^2$- is defined as in the Embodiment [5]) is from about 0.1% to about 30%.

[6-1] In the Embodiment [6], the introduction rate of the $N_3$-$L^2$-$NH_2$ group is preferably from about 1.0% to about 20%, or more preferably from about 2.0% to 10%.

[7] Embodiment 7 is as follows: The alginic acid derivative of formula (II) according to the Embodiment [5] or [5a], wherein the weight-average molecular weight of the alginic acid derivative as measured by gel filtration chromatography is from about 100,000 Da to about 3,000,000 Da.

[7-1] In the Embodiment [7], the weight-average molecular weight of the alginic acid derivative of formula (II) as measured by gel filtration chromatography is preferably from about 300,000 Da to about 2,500,000 Da, or more preferably from about 500,000 Da to about 1,000,000 Da.

[8] Embodiment 8 is as follows: The crosslinked alginic acid according to [1] above, in which any carboxyl group of a first alginic acid and any carboxyl group of a second alginic acid are bound together via the following formula (III-L):

[C20]

(III-L)

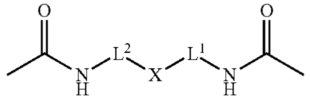

[in formula (III-L), the —CONH— and —NHCO— at either end represent amide bonds via any carboxyl group of alginic acid; -$L^1$- is defined as in the Embodiment [1]; -$L^2$- is defined as in the Embodiment [1]; and X is a cyclic group selected from the group consisting of the partial structural formulae shown in the following tables (excluding the parts outside the broken lines at both ends of each formula):

TABLE 35-1

| No. | X | No. | X |
|---|---|---|---|
| (TZ-1) | 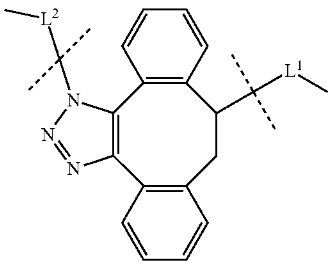 | (TZ-1-r) | 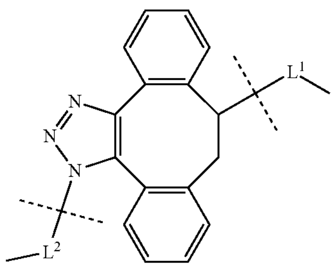 |
| (TZ-2) | 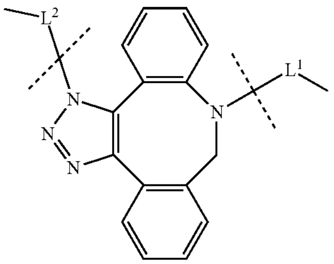 | (TZ-2-r) | 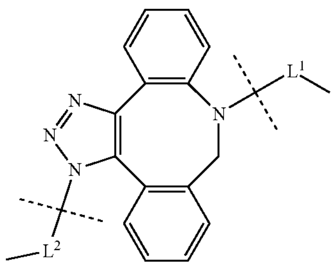 |
| (TZ-3) | 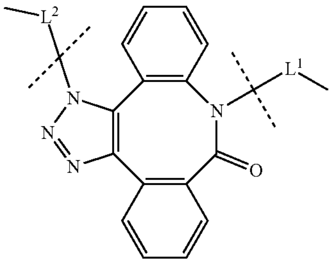 | (TZ-3-r) | 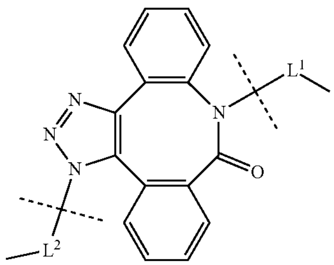 |

TABLE 35-1-continued
| No. | X | No. | X |
|---|---|---|---|
| (TZ-4) | 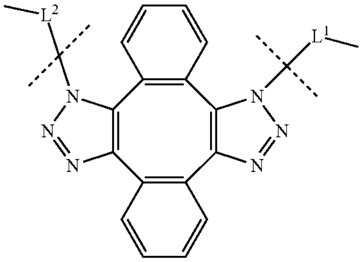 | (TZ-4-r) | 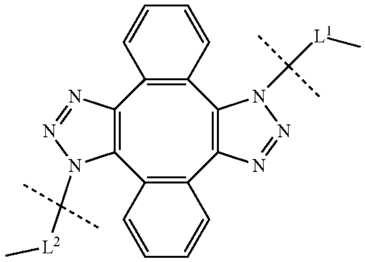 |
| (TZ-5) | 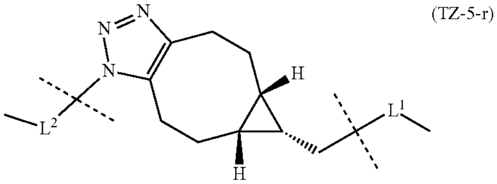 | (TZ-5-r) | 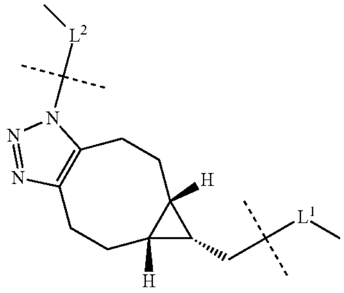 |
| (TZ-6) | 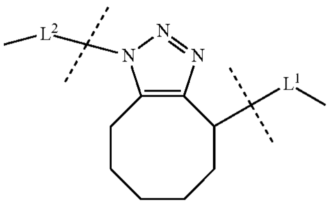 | (TZ-6-r) | 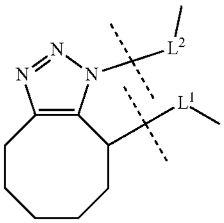 |
TABLE 35-2
| No. | X | No. | X |
|---|---|---|---|
| (TZ-7) | 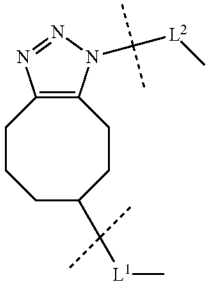 | (TZ-7-r) | 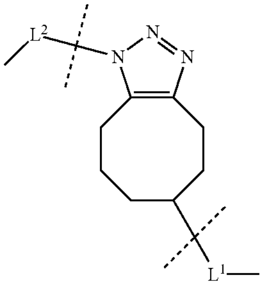 |
| (TZ-8) | 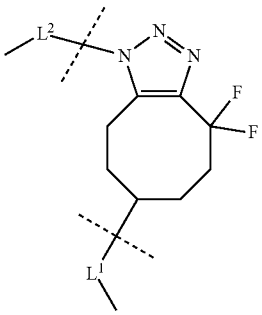 | (TZ-8-r) | 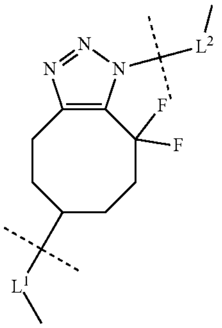 |

TABLE 35-2-continued

| No. | X | No. | X |
|---|---|---|---|
| (TZ-9) | 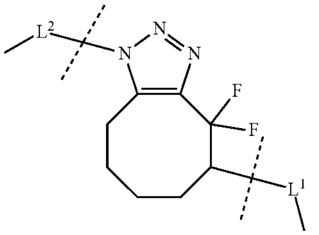 | (TZ-9-r) | 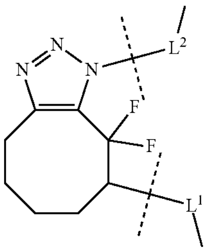 |
| (TZ-10) | 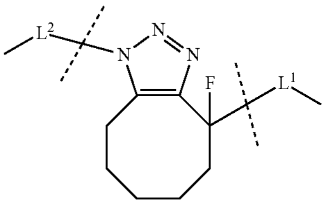 | (TZ-10-r) | 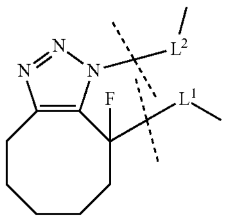 |
| (TZ-11) | 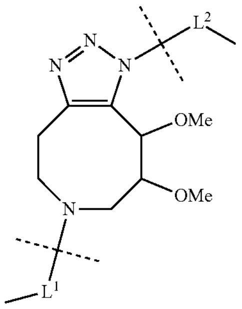 | (TZ-11-r) | 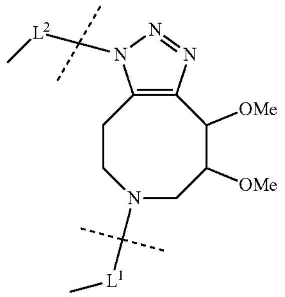 |
| (TZ-12) | 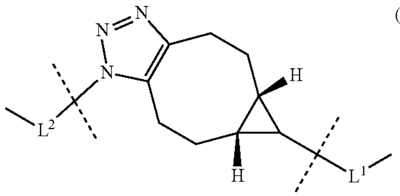 | (TZ-12-r) | 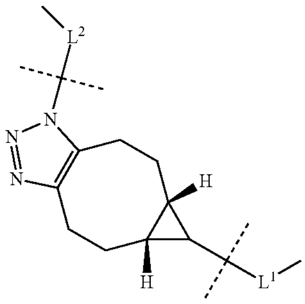 |

(with the proviso that with the proviso that, in formula (III-L) the linker (L2-10) is excluded from the corresponding -$L^2$- when -$L^1$- is any one linker selected from the group consisting of (L1-1), (L1-2a), (L1-2b), (L1-11) and (L1-12))].

[8a] Embodiment 8a is as follows: A crosslinked alginic acid in which any carboxyl group of a first alginic acid and any carboxyl group of a second alginic acid are bound together via the following formula (III-L):

[C21]

(III-L)

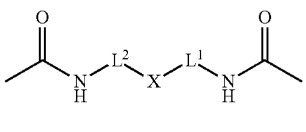

[in formula (III-L), the —CONH— and —NHCO— at either end represent amide bonds via any carboxyl group of alginic acid; -$L^1$- is defined as in the Embodiment [1]; -$L^2$- is defined as in the Embodiment [1]; and X is defined as in the Embodiment [8] (with the proviso that, in formula (III-L) the linker (L2-10) is excluded from the corresponding -$L^2$- when -$L^1$- is any one linker selected from the group consisting of (L1-1), (L1-2a), (L1-2b), (L1-11) and (L1-12))].

[8-1-1] In formula (III-L) of the Embodiment [8] or [8a], -$L^1$- is preferably the same as a linker selected from the group consisting of the formulae representing -$L^1$- as described in the Embodiment [1-1-1].

[8-1-2] In formula (III-L) of the Embodiment [8] or [8a], -$L^1$- is more preferably the same as a linker selected from the group consisting of the formulae representing -$L^1$- as described in the Embodiment [1-1-2].

[8-1-3] In formula (III-L) of the Embodiment [8] or [8a], -$L^1$- is still more preferably the same as a linker selected from the group consisting of the formulae representing $-L^1-$ as described in the Embodiment [1-1-3].

[8-2-1] In formula (III-L) of the Embodiment [8] or [8a], $-L^2-$ is preferably the same as a linker selected from the group consisting of the formulae representing $-L^2-$ as described in the Embodiment [1-2-1].

[8-2-2] In formula (III-L) of the Embodiment [8] or [8a], $-L^2-$ is more preferably the same as a linker selected from the group consisting of the formulae representing $-L^2-$ as described in the Embodiment [1-2-2].

[8-2-3] In formula (III-L) of the Embodiment [8] or [8a], $-L^2-$ is still more preferably the same as a linker selected from the group consisting of the formulae representing $-L^2-$ as described in the Embodiment [1-2-3].

[8-3-1] In formula (III-L) of the Embodiment [8] or [8a], X is preferably a cyclic group selected from the group consisting of the partial structural formulae (TZ-1), (TZ-2), (TZ-3), (TZ-4), (TZ-5), (TZ-6), (TZ-10), (TZ-1-r), (TZ-2-r), (TZ-3-r), (TZ-4-r), (TZ-5-r), (TZ-6-r) and (TZ-10-r) described in the Embodiment [8].

[8-3-2] In formula (III-L) of the Embodiment [8] or [8a], X is more preferably a cyclic group selected from the group consisting of the partial structural formulae (TZ-2), (TZ-3), (TZ-6), (TZ-10), (TZ-2-r), (TZ-3-r), (TZ-6-r) and (TZ-10-r).

[8-3-3] In formula (III-L) of the Embodiment [8] or [8a], X is still more preferably a cyclic group selected from the group consisting of the partial structural formulae (TZ-2), (TZ-6), (TZ-2-r) and (TZ-6-r).

[8-4-1] In formula (III-L) of the Embodiment [8] or [8a], the combination of $-L^2-X-L^1-$ is preferably represented by partial structures selected from the groups consisting of the formulae in the following tables:

TABLE 36-1

| X | $-L^1-$ | $-L^2-$ |
|---|---|---|
| (TZ-1) | Any one linker selected from the group consisting of (L1-1), (L1-2a), (L1-2b), (L1-3), (L1-4a), (L1-4b), (L1-5a), (L1-5b), (L1-6a-p1), (L1-6b-p1), (L1-7), (L1-8a), (L1-8b), (L1-11) and (L1-12) | Any one linker selected from the group consisting of (L2-1), (L2-2a), (L2-2b), (L2-3), (L2-4-p1), (L2-5a-p1), (L2-5b-p1) and (L2-10-p1) |
| (TZ-1-r) | Any one linker selected from the group consisting of (L1-1), (L1-2a), (L1-2b), (L1-3), (L1-4a), (L1-4b), (L1-5a), (L1-5b), (L1-6a-p1), (L1-6b-p1), (L1-7), (L1-8a), and (L1-8b), (L1-11) and (L1-12) | Any one linker selected from the group consisting of (L2-1), (L2-2a), (L2-2b), (L2-3), (L2-4-p1), (L2-5a-p1), (L2-5b-p1) and (L2-10-p1) |
| (TZ-2) | Linker (L1-7) or (L1-11) | Any one linker selected from the group consisting of (L2-1), (L2-2a), (L2-2b), (L2-3), (L2-4-p1), (L2-5a-p1), (L2-5b-p1) and (L2-10-p1) |
| (TZ-2-r) | Linker (L1-7) or (L1-11) | Any one linker selected from the group consisting of (L2-1), (L2-2a), (L2-2b), (L2-3), (L2-4-p1), (L2-5a-p1), (L2-5b-p1) and (L2-10-p1) |
| (TZ-3) | Linker (L1-7) or (L1-11) | Any one linker selected from the group consisting of (L2-1), (L2-2a), (L2-2b), (L2-3), (L2-4-p1), (L2-5a-p1), (L2-5b-p1) and (L2-10-p1) |

TABLE 36-1-continued

| X | $-L^1-$ | $-L^2-$ |
|---|---|---|
| (TZ-3-r) | Linker (L1-7) or (L1-11) | Any one linker selected from the group consisting of (L2-1), (L2-2a), (L2-2b), (L2-3), (L2-4-p1), (L2-5a-p1), (L2-5b-p1) and (L2-10-p1) |
| (TZ-4) | Linker (L1-7) or (L1-11) | Any one linker selected from the group consisting of (L2-1), (L2-2a), (L2-2b), (L2-3), (L2-4-p1), (L2-5a-p1), (L2-5b-p1) and (L2-10-p1) |
| (TZ-4-r) | Linker (L1-7) or (L1-11) | Any one linker selected from the group consisting of (L2-1), (L2-2a), (L2-2b), (L2-3), (L2-4-p1), (L2-5a-p1), (L2-5b-p1) and (L2-10-p1) |

TABLE 36-2

| X | $-L^1-$ | $-L^2-$ |
|---|---|---|
| (TZ-5) | Any one linker selected from the group consisting of (L1-1), (L1-2a), (L1-2b), (L1-3), (L1-4a), (L1-4b), (L1-5a), (L1-5b), (L1-6a-p1), (L1-6b-p1), (L1-7), (L1-8a), (L1-8b), (L1-11) and (L1-12) | Any one linker selected from the group consisting of (L2-1), (L2-2a), (L2-2b), (L2-3), (L2-4-p1), (L2-5a-p1), (L2-5b-p1) and (L2-10-p1) |
| (TZ-5-r) | Any one linker selected from the group consisting of (L1-1), (L1-2a), (L1-2b), (L1-3), (L1-4a), (L1-4b), (L1-5a), (L1-5b), (L1-6a-p1), (L1-6b-p1), (L1-7), (L1-8a), (L1-8b), (L1-11) and (L1-12) | Any one linker selected from the group consisting of (L2-1), (L2-2a), (L2-2b), (L2-3), (L2-4-p1), (L2-5a-p1), (L2-5b-p1) and (L2-10-p1) |
| (TZ-6) | Any one linker selected from the group consisting of (L1-1), (L1-2a), (L1-2b), (L1-3), (L1-4a), (L1-4b), (L1-5a), (L1-5b), (L1-6a-p1), (L1-6b-p1), (L1-7), (L1-8a), (L1-8b), (L1-11) and (L1-12) | Any one linker selected from the group consisting of (L2-1), (L2-2a), (L2-2b), (L2-3), (L2-4-p1), (L2-5a-p1), (L2-5b-p1) and (L2-10-p1) |
| (TZ-6-r) | Any one linker selected from the group consisting of (L1-1), (L1-2a), (L1-2b), (L1-3), (L1-4a), (L1-4b), (L1-5a), (L1-5b), (L1-6a-p1), (L1-6b-p1), (L1-7), (L1-8a), (L1-8b), (L1-11) and (L1-12) | Any one linker selected from the group consisting of (L2-1), (L2-2a), (L2-2b), (L2-3), (L2-4-p1), (L2-5a-p1), (L2-5b-p1) and (L2-10-p1) |
| (TZ-10) | Any one linker selected from the group consisting of (L1-1), (L1-2a), (L1-2b), (L1-3), (L1-4a), (L1-4b), (L1-5a), (L1-5b), (L1-6a-p1), (L1-6b-p1), (L1-7), (L1-8a), (L1-8b), (L1-11) and (L1-12) | Any one linker selected from the group consisting of (L2-1), (L2-2a), (L2-2b), (L2-3), (L2-4-p1), (L2-5a-p1), (L2-5b-p1) and (L2-10-p1) |

TABLE 36-2-continued

| X | $-L^1-$ | $-L^2-$ |
|---|---|---|
| (TZ-10-r) | Any one linker selected from the group consisting of (L1-1), (L1-2a), (L1-2b), (L1-3), (L1-4a), (L1-4b), (L1-5a), (L1-5b), (L1-6a-p1), (L1-6b-p1), (L1-7), (L1-8a), (L1-8b), (L1-11) and (L1-12) | Any one linker selected from the group consisting of (L2-1), (L2-2a), (L2-2b), (L2-3), (L2-4-p1), (L2-5a-p1), (L2-5b-p1) and (L2-10-p1) |

(in which $-L^1-$ and $-L^2-$ are as described in the Embodiment [1], and —X— is as described in the Embodiment [8]) (with the proviso that, the linker (L2-10-p1) is excluded from the corresponding $-L^2-$ when $-L^1-$ in the table is any one linker selected from the group consisting of (L1-1), (L1-2a), (L1-2b), (L1-11) and (L1-12).

[8-4-2] In formula (III-L) of the Embodiment [8] or [8a], the combination of $-L^2$-X-12- is more preferably represented by partial structures selected from the groups consisting of the formulae in the following tables:

TABLE 37-1

| X | $-L^1-$ | $-L^2-$ |
|---|---|---|
| (TZ-2) | Linker (L1-7-1) or (L1-11-1) | Any one linker selected from the group consisting of (L2-1-1), (L2-2a-1), (L2-2b-1), (L2-3-1), (L2-4-p2), (L2-5a-p2), (L2-5b-p2) and (L2-10-p2) |
| (TZ-2-r) | Linker (L1-7-1) or (L1-11-1) | Any one linker selected from the group consisting of (L2-1-1), (L2-2a-1), (L2-2b-1), (L2-3-1), (L2-4-p2), (L2-5a-p2), (L2-5b-p2) and (L2-10-p2) |
| (TZ-3) | Linker (L1-7-1) or (L1-11-1) | Any one linker selected from the group consisting of (L2-1-1), (L2-2a-1), (L2-2b-1), (L2-3-1), (L2-4-p2), (L2-5a-p2), (L2-5b-p2) and (L2-10-p2) |
| (TZ-3-r) | Linker (L1-7-1) or (L1-11-1) | Any one linker selected from the group consisting of (L2-1-1), (L2-2a-1), (L2-2b-1), (L2-3-1), (L2-4-p2), (L2-5a-p2), (L2-5b-p2) and (L2-10-p2) |
| (TZ-6) | Any one linker selected from the group consisting of (L1-1-1), (L1-2a-1), (L1-2b-1), (L1-3-1), (L1-4a-1), (L1-4b-1), (L1-5a-1), (L1-5b-1), (L1-6a-p2), (L1-6b-p2), (L1-7-1), (L1-8a-1), (L1-8b-1), (L1-11-1) and (L1-12-p1) | Any one linker selected from the group consisting of (L2-1-1), (L2-2a-1), (L2-2b-1), (L2-3-1), (L2-4-p2), (L2-5a-p2), (L2-5b-p2) and (L2-10-p2) |
| (TZ-6-r) | Any one linker selected from the group consisting of (L1-1-1), (L1-2a-1), (L1-2b-1), (L1-3-1), (L1-4a-1), (L1-4b-1), (L1-5a-1), (L1-5b-1), (L1-6a-p2), (L1-6b-p2), (L1-7-1), (L1-8a-1), (L1-8b-1), (L1-11-1) and (L1-12-p1) | Any one linker selected from the group consisting of (L2-1-1), (L2-2a-1), (L2-2b-1), (L2-3-1), (L2-4-p2), (L2-5a-p2), (L2-5b-p2) and (L2-10-p2) |

TABLE 37-2

| X | -L1- | -L2- |
|---|---|---|
| (TZ-10) | Any one linker selected from the group consisting of (L1-1-1), (L1-2a-1), (L1-2b-1), (L1-3-1), (L1-4a-1), (L1-4b-1), (L1-5a-1), (L1-5b-1), (L1-6a-p2), (L1-6b-p2), (L1-7-1), (L1-8a-1), (L1-8b-1), (L1-11-1) and (L1-12-p1) | Any one linker selected from the group consisting of (L2-1-1), (L2-2a-1), (L2-2b-1), (L2-3-1), (L2-4-p2), (L2-5a-p2), (L2-5b-p2) and (L2-10-p2) |
| (TZ-10-r) | Any one linker selected from the group consisting of (L1-1-1), (L1-2a-1), (L1-2b-1), (L1-3-1), (L1-4a-1), (L1-4b-1), (L1-5a-1), (L1-5b-1), (L1-6a-p2), (L1-6b-p2), (L1-7-1), (L1-8a-1), (L1-8b-1), (L1-11-1) and (L1-12-p1) | Any one linker selected from the group consisting of (L2-1-1), (L2-2a-1), (L2-2b-1), (L2-3-1), (L2-4-p2), (L2-5a-p2), (L2-5b-p2) and (L2-10-p2) |

(in which $-L^1-$ and $-L^2-$ are as described in the Embodiment [1], and —X— is as described in the Embodiment [8]) (with the proviso that, the linker (L2-10-p2) is excluded from the corresponding $-L^2-$ when $-L^1-$ in the table is any one linker selected from the group consisting of (L1-1-1), (L1-2a-1), (L1-2b-1), (L1-11-1) and (L1-12-p1).

[8-4-3] In formula (III-L) of the Embodiment [8] or [8a], the combination of $-L^2$-X-$L^1-$ is still more preferably represented by partial structures selected from the groups consisting of the formulae in the following table:

TABLE 38

| X | $-L^1-$ | $-L^2-$ |
|---|---|---|
| (TZ-2) | Linker (L1-7-X) or (L1-11-X) | Any one linker selected from the group consisting of (L2-1-X), (L2-2-X), (L2-3-X1), (L2-3-X2), (L2-4-X), (L2-5-X) and (L2-10-X) |
| (TZ-2-r) | Linker (L1-7-X) or (L1-11-X) | Any one linker selected from the group consisting of (L2-1-X), (L2-2-X), (L2-3-X1), (L2-3-X2), (L2-4-X), (L2-5-X) and (L2-10-X) |
| (TZ-6) | Any one linker selected from the group consisting of (L1-1-X), (L1-2-X), (L1-3-X1), (L1-3-X2), (L1-4-X1), (L1-4-X2), (L1-5-X), (L1-6-X), (L1-7-X), (L1-8-X1), (L1-11-X) and (L1-12-X) | Any one linker selected from the group consisting of (L2-1-X), (L2-2-X), (L2-3-X1), (L2-3-X2), (L2-4-X), (L2-5-X) and (L2-10-X) |
| (TZ-6-r) | Any one linker selected from the group consisting of (L1-1-X), (L1-2-X), (L1-3-X1), (L1-3-X2), (L1-4-X1), (L1-4-X2), (L1-5-X), (L1-6-X), (L1-7-X), (L1-8-X1), (L1-11-X) and (L1-12-X) | Any one linker selected from the group consisting of (L2-1-X), (L2-2-X), (L2-3-X1), (L2-3-X2), (L2-4-X), (L2-5-X) and (L2-10-X) |

(in which -$L^1$- and -$L^2$- are as described in the Embodiment [1], and —X— is as described in the Embodiment [8]) (with the proviso that, the linker (L2-10-X) is excluded from the corresponding -$L^2$- when -$L^1$- in the table is any one linker selected from the group consisting of (L1-1-X), (L1-2-X), (L1-11-X) and (L1-12-X).

[8-4-4] In formula (III-L) of the Embodiment [8] or [8a], the combination of -$L^2$-X-$L^1$- is particularly preferably represented by a partial structure selected from the group consisting of the following partial structures [excluding the parts outside the broken lines at both ends of each formula]:

[C22]

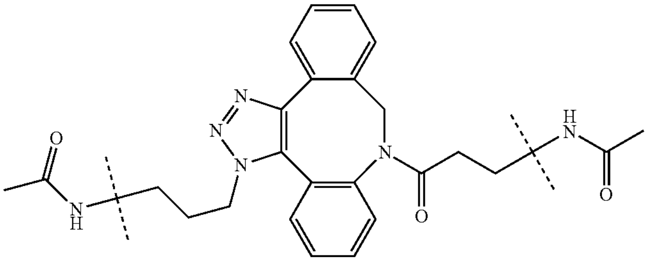

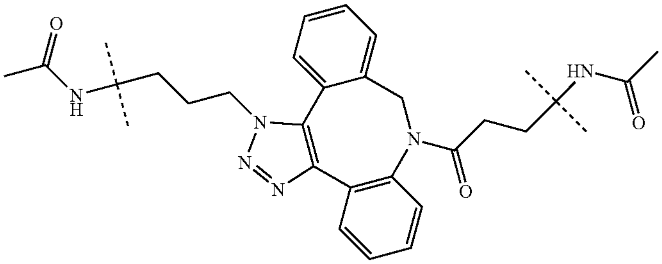

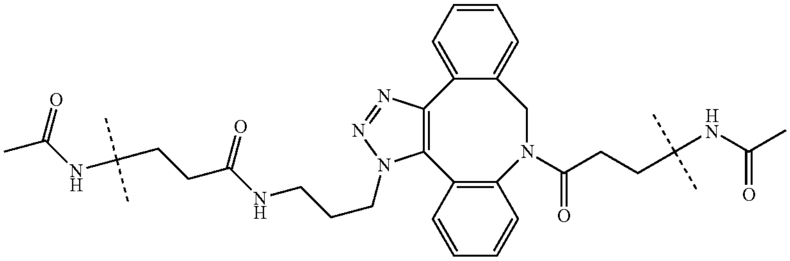

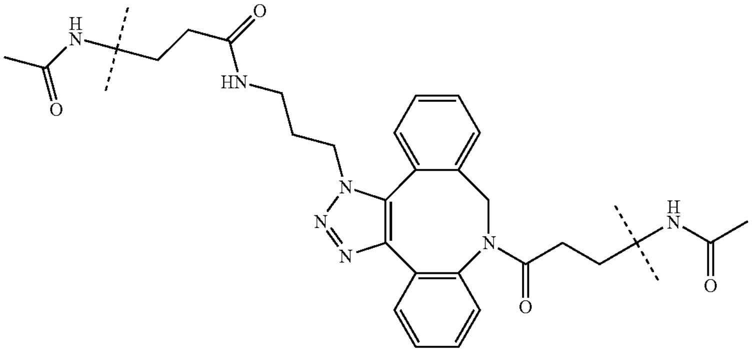

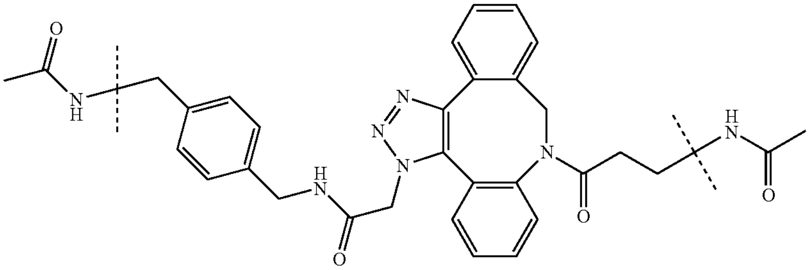

-continued
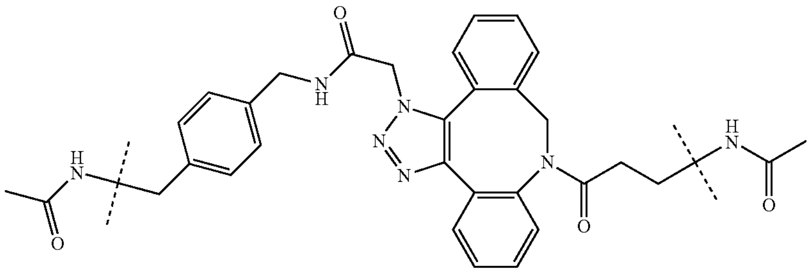
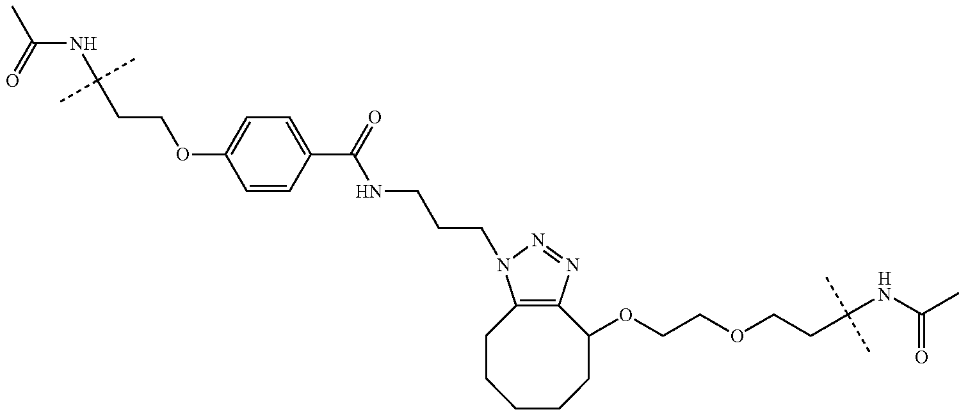
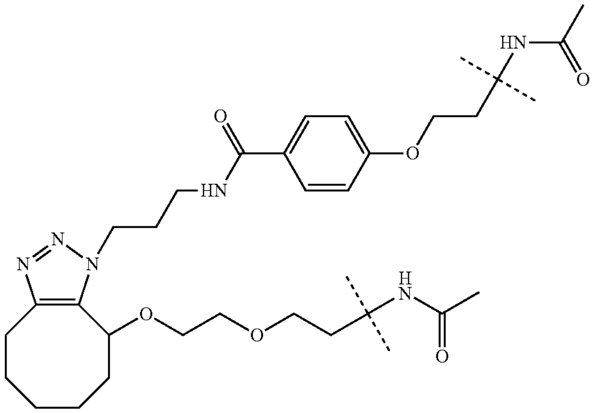
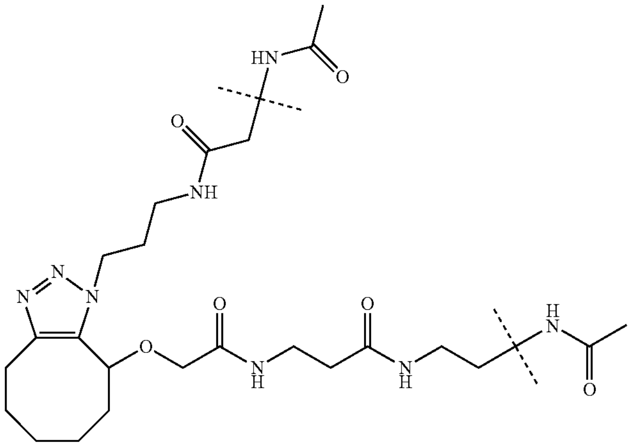

-continued
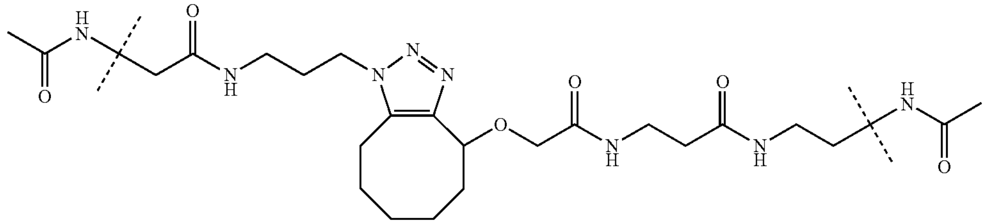
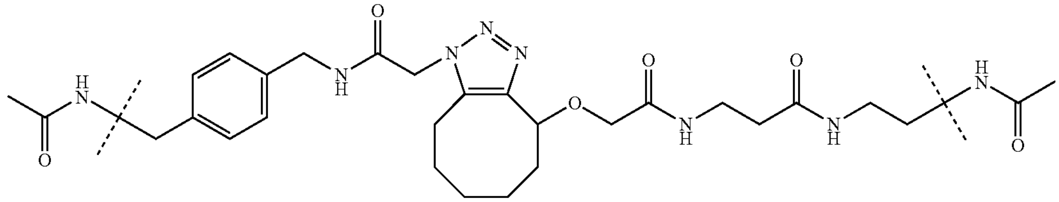
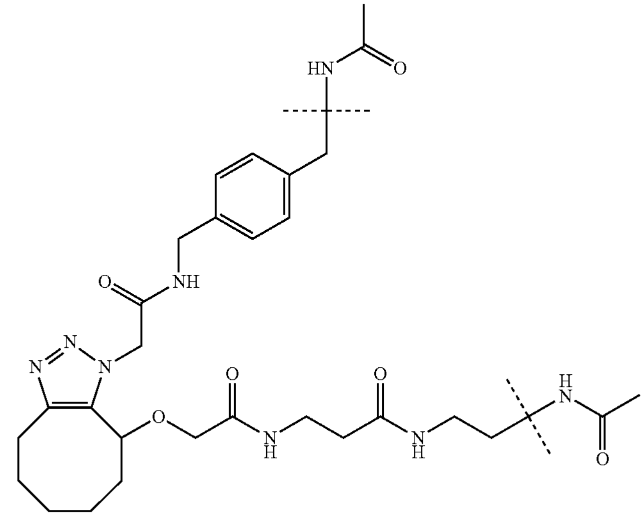
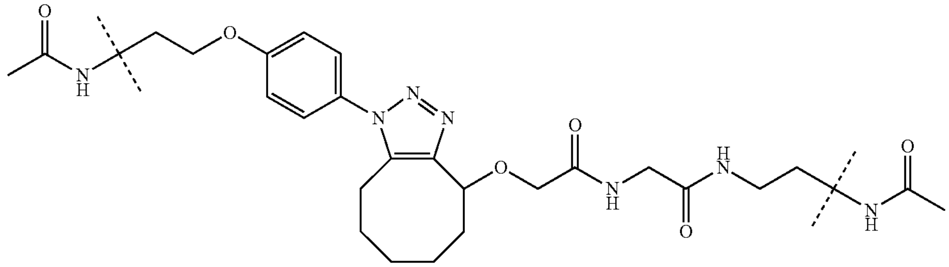
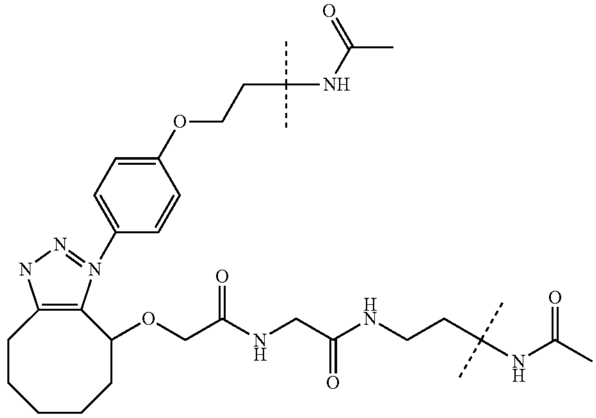

-continued
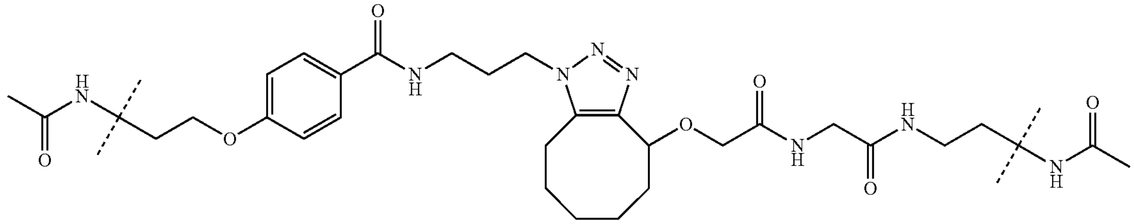
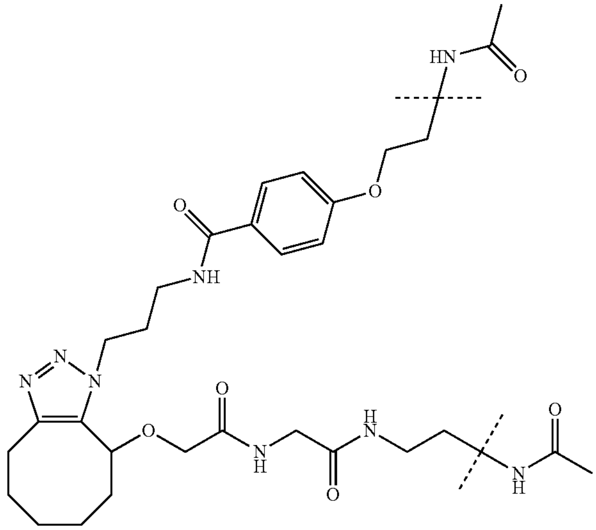
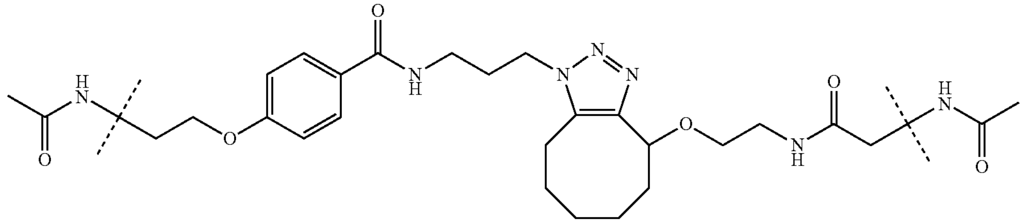
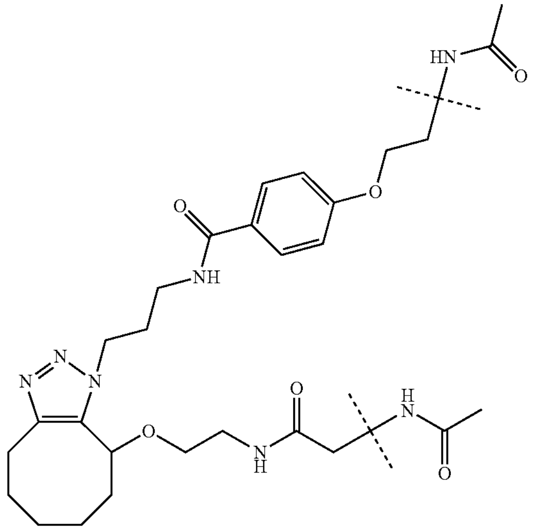
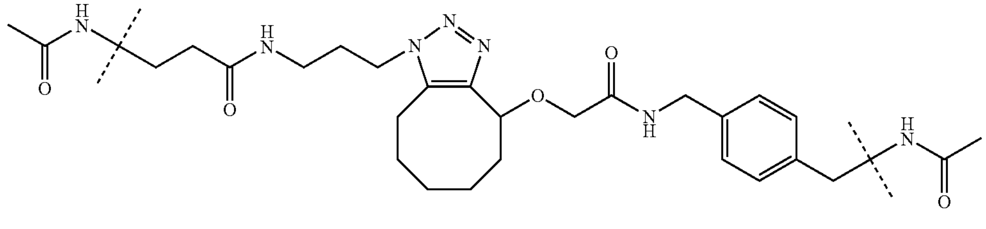

-continued

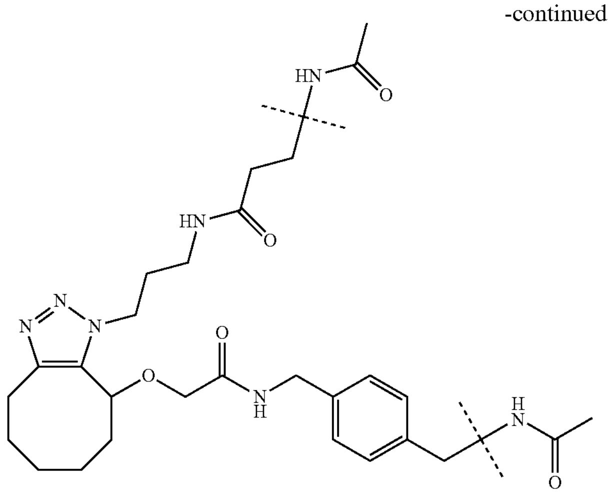

[8-5-1] In the crosslinked alginic acid of the Embodiment [1] or the Embodiment [8a], the crosslinking is chemical crosslinking by triazole rings formed by a Huisgen reaction and ionic crosslinking partially formed by a divalent metal ion.

[8-5-2] In the crosslinked alginic acid of the Embodiment [1] or the Embodiment [8a], the crosslinking is chemical crosslinking by triazole rings formed by a Huisgen reaction.

[8-5-3] In the Embodiment [8-5-1], the divalent metal ion is preferably a divalent metal ion selected from the group consisting of a calcium ion, a magnesium ion, a barium ion, a strontium ion and a zinc ion; or more preferably a calcium ion or a barium ion; or still more preferably a calcium ion.

[8-5-4] In the Embodiment [8-5-1], the source of the divalent metal ion used in ion crosslink formation is preferably an aqueous solution selected from the group consisting of a calcium chloride aqueous solution, a calcium carbonate aqueous solution, a calcium gluconate aqueous solution and a barium chloride aqueous solution; or more preferably a calcium chloride aqueous solution or a barium chloride aqueous solution; or still more preferably a calcium chloride aqueous solution.

Preferred embodiments of the crosslinked alginic acid of the Embodiment [8] can be formed arbitrarily by appropriately combining the preferred embodiments of the Embodiment [8] and the definitions of -$L^1$-, -$L^2$- and X.

Preferred embodiments of the crosslinked alginic acid of the Embodiment [8a] can be formed arbitrarily by appropriately combining the preferred embodiments of the Embodiment [8a] and the definitions of -$L^1$-, -$L^2$- and X.

[9] Embodiment 9 is as follows: A method of manufacturing a crosslinked alginic acid, comprising mixing the alginic acid derivative represented by formula (I) and the alginic acid derivative represented by formula (II) according to the Embodiment [1] and performing a crosslinking reaction (Huisgen reaction) to thereby obtain a crosslinked alginic acid according to the Embodiment [1] or Embodiment [8a].

[9-1] Embodiment 9-1 is as follows: A method of manufacturing a crosslinked alginic acid, comprising adding a solution of the alginic acid derivative represented by formula (I) according to the Embodiment [1] to a solution of the alginic acid derivative represented by formula (II) according to the Embodiment [1] and performing a crosslinking reaction (Huisgen reaction) to thereby obtain a crosslinked alginic acid according to the Embodiment [1] or Embodiment [8a].

[9-2] Embodiment 9-2 is as follows: A method of manufacturing a crosslinked alginic acid, comprising adding a solution of the alginic acid derivative represented by formula (II) according to the Embodiment [1] to a solution of the alginic acid derivative represented by formula (I) according to the Embodiment [1] and performing a crosslinking reaction (Huisgen reaction) to thereby obtain a crosslinked alginic acid according to the Embodiment [1] or Embodiment [8a].

[10] A method of manufacturing a crosslinked alginic acid according to the Embodiment [1] or Embodiment [8a], wherein the chemical crosslinking formed by performing a Huisgen reaction (crosslinking reaction) using the alginic acid derivative represented by formula (I) and the alginic acid derivative represented by formula (II) according to the Embodiment [1] is the structure of formula (III-L) below:

[C23]

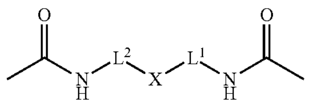

(III-L)

[In formula (III-L), the —CONH— and —NHCO— at either end and X, -$L^1$- and -$L^2$- are defined as in the Embodiment [8]].

[11] Embodiment 11 is as follows: A crosslinked alginic acid structure obtained by mixing the alginic acid derivative represented by formula (I) and the alginic acid derivative represented by formula (II) according to [1] above to obtain a mixed solution of alginic acid derivatives that is then dripped into a solution containing a divalent metal ion.

[11-1] Embodiment 11-1 is as follows: A crosslinked alginic acid structure obtained by dripping a solution of the alginic acid derivative represented by formula (I) according to any one of [1] above into a solution containing a divalent metal ion to obtain a gel that is then added to a solution of the alginic acid derivative represented by formula (II) according to [1] above to perform a crosslinking reaction.

[11-2] Embodiment 11-2 is as follows: A crosslinked alginic acid structure obtained by dripping a solution of the alginic acid derivative represented by formula (II) according to [1] above into a solution containing a divalent metal ion to obtain a gel that is then added to a solution of the alginic acid derivative represented by formula (I) according to [1] above to perform a crosslinking reaction.

[12-1] Embodiment 12-1 is as follows: A crosslinked alginic acid structure according to any one of the Embodiments [11] to [11-2], comprising as crosslinking both chemical crosslinking by triazole rings formed by a Huisgen reaction and ionic crosslinking partially formed by a divalent metal ion.

[12-2] Embodiment 12-2 is as follows: A crosslinked alginic acid structure according to any one of the Embodiments [11] to [11-2], comprising as crosslinking chemical crosslinking by triazole rings formed by a Huisgen reaction.

[12-3-1] In the Embodiment [12-1], the divalent metal ion is preferably a divalent metal ion selected from the group consisting of a calcium ion, a magnesium ion, a barium ion, a strontium ion and a zinc ion; or more preferably is a calcium ion or a barium ion; or still more preferably is a calcium ion.

[12-3-2] In the Embodiment [12-1], the source of the divalent metal ion used in ion crosslink formation may preferably be an aqueous solution selected from the group consisting of a calcium chloride aqueous solution, a calcium carbonate aqueous solution, a calcium gluconate aqueous solution and a barium chloride aqueous solution; or more preferably a calcium chloride aqueous solution or a barium chloride aqueous solution; or still more preferably a calcium chloride aqueous solution.

[13] Embodiment 13 is as follows: A crosslinked alginic acid structure having the ability to retain contents, obtained by subjecting the alginic acid derivative represented by formula (I) and the alginic acid derivative represented by formula (II) according to the Embodiment [1] to ionic crosslinking by a divalent metal ion and/or chemical crosslinking by a Huisgen reaction.

[13-1-1] In the Embodiment 13, the divalent metal ion is preferably a divalent metal ion selected from the group consisting of a calcium ion, a magnesium ion, a barium ion, a strontium ion and a zinc ion; or more preferably is a calcium ion or a barium ion; or still more preferably is a calcium ion.

[13-1-2] In the Embodiment 13, the source of the divalent metal ion used in ion crosslink formation may preferably be an aqueous solution selected from the group consisting of a calcium chloride aqueous solution, a calcium carbonate aqueous solution, a calcium gluconate aqueous solution and a barium chloride aqueous solution; or more preferably a calcium chloride aqueous solution or a barium chloride aqueous solution; or still more preferably a calcium chloride aqueous solution.

[14] Embodiment 14 is as follows: A crosslinked alginic acid structure according to any one of Embodiments [11] to [13], wherein the chemical crosslinking formed by performing a Huisgen reaction using the alginic acid derivative represented by formula (I) and the alginic acid derivative represented by formula (II) according to the Embodiment [1] is the structure of formula (III-L) below:

[C24]

(III-L)

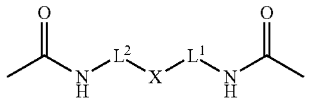

[in formula (III-L), the —CONH— and —NHCO— at either end and X, -$L^1$- and -$L^2$- are defined as in the Embodiment [8]].

[15] Embodiment 15 is as follows: A method of manufacturing a crosslinked alginic acid structure that is obtained by mixing the alginic acid derivative represented by formula (I) and the alginic acid derivative represented by formula (II) according to the Embodiment [1] to obtain a mixed solution of alginic acid derivatives that is then dripped into a solution containing a divalent metal ion to perform a crosslinking reaction.

[15-1] Embodiment 15-1 is as follows: A method of manufacturing a crosslinked alginic acid structure that is obtained by dripping a solution of the alginic acid derivative represented by formula (I) according to the Embodiment [1] into a solution containing a divalent metal ion to obtain a gel that is then added to a solution of the alginic acid derivative represented by formula (II) according to the Embodiment [1] to perform a crosslinking reaction.

[15-2] Embodiment 15-2 is as follows: A method of manufacturing a crosslinked alginic acid structure that is obtained by dripping a solution of the alginic acid derivative represented by formula (II) according to the Embodiment [1] into a solution containing a divalent metal ion to obtain a gel that is then added to a solution of the alginic acid derivative represented by formula (I) according to the Embodiment [1] to perform a crosslinking reaction.

[16-1] Embodiment 16-1 is as follows: The method of manufacturing a crosslinked alginic acid structure according to any one of the Embodiments [15] to [15-2], comprising as crosslinking both chemical crosslinking by triazole rings formed by a Huisgen reaction and ionic crosslinking partly formed by a divalent metal ion.

[16-2] Embodiment 16-2 is as follows: The method of manufacturing a crosslinked alginic acid structure according to any one of the Embodiments [15] to [15-2], comprising as crosslinking chemical crosslinking by triazole rings formed by a Huisgen reaction.

[16-3-1] In the Embodiment [16-1], the divalent metal ion is preferably an ion selected from a calcium ion, a magnesium ion, a barium ion, a strontium ion and a zinc ion; or more preferably a calcium ion or a barium ion; or still more preferably a calcium ion.

[16-3-2] In the Embodiment [16-1], the source of the divalent metal ion may preferably be an aqueous solution selected from the group consisting of a calcium chloride aqueous solution, a calcium carbonate aqueous solution, a calcium gluconate aqueous solution and a barium chloride aqueous solution; or more preferably a calcium chloride aqueous solution or a barium chloride aqueous solution; or still more preferably a calcium chloride aqueous solution.

[17] The Embodiment 17 is as follows: The method of manufacturing a crosslinked alginic acid structure according to any one of the Embodiments [15] to [16-2], wherein the chemical crosslinking formed by performing a Huisgen reaction using the alginic acid derivative represented by formula (I) and the alginic acid derivative represented by formula (II) according to the Embodiment [1] is the structure of formula (III-L) below:

[C25]

(III-L)

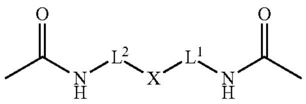

[in formula (III-L), the —CONH— and —NHCO— at either end and X, -$L^1$- and -$L^2$- are defined as in the Embodiment [8]].

[18] Embodiment 18 is as follows: The crosslinked alginic acid structure according to any one of the Embodiments [11] to [14], which is beads or a semi-spherical gel.

[19] Embodiment 19 is as follows: A medical material containing a crosslinked alginic acid structure according to any one of the Embodiments [11] to [14].

[20] Embodiment 20 is as follows: The medical material according to the Embodiment [19], which is beads or a semi-spherical gel.

[21] Embodiment 21 is as follows: The crosslinked alginic acid according to the Embodiment [1] or [8a], the alginic acid derivative according to the Embodiment [2] or [5], or the crosslinked alginic acid structure according to any one of the Embodiments [11] to [14], having biocompatibility.

[22] Embodiment 22 is as follows: An amino compound represented by formula (AM-1) below, or pharmaceutically acceptable salt thereof or a solvate of these:

[C26]

(AM-1)

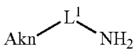

[in formula (AM-1), -$L^1$- and Akn are defined as in the Embodiment [2]]. With the proviso that, the amino compounds shown in the following table and their pharmaceutically acceptable salts and solvates of these are excluded:

TABLE 39

| Structure | CAS Registry No. | Structure | CAS Registry No. |
|---|---|---|---|
| 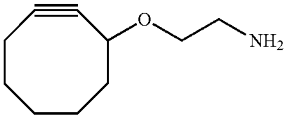 | 1194977-75-7 | 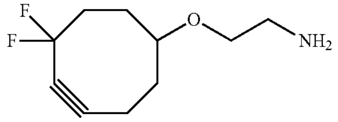 | 1655486-28-4 |
| 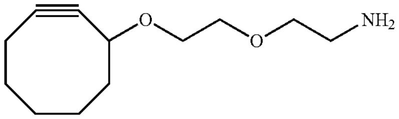 | 2137051-15-9 | 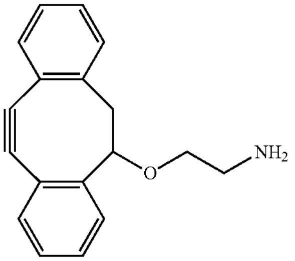 [SMILES: NCCOC1Cc2ccccc2C#Cc2ccccc21] | 1655486-32-0 |
| 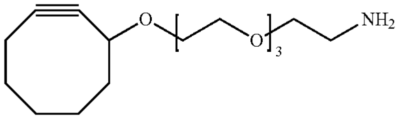 | 2137041-20-2 | 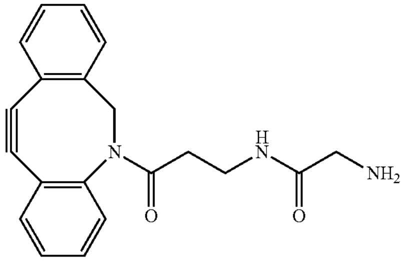 [SMILES: NCC(=O)NCCC(=O)N1Cc2ccccc2C#Cc2ccccc21] | 2404666-19-7 |
| 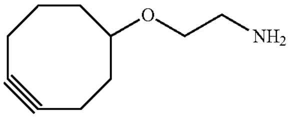 [SMILES: NCCOC1CCC#CCCC1] | 1655486-26-2 | 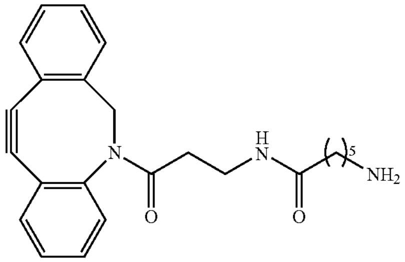 | 2093111-67-0 |

[22-1] The compound represented by the formula (AM-1) in the Embodiment [22] is preferably an amino compound in which $-L^1-$ is defined in the same way as the preferred $-L^1-$ in the Embodiment [2-1] and Akn is defined in the same way as the preferred Akn in the Embodiment [2-2], or a pharmaceutically acceptable salt thereof or a solvate of these. With the proviso that, the amino compounds shown in the following table and their pharmaceutically acceptable salts and solvates of these are excluded:

TABLE 40

| Structure | CAS Registry No. | Structure | CAS Registry No. |
|---|---|---|---|
| 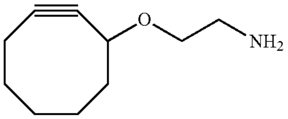 [SMILES: NCCOC1C#CCCCCC1] | 1194977-75-7 | 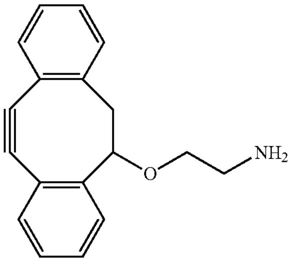 [SMILES: NCCOC1Cc2ccccc2C#Cc2ccccc21] | 1655486-32-0 |
| 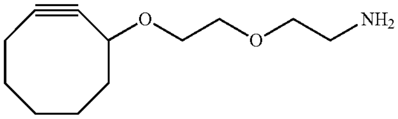 [SMILES: NCCOCCOC1C#CCCCCC1] | 2137051-15-9 | 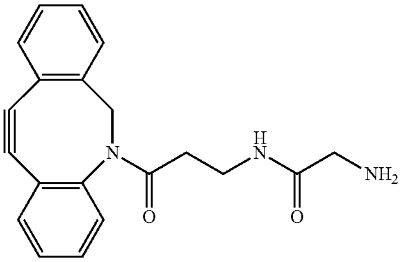 [SMILES: NCC(=O)NCCC(=O)N1Cc2ccccc2C#Cc2ccccc21] | 2404666-19-7 |
| 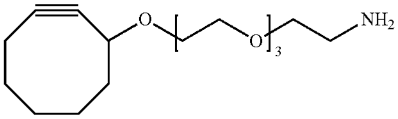 | 2137041-20-2 | 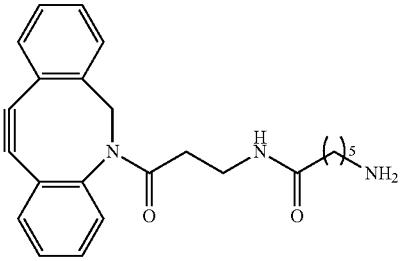 | 2093111-67-0 |

[22-2] The compound represented by the formula (AM-1) in the Embodiment [22] is more preferably an amino compound in which $-L^1-$ is defined in the same way as the more preferred $-L^1-$ in the Embodiment [2-1] and Akn is defined in the same way as the more preferred Akn in the Embodiment [2-2], or a pharmaceutically acceptable salt thereof or a solvate of these. With the proviso that, the amino compounds shown in the following table and their pharmaceutically acceptable salts and solvates of these are excluded:

TABLE 41

| Structure | CAS Registry No. | Structure | CAS Registry No. |
|---|---|---|---|
| 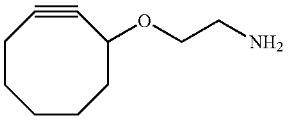 [SMILES: NCCOC1C#CCCCCC1] | 1194977-75-7 | 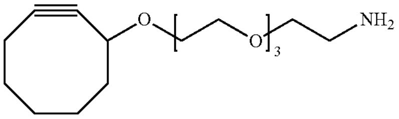 | 2137041-20-2 |

TABLE 41-continued

| Structure | CAS Registry No. | Structure | CAS Registry No. |
|---|---|---|---|
| 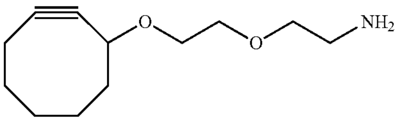 | 2137051-15-9 | 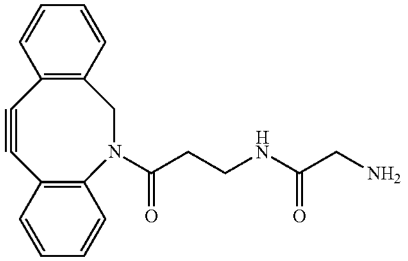 [SMILES: NCC(=O)NCCC(=O)N1Cc2ccccc2C#Cc2ccccc21] | 2404666-19-7 |

[22-3] The compound represented by the formula (AM-1) in the Embodiment [22] is still more preferably an amino compound in which $-L^1-$ is defined in the same way as the still more preferred $-L^1-$ in the Embodiment [2-1] and Akn is defined in the same way as the still more preferred Akn in the Embodiment [2-2], or a pharmaceutically acceptable salt thereof or a solvate of these. With the proviso that, the amino compounds shown in the following table and their pharmaceutically acceptable salts and solvates of these are excluded:

-continued

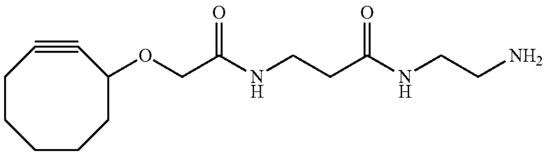

TABLE 42

| Structure | CAS Registry No. | Structure | CAS Registry No. |
|---|---|---|---|
| 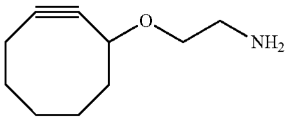 [SMILES: NCCOC1C#CCCCCC1] | 1194977-75-7 | 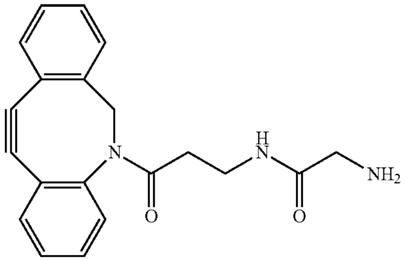 [SMILES: NCC(=O)NCCC(=O)N1Cc2ccccc2C#Cc2ccccc21] | 2404666-19-7 |
| 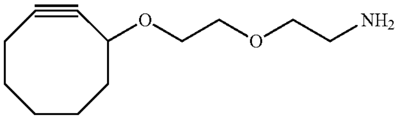 [SMILES: NCCOCCOC1C#CCCCCC1] | 2137051-15-9 | | |

[22-4] The compound represented by the formula (AM-1) in the Embodiment [22] is particularly preferably an amino compound selected from the group consisting of the following formulae:

[C27]

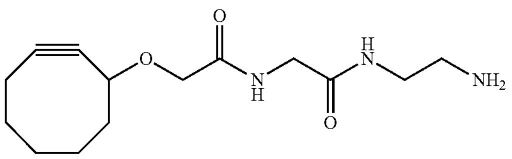

-continued

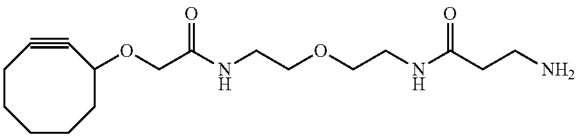

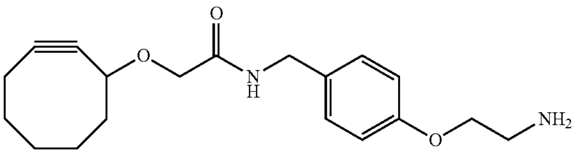

-continued

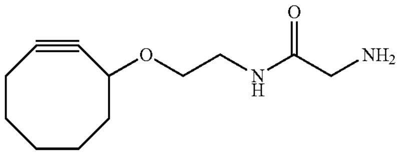

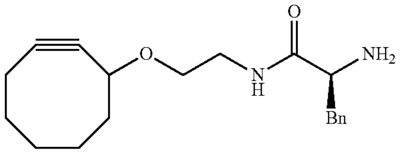

or a pharmaceutically acceptable salt thereof or a solvate of these.

[23] Embodiment 23 is as follows: An amino compound represented by formula (AM-2) below, or pharmaceutically acceptable salt thereof or a solvate of these:

[C28]

(AM-2)

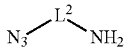

[in formula (AM-2), the definition of $-L^2-$ is the same as the definition of (L2-2a), (L2-2b-A), (L2-3), (L2-4), (L2-5a), (L2-5b), (L2-6a), (L2-6b), (L2-7a), (L2-7b), (L2-8a), (L2-8b), (L2-9a) and (L2-9b) in the Embodiment [5]]. With the proviso that, the amino compounds shown in the following table and their pharmaceutically acceptable salts and solvates of these are excluded:

TABLE 43

| Structure | CAS Registry No. | Structure | CAS Registry No. |
|---|---|---|---|
| 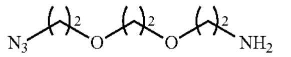 | 166388-57-4 | 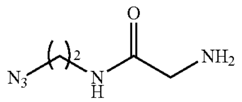 | 2385440-83-3 |
| 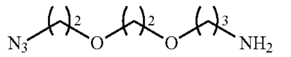 | 2164339-44-8 | 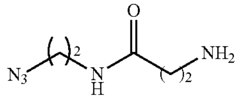 | 2384841-79-4 |
| 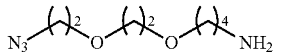 | 2360561-87-9 | 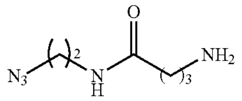 | 2387044-14-4 |
| 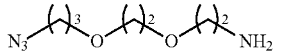 | 2413064-02-3 | 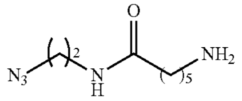 | 2093111-66-9 |
| 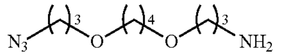 | 1030263-16-1 | 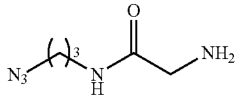 | 2385421-04-3 |
| 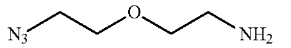 | 464190-91-8 | 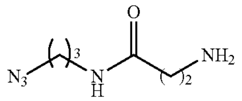 | 2245273-36-1 |
| 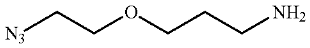 | 912849-74-2 | 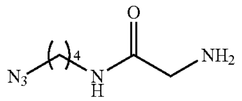 | 2385086-80-4 |
| 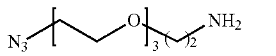 | 134179-38-7 | 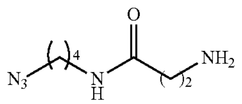 | 1240264-81-6 |
| 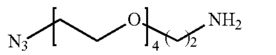 | 951671-92-4 | 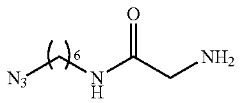 | 1644549-71-2 |

TABLE 43-continued

| Structure | CAS Registry No. | Structure | CAS Registry No. |
|---|---|---|---|
| 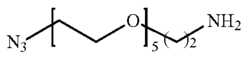 | 516493-93-9 | 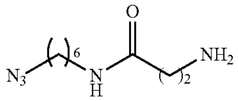 | 1240264-82-7 |
| 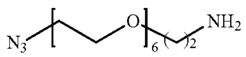 | 957486-82-7 | | |

[23-1] The amino compound represented by formula (AM-2) in the Embodiment [23] is preferably an amino compound in which the definition of -$L^2$- is the same as the definition of (L2-2a), (L2-2b-A), (L2-3), (L2-4-p1), (L2-5a-p1) and (L2-5b-p1) in the Embodiment [5-1], or pharmaceutically acceptable salt thereof or a solvate of these. With the proviso that, the amino compounds shown in the following table and their pharmaceutically acceptable salts and solvates of these are excluded:

TABLE 44

| Structure | CAS Registry No. | Structure | CAS Registry No. |
|---|---|---|---|
| 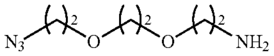 | 166388-57-4 | 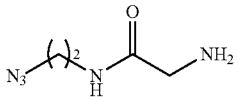 | 2385440-83-3 |
| 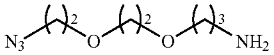 | 2164339-44-8 | 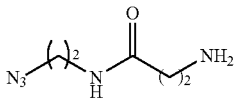 | 2384841-79-4 |
| 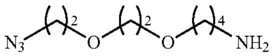 | 2360561-87-9 | 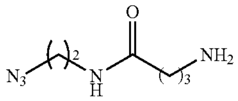 | 2387044-14-4 |
| 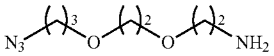 | 2413064-02-3 | 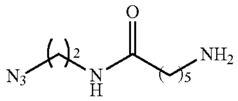 | 2093111-66-9 |
| 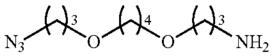 | 1030263-16-1 | 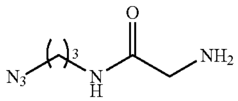 | 2385421-04-3 |
| 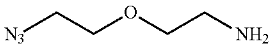 | 464190-91-8 | 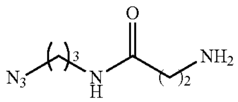 | 2245273-36-1 |
| 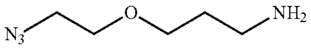 | 912849-74-2 | 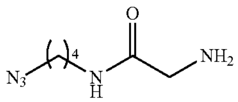 | 2385086-80-4 |
| 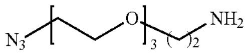 | 134179-38-7 | 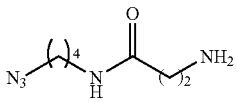 | 1240264-81-6 |

TABLE 44-continued

| Structure | CAS Registry No. | Structure | CAS Registry No. |
|---|---|---|---|
| 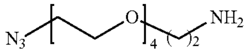 | 951671-92-4 | 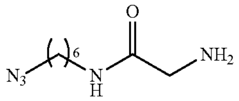 | 1644549-71-2 |
| 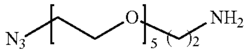 | 516493-93-9 | 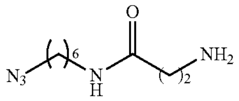 | 1240264-82-7 |
| 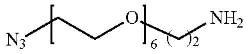 | 957486-82-7 | | |

[23-2] The compound represented by formula (AM-2) in the Embodiment [23] is more preferably an amino compound in which the definition of -$L^2$- is the same as the definition of (L2-2a-1), (L2-2b-B), (L2-3-1), (L2-4-p2), (L2-5a-p2) and (L2-5b-p2) in the Embodiment [5-1], or pharmaceutically acceptable salt thereof or a solvate of these. With the proviso that, the amino compounds shown in the following table and their pharmaceutically acceptable salts and solvates of these are excluded:

TABLE 45

| Structure | CAS Registry No. | Structure | CAS Registry No. |
|---|---|---|---|
| 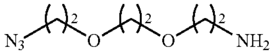 | 166388-57-4 | 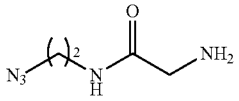 | 2385440-83-3 |
| 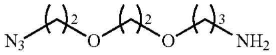 | 2164339-44-8 | 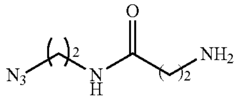 | 2384841-79-4 |
| 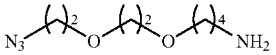 | 2360561-87-9 | 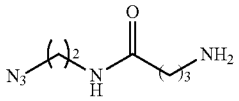 | 2387044-14-4 |
| 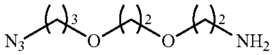 | 2413064-02-3 | 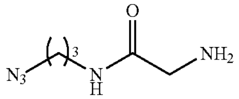 | 2385421-04-3 |
| 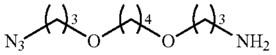 | 1030263-16-1 | 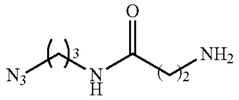 | 2245273-36-1 |
| 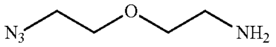 | 464190-91-8 | 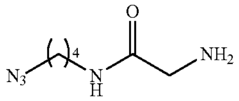 | 2385086-80-4 |
| 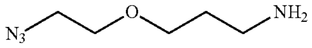 | 912849-74-2 | 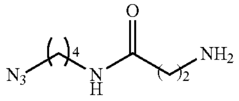 | 1240264-81-6 |

TABLE 45-continued

| Structure | CAS Registry No. | Structure | CAS Registry No. |
|---|---|---|---|
| 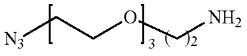 | 134179-38-7 | | |

[23-3] The compound represented by formula (AM-2) in the Embodiment [23] is still more preferably an amino compound selected from the group consisting of the following formulae, or a pharmaceutically acceptable salt thereof or a solvate of these:

[C29]

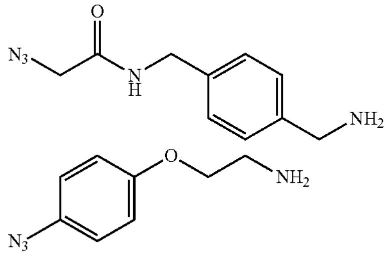

Unless otherwise specified in the present Description, when a higher aspect is cited, a lower aspect of the embodiment is also included. For example, when the Embodiment [1] is cited, the subordinate aspects of the Embodiment [1] are also included.

Each embodiment is explained in more detail below.

1. Alginic Acid

In the present Description, references to alginic acid refer to at least one kind of alginic acid (also called an "alginate") selected from the group consisting of alginic acid, the alginic acid esters and the salts of these (such as sodium alginate). The alginic acid used may be either naturally derived or synthetic, but a naturally derived alginic acid is preferred. A preferred alginic acid is a bioabsorbable polysaccharide that is extracted from natural brown algae such as *Lessonia, Macrocystis, Laminaria*, Ascophyllum, Durvillea, *Ecklonia cava, Eisenia bicyclis* and *Saccharina japonica*, and is a polymer obtained by linear polymerization of two kinds of uronic acid, D-mannuronic acid (M) and L-guluronic acid (G). More specifically, this is a block copolymer comprising a homopolymer fraction of D-mannuronic acid (MM fraction), a homopolymer fraction of L-guluronic acid (GG fraction), and a fraction of randomly arranged D-mannuronic acid and L-guluronic acid (M/G fraction) in arbitrary combination.

Alginic acid is a natural polysaccharide that is manufactured by extraction and purification from brown algae seaweeds and is a polymer of D-mannuronate (M) and L-guluronate (G). The constituent ratio of D-mannuronic acid and L-guluronic acid (M/G ratio) in alginic acid, and by extension the gel strength, differs principally according to the species of seaweed or other organism from which it is derived, and may also be affected by the organism's habitat and season, with a wide range from high-G (M/G ratio about 0.2) to high-M alginic acid (M/G ratio about 5). The physiochemical properties of alginic acid differ according to the M/G ratio as well as the arrangement of M and G and the like, and the preferred applications may also be different. The gelling ability of an alginic acid and the properties of the resulting gel are affected by the M/G ratio, and in general, the gel strength is known to be greater the higher the proportion of G. The M/G ratio also affects the hardness, fragility, water absorption, flexibility and the like of the gel. Consequently, the alginic acid used in the present invention may be alginic acid having an M/G ratio and viscosity suited to the final intended use.

Industrial methods for manufacturing alginic acid include acid methods and calcium methods, and alginic acid manufactured by any manufacturing method may be used in the present invention. Preferably the assay value according to HPLC is in the range of from 80 to 120 mass %, or more preferably from 90 to 110 mass %, or still more preferably from 95 to 105 mass % as a result of purification. In the present invention, alginic acid having an HPLC assay value within the above range is called high purity alginic acid. The alginic acid or salt thereof used in the present invention is preferably high purity alginic acid. Examples of commercial products include the KIMICA ALGIN series sold by the KIMICA Corporation, and a high purity food and pharmaceutical grade product can be purchased and used by preference. A commercial product may also be further purified appropriately before use. For example, low-endotoxin treatment is desirable. For example, the methods described in Japanese Patent Application Publication No. 2007-75425 may be used as the methods for purification and low-endotoxin treatment.

In the "alginic acid" used in the present invention, an alginic acid salt is a monovalent metal salt of alginic acid, and is a salt created by ion exchange of a monovalent metal ion such as $Na^+$ or $K^+$ for a hydrogen ion of a carboxylic acid in the D-mannuronate or L-guluronate of alginic acid. Specific examples of monovalent metal salts of alginic acid include sodium alginate, potassium alginate and the like, and sodium alginate is especially preferred.

In this Description, alginic acid is sometimes expressed as (ALG)-COOH, where (ALG) is alginic acid and —COOH is any one carboxyl group of alginic acid.

The alginic acid used in the present invention may have a weight-average molecular weight suited to the final intended use. For example, the weight-average molecular weight is preferably from 10,000 to 10,000,000, or more preferably from 100,000 to 5,000,000, or still more preferably from 150,000 to 3,000,000.

In some embodiments, the alginic acid is sodium alginate. Commercial sodium alginate may be used as the sodium alginate. In the following examples, the sodium alginates A-1, A-2, A-3, B-1, B-2 and B-3 described in the tables below (sold by MOCHIDA PHARMACEUTICAL CO., LTD.) are used as the sodium alginate. The following table shows the viscosity (1 w/w % aqueous solution), weight-average molecular weight and M/G ratio of each sodium alginate.

TABLE 46

| Sodium alginate | 1 w/w % viscosity (mPa · s) | Weight-average molecular weight GPC | GPC-MALS | M/G ratio |
|---|---|---|---|---|
| A-1 | 10 to 40 | 300,000 to 700,000 | 60,000 to 130,000 | 0.5 to 1.8 |
| A-2 | 50 to 150 | 700,000 to 1,400,000 | 130,000 to 200,000 | |
| A-3 | 300 to 600 | 1,400,000 to 2,000,000 | 200,000 to 400,000 | |
| B-1 | 10 to 40 | 150,000 to 800,000 | 60,000 to 130,000 | 0.1 to 0.5 |
| B-2 | 70 to 150 | 800,000 to 1,500,000 | 130,000 to 200,000 | |
| B-3 | 400 to 600 | 1,500,000 to 2,500,000 | 200,000 to 350,000 | |

The physical property values of the sodium alginates A-1, A-2, A-3, B-1, B-2 and B-3 were measured by the methods described below. The measurement methods are not limited to these, and the physical property values may differ from those given above depending on the measurement method.

[Measuring Viscosity of Sodium Alginate]

This was measured by the rotational viscometer method (using a cone plate rotational viscometer) according to the viscosity measurement methods of the Japanese Pharmacopoeia (16th Edition). The specific measurement conditions are as follows. The sample solution was prepared using MilliQ water. A cone plate rotational viscometer (RS600 RheoStress rheometer (Thermo Haake GmbH), sensor: 35/1) was used as the measurement equipment. The rotation was set at 1 rpm when measuring a 1 w/w % sodium alginate solution. For the read time, the solution was measured for 2 minutes and the average value from 1 to 2 minutes after starting was used. The average of three measured values was used as the measurement value. The measurement temperature was 20° C.

[Measuring Weight-Average Molecular Weight of Sodium Alginate]

This was measured by two measurement methods, (1) gel permeation chromatography (GPC) and (2) GPC-MALS. The measurement conditions are as follows.

[Pre-Treatment Method]

An eluent was added to dissolve the sample, which was then filtered through a0.45-micron membrane filter to obtain a measurement solution.

(1) Gel Permeation Chromatography (GPC) Measurement

[Measurement Conditions (Relative Molecular Weight Distribution Measurement)]

Columns: TSKgel GMPW-XL×2+G2500PW-XL (7.8 mm I.D.×300 mm×3)
Eluent: 200 mM sodium nitrate aqueous solution
Flow rate: 1.0 mL/min
Concentration: 0.05%
Detector: RI detector
Column temperature: 40° C.
Injection volume: 200 μL
Molecular weight standards: Standard pullulan, glucose (2) GPC-MALS Measurement

[Refractive Index Increment (Dn/Dc) Measurement (Measurement Conditions)]

Differential refractometer: Optilab T-rEX
Measurement wavelength: 658 nm
Measurement temperature: 40° C.
Solvent: 200 mM sodium nitrate aqueous solution
Sample concentration: 0.5 to 2.5 mg/mL (5 concentrations)

[Measurement Conditions (Absolute Molecular Weight Distribution Measurement)]

Columns: TSKgel GMPW-XL×2+G2500PW-XL (7.8 mm I.D.×300 mm×3)
Eluent: 200 mM sodium nitrate aqueous solution
Flow rate: 1.0 mL/min
Concentration: 0.05%
Detectors: RI detector, light scattering detector (MALS)
Column temperature: 40° C.
Injection volume: 200 μL In this Description, the molecular weights of alginic acid, alginic acid derivatives and crosslinked alginic acids may be given in units of Da (Daltons).

The constituent ratio of D-mannuronic acid and L-guluronic acid (M/G ratio) in an alginate differs principally according to the type of seaweed or other organism from which it is derived, and may also be affected by the organism's habitat and season, with a wide range from high-G (M/G ratio about 0.2) to high-M alginic acid (M/G ratio about 5). The gelling ability of the alginic acid and the properties of the resulting gel are affected by the M/G ratio, and in general, the gel strength is known to be greater the higher the proportion of G. The M/G ratio also affects the gel hardness, fragility, water absorption, flexibility and the like. The M/G ratio of the alginic acid and/or salt thereof used here is normally from 0.1 to 4.0, or from 0.1 to 3.0 in some embodiments, or from 0.1 to 2.0 in some embodiments, or from 0.5 to 1.8 in some embodiments, or from 0.8 to 1.2 in some embodiments, or from 0.1 to 0.5 in other embodiments.

The alginic acid with a suitable viscosity and a suitable M/G ratio may also be used as the alginic acid in the present invention according to the final intended use.

When numerical ranges are indicated with "from" and "to" this Description, the numbers after "from" and "to" are the minimum and maximum values of the range, respectively.

The "alginic acid ester" and "alginic acid salt" in this Description are not particularly limited, but because these will react with a crosslinking agent, they must have no functional groups that would impede the crosslinking reaction. Desirable examples of alginic acid esters include propylene glycol alginate and the like.

In this Description, examples of alginic acid salts include monovalent salts and divalent salts of alginic acid. Preferred examples of monovalent alginic acid salts include sodium alginate, potassium alginate and ammonium alginate, of which sodium alginate and potassium alginate are more preferred, and sodium alginate is particularly preferred. Preferred examples of divalent alginic acid salts include calcium alginate, magnesium alginate, barium alginate, strontium alginate and the like.

Alginic acid is a high-molecular-weight polysaccharide, and its molecular weight is hard to determine accurately, but generally the weight-average molecular weight is in the range of 1,000 to 10,000,000, or preferably 10,000 to 8,000,000, or more preferably 20,000 to 3,000,000. It is known that in molecular weight measurement of naturally derived high-molecular-weight substances, values may differ depending on the measurement method.

When the molecular weight of an alginic acid derivative or alginic acid or salt thereof of the present invention is specified in this Description, unless otherwise specified this is the weight-average molecular weight as calculated by size exclusion chromatography (SEC). The alginic acid or salt thereof used in the present invention is also preferably one with a molecular weight distribution suited to the final intended use.

For example, this is preferably from 100,000 to 5,000,000 or more preferably from 150,000 to 3,000,000 under the measurement conditions for gel permeation chromatography (GPC) or gel filtration chromatography (which together are sometimes called size exclusion chromatography (SEC)) described in the examples below. In some embodiments, the range is from 500,000 to 3,000,000, or more preferably from 1,000,000 to 2,500,000, or still more preferably from 1,000,000 to 2,000,000.

The absolute weight-average molecular weight can also be measured by the GPC-MALS (SEC-MALS) method. The weight-average molecular weight (absolute molecular weight) as measured by GPC-MALS is preferably at least 10,000, or more preferably at least 50,000, or still more preferably at least 60,000, and is preferably not more than 1,000,000, or more preferably not more than 800,000, or still more preferably not more than 700,000, or especially not more than 500,000. The preferred range is 10,000 to 1,000,000, or more preferably 50,000 to 800,000, or still more preferably 60,000 to 500,000.

When the molecular weight of a high-molecular-weight polysaccharide is calculated by such methods using SEC and SEC-MALS, a measurement error of about 10% to 30% is normal. Thus, a value of 500,000 may vary in the range of 350,000 to 650,000 and a value of 1,000,000 may vary in the range of 700,000 to 1,300,000. In this Description, "about" in the context of molecular weight measurement means that values within about ±10%, or in some embodiments within about ±20% of the measured value may be included.

Because a naturally derived high-molecular-weight substance generally does not have a single molecular weight, but rather is an aggregation of molecules having various molecular weights, it is measured as having a molecular weight distribution of a specific width. A typical measurement method is gel filtration chromatography. Typical information on molecular weight distribution obtained from gel filtration chromatography includes the weight-average molecular weight (Mw), number-average molecular weight (Mn) and dispersion ratio (Mw/Mn).

The following formula represents the weight-average molecular weight, which is most important when calculating the average molecular weight of polymers with large molecular weights.

$$Mw = \Sigma(WiMi)/W = \Sigma(HiMi)/\Sigma(Hi)$$

The number-average molecular weight is calculated by dividing the total weight of the polymer by the total number of polymer molecules.

$$Mn = W/\Sigma Ni = \Sigma(MiNi)/\Sigma Ni = \Sigma(Hi)/\Sigma(Hi/Mi)$$

Where is the total weight of the polymer, Wi is the weight of the i-th polymer molecule, Mi is the molecular weight at the i-th elution time, Ni is the number of molecular weights Mi, and Hi is the height at the i-th elution time.

It is known that in molecular weight measurement of naturally derived high-molecular-weight substances, values may differ depending on the measurement method (for hyaluronic acid: Chikako YOMOTA et al., Bull. Natl. Health Sci., Vol. 117, pp 135-139 (1999), Chikako YOMOTA et al., Bull. Natl. Inst. Health Sci., Vol. 121, pp 30-33 (2003)). Published methods for measuring the molecular weight of alginic acid include methods for calculating from the intrinsic viscosity and methods for calculating by SEC-MALLS (size exclusion chromatography with multiple angle laser light scattering detection) (ASTM F2064-00 (2006), issued by ASTM International). In the present invention, the weight-average molecular weight can be obtained by measuring molecular weight by size exclusion chromatography (SEC) using the ordinary methods described in the above literature, and then calculating based on a calibration curve using pullulan as a standard substance.

Moreover, in the present invention the weight-average molecular weight may also be the absolute molecular weight as measured by size exclusion chromatography (SEC)-MALS for example using the ordinary methods described in the above literature.

The molecular weight of an alginate can be measured by ordinary methods.

When the molecular weight of an alginic acid or salt thereof is specified in this Description, this is the weight-average molecular weight as calculated by gel filtration chromatography unless otherwise specified. The conditions given in the examples below for example may be adopted as typical conditions for molecular weight measurement by gel filtration chromatography. For example, a Superose 6 Increase 10/300 GL column (GE Health Care Sciences) may be used as the column, a 10 mmol/L phosphate buffer, containing 0.15 mol/L NaCl (pH 7.4) may be used as the development solvent, and blue dextran, thyroglobulin, ferritin, aldolase, conalbumin, ovalbumin, ribonuclease A and aprotinin may be used as molecular weight standards.

The viscosity of the alginic acid used in this Description is not particularly limited, but when measured in a 1 w/w % aqueous alginate solution, the viscosity is preferably 10 mPa·s to 1,000 mPa·s, or more preferably 50 mPa·s to 800 mPa·s.

The viscosity of an aqueous solution of alginic acid can be measured by ordinary methods. For example, it can be measured by rotational viscometry using a coaxial double cylindrical rotational viscometer, single cylindrical rotary viscometer (Brookfield viscometer), conical plate rotational viscometer (cone plate viscometer) or the like. Preferably it is measured following the viscosity measurement methods of the Japanese Pharmacopoeia (16th Edition). More preferably, a cone plate viscometer is used.

When first extracted from brown algae, alginates have a high molecular weight and a high viscosity, but the molecular weight and viscosity are reduced by the processes of heat drying, purification and the like. Alginic acids with different molecular weights can be manufactured by methods such as controlling the temperature and other conditions during the manufacturing process, selecting the brown algae used as raw materials, and fractioning the molecular weights in the manufacturing process. An alginic acid having the desired molecular weight can also be obtained by mixing alginic acids from different lots having different molecular weights or viscosities.

Some embodiments of the alginic acid used in this Description have been subjected to low endotoxin treatment, while others have not been subjected to low endotoxin treatment. "Low endotoxin" means that the level of endotoxins is so low that there is no effective risk of inflammation or fever. An alginic acid that has been subjected to low endotoxin treatment is more preferred.

Low endotoxin treatment can be performed by known methods or analogous methods. For example, it can be performed by the methods of Kan et al for purifying sodium hyaluronate (see for example Japanese Patent Application Publication No. JP H09-324001A, etc.), the methods of Yoshida et al for purifying β 1,3-glucan (see for example Japanese Patent Application Publication No. JP H08-260102A), the methods of William et al for purifying biopolymer salts such as alginate and gellan gum (see for example Japanese Patent Application Publication No. JP 2002-530440A), the methods of James et al for purifying polysaccharides (see for example WO 93/13136A), the methods of Lewis et al (see for example U.S. Pat. No. 5,589,591B), and the methods of Herman Frank for purifying alginates (see for example Appl. Microbiol. Biotechnol. (1994) 40:638-643, etc.) and the like or analogous methods. Low endotoxin treatment is not limited to these methods, and may also be performed by known methods such as washing, filtration with a filter (endotoxin removal filter, charged filter or the like), ultrafiltration, column purification (using an endotoxin adsorption affinity column, gel filtration column, ion-exchange resin column or the like), adsorption by a hydrophobic substance, resin, activated carbon or the like, organic solvent treatment (organic solvent extraction, deposition/sedimentation with an organic solvent or the like), surfactant treatment (see for example Japanese Patent Application Publication No. JP 2005-036036A) or the like, or by a suitable combination of these methods. Known methods such as centrifugation may also be combined with the steps of such treatment. The treatment is preferably selected appropriately according to the type of alginic acid.

The endotoxin level can be confirmed by known methods, such as limulus reagent (LAL) methods or methods using an Endospecy (registered trademark) ES-24S set (SEIKAGAKU CORPORATION).

There are no particular limitations on the endotoxin treatment method used, but the resulting endotoxin content of the treated alginate is preferably not more than 500 endotoxin units (EU)/g, or more preferably not more than 100 EU/g, or still more preferably not more than 50 EU/g, or especially not more than 30 EU/g when measured with a limulus reagent (LAL). In the present invention, "substantially free of endotoxins" means that the endotoxin level as measured by Japanese Pharmacopoeia endotoxin testing is effectively within the above numerical range. Low endotoxin treated sodium alginate is available as a commercial product such as Sea Matrix (registered trademark) (MOCHIDA PHARMACEUTICAL CO., LTD.) or Pronova (registered trademark) UP LVG (FMC BioPolymer).

2. Alginic Acid Derivative

Novel alginic acid derivatives are provided in this Description. An alginic acid derivative in this Description has a reactive group or a reactive group complementary to that reactive group in a Huisgen reaction introduced at any one or more carboxyl groups of alginic acid via an amide bond and a divalent linker.

More specifically, these are an alginic acid derivative represented by the following formula (I):

[C30]

(I)

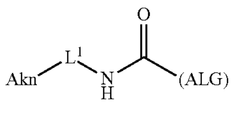

[in formula (I), (ALG), $-L^1-$, Akn and —NH—CO— are defined as in the Embodiment 1 above], and an alginic acid derivative represented by the following formula (II):

[C31]

(II)

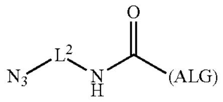

[in formula (II), (ALG), $-L^2-$ and —NH—CO— are defined as in the Embodiment 4 above].

Any linear group may be used as the divalent linker ($-L^1-$ or $-L^2-$) as long as it does not impede the reaction between the reactive group and the reactive group complementary to that reactive group. Specific examples include, for instance, linear alkylene groups ($—(CH_2)_n—$, n=1 to 30) (in which $—CH_2—$ may be substituted with one or more (such as 1 to 10, or 1 to 5) groups such as —C(═O)—, —CONH—, —O—, —NH— or —S— or a benzene or heterocyclic ring (5- to 6-membered aromatic or non-aromatic heterocycle such as a pyridine, piperidine or piperazine ring), and a hydrogen atom of the $—CH_2—$ may also be substituted with one or more (such as 1 to 10, or 1 to 5) groups selected from the oxo (═O), hydroxyl (—OH) and $C_{1-6}$ alkyl groups (such as methyl, ethyl, n-propyl and iso-propyl groups) and halogen atoms (such as a fluorine, chlorine, bromine and iodine atoms)), but the examples are not limited to these.

A methyl group may also be substituted for the hydrogen atom in the imino group (—NH—) of the —NH—CO— group in the alginic acid derivative represented by formula (I) or formula (II) above to obtain an —N(Me)-CO— group.

The mode of binding between the linker ($-L^1-$, $-L^2-$) and the alginic acid in the alginic acid derivative represented by the formula (I) or (II) may be —NH—CO— binding or —N(Me)-CO— binding but is preferably —NH—CO— binding.

The novel alginic acid derivatives in this Description are the alginic acid derivatives represented by formula (I) and formula (II), which can be manufactured by the methods shown in the following formulae (for details, see the general manufacturing methods described below).

[C32]

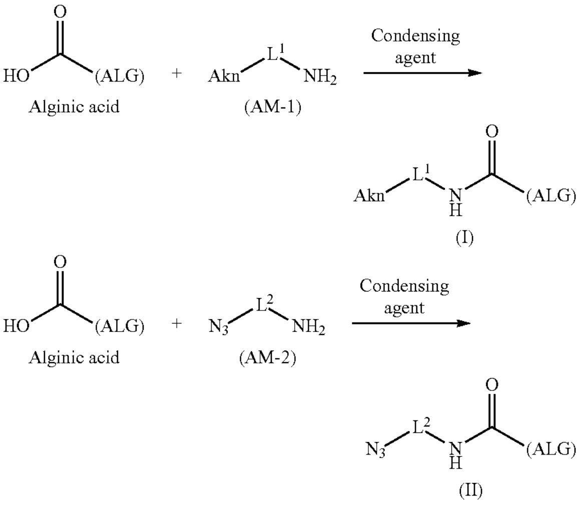

Alginic acid (AM-1) (I)
Alginic acid (AM-2) (II)

The weight-average molecular weights of the alginic acid derivatives represented by formula (I) and formula (II) in this Description are each 100,000 Da to 3,000,000 Da, or preferably 300,000 Da to 2,500,000 Da, or still more preferably 500,000 Da to 2,000,000 Da. The molecular weights of both alginic acid derivatives can be determined by the methods described below.

In this Description, the Akn-$L^1$-NH— group of formula (I) need not be bound to all of the carboxyl groups of the constituent units of alginic acid, and the $N_3$-$L^2$-NH— group of formula (II) need not be bound to all of the carboxyl groups of the constituent units of alginic acid.

In this Description, the Akn-$L^1$-NH— group of formula (I) is sometimes called a reactive group, and the $N_3$-$L^2$-NH— group of formula (II) is sometimes called a complementary reactive group. Conversely, the $N_3$-$L^2$-NH— group of formula (II) may sometimes be called a reactive group, and the Akn-$L^1$-NH— group of formula (I) may sometimes be called a complementary reactive group.

In this Description, the introduction rate of the reactive group or complementary reactive group is 0.1% to 30% or 1% to 30%, or preferably 2% to 20%, or more preferably 3% to 10% of each.

The introduction rate of the reactive group or complementary reactive group is a value representing the number of uronic acid monosaccharide units having introduced reactive groups or complementary reactive groups as a percentage of the uronic acid monosaccharide units that are repeating units of the alginate. Unless otherwise specified, the % value used as the introduction rate of the reactive group or complementary reactive group in the alginic acid derivative (formula (I) or formula (II)) in this Description is a mol % value. The introduction rate of the reactive group or complementary reactive group can be determined by the methods described in the examples below.

In this Description, the cyclic alkyne group (Akn) in formula (I) and the azide group in formula (II) form a triazole ring by a Huisgen reaction, thereby forming a crosslink.

3. Huisgen Reaction

A Huisgen reaction (1,3-dipolar cycloaddition reaction) is a condensation reaction between compounds having a terminal azide group and a terminal alkyne group as shown in the formula below. The reaction efficiently yields a disubstituted 1,2,3-triazole ring, and has the feature of producing no extra by-products. Although it is believed that the reaction may produce a 1,4- or 1,5-disubstituted triazole ring, it is possible to regioselectively obtain a triazole ring by using a copper catalyst.

[C33]

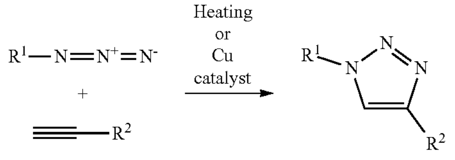

Wittig and Krebs have also reported on a Huisgen reaction that does not use a copper catalyst. That is, in this reaction a cycloadduct is obtained by simply mixing cyclooctyne and phenyl azide ($R^3$=phenyl in the formula below). Because the triple bond of cyclooctyne is greatly distorted in this reaction, elimination of the distortion caused by the reaction with the phenyl azide acts as a driving force, and the reaction progresses spontaneously without the need of a catalyst.

[C34]

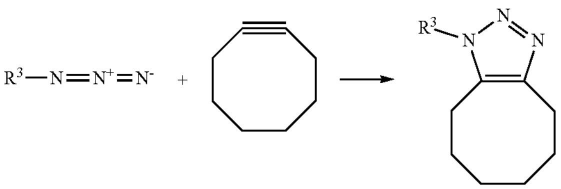

Thus, the Huisgen reaction may use an azide compound having a substituted primary azide, secondary azide, tertiary azide, aromatic azide or the like and a compound having a terminal or cyclic alkyne group, which is a reactive group complementary to the azide group. Moreover, because it is mainly only the azide and alkyne groups that react in the Huisgen reaction, various functional groups (such as ester, carboxyl, alkenyl, hydroxyl and amino groups and the like) may also be substituted in the reaction substrate.

In certain embodiments, the cyclic alkyne group (cyclooctyl group) described in the Embodiment [1] above for example is used as the alkyne group in a Huisgen reaction so that crosslinks are formed easily, efficiently and in a short amount of time by 1,2,3-triazole rings between alginic acid molecules without producing undesirable by-products and while avoiding the use of a copper catalyst so as to avoid cytotoxicity from the copper catalyst.

In a preferred embodiment of the method of crosslinking the alginic acid derivatives, almost no undesirable by-products are formed by the reaction (Huisgen reaction). In this case, when alginic acid is used to prepare novel forms of biocompatible materials or to form alginic acid hydrogels, it is possible to incorporate various bioactive molecules or to incorporate cellular materials into alginic acid hydrogels for reconstructive surgery or gene therapy.

4. Crosslinked Alginic Acid

Crosslinked alginic acids include (i) those crosslinked via divalent metal ion bonds, (ii) those crosslinked via chemical bonds, and (iii) those crosslinked via both divalent metal ion bonds and chemical bonds. All of these crosslinked alginic acids have the property of forming gels, semi-solids and in some cases sponge-like forms.

When a crosslinked alginic acid is crosslinked via divalent metal ion bonds, the reaction progresses ultra-rapidly and is reversible, while when a crosslinked alginic acid is crosslinked via chemical bonds, the reaction progresses slowly under relatively mild conditions, and is irreversible. The physical properties of a crosslinked alginic acid can be adjusted for example by such methods as changing the concentration of the aqueous solution (such as a calcium chloride aqueous solution) containing the divalent metal ion or changing the introduction rate of the reactive group introduced into the alginic acid or the like.

A variety of alginic acid structures can be prepared using the above crosslinking reaction. For example, a specific structure can be prepared instantaneously from an alginic acid solution by an ionic crosslinking reaction, and a crosslinking reaction via chemical bonds can then be used to structurally reinforce this structure (to give it long-term stability for example). Alternatively, in a crosslinked alginic acid structure crosslinked via both divalent metal ion bonds and chemical bonds, the divalent metal ions incorporated by ionic crosslinking can be reversibly released, leaving a structure having only crosslinking via chemical bonds.

The crosslinked alginic acid of one embodiment can be obtained by mixing the alginic acid derivatives of formula (I) and formula (II) above and performing a Huisgen reaction.

The crosslinked alginic acid of one embodiment forms a three-dimensional mesh structure via chemical crosslinking (crosslinking by triazole rings formed from alkyne and azide groups). Preferred alginic acid derivatives have improved stability of the crosslinked alginic acid after crosslinking.

The crosslinked alginic acid of some embodiments is a crosslinked alginic acid in which any carboxyl group of a first alginic acid and any carboxyl group of a second alginic acid are amide bonded via the following formula (III-L):

[C35]

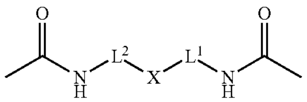

(III-L)

[in formula (III-L), the —CONH— and —NHCO— at either end represent amide bonds via any carboxyl group of alginic acid; and $-L^1-$, $-L^2-$ and X are defined as in Embodiment 8 above].

In some embodiments, the mixing ratio of the alginic acid derivative of formula (I) and the alginic acid derivative of formula (II) when preparing the crosslinked alginic acid (the weight ratio of formula (I) derivative:formula (II) derivative) is 1 to 1.5:1 for example, or preferably 1.2 to 1.5:1, or 1 to 1.2:1, or more preferably 1:1.

In terms of the mixing ratio of the alginic acid derivative of formula (II) and the alginic acid derivative of formula (I) when preparing the crosslinked alginic acid, in some embodiments the mixing ratio of the derivative of formula (II) to the derivative of formula (I) (the weight ratio of formula (II) derivative:formula (I) derivative) is 1 to 4.0:1 for example, or preferably 1.5 to 4.0:1, or 1.2 to 1.5:1, or 1 to 1.2:1, or more preferably 1:1.

In some embodiments, the mixing ratio of the alginic acid derivative of formula (I) and the alginic acid derivative of formula (II) when preparing the crosslinked alginic acid is more preferably such that the ratio of the introduction rates (mol %) of the reactive groups of the alginic acid derivative of formula (I) and the alginic acid derivative of formula (II) is 1 to 1.5:1 for example, or preferably 1.2 to 1.5:1, or 1 to 1.2:1, or more preferably 1:1.

In some embodiments, the mixing ratio of the alginic acid derivative of formula (II) and the alginic acid derivative of formula (I) when preparing the crosslinked alginic acid is more preferably such that the ratio of the introduction rates (mol %) of the reactive groups of the alginic acid derivative of formula (II) and the alginic acid derivative of formula (I) is 1 to 4.0:1 for example, or preferably 1.5 to 4.0:1, or 1.2 to 1.5:1, or 1 to 1.2:1, or more preferably 1:1.

In the mixing ratios above, the alginic acid derivative of formula (II) may be substituted for the alginic acid derivative of formula (I), and the alginic acid derivative of formula (I) may be substituted for the alginic acid derivative of formula (II).

In the crosslinked alginic acid, it is not necessary that all of the carboxyl groups of the constituent units of the alginic acid have the crosslink of formula (III-L) above. The introduction rate of the crosslink represented by formula (III-L) above in the crosslinked alginic acid (also called the crosslinking rate) is in the range of about 0.1% to about 80%, or about 0.3% to about 60%, or about 0.5% to about 30%, or about 1.0% to about 10% for example.

The concentration of the alginic acid derivative of formula (I) or (II) in the Huisgen reaction for obtaining the crosslinked alginic acid is normally about 1 to about 500 mg/mL, or preferably about 5 to about 100 mg/mL.

The reaction temperature in the Huisgen reaction is normally an external temperature of about 4° C. to about 60° C., or preferably about 15° C. to about 40° C.

The stirring time for forming the crosslinked alginic acid (hydrogel) is a few seconds to about 24 hours, or a few seconds to about 12 hours, or a few seconds to about 30 minutes, or a few seconds to about 10 minutes for example.

The reaction solvent or reaction solution used in the Huisgen reaction is not particularly limited, and examples include tap water, pure water (such as distilled water, ion-exchange water, RO water or RO-EDI water), ultrapure water, cell culture medium, phosphate-buffered saline (PBS) and physiological saline, and ultrapure water is preferred.

The crosslinked alginic acid of some embodiments is a crosslinked alginic acid comprising as crosslinking both chemical crosslinking by triazole rings formed from a Huisgen reaction and ionic crosslinking partially formed by divalent metal ions.

5. Crosslinked Alginic Acid Structure

The crosslinked alginic acid structure can be obtained by a method that includes performing a crosslinking reaction using the alginic acid derivative of formula (I) and the alginic acid derivative of formula (II) above.

In this Description, "performing a crosslinking reaction" means either performing a Huisgen reaction using the alginic acid derivative of the formula (I) and the alginic acid derivative of the formula (II) to thereby form chemical crosslinking (chemical bonds) between the alginic acid derivative of the formula (I) and the alginic acid derivative of the formula (II), or supplying a divalent metal ion to the alginic acid derivative of the formula (I) and the alginic acid derivative of the formula (II) to thereby form ionic crosslinking (ionic bonds) between or within the alginic acid derivative of the formula (I) and/or the alginic acid derivative of the formula (II), or else forming both chemical crosslinking by the aforementioned Huisgen reaction and ionic crosslinking by crosslinking with a divalent metal ion.

Although this is not a limitation, the crosslinked alginic acid structure can be prepared by the following methods for example.

[Mixing Method]

A mixed alginic acid derivative solution obtained by mixing the alginic acid derivative of the formula (I) with the alginic acid derivative of the formula (II) is dripped into a solution containing a divalent metal ion to obtain a crosslinked alginic acid structure, which is a specific structure formed by chemical crosslinking (crosslinking by triazole rings formed from alkyne groups and azide groups in a Huisgen reaction) and ionic crosslinking (partial crosslinking formed by divalent metal ions).

[Coating Method]

A solution containing the alginic acid derivative of the formula (I) is dripped or the like into a solution containing a divalent metal ion to obtain a specific partially crosslinked structure. The resulting gel or other structure for example can then be added to a solution containing the alginic acid structure of the formula (II) above to thereby perform a further crosslinking reaction (Huisgen reaction) on the surface of the like of the previous structure and obtain a crosslinked alginic acid. This method can also be implemented with the alginic acid derivative of formula (II) substituted for the alginic acid derivative of formula (I) and with the alginic acid derivative of formula (I) substituted for the alginic acid derivative of formula (II).

The divalent metal ion used in the above method is not particularly limited but may be a divalent metal ion selected from the group consisting of a calcium ion, a magnesium ion, a barium ion, a strontium ion, a zinc ion and the like; or preferably a calcium ion or a barium ion; or more preferably a calcium ion.

The solution containing the divalent metal ion used in the above method is not particularly limited but may be for example an aqueous solution selected from the group consisting of a calcium chloride aqueous solution, a calcium carbonate aqueous solution, a calcium gluconate aqueous solution, a barium chloride aqueous solution and the like; or preferably a calcium chloride aqueous solution or a barium chloride aqueous solution; or more preferably a calcium chloride aqueous solution.

The divalent metal ion concentration in the solution containing the divalent metal ion used in the above method is not particularly limited but may be from about 1 mM to about 1 M for example, or preferably from about 5 mM to about 500 mM, or more preferably from about 10 mM to about 300 mM.

The solvent or solution used in this method is not particularly limited, but examples include tap water, pure water (such as distilled water, ion-exchange water, RO water or RO-EDI water), ultrapure water, cell culture medium, phosphate-buffered saline (PBS) and physiological saline, and ultrapure water is preferred.

Examples of specific crosslinked alginic acid structures include fibrous structures, fibers, beads, gels and nearly spherical gels. A preferred crosslinked alginic acid structure has improved stability. The crosslinked alginic acid structure may also have the ability to retain contents within the structure (content retention property).

The physical properties of the alginic acid gel can be adjusted by adjusting the physical property values such as hardness, elasticity, repulsive force, rupture force, stress at break and the like.

6. Biocompatibility of Alginic Acid Derivatives and Crosslinked Alginic Acid Structure In this Description, the alginic acid derivatives, crosslinked alginic acid or crosslinked alginic acid structure has biocompatibility. In this Description, biocompatibility means the property of not causing reactions such as interactions between a biomaterial (in this case, the alginic acid derivatives represented by formulae (I) and (II), or a crosslinked alginic acid or crosslinked alginic acid structure manufactured using these alginic acid derivatives) and a living body, or local reactions in tissue adjacent to the biomaterial, or systemic reactions and the like.

In this Description, the biocompatibility of the alginic acid derivative, crosslinked alginic acid or crosslinked alginic acid structure is confirmed in the examples relating to biocompatibility below.

7. Stability of Crosslinked Alginic Acid Structure

The stability of the crosslinked alginic acid structure can be confirmed for example by measuring gel stability, and its permeability can be confirmed by measuring gel permeability.

[Method of Measuring Gel Stability]

Phosphate buffered saline (PBS) is added to a crosslinked alginic acid structure gel in a container, and the concentration (μg/mL) of alginic acid eluted into the PBS is measured. The amount of eluted alginic acid is calculated from the measured alginic acid concentration and divided by the total amount of alginic acid as calculated from the total alginic acid concentration obtained by decomposing the crosslinked alginic acid structure gel, and the resulting value is given as percentage and used as the collapse rate. Gel stability can be determined specifically by the methods described in the examples below.

In this Description, the gel collapse rate of the crosslinked alginic acid structure is preferably 0% to about 90%, or more preferably 0% to about 70%, or still more preferably 0% to about 50%. The stability of the crosslinked alginic acid structure is greater the lower the concentration of the alginic acid leaking into an aqueous solution, or in other words the lower the gel collapse rate.

[Method of Measuring Gel Permeation Rate]

A crosslinked alginic acid structure gel containing fluorescein isothiocyanate-dextran is prepared, physiological saline is added to the gel in a container, and the concentration of dextran leaking into the saline is measured. The amount of dextran is calculated from the measured dextran concentration and divided by the total amount of dextran as calculated from the total dextran concentration obtained by decomposing the crosslinked alginic acid structure gel containing the fluorescein isothiocyanate-dextran, and the resulting value is given as percentage and used as the gel permeation rate. The gel permeation rate can be determined specifically by the methods described in the examples below.

The gel permeation rate of the crosslinked alginic acid 24 hours after addition of the saline is preferably 0% to about 90%, or more preferably 0% to about 70%, or still more preferably 0% to about 50% when the gel contains dextran with a molecular weight of about 2,000,000. When it contains dextran with a molecular weight of about 150,000, assuming that the intended use of the crosslinked alginic acid structure gel is releasing and producing proteins and antibodies, the gel permeation rate is preferably about 1% to about 100%, or more preferably about 10% to about 100%, or still more preferably about 30% to about 100%, while if the intended use is as an immune barrier, the gel permeation rate is preferably 0% to about 90%, or more preferably 0% to about 70%, or still more preferably 0% to about 50%.

The lower the permeation rate of the crosslinked alginic acid structure, the lower the permeation of the gel contents or external substances, while the higher the permeation rate, the higher the permeation of the gel contents or external substances.

The gel permeation rate can be adjusted by adjusting the molecular weight and concentration of the alginic acid used, the type and introduction rate of the reactive group introduced into the alginic acid, the type and concentration of the divalent metal ion used for gelling, or a combination of these.

[Method of Preparing Crosslinked Alginic Acid Structure Gel Containing Contents]

For example, a crosslinked alginic acid structure gel containing fluorescein isothiocyanate-dextran contents can be prepared by the following methods.

(1) A solution of the alginic acid derivative represented by formula (I) is mixed with a fluorescein isothiocyanate-dextran solution.

(2) The mixed solution obtained in (1) is mixed with a solution of the alginic acid derivative represented by formula (II).

(If formula (I) is substituted for formula (II) in step (1), then formula (II) is substituted for formula (I) in step (2)).

(3) The mixed solution obtained in (2) is dripped into a solution containing a calcium ion to obtain a gel that forms chemical crosslinks and ionic crosslinks in solution, thereby yielding a crosslinked alginic acid structure gel containing fluorescein isothiocyanate-dextran.

Unless otherwise specified "about" in this Description may include values within about ±20%, or preferably within about ±10% of the indicated value.

8. Methods for Synthesizing Alginic Acid Derivatives

In this Description, the alginic acid derivatives represented by formula (I) and formula (II) can each be manufactured by a condensation reaction using a condensing agent, in which an amine derivative (AM-1) represented by $H_2N$-$L^1$-Akn (in which $L^1$ and Akn are defined as in the Embodiment [1]) or an amine derivative (AM-2) represented by $H_2N$-$L^2$-$N_3$ (in which $L^2$ is defined as in the Embodiment [4]) is reacted with any carboxyl group of an alginate.

[C36]

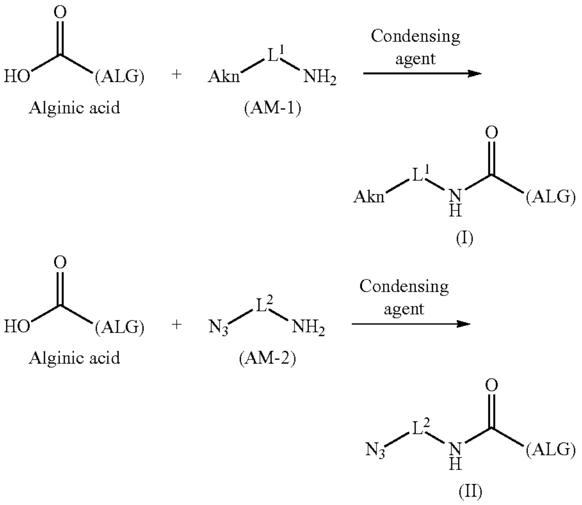

Alginic acid
(AM-1)
(I)
Alginic acid
(AM-2)
(II)

[Method of Preparing Alginic Acid Derivative of Formula (I)]

Using a 0.5 wt % to 1 wt % aqueous alginic acid solution and the amine represented by formula (AM-I), the alginic acid derivative of formula (I) can be manufactured by methods known in the literature (such as "Experimental Chemistry Course 5th Edition", Vol. 16, Synthesis of Organic Compounds IV: Carboxylic acids, derivatives and esters, pp. 35-70, Acid amides and acid imides, pp. 118-154, Amino acids and peptides, pp. 258-283, 2007 (Maruzen)) by for example performing a condensation reaction at temperatures between 0° C. and 50° C., with or without an inorganic base such as sodium hydrogen carbonate or sodium carbonate or an organic base such as triethylamine or pyridine, in a mixed solvent of water and a solvent selected from the ether solvents such as tetrahydrofuran and 1,4-dioxane, the alcohol solvents such as methanol, ethanol and 2-propanol and the polar solvents such as N,N-dimethylformamide and the like to a degree that does not cause precipitation of the alginic acid, in the presence of a condensing agent selected from 1,3-dicyclohexyl carbodiimide (DCC), 1-ethyl-3-(3-dimethylaminopropyl) carbodiimide hydrochloride (WSC·HCl), benzotriazol-1-yloxytris(dimethylamino) phosphonium hexafluorophosphate (BOP reagent), bis(2-oxo-3-oxazolidinyl) phosphinic chloride (BOP-Cl), 2-chloro-1,3-dimethylimidazolinium hexafluorophosphate (CIP), 4-(4,6-dimethoxy-1,3,5-triazin-2-yl)-4-methyl morpholinium chloride (DMT-MM) or the like.

[Method of Preparing Alginic Acid Derivative of Formula (II)]

The alginic acid derivative of formula (II) can be manufactured by performing a reaction according to the "Method of preparing alginic acid derivative of formula (I)" above using a 0.5 wt % to 1 wt % aqueous alginic acid solution and the amine derivative represented by formula (AM-2).

In the method of preparing the alginic acid derivative of formula (I) or the alginic acid derivative of formula (II) above, the introduction rate of the amine of formula (AM-1) or formula (AM-2) can be regulated by appropriately selecting and combining the reaction conditions of (i) to (v) below and the like in consideration of the properties and the like of the respective amines: (i) increasing or decreasing the equivalent amount of the condensing agent, (ii) raising or lowering the reaction temperature, (iii) lengthening or shortening the reaction time, (iv) adjusting the concentration of alginic acid as the reaction substrate, (v) adding an organic solvent miscible with water to raise the solubility of the amine of formula (AM-1) or (AM-2), etc.

Of the amines represented by formula (AM-1) and (AM-2), methods of manufacturing more specific amines are given below.

In the manufacturing methods below, m1, n1, m2a, n2a, p2a, m2b, n2b, p2b, m3, n3, p3, m4a, n4a, m4b, n4b, m5a, n5a, p5a, q5a, m5b, n5b, p5b, q5b, m6a, n6a, p6a, m6b, n6b, p6b, m7, n7, m8a, n8a, m8b, n8b, m9a, n9a, p9a, m9b, n9b, p9b, m10, n10, p10, m11, m12, n12, p12, x1, x2, x2a, y2a, x2b, y2b, x3, y3, x4, y4, z4, x5a, y5a, x5b, y5b, x6a, y6a, z6a, v6a, x6b, y6b, z6b, v6b, x7a, y7a, z7a, x7b, y7b, z7b, x8a, y8a, z8a, x8b, y8b, z8b, x9a, y9a, z9a, x9b, y9b, z9b, x10 and y10 are defined as in the descriptions of the Embodiment [1]; $P^1$ is an amino group protecting group selected from a —C(O)O-tertBu group, —C(O)O—Bn group, —$C(O)CH_3$ group, $C(O)CF_3$ group, —$SO_2Ph$ group, —$SO_2PhMe$ group, —$SO_2Ph(NO_2)$ group and the like; and E is a leaving group such as a halogen atom (fluorine atom, chlorine atom, bromine atom, iodine atom, etc.), —OTs group, —OMs group or the like.

In the manufacturing methods below, moreover, the protecting group $P^1$ can be protected and deprotected by methods known in the literature, such as the deprotection methods described in Greene et al, "Protective Groups in Organic Synthesis, 4th Edition", 2007, John Wiley & Sons.

[Manufacturing Method AM-A]

Method of Manufacturing Amine Represented by Formula (AM-1-B1):

[C37]

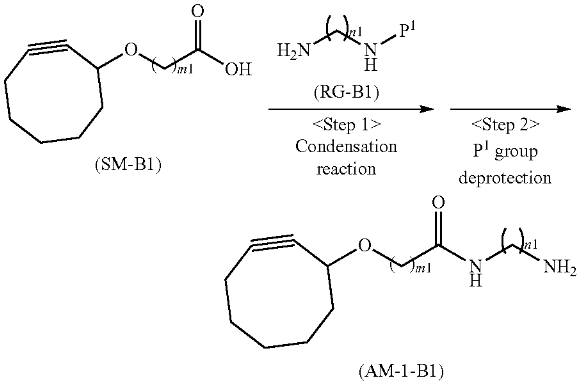

(SM-B1)
(RG-B1)
(AM-1-B1)

Using the compound of formula (SM-B1) and the compound of formula (RG-B1) [the compound of formula (SM-B1) and the compound of formula (RG-B1) are commercial compounds or compounds that can be manufactured from commercial compounds by methods known in the literature], the amine compound represented by formula (AM-1-B1) or salt thereof can be manufactured by performing a condensation reaction as in the "Method of preparing alginic acid derivative of formula (I)" above and then deprotecting the protecting group $P^1$.

[Manufacturing Method AM-B]

Method of Manufacturing Amines Represented by Formula (AM-1-B2a) and Formula (AM-1-B2b):

[C38]

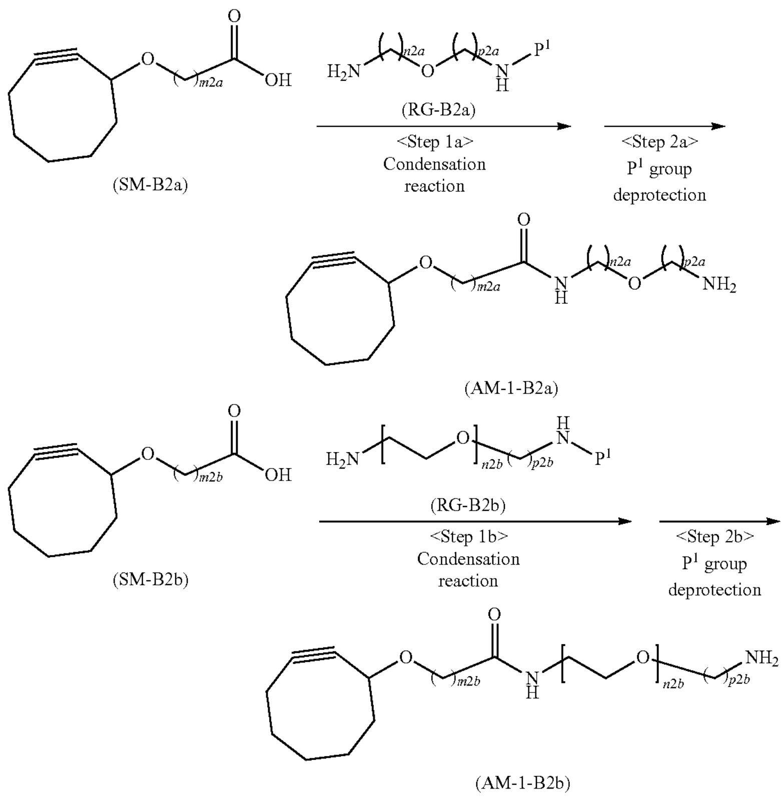

(SM-B2a) (RG-B2a) (AM-1-B2a) (SM-B2b) (RG-B2b) (AM-1-B2b)

Using the compound of formula (SM-B2a) and the compound of formula (RG-B2a) [the compound of formula (SM-B2a) and the compound of formula (RG-B2b) are commercial compounds or compounds that can be manufactured by methods known in the literature from commercial compounds], the amine compound represented by formula (AM-1-B2a) or a salt thereof can be manufactured by performing a reaction as in the [Manufacturing Method AM-A]. Similarly, the amine compound represented by formula (AM-1-B2b) or a salt thereof can be manufactured by performing a similar reaction using the compound of formula (SM-B2b) and the compound of formula (RG-B2b) [the compound of formula (SM-B2b) and the compound of formula (RG-B2b) are commercial compounds or compounds that can be manufactured by methods known in the literature from commercial compounds].

[Manufacturing Method AM-C]

Method of Manufacturing Amine Represented by Formula (AM-1-B3):

[C39]

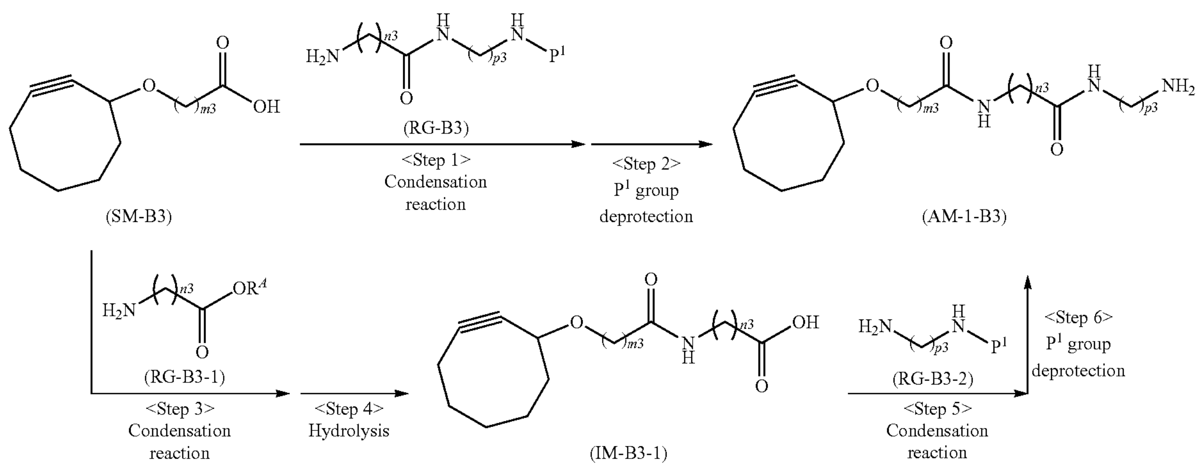

(SM-B3) (RG-B3) (AM-1-B3) (RG-B3-1) (IM-B3-1) (RG-B3-2)

The amine compound represented by formula (AM-1-B3) or a salt thereof can be manufactured by performing reactions in accordance with the above synthesis scheme (the reactions of each step conform to the reactions described in [Manufacturing Method AM-A]) using the compound of formula (SM-B3) [the compound of formula (SM-B3 is a commercial compound or a compound that can be manufactured by methods known in the literature from commercial compounds]. In the above scheme, the compounds of formula (RG-B3), formula (RG-B3-1) and formula (RG-B3-2) are commercial compounds or compounds that can be manufactured by methods known in the literature from commercial compounds.

[Manufacturing Method AM-D]

Method of Manufacturing Amines Represented by Formula (AM-1-B5a) and Formula (AM-1-B5b):

[C40]

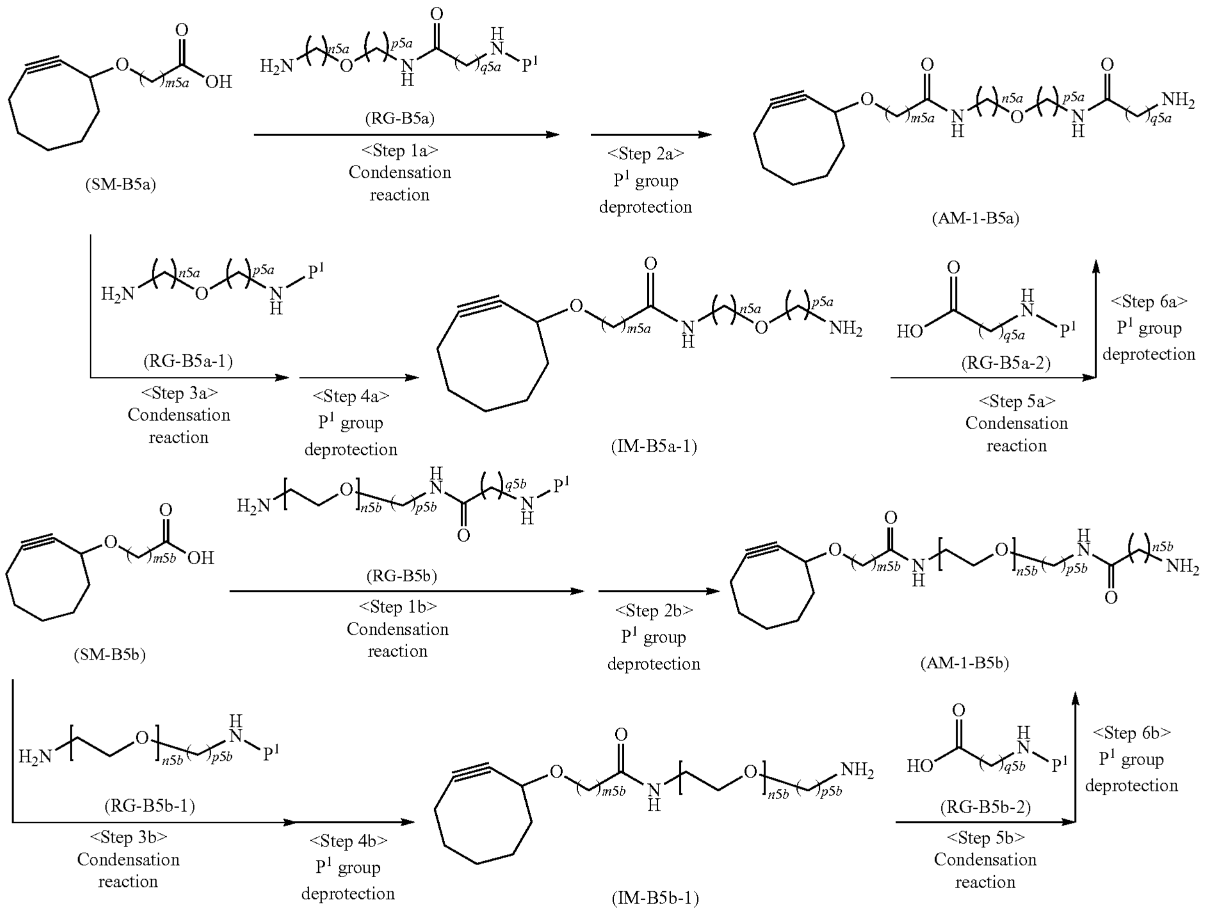

The compounds represented by formula (AM-1-B5a) and formula (AM-1-B5b) or their salts can be manufactured by performing reactions according to the above synthesis scheme (the reactions of each step conform to the reactions described in [Manufacturing Method AM-A]). In the above scheme, the compounds of formula (SM-B5a), formula (RG-B5a), formula (RG-B5a-1), formula (RG-B5a-2), formula (SM-B5b), formula (RG-B5b), formula (RG-B5b-1) and formula (RG-B5b-2) are commercial compounds or compounds that can be manufactured by methods known in the literature from commercial compounds.

[Manufacturing Method AM-E]

Method of Manufacturing Amines Represented by Formula (AM-1-B6a) and Formula (AM-1-B6b):

[C41]

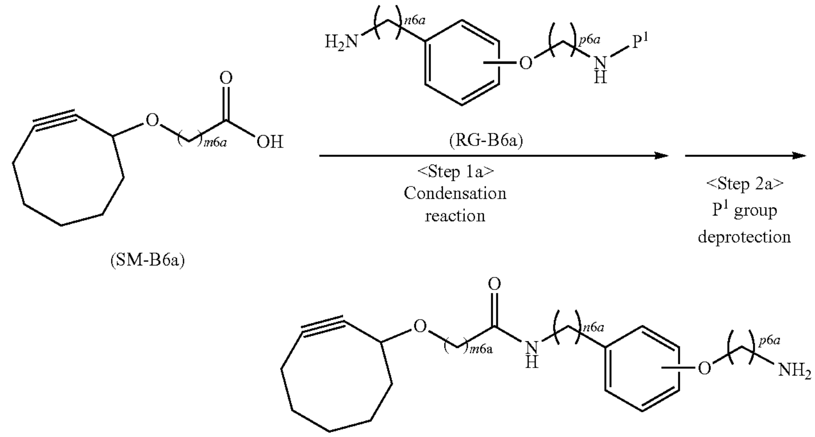

(AM-1-B6a)

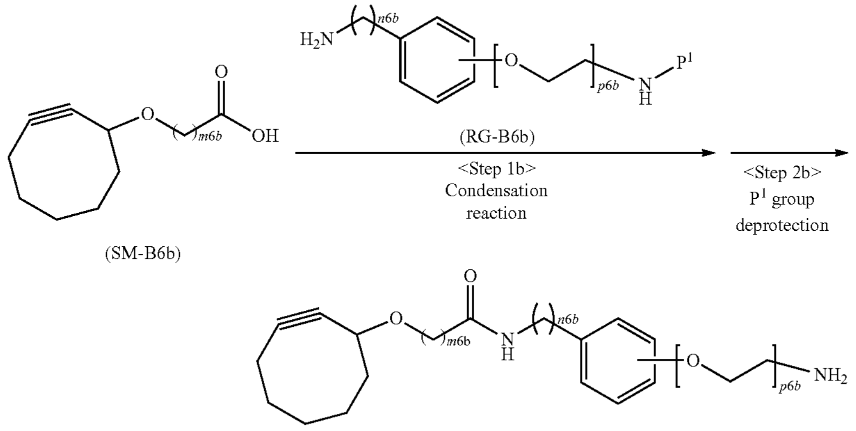

(AM-1-B6b)

The amine compounds represented by formula (AM-1-B6a) and formula (AM-1-B6b) can be manufactured by performing reactions according to the above synthesis scheme (the reactions of each step conform to the reactions described in [Manufacturing Method AM-A]). In the above scheme, the compounds of formula (SM-B6a), formula (RG-B6a), formula (SM-B6b) and formula (RG-B6b) are commercial compounds or compounds that can be manufactured by methods known in the literature from commercial compounds.

[Manufacturing Method AM-F]

Method of Manufacturing Amine Represented by Formula (AM-1-B10):

[C42]

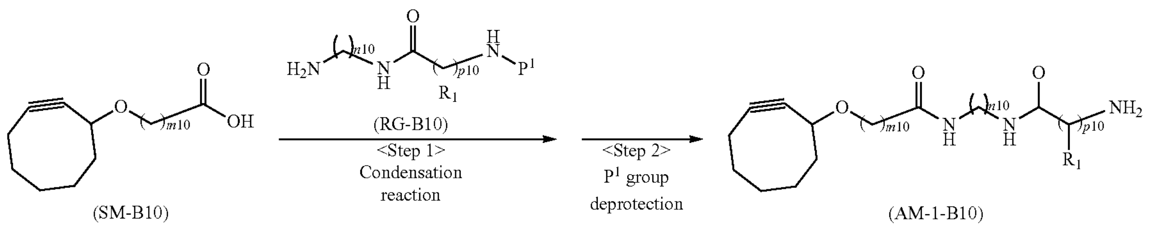

-continued

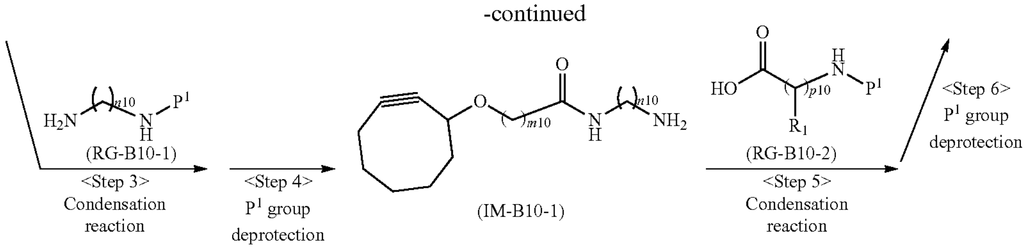

The amine represented by formula (AM-1-B10) or a salt thereof can be manufactured by performing reactions according to the above synthesis scheme (in which the reactions of each step conform to the reactions described in [Manufacturing Method AM-A]). In the above scheme, the compounds of formula (SM-B10), formula (RG-B10), formula (RG-B10-1) and formula (RG-B10-2) are commercial compounds or compounds that can be manufactured by methods known in the literature from commercial compounds.

[Manufacturing Method AM-G]

Method of Manufacturing Amines Represented by Formula (AM-1-B4a) and Formula (AM-1-B4b):

[C43]
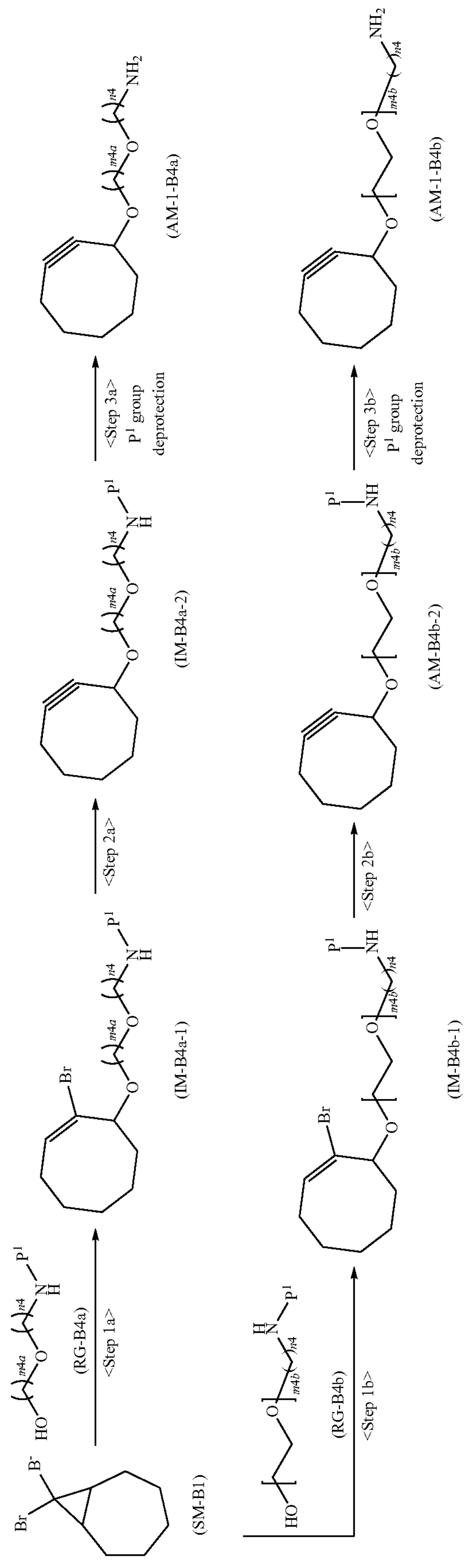
(SM-B1) (RG-B4a) (IM-B4a-1) (IM-B4a-2) (AM-1-B4a)
(RG-B4b) (IM-B4b-1) (AM-B4b-2) (AM-1-B4b)

Using the compound of formula (SM-B4) and the compound of formula (RG-B4a) [the compound of formula (SM-B4) and the compound of formula (RG-B4a) are commercial compounds or compounds that can be manufactured by methods known in the literature from commercial compounds], the amine represented by formula (AM-1-B4a) or a salt thereof can be manufactured by methods known in the literature (such as those described in "Journal of the American Chemical Society, 126 (46), pp 15046-15047, 2004" and the like) by <Step 1a> first performing a reaction in the presence of a reagent such as silver trifluoromethane sulfonate or $AgClO_4$ in a solvent such as toluene or dichloromethane that does not participate in the reaction to obtain the compound of formula (IM-B4a-1), then <Step 2a> performing a debromination reaction with a base such as sodium hydride or NaOMe to obtain the compound of formula (IM-B4a-2), and then <Step 3a> deprotecting the $P^1$ protecting group.

Similarly, the amine represented by formula (AM-1-B4b) or a salt thereof can be manufactured by performing reactions in accordance with the above scheme using formula (RG-B4b) in place of formula (RG-B4a).

[Manufacturing Method AM-H]

Methods of Manufacturing Amines of Formula (AM-1-B8a) and Formula (AM-1-B8b):

[C44]

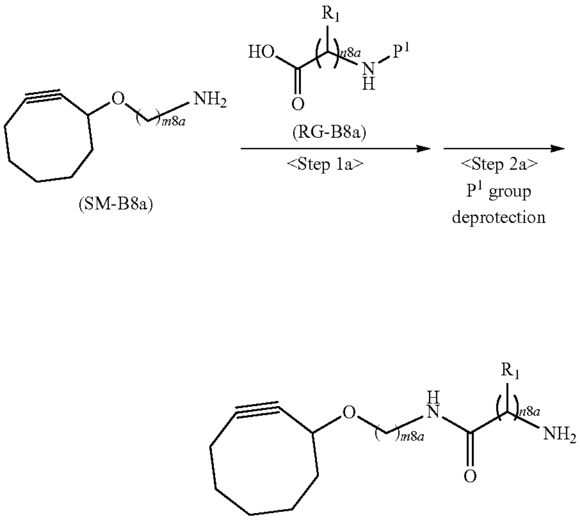

(SM-B8a) (RG-B8a) (AM-1-B8a)

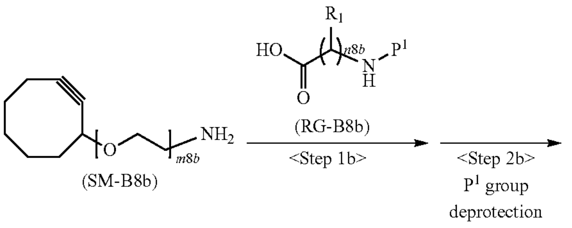

(SM-B8b) (RG-B8b)

-continued

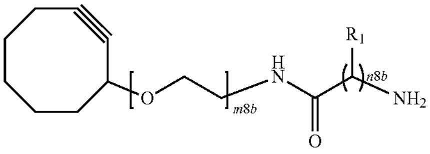

(AM-1-B8b)

The amine compounds represented by formula (AM-1-B8a) and formula (AM-1-B8b) can be manufactured by performing reactions in accordance with the above synthesis scheme (in which the reactions of each step conform to the reactions described in [Manufacturing Method AM-A]). In the above scheme, the formula (SM-B8a) or formula (SM-B8b) represents a commercial compound or a compound that can be manufactured by the reactions described in [Manufacturing Method AM-G], and the compound of formula (RG-B8a) or formula (RG-B8b) is a commercial compound or a compound that can be manufactured by methods known in the literature from commercial compounds.

[Manufacturing Method AM-J]

Method of Manufacturing Amine Represented by Formula (AM-1-B7):

[C45]

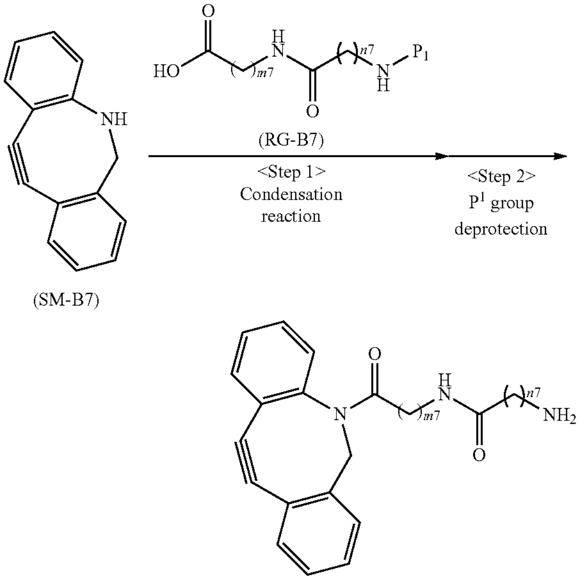

(SM-B7) (RG-B7) (AM-1-B7)

The amine represented by formula (AM-1-B7) or salt thereof can be manufactured using the compound of formula (SM-B7) and the compound of formula (RG-B7) [the compound of formula (SM-B7) and the compound of formula (RG-B7) are commercial compounds or compounds that can be manufactured by methods known in the literature from commercial compounds] by performing a condensation reaction as in the "Method of preparing alginic acid derivative of formula (I)" above and then deprotecting the protecting group $P^1$.

[Manufacturing Method AM-J-2]

Method of Manufacturing Amine Represented by Formula (AM-1-B7):

[C46]

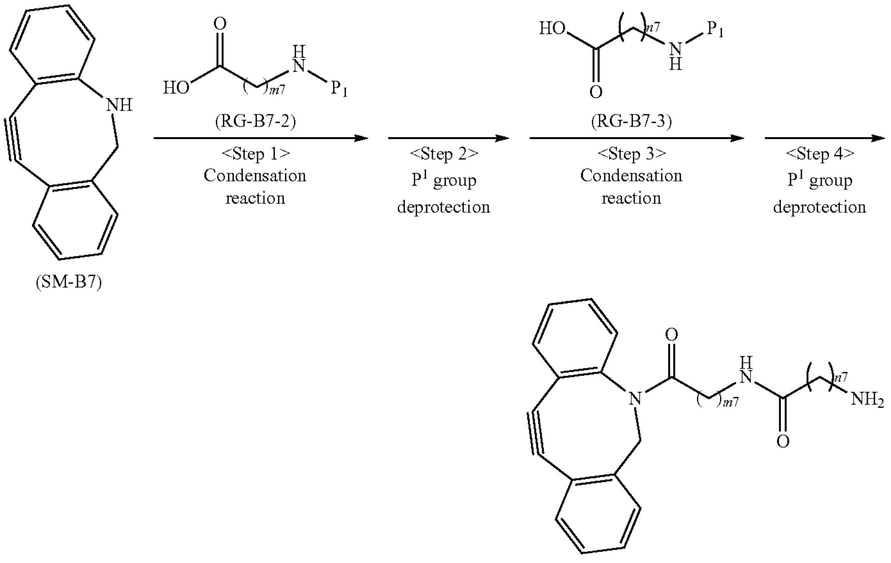

(SM-B7)

(AM-1-B7)

The amine represented by formula (AM-1-B7) or salt thereof can be manufactured using the compound of formula (SM-B7) and the compound of formula (RG-B7-2) [the compound of formula (SM-B7) and the compound of formula (RG-B7-2) are commercial compounds or compounds that can be manufactured by methods known in the literature from commercial compounds] by performing a condensation reaction as in the "Method of preparing alginic acid derivative of formula (I)" above (<Step 1> and <Step 2>), then deprotecting the protecting group $P^1$, and then performing a condensation reaction as in the <Step 1> using the compound of formula (RG-B7-3) (a commercial compound or a compound that can be manufactured by methods known in the literature from commercial compounds) and deprotecting the protecting group $P^1$.

[Manufacturing Method AM-K]

Method of Manufacturing Amine Represented by Formula (AM-1-B9a) or Formula (AM-1-B9b):

[C47]

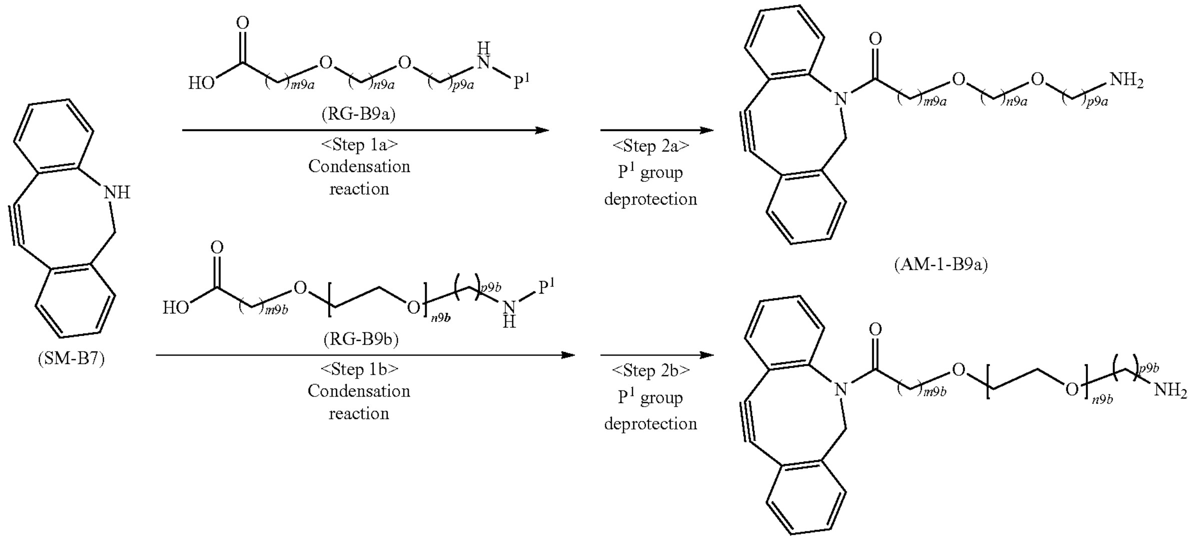

(SM-B7)

(AM-1-B9a)

(AM-1-B9b)

The amine compounds represented by formula (AM-1-B9a) and (AM-1-B9b) or salts thereof can be manufactured by performing reactions in accordance with the above synthesis scheme (in which the reactions of each step conform to the reactions described in [Manufacturing Method AM-J]). In the above scheme, the compound of formula (SM-B7), formula (RG-B9a) or formula (RG-B9b) is a commercial compound or a compound that can be manufactured by methods known in the literature from commercial compounds.

[Manufacturing Method AM-L]

Method of Manufacturing Amine Represented by Formula (AM-2-Z1):

[C48]

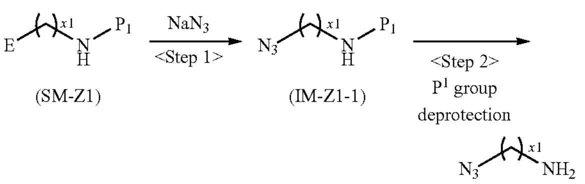

(SM-Z1) (IM-Z1-1) (AM-2-Z1)

Using the compound represented by formula (SM-Z1) [the compound of formula (SM-Z1) is a commercial compound or a compound that can be manufactured by methods known in the literature from commercial compounds], the amine compound represented by formula (AM-2-Z1) or a salt thereof can be manufactured by methods known in the literature (such as those described in "Organometallics, 29 (23), pp 6619-6622, 2010") by reacting $NaN_3$ in a solvent such as dimethyl sulfide that does not participate in the reaction to introduce an azide group, and then deprotecting the protecting group $P^1$.

The amine compound represented by (AM-2-Z1) or salt thereof is also available as a commercial product.

[Manufacturing Method AM-M]

Methods of Manufacturing Amines Represented by Formula (AM-2-Z2a) and Formula (AM-2-Z2b):

[C49]

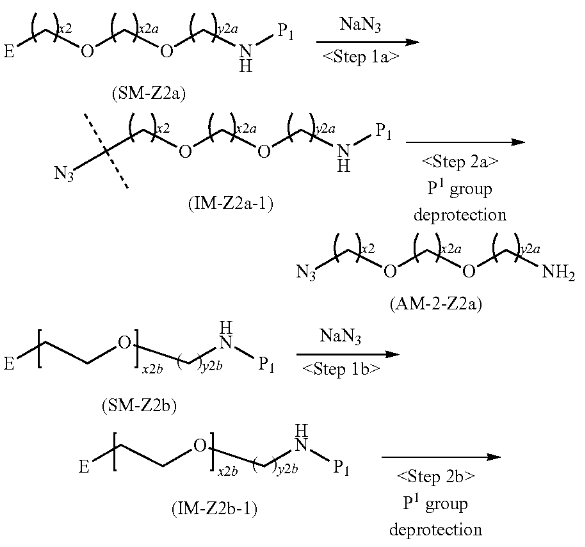

(SM-Z2a) (IM-Z2a-1) (AM-2-Z2a) (SM-Z2b) (IM-Z2b-1)

-continued

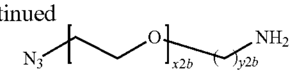

(AM-2-Z2b)

Using the compound of formula (SM-Z2a) or the compound of formula (SM-Z2b) [the compound of formula (SM-Z2a) and the compound of formula (SM-Z2b) are commercial compounds or compounds that can be manufactured by methods known in the literature from commercial compounds], the amine compound represented by formula (AM-2-Z2a) or formula (AM-2-Z2b) or a salt thereof can be manufactured as in the [Manufacturing Method AM-L] by first reacting $NaN_3$ to introduce an azide group and then deprotecting the protecting group $P^1$. The amine compound represented by formula (AM-2-Z2a) or formula (AM-2-Z2b) or a salt thereof is also available as a commercial compound.

[Manufacturing Method AM-N]

Method of Manufacturing Amine Represented by Formula (AM-2-Z3):

[C50]

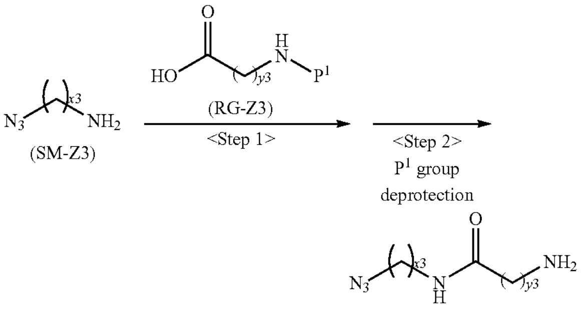

(RG-Z3) (SM-Z3) (AM-2-Z3)

The amine compound represented by formula (AM-2-Z3) or a salt thereof can be manufactured using the compound of formula (SM-Z3) and the compound of formula (RG-Z3) [the compound of formula (SM-Z3) and the compound of formula (RG-Z3) are commercial compounds or compounds that can be manufactured by methods known in the literature from commercial compounds] by performing a condensation reaction as in the "Method of preparing alginic acid derivative of formula (I)" above and then deprotecting the protecting group $P^1$.

[Manufacturing Method AM-O]

Method of Manufacturing Amine Represented by Formula (AM-2-Z4):

[C51]

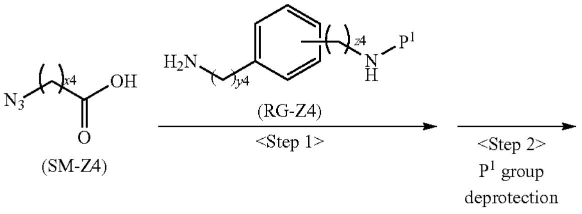

(RG-Z4) (SM-Z4)

-continued

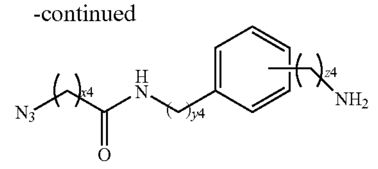

(AM-2-Z4)

The amine compound represented by formula (AM-2-Z4) or a salt thereof can be manufactured using the compound of formula (SM-Z4) and the compound of formula (RG-Z4) [the compound of formula (SM-Z4) and the compound of formula (RG-Z4) are commercial compounds or compounds that can be manufactured by methods known in the literature from commercial compounds] by performing a condensation reaction as in the "Method of preparing alginic acid derivative of formula (I)" above and then deprotecting the protecting group $P^1$.

[Manufacturing Method AM-P]

Methods of Manufacturing Amine Compounds Represented by Formula (AM-2-Z5a) and Formula (AM-2-Z5b):

[C52]

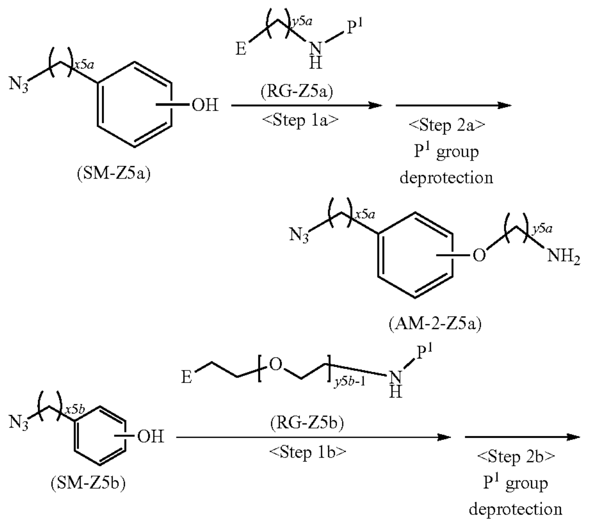

(SM-Z5a) (RG-Z5a) (AM-2-Z5a) (SM-Z5b) (RG-Z5b)

-continued

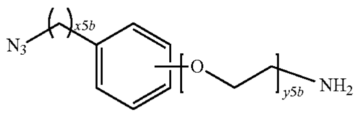

(AM-2-Z5b)

Using the compound of formula (SM-Z5a) and the compound of formula (RG-Z5a) [the compound of formula (SM-Z5a) and the compound of formula (RG-Z5a) are commercial compounds or compounds that can be manufactured by methods known in the literature from commercial compounds], a compound having introduced side chains can be obtained by performing a reaction in the presence of a base such as sodium hydride or potassium carbonate in a solvent such as tetrahydrofuran, N,N-dimethylformamide, N-methyl pyrrolidone or dimethyl sulfoxide that does not participate in the reaction. The $P^1$ protecting group can then be deprotected to obtain the amine compound represented by formula (AM-2-Z5a) or a salt thereof.

A similar reaction can also be performed using the compound of formula (SM-Z5b) and the compound of formula (RG-Z5b) [the compound of formula (SM-Z5b) and the compound of formula (RG-Z5b) are commercial compounds or compounds that can be manufactured by methods known in the literature from commercial compounds] to manufacture the amine compound represented by formula (AM-2-Z5b) or a salt thereof.

The amino compounds represented by formula (AM-2-Z6a), formula (AM-2-Z6b), formula (AM-2-Z7a), formula (AM-2-Z7b), formula (AM-2-Z8a), formula (AM-2-Z8b), formula (AM-2-Z9a) and formula (AM-2-Z9b) or their salts can be manufactured by the manufacturing methods shown in the following scheme in accordance with [Manufacturing Method AM-A] through [Manufacturing Method AM-P] above.

[C53]

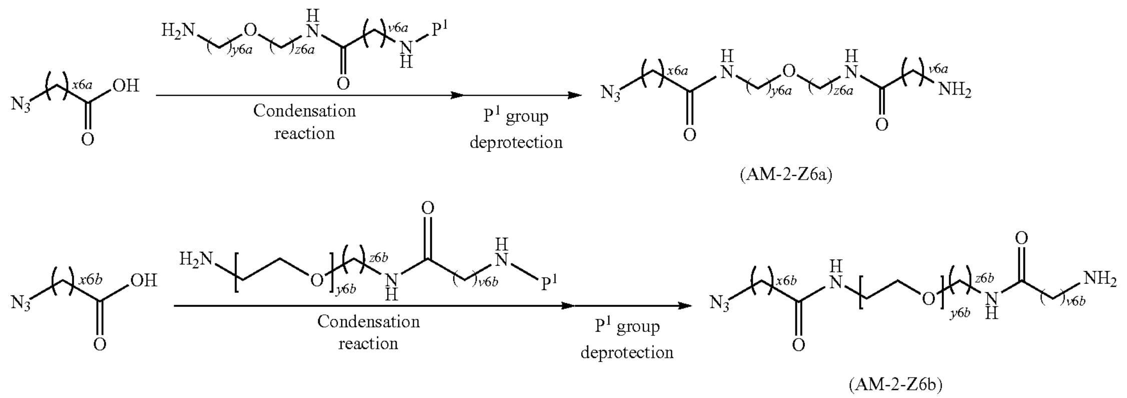

(AM-2-Z6a) (AM-2-Z6b)

-continued
[C54]
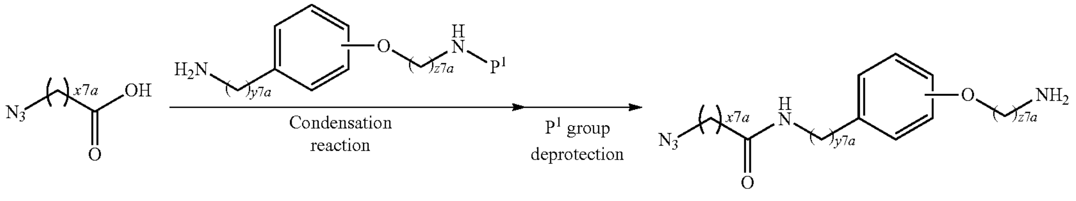
(AM-2-Z7a)
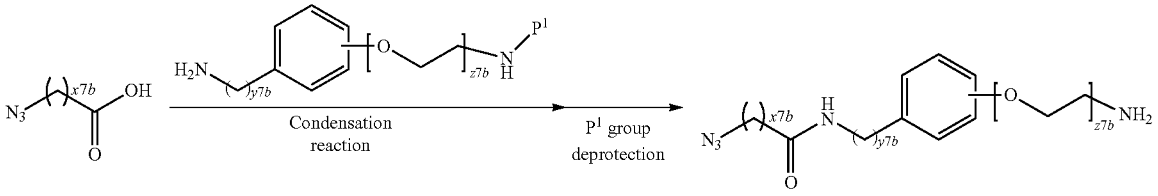
(AM-2-Z7b)
[C55]
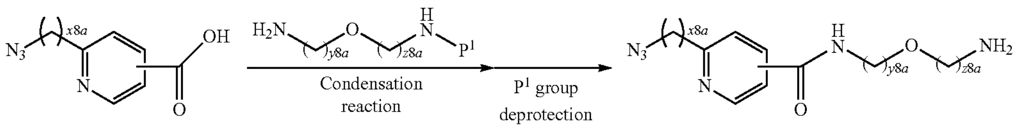
(AM-2-Z8a)
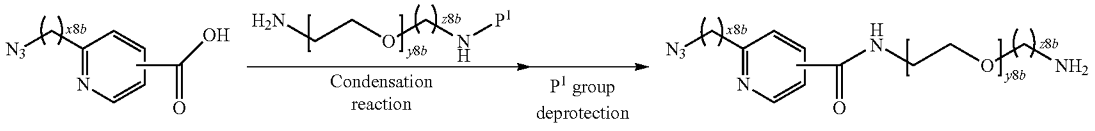
(AM-2-Z8b)
[C56]
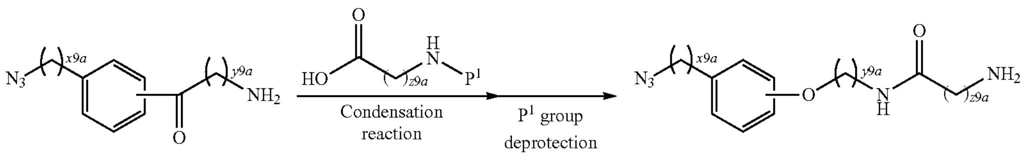
(AM-2-Z9a)
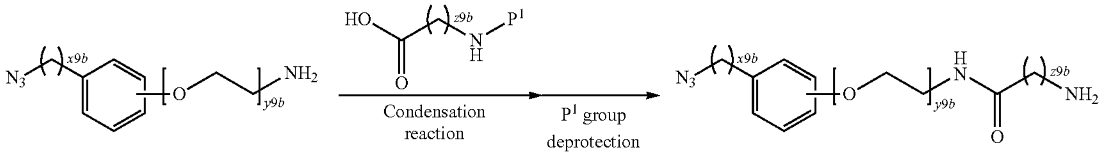
(AM-2-Z9b)

[Manufacturing Method AM-Q]

Method of Manufacturing Amine Represented by Formula (AM-2-Z10):

[C57]

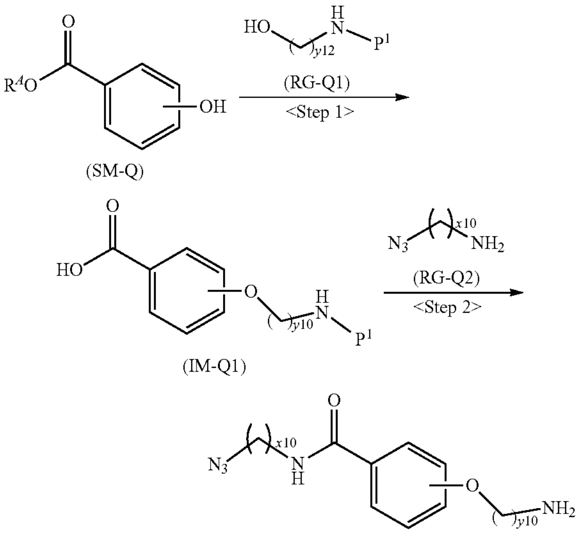

(AM-2-Z10)

<Step 1>

Using the compound of formula (SM-Q) [the compound of formula (SM-Q) is a commercial compound or a compound that can be manufactured by methods known in the literature from commercial compounds] and the compound of formula (RG-Q1) [the compound of formula (RG-Q1) is a commercial compound or a compound that can be manufactured by methods known in the literature from commercial compounds], the compound of formula (IM-Q1) can be manufactured following methods known in the literature (such as "European Journal of Organic Chemistry, 2014 (6), pp 1280-1286, 2014") by performing a Mitsunobu reaction in the presence of the reagents (i) $PPh_3$ and $N_2(CO_2CHMe_2)_2$ in a solvent such as tetrahydrofuran that does not participate in the reaction, and then hydrolyzing the ester groups in the presence of a base such as sodium hydroxide in a solvent such as methanol, ethanol, tetrahydrofuran or water that does not participate in the reaction, or a mixed solvent of these.

<Step 2>

Using the compound of formula (IM-Q1) obtained in <Step 1> of [Manufacturing Method AM-Q] and the compound of formula (RG-Q2) [the compound of formula (RG-Q2) is a commercial compound or a compound that can be manufactured by methods known in the literature from commercial compounds], the amine compound represented by formula (AM-2-Z10) or a salt thereof can be manufactured by performing a condensation reaction as in the "Method of preparing alginic acid derivative of formula (I)" above and then deprotecting the protecting group $P^1$.

[Manufacturing Method AM-R]

Method of Manufacturing Amine Represented by Formula (AM-1-B10):

[C58]

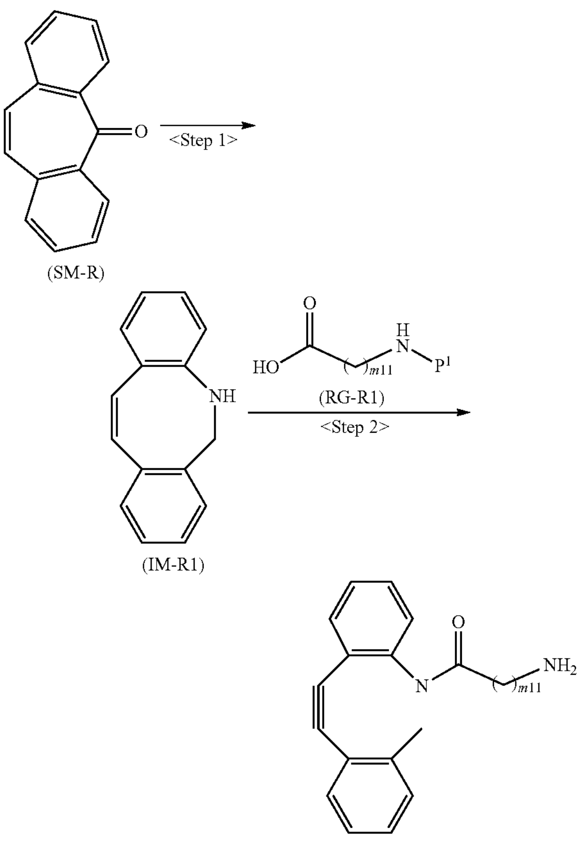

(AM-1-B10)

Using the compound of formula (SM-R) [the compound of formula (SM-R) is a commercial compound or a compound that can be manufactured by methods known in the literature from commercial compounds], the compound represented by formula (IM-R1) can be manufactured by methods known in the literature (such as Faming Zhuanli Shenqing, 104529898, 22 Apr. 2015) by for example (i) reacting $H_2NOH$—HCl in the presence of a base such as pyridine in a solvent such as ethanol that does not participate in the reaction to form an oxime, then (ii) reacting diphosphorus pentoxide in $P_2O_5$ and methanesulfonic acid to perform Beckmann rearrangement and thereby form an 8-membered lactam, and finally (iii) reducing the amide groups with a reducing agent such as $BH_3$ or $LiAlH_4$ in a solvent such as diethyl ether that does not participate in the reaction.

<Step 2>

Using the compound of formula (IM-R1) obtained in <Step 1> of the [Manufacturing Method AM-R] and the compound of formula (RG-R1) [the compound of formula (RG-R1) is a commercial compound or a compound that can be manufactured by methods known in the literature from commercial compounds], the amine compound represented by formula (AM-1-B10) or a salt thereof can be manufactured by performing a condensation reaction as in the "Method of preparing alginic acid derivative of formula (I)" above to obtain a condensate, then adding bromine and performing a debromination reaction using tert-BuOK to form alkyne groups, and then deprotecting the protecting group $P^1$.

[Manufacturing Method AM-S]

Method of Manufacturing Amine Represented by Formula (AM-2-Z11):

[C59]

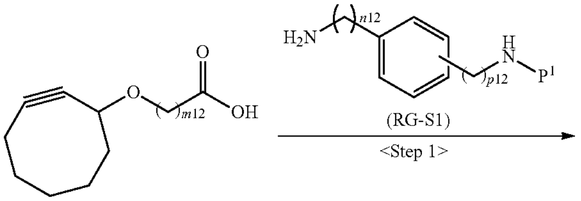

(SM-S)

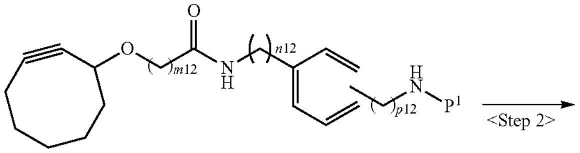

(IM-S1)

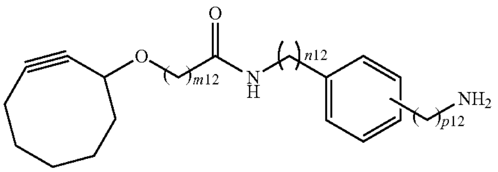

(AM-2-Z11)

The compound represented by formula (AM-2-Z11) or a salt thereof can be manufactured using the compound of formula (SM-S) and the compound of formula (RG-S1) [the compound of formula (SM-S) and the compound of formula (RG-S1) are commercial compounds or compounds that can be manufactured by methods known in the literature from commercial compounds] by performing a condensation reaction as in the "Method of preparing alginic acid derivative of formula (I)" above and then deprotecting the protecting group $P^1$.

[Manufacturing Method AM-T]

Method of Manufacturing Amines Represented by Formula (AM-1-T1) and Formula (AM-1-T2):

[C60]

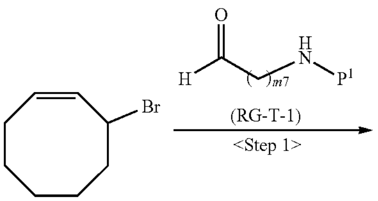

(SM-T)

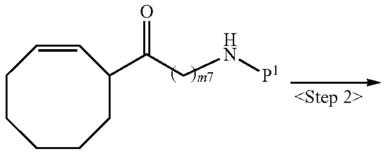

(IM-T-1)

-continued

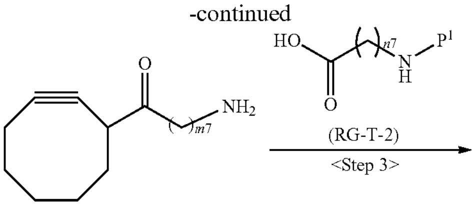

(AM-1-T1)

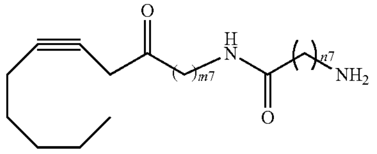

(AM-1-T2)

<Step 1>

The compound of formula (IM-T-1) is obtained using the compound of formula (SM-T) and the compound of formula (RG-T-1) [the compound of formula (SM-T) and the compound of formula (RG-T-1) are commercial compounds or compounds that can be manufactured by methods known in the literature from commercial compounds] by performing a Grignard reaction, then oxidation, according to methods known in the literature, such as the methods described in WO 2004/035017 or the like.

<Step 2>

The amine represented by formula (AM-1-T1) or a salt thereof is manufactured by first protecting the carbonyl group of the compound of formula (IM-T-1) (with an acetal group for example), then adding bromine to the cyclooctene ring, and then performing a debromination reaction with a base such as tert-BuOK and deprotecting the carbonyl protecting group and the $P^1$ protecting group.

<Step 3>

The amine represented by formula (AM-1-T2) or a salt thereof is manufactured by performing a condensation reaction using the amine of formula (AM-1-T1) or a salt thereof and the compound of formula (RG-T-2) [the compound of formula (RG-T-2) is a commercial compound or a compound that can be manufactured by methods known in the literature from commercial compounds] and then deprotecting the $P^1$ protecting group.

[Manufacturing Method AM-U]

Method of Manufacturing Amines Represented by Formula (AM-1-U1) and Formula (AM-1-U2):

[C61]

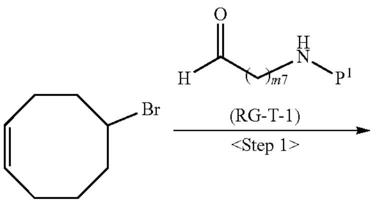

(SM-U)

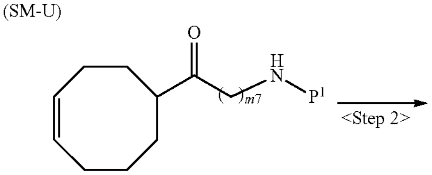

(IM-U-1)

-continued

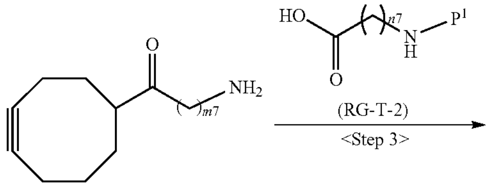

(AM-1-U1)

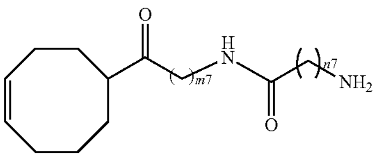

(AM-1-U2)

The amines represented by formula (AM-1-U1) and formula (AM-1-U2) or salts thereof are manufactured by performing a reaction according to the methods described in [Manufacturing Method AM-T] above using the compound of formula (SM-U) [the compound of formula (SM-U) is a commercial compound or a compound that can be manufactured by methods known in the literature from commercial compounds] in place of the compound of formula (SM-T) in the [Manufacturing method AM-T].

Amines having the corresponding linkers, or salts thereof, are manufactured by substituting the aldehydes of formula (RG-T-3) or formula (RG-T-4) below [the compounds of formula (RG-T-3) and formula (RG-T-4) are commercial compounds or compounds that can be manufactured by methods known in the literature from commercial compounds] for the aldehydes used in <Step 1> of the [Manufacturing Method AM-T] and [Manufacturing Method AM-U].

[C62]

(RG-T-3)

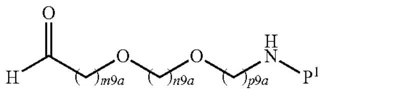

(RG-T-4)

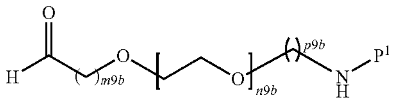

[Manufacturing Method AM-V]

Method of Manufacturing Amines Represented by Formula (AM-1-V1) and Formula (AM-1-V2):

[C63]

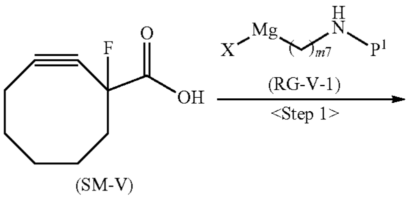

(SM-V)

-continued

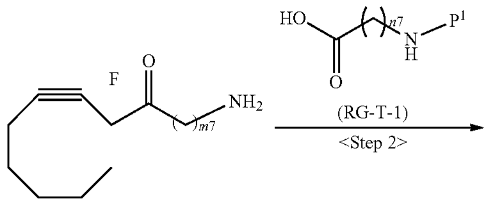

(AM-1-V1)

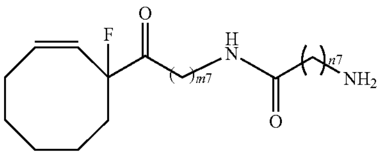

(AM-1-V2)

<Step 1>

Using the compound of formula (SM-V) [the compound of formula (SM-V) is a commercial compound or a compound that can be manufactured from commercial compounds by methods known in the literature, such as the methods described in Bioorganic & Medicinal Chemistry, 23 (22), pp 7150-7157, 2015 or the like] the amine represented by formula (AM-1-V1) or a salt thereof is manufactured by converting to an acid chloride by ordinary methods, and then performing a Grignard reaction using the compound of formula (RG-V-1) [the compound of formula (RG-V-1) is a commercial compound or a compound that can be manufactured by methods known in the literature from commercial compounds] and then deprotecting the $P^1$ protecting group.

<Step 2>

Using the amine represented by formula (AM-1-V1) or salt thereof and the compound represented by formula (RG-T-1), the amine represented by formula (AM-1-V2) or a salt thereof is manufactured by performing a condensation reaction and deprotecting the $P^1$ protecting group.

An amine having the corresponding linkers, or a salt thereof, is manufactured by substituting the compounds of the following formulae [which are commercial compounds or can be manufactured by methods known in the literature from commercial compounds] for the compounds used in <Step 1> of the [Manufacturing Method AM-V].

[C64]

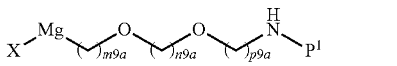

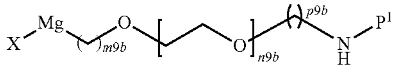

[Manufacturing Method AM-W]

Method of Manufacturing Amines Represented by Formula (AM-1-W1) and Formula (AM-1-W2):

[C65]

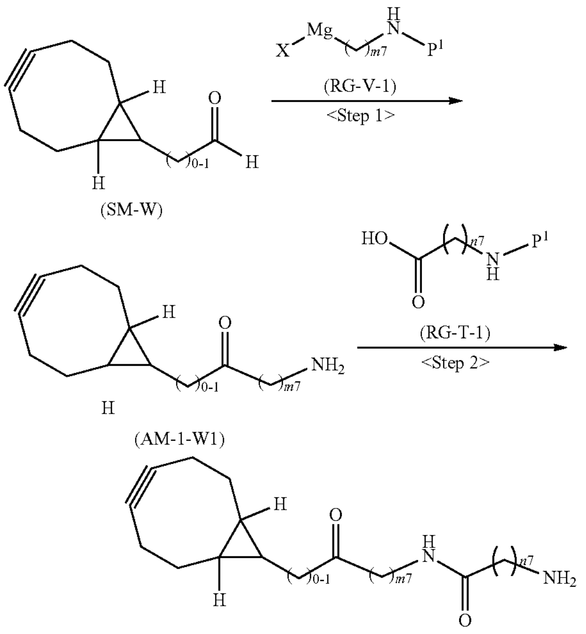

(SM-W)

(AM-1-W1)

(AM-1-W2)

The amines represented by formula (AM-1-W1) and formula (AM-1-W2) or salts thereof are manufactured by performing reactions according to the methods described in [Manufacturing Method AM-V] with the compound of formula (SM-W) [the compound of formula (SM-W) is a commercial compound or a compound that can be manufactured by methods known in the literature from commercial compounds] substituted for the compound of formula (SM-V) in the [Manufacturing Method AM-V].

Amines having the corresponding linkers, or salts thereof, are manufactured by performing a reaction with the compounds of the following formulae [which are commercial compounds or can be manufactured by methods known in the literature from commercial compounds] substituted for the compounds used in <Step 1> of the [Manufacturing method AM-W].

[C66]

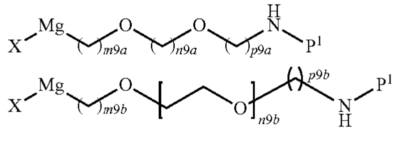

For the amine (Akn-$L^1$-$NH_2$) with introduced alkyne group and the amine ($N_3$-$L^2$-$NH_2$) with introduced azide group used in manufacturing the alginic acid derivative represented by formula (I) or (II), the desired amines can be manufactured by appropriately combining the reactions described in [Manufacturing Method AM-A] through [Manufacturing Method AM-P] above with methods described in known literature, such as "Experimental Chemistry Course 5th Edition", each volume, 2007, Maruzen, or "Comprehensive Organic Transformations, A Guide to Functional Group Preparations, 3rd Edition", Richard C. Larock, Ed., 2018 and "Strategic Applications of Named Reactions in Organic Synthesis", Laszlo Kurti & Barbara Czako, Eds., Academic Press, 2005. The amines in the table below can also be manufactured by the methods described in the documents of prior art shown in the table.

In this Description, the amine compound represented by formula (AM-1) or (AM-2) (including subordinate expressions of each expression) may sometimes form a pharmaceutically acceptable salt (such as an acid addition salt). This salt is not particularly limited as long as it is pharmaceutically acceptable, and examples include salts with inorganic acids, salts with organic acids, and salts with acidic amino acids and the like. Preferred examples of salts with inorganic acids include salts with hydrochloric acid, hydrobromic acid, hydroiodic acid, nitric acid, sulfuric acid and phosphoric acid. Preferred examples of salts with organic acids include salts with aliphatic monocarboxylic acids such as formic acid, acetic acid, trifluoroacetic acid, propionic acid, butyric acid, valeric acid, enanthic acid, capric acid, myristic acid, palmitic acid, stearic acid, lactic acid, sorbic acid and mandelic acid, salts with aliphatic dicarboxylic acids such as oxalic acid, malonic acid, succinic acid, fumaric acid, maleic acid, malic acid and tartaric acid, salts with aliphatic tricarboxylic acids such as citric acid, salts with aromatic monocarboxylic acids such as benzoic acid and salicylic acid, salts with aromatic dicarboxylic acids such as phthalic acid, salts with organic carboxylic acids such as cinnamic acid, glycolic acid, pyruvic acid, oxylic acid, salicylic acid and N-acetylcystein, salts with organic sulfonic acids such as methanesulfonic acid, benzenesulfonic acid and p-toluenesulfonic acid, and acid addition salts with acidic amino acids such as aspartic acid and glutamic acid. Preferred examples of salts with acidic amino acids include salts with aspartic acid, glutamic acid and the like. Of these, a pharmaceutically acceptable salt is preferred.

This salt can be obtained by ordinary methods, such as for example by mixing the compound of the invention with a solution containing a suitable amount of an acid or base to form the target salt, and then either performing separation filtration or distilling off the mixed solvent. General information on salts is published in Stahl & Wermuth, "Handbook of Pharmaceutical Salts: Properties, Selection and Use" (Wiley-VCH, 2002), and details are described in this handbook.

In this Description, the amine compound represented by formula (AM-1) or (AM-2) (including subordinate expressions of each expression) or a salt thereof may form a solvate with a solvent such as water, ethanol, glycerol or the like.

In this Description, unless otherwise specified, when a variable substituent is substituted on a cyclic group this means that the variable substituent is not linked to a specific carbon atom on the cyclic group. For example, this means that the variable substituent Rs in the following formula A can be substituted on any of the carbon atoms i, ii, iii, iv and v.

[C67]

Formula A

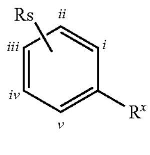

When an asymmetric carbon is present in a linker (-$L^1$- or -$L^2$-) of a chemically modified alginic acid derivative represented by formula (I) or (II) in this Description, each of the optical isomers is included.

For example, in the case of the following formula (L1-8a-M) when -$L^1$- in formula (I) is formula (L1-8a) and m8a=2, n8a=1 and $R^1$=Me (excluding the parts outside the broken lines at both ends of the formula):

[C68]

(L1-8a-M)

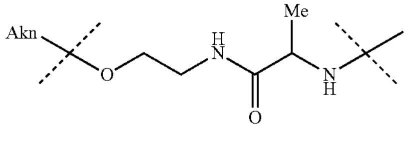

both the linker of the following formula (L1-8a-M-S) in which the molecular configuration of the carbon substituted by the $R^1$ is the S position and the linker of the following formula (L1-8a-M-R) in which the molecular configuration of the carbon substituted by the methyl group is the R position (excluding the parts outside the broken lines at both ends in both formulae) are included:

[C69]

(L1-8a-M)

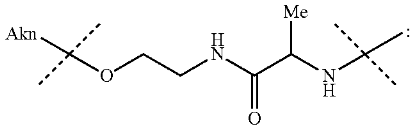

:

(L1-8a-M-R)

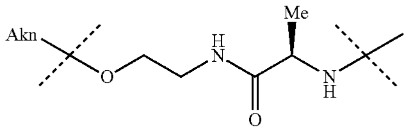

(L1-8a-M-S)

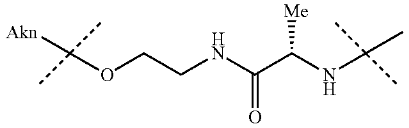

When an asymmetric carbon is present in a linker (-$L^1$- or -$L^2$-) of a chemically modified alginic acid derivative represented by formula (I) or (II) (in the case of optically active forms), the optically active forms can be separated by ordinary optical resolution means (separation methods) from the racemic mixture in the step of synthesizing the amine derivative (AM-1) corresponding to the formula (I) or formula (II), or else the optically active forms can be obtained by selectively synthesizing one optically active form by asymmetric synthesis in the step of synthesizing the formula (AM-1) or formula (AM-2) as the amine derivative corresponding to formula (I).

9. Use of Alginic Acid Derivatives and Crosslinked Alginic Acid Structure

The alginic acid derivatives can be used in place of conventional alginic acid in a wide range of fields including foodstuffs, medicine, cosmetics, fibers, paper and the like. Specifically, preferred uses of the alginic acid derivatives and crosslinked alginic acid structure include medical materials such as wound dressings, postoperative adhesion prevention materials, sustained drug release materials, cell culture substrates and cell transplant substrates.

When used as a medical material, the crosslinked alginic acid structure may be in the form of a tube, fiber, bead, gel, nearly spherical gel or the like; a bead, gel or nearly spherical gel is preferred, and a nearly spherical gel is more preferred.

The entire contents of all literature and publications cited in this Description are incorporated by reference in this Description regardless of their purpose.

Moreover, the objectives, features, advantages and ideas of the present invention are clear to a person skilled in the art from the descriptions of this Description, and the present invention can be easily implemented by a person skilled in the art based on the descriptions of this Description. The best mode and specific examples for implementing the invention are used to illustrate preferred embodiments of the present invention, and the present invention is not limited to these because they are given for purposes of example or explanation. Based on the descriptions of this Description, a person skilled in the art can understand that various modifications are possible within the intent and scope of the present invention as disclosed in this Description.

EXAMPLES

Examples and test examples are given next in order to explain the present invention in detail, but these are only examples and test examples that do not limit the present invention, and may be altered without departing from the scope of the present invention.

A JEOL JNM-ECX400 FT-NMR (JEOL) was used for nuclear magnetic resonance (NMR) spectrum measurement. Liquid chromatography-mass spectrometry (LC-Mass) was performed by the following methods. A [UPLC] Waters Aquity UPLC system and a BEH C18 column (2.1 mm×50 mm, 1.7 μm) (Waters) were used under gradient conditions with a mobile phase of acetonitrile:0.05% trifluoroacetic acid aqueous solution=5:95 (0 minutes) to 95:5 (1.0 minute) to 95:5 (1.6 minutes) to 5:95 (2.0 minutes).

In the NMR signal patterns of the $^1$H-NMR data, s means a singlet, d means a doublet, t means a triplet, q means a quartet and m means a multiplet, br means broad, J is the coupling constant, Hz means hertz, $CDCl_3$ is deuterated chloroform, DMSO-$d_6$ is deuterated dimethylsulfoxide, and $D_2O$ is deuterium oxide. In the $^1$H-NMR data, signals that cannot be confirmed because they are broadband, such as protons of hydroxyl (OH), amino ($NH_2$) and carboxyl (COOH) groups, are not included in the data.

In the LC-Mass data, M means molecular weight, RT means retention time, and $[M+H]^+$ and $[M+Na]^+$ indicate molecular ion peaks.

“Room temperature” in the examples normally indicates a temperature from 0° C. to about 35° C.

In the examples, the introduction rate (mol %) of the reactive substituent is the molar number of introduced reactive substituents as a percentage of the molar number of monosaccharide (guluronic acid and mannuronic acid) units constituting the alginic acid as calculated by $^1$H-NMR ($D_2O$).

In the examples, sodium alginate having the physical properties shown in Table 46 above was used as the sodium alginate before introduction of the reactive group or complementary reactive group.

Table 48 shows the physical properties values of the alginic acid derivatives with introduced reactive groups obtained in (Example 1) to (Example 20) (specifically, the reactive group introduction rates (mol %), molecular weights and weight-average molecular weights (Da)).

1H-NMR data for the intermediates in (Example 1) to (Example 20) are show in Table 49-1 to Table 49-5, while LCM-Mass data for the intermediates in (Example 1) to (Example 20) are show in Table 50.

Example 1

Synthesis of Alginic Acid Having Introduced 3-Azidopropylamino Group (EX1-A2)

[C70]

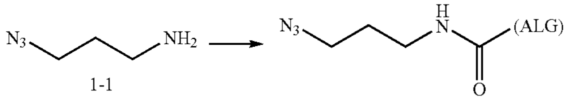

1-1

EX1-A2

4-(4,6-dimethoxy-1,3,5-triazin-2-yl)-4-methylmorpholinium chloride (DMT-MM) (56 mg), an ethanol (2 mL) solution of commercial 3-azidopropylamine [CAS Registry No. 88192-19-2] (1-1, 5.1 mg), and 1-molar aqueous sodium bicarbonate solution (50 μL) were added to 20 mL of an aqueous solution of sodium alginate (MOCHIDA PHARMACEUTICAL CO., LTD.: A-2) adjusted to 1 wt %. This was stirred for 3 hours at 30° C., sodium chloride (0.2 g) and ethanol (40 mL) were added in that order, and the mixture was stirred at room temperature for 30 minutes. The resulting precipitate was collected by filtration, washed with ethanol, and dried under reduced pressure. The resulting solid was dissolved in water and lyophilized to obtain the title compound EX1-A2 (187 mg) as a white solid.

Example 2

Synthesis of Alginic Acid Having Introduced 2-(2-(2-Azidoethoxy)Ethoxy) Ethane-1-Amino Group (EX2-A2)

[C71]

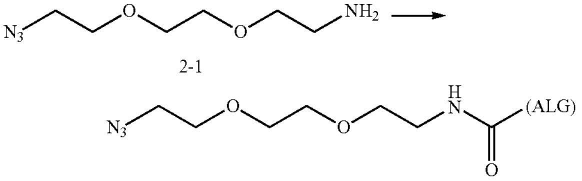

2-1

EX2-A2

4-(4,6-dimethoxy-1,3,5-triazin-2-yl)-4-methylmorpholinium chloride (DMT-MM) (55.83 mg) and 1-molar aqueous sodium bicarbonate solution (252.17 μL) were added under ice cooling and stirring to 10.9 mL of an aqueous solution of sodium alginate (MOCHIDA PHARMACEUTICAL CO., LTD.: A-2) adjusted to 1 wt %. An ethanol (1 mL) and water (1 mL) solution of commercial 2-(2-(2-azidoethoxy)ethoxy) ethane-1-amine [CAS Registry No. 166388-57-4] (2-1, 26.36 mg) was then added, and the mixture was stirred for 15 hours at room temperature, after which sodium chloride (100 mg) and ethanol (21.8 mL) were added in that order, and the mixture was stirred for 30 minutes at room temperature. The resulting precipitate was collected by filtration, washed with ethanol, and dried under reduced pressure to obtain the title compound EX2-A2 (99 mg) as a white solid.

Example 3

Synthesis of Alginic Acid Having Introduced 2-Amino-N-(3-Azidopropyl) Acetamido Group (EX3-A2)

[C72]

EX3-A2

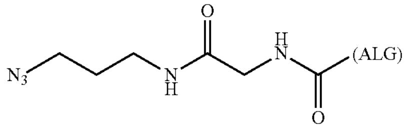

<Step 1>

Synthesis of tert-butyl(2-(3-azidopropyl)amino)-2-oxoethyl) carbamate (3-2)

[C73]

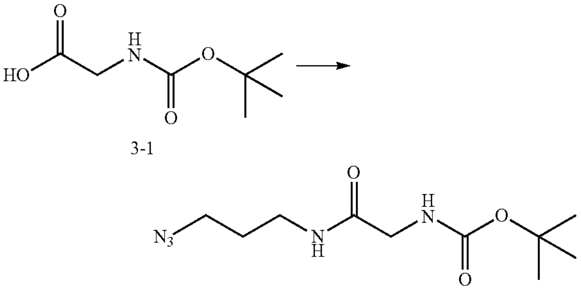

3-1

3-2

197 mg of 4-(4,6-dimethoxy-1,3,5-triazin-2-yl)-4-methylmorpholinium chloride (DMT-MM) were added to an ethanol (2 mL) solution of commercial 3-azidopropylamine [CAS Registry No. 88192-19-2] (1-1, 41 μL) and N-(tert-butoxycarbonyl) glycine [CAS Registry No. 4530-20-5] (3-1, 100 mg), and stirred for 18 hours at room temperature. Water was added to the reaction solution, which was then extracted with ethyl acetate, and the organic layer was washed successively with water and brine. The organic layer was then dried with anhydrous sodium sulfate and concentrated under reduced pressure. The resulting oily substance was dissolved in 10 mL of methyl tert-butyl ether, and washed successively with saturated sodium bicarbonate solution, water, and brine. The organic layer was dried with anhydrous sodium sulfate and concentrated under reduced pressure to obtain the title compound 3-2 (95 mg) as a colorless oily substance.

<Step 2>

Synthesis of 2-amino-N-(3-azidopropyl) acetamide hydrochloride (3-3)

[C74]

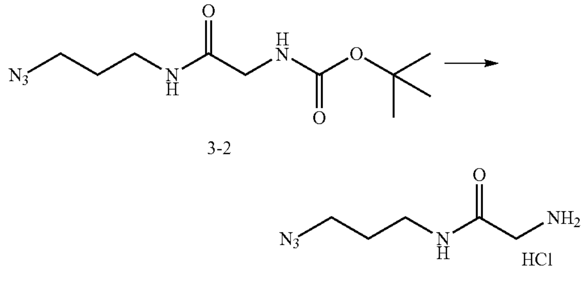

3-2

3-3

4N-hydrogen chloride/1,4-dioxane (665 μL) was added under ice water cooling to the compound (3-2, 95 mg) obtained in <Step 1> of (Example 3), and the mixture was stirred for 1 hour at room temperature. Diisopropyl ether (2.0 mL) was added to the reaction solution, which was then concentrated under reduced pressure. The resulting oily substance was decantation washed with methyl tert-butyl ether and then concentrated under reduced pressure to obtain the title compound 3-3 (62 mg) as a colorless gummy substance.

<Step 3>

Synthesis of Alginic Acid Having Introduced 2-amino-N-(3-azidopropyl) acetamido Group (EX3-A2)

[C75]

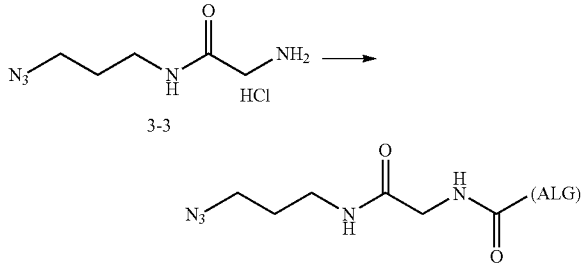

3-3

EX3-A2

4-(4,6-dimethoxy-1,3,5-triazin-2-yl)-4-methylmorpholinium chloride (DMT-MM) (56 mg), an ethanol (2 mL) solution of the compound obtained in <Step 2> of (Example 3) (3-3, 10.6 mg) and 1-molar aqueous sodium bicarbonate solution (76 μL) were added to 20 mL of an aqueous solution of sodium alginate (MOCHIDA PHARMACEUTICAL CO., LTD.: A-2) adjusted to 1 wt %. This was stirred for 3 hours at 30° C., sodium chloride (0.2 g) and ethanol (40 mL) were added in that order, and the mixture was stirred at room temperature for 30 minutes. The resulting precipitate was collected by filtration, washed with ethanol, and dried under reduced pressure. The resulting solid was dissolved in water and lyophilized to obtain the title compound EX3-A2 (207 mg) as a white solid.

Example 4

Synthesis of Alginic Acid Having Introduced 3-amino-N-(3-azidopropyl) propanamido Group (EX4-A2)

[C76]

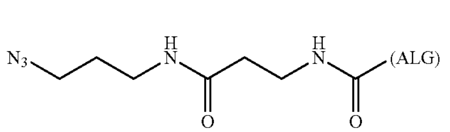

EX4-A2

<Step 1>

Synthesis of tert-butyl (3-((3-azidopropyl)amino)-3-oxopropyl)carbamate (4-2)

[C77]

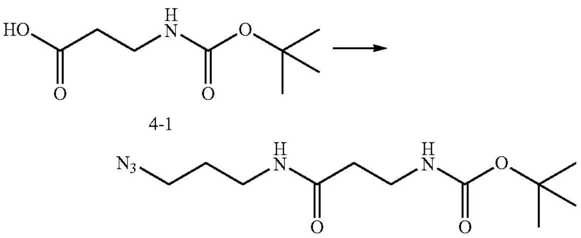

4-1

4-2

4-(4,6-dimethoxy-1,3,5-triazin-2-yl)-4-methylmorpholinium chloride (DMT-MM) (146 mg) was added to an ethanol (2 mL) solution of commercial 3-azidopropylamine [CAS Registry No. 88192-19-2] (1-1, 38 μL) and N-(tert-butoxycarbonyl)-J3-alanine [CAS Registry No. 3303-84-2] (4-1, 100 mg), and the mixture was stirred for 18 hours at room temperature. Water was added to the reaction solution, which was then extracted with ethyl acetate, and the organic layer was washed successively with water and brine. The organic layer was then dried with anhydrous sodium sulfate and concentrated under reduced pressure to obtain the title compound 4-2 (124 mg) as a white waxy substance.

<Step 2>

Synthesis of 3-amino-N-(3-azidopropyl) propanamide hydrochloride (4-3)

[C78]

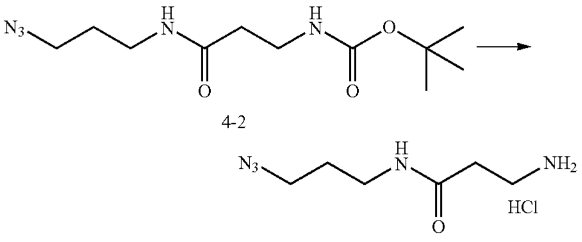

4-2

4-3

4N-hydrogen chloride/1,4-dioxane (868 μL) was added under ice water cooling to the compound (4-2, 124 mg) obtained in <Step 1> of (Example 4), and stirred for 1 hour at room temperature. Diisopropyl ether (2.6 mL) was added to the reaction solution, which was then concentrated under reduced pressure. The resulting oily substance was decantation washed with methyl tert-butyl ether and then concentrated under reduced pressure to obtain the title compound 4-3 (93 mg) as a colorless gummy substance.

<Step 3>

Synthesis of Alginic Acid (EX4-A2) Having Introduced 3-amino-N-(3-azidopropyl) Propanamido Group

[C79]

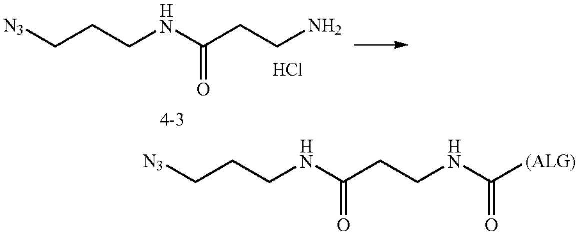

4-3

EX4-A2

4-(4,6-dimethoxy-1,3,5-triazin-2-yl)-4-methylmorpholinium chloride (DMT-MM) (56 mg), an ethanol (2 mL) solution of the compound obtained in <Step 2> of (Example 4) (4-3, 12.6 mg) and 1-molar aqueous sodium bicarbonate solution (76 μL) were added to 20 mL of an aqueous solution of sodium alginate (MOCHIDA PHARMACEUTICAL CO., LTD.: A-2) adjusted to 1 wt %. This was stirred for 3 hours at 30° C., sodium chloride (0.2 g) and ethanol (40 mL) were added in that order, and the mixture was stirred at room temperature for 30 minutes. The resulting precipitate was collected by filtration, ethanol washed, and dried under reduced pressure. The resulting solid was dissolved in water and lyophilized to obtain the title compound EX4-A2 (211 mg) as a white solid.

Example 5

Synthesis of Alginic Acid Having Introduced N-(4-(aminomethyl)benzyl)-2-azidoacetamido Group (EX5-A2)

[C80]

EX5-A2

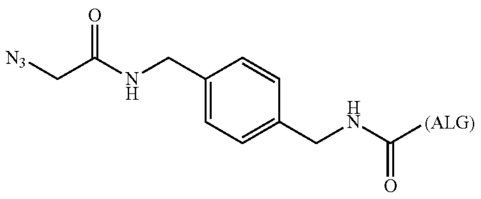

<Step 1>

Synthesis of tert-butyl (4-((2-azidoacetamido) methyl)benzyl)carbamate (5-2)

[C81]

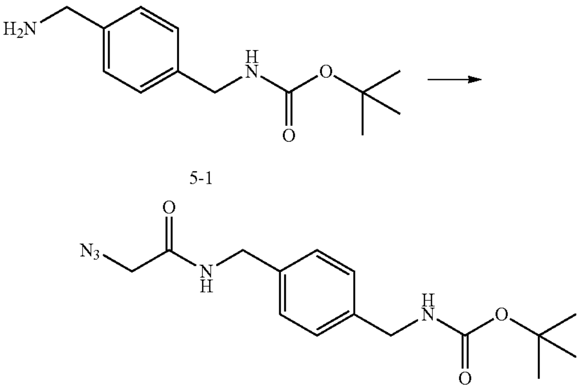

5-1

5-2

1.0 mL of a methylene chloride solution of azide chloride acetate prepared from commercial 2-azidoacetic acid [CAS Registry No. 18523-48-3] (1-1, 41 μL) by methods similar to those described in Organic Letters (2017), 19(23), 6400-6403 was added under ice water cooling to 1.0 mL of a methylene chloride solution of commercial 1-(N-tert-butoxycarbonyl-aminomethyl)-4-(aminomethyl) benzene [CAS Registry No. 108468-00-4] (5-1, 100 mg) and triethylamine (118 and the mixture was stirred for 2.5 hours at room temperature. The reaction solution was separated by addition of ethyl acetate (20 mL) and water (5 mL), and the organic layer was washed successively with water, saturated aqueous sodium bicarbonate solution, water and brine. The insoluble matter was filtered out, and the filtrate was dried with anhydrous sodium sulfate and then concentrated under reduced pressure. The residue was triturated with methyl tert-butyl ether/n-heptane. The resulting solid was collected by filtration to obtain the title compound 5-2 (91 mg) as a light beige solid.

<Step 2>

Synthesis of N-(4-(aminomethyl)benzyl)-2-azidoacetamide hydrochloride (5-3)

[C82]

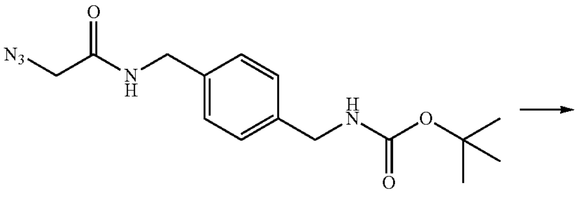

5-2

-continued

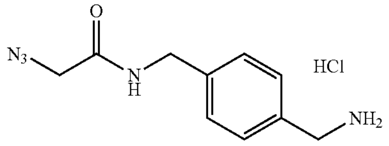

5-3

4N-hydrogen chloride/1,4-dioxane (637 μL) was added under ice water cooling to the compound (5-2, 91 mg) obtained in <Step 1> of (Example 5), after which 1,4-dioxane (627 μL) was added and the mixture was stirred for 3.5 hours at room temperature. Diisopropyl ether (3.8 mL) was added to the reaction solution, which was then stirred for 10 minutes. The resulting solid was filtered to obtain the title compound 5-3 (62 mg) as a beige solid.

<Step 3>

Synthesis of Alginic Acid Having Introduced N-(4-(aminomethyl)benzyl)-2-azidoacetamido Group (EX5-A2)

[C83]

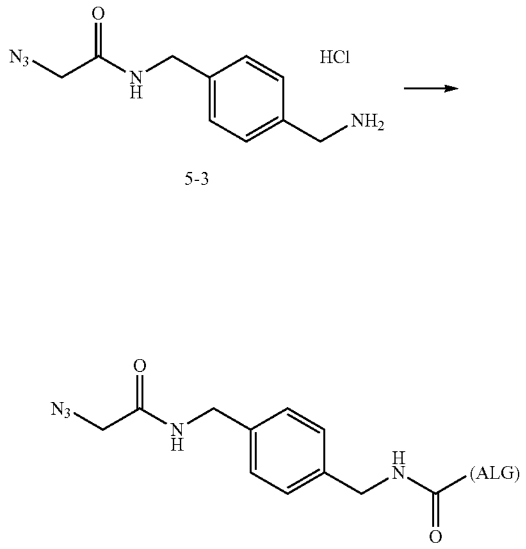

5-3

EX5-A2

4-(4,6-dimethoxy-1,3,5-triazin-2-yl)-4-methylmorpholinium chloride (DMT-MM) (70 mg), the compound (5-3, 16.1 mg) obtained in <Step 2> of (Example 5) and 1-molar aqueous sodium bicarbonate solution (95 μL) were added to 25 mL of an aqueous solution of sodium alginate (MOCHIDA PHARMACEUTICAL CO., LTD.: A-2) adjusted to 1 wt %. This was stirred for 3 hours at 30° C., sodium chloride (0.25 g) and ethanol (50 mL) were added in that order, and the mixture was stirred at room temperature for 30 minutes. The resulting precipitate was collected by filtration, washed with ethanol, and dried under reduced pressure. The resulting solid was dissolved in water and lyophilized to obtain the title compound EX5-A2 (239 mg) as a white solid.

Example 6

Synthesis of Alginic Acid Having Introduced 2-(4-azidophenoxy) ethane-1-amino Group (EX6-A2)

[C84]

EX6-A2

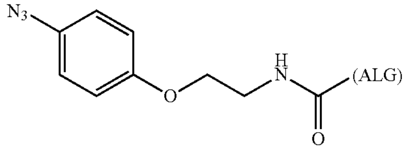

<Step 1>

Synthesis of tert-butyl (2-(4-azidophenoxy)ethyl)carbamate (6-3)

[C85]

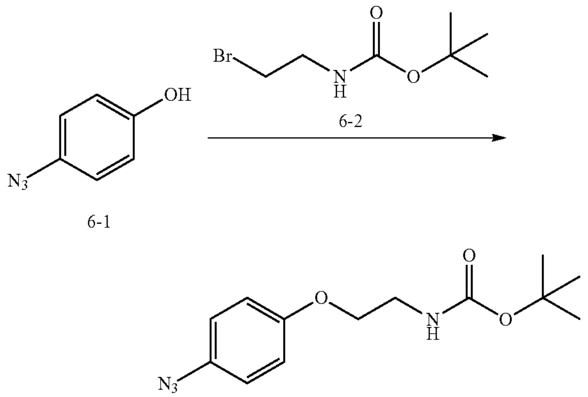

6-2

6-1

6-3

Potassium carbonate (0.61 g) was added at room temperature to a mixture of commercial 4-azidophenol [CAS Registry No. 24541-43-3] (6-1, 0.3 g), commercial tert-butyl (2-bromoethyl) carbamate [CAS Registry No. 39684-80-5] (6-2, 0.6 g) and N-methyl pyrrolidone (3 mL). The reaction mixture was stirred for 6 hours 30 minutes at 80° C. and cooled to room temperature, after which water (10 mL) and methyl tert-butyl ether (20 mL) were added. The resulting suspension was celite filtered, and the residue was washed twice with methyl tert-butyl ether (5 mL). The filtrate was separated, and the organic layer was concentrated under reduced pressure to obtain a crude product. This crude product was dissolved in methyl tert-butyl ether (20 mL) and washed twice with 1N-sodium hydroxide aqueous solution (5 mL), then twice with water (5 mL), and then with brine (5 mL), and then dried with anhydrous sodium sulfate. The organic layer was filtered and concentrated under reduced pressure to obtain the title compound 6-3 (0.411 g) as a purple oily substance.

<Step 2>

Synthesis of 2-(4-azidophenoxy) ethane-1-amine hydrochloride (6-4)

[C86]

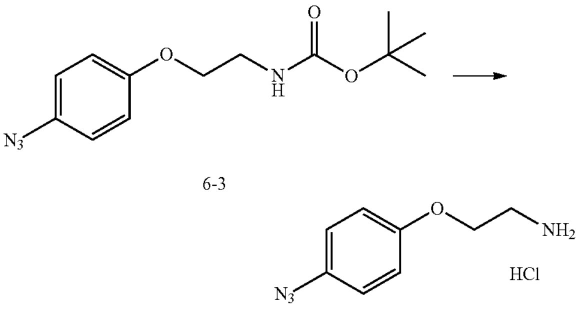

6-3

6-4

4N-hydrogen chloride/1,4-dioxane (2.87 mL) was added under water cooling and stirring to a mixture of the compound obtained in <Step 1> of (Example 6) (6-3, 0.41 g) and 1,4-dioxane (2.87 mL), and this was stirred for 18 hours at room temperature. Diisopropyl ether (40 mL) was added to the reaction solution, and the suspension was stirred for 30 minutes at room temperature. The precipitate was filtered, and the collected solid was dried under reduced pressure to obtain the title compound 6-4 (0.2834 g) as a light purple solid.

<Step 3>

Synthesis of Alginic Acid Having Introduced 2-(4-azidophenoxy) ethane-1-amino Group (EX6-A2)

[C87]

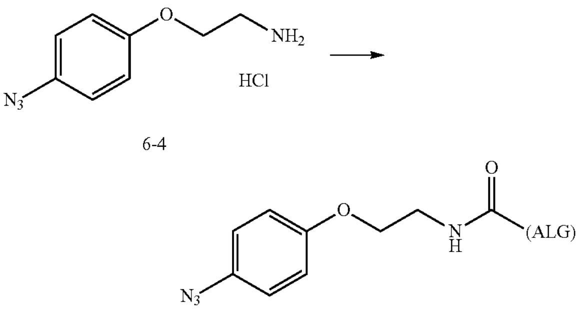

6-4

EX6-A2

4-(4,6-dimethoxy-1,3,5-triazin-2-yl)-4-methylmorpholinium chloride (DMT-MM) (91.52 mg) and 1-molar aqueous sodium bicarbonate solution (68.63 μL) were added to 29.66 mL of an aqueous solution of sodium alginate (MOCHIDA PHARMACEUTICAL CO., LTD.: A-2) adjusted to 1 wt %. A water (1 mL) and ethanol (1 mL) solution of the compound (6-4, 14.73 mg) obtained in <Step 2> of (Example 6) was then added at room temperature, and this was stirred for 42 hours at that temperature, after which sodium chloride (300 mg) and ethanol (59.3 mL) were added in that order and the mixture was stirred for 30 minutes at room temperature. The resulting precipitate was collected by filtration, washed with ethanol, and dried under reduced pressure. The resulting solid was dissolved in water and lyophilized to obtain the title compound EX6-A2 (269 mg) as a pink solid.

Example 7

Synthesis of Alginic Acid Having Introduced N-(2-aminoethyl)-2-(cyclooct-2-yn-1-yloxy)acetamido Group (EX7-B2)

[C88]

EX7-B2

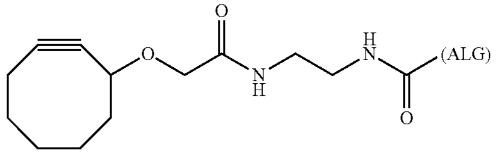

<Step 1>

Synthesis of tert-butyl (2-(2,2,2-trifluoroacetamido)ethyl)carbamate (7-2)

[C89]

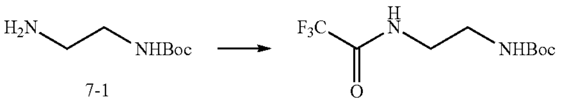

7-1

7-2

Ethyl trifluoroacetate (2.24 mL) was dripped into a tetrahydrofuran (12.0 mL) solution of commercial tert-butyl (2-aminoethyl)carbamate (7-1, 3.00 g, [CAS Registry No. 57260-73-8]). The reaction mixture was stirred for 14.5 hours at room temperature. The reaction solution was concentrated under reduced pressure, and tert-butyl methyl ether (5 mL) and heptane (25 mL) were added to the residue, which was then triturated. A solid was collected by filtration and washed with heptane to obtain the title compound 7-2 (4.36 g) as a white solid.

<Step 2>

Synthesis of N-(2-aminoethyl)-2,2,2-trifluoracetamide hydrochloride (7-3)

[C90]

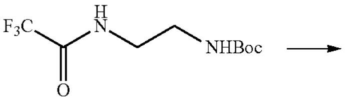

7-2

-continued

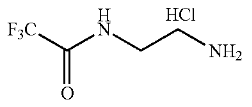

7-3

The compound 7-2 (0.50 g) obtained in <Step 1> of (Example 7) was suspended in 3.0 mL of 1,4-dioxane. 4N-hydrogen chloride/1,4-dioxane (7.0 mL) was added under ice water cooling, and this was stirred for 3 hours at room temperature. Diisopropyl ether (30.0 mL) was added to the reaction solution, which was then stirred for 50 minutes at room temperature. A solid was collected by filtration, washed with diisopropyl ether, and dried under reduced pressure to obtain the title compound 7-3 (0.70 g) as a white solid.

<Step 3>

Synthesis of N-(2-(2-(cyclooct-2-yn-1-yloxy)acetamido)ethyl)-2,2,2-trifluoroacetamide (7-5)

[C91]

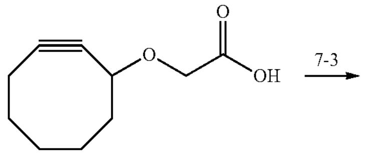

7-4

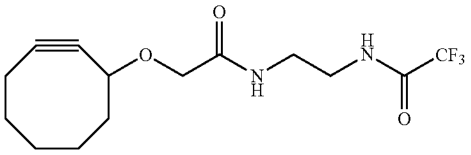

7-5

4-(4,6-dimethoxy-1,3,5-triazin-2-yl)-4-methylmorpholinium chloride (DMT-MM) (1.09 g), the compound 7-3 (380 mg) obtained in <Step 2> of (Example 7) and triethylamine (321 μL) were added to an ethanol (2 mL) solution of carboxylic acid (7-4, 300 mg) synthesized by methods known in the literature (Org. Process. Res. Dev. (2018) 22: 108-110), and stirred for 3 hours at 30° C., after which triethylamine (229 μL) was added and the mixture was stirred at that temperature for 1 hour. This was further stirred for 15.5 hours at room temperature and then separated by addition of water (10 mL) and ethyl acetate (50 mL), and the water layer was extracted with ethyl acetate (10 mL). The organic layer was washed successively with 0.5 N-citric acid, water, and brine, dried with anhydrous sodium sulfate, and concentrated under reduced pressure. Tert-butyl methyl ether was added to the residue, insoluble matter was filtered out, and the filtrate was concentrated and then purified by silica gel column chromatography (10% ethyl acetate/n-heptane to 40% ethyl acetate/n-heptane) to obtain the title compound 7-5 (322 mg) as a white solid.

<Step 4>

Synthesis of N-(2-aminoethyl)-2-(cyclooct-2-yn-1-yloxy)acetamide (7-6)

[C92]

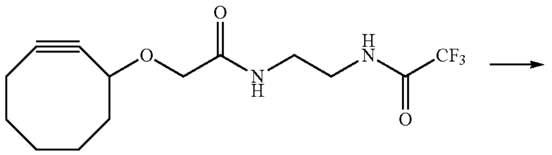

7-5

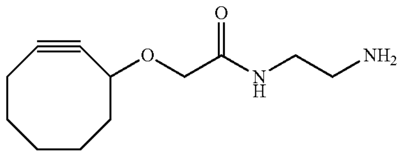

7-6

A water (1.6 mL) solution of potassium carbonate (278 mg) was added to a methanol (4.8 mL) solution of the compound 7-5 (322 mg) obtained in <Step 3> of (Example 7) and stirred for 7.5 hours at room temperature. The reaction solution was concentrated under reduced pressure, water (3 mL) was added, and the solution was saturated with sodium chloride. The water layer was extracted with ethyl acetate (30 mL, 10 mL×3), dried with anhydrous sodium sulfate, and concentrated under reduced pressure to obtain the title compound 7-6 (238 mg) as a colorless oily substance.

<Step 5>

Synthesis of Alginic Acid Having Introduced N-(2-aminoethyl)-2-(cyclooct-2-yn-1-yloxy)acetamido Group (EX7-B2)

[C93]

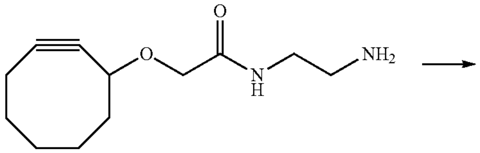

7-6

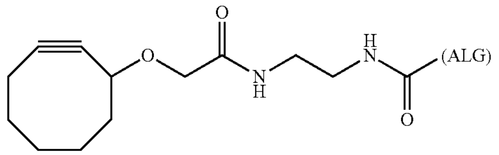

EX7-B2

4-(4,6-dimethoxy-1,3,5-triazin-2-yl)-4-methylmorpholinium chloride (DMT-MM) (335 mg), an ethanol (12 mL) solution of the compound 7-6 (68 mg) obtained in <Step 4> of (Example 7) and 1-molar aqueous sodium bicarbonate solution (303 μL) were added successively under stirring at room temperature to 120 mL of an aqueous solution of sodium alginate (MOCHIDA PHARMACEUTICAL CO., LTD.: B-2) adjusted to 1 wt %, and stirred for 3 hours at 30° C. Sodium chloride (1.2 g) was added to the reaction solution, followed by ethanol (240 mL), and the mixture was stirred for 1.5 hours. The resulting precipitate was collected by filtration, washed 5 times with 20 mL of ethanol, and dried under reduced pressure. The resulting solid was dissolved in water and lyophilized to obtain the title compound EX7-B2 (1.16 g) as a white solid.

Example 8

Synthesis of Alginic Acid Having Introduced N-(2-(2-aminoethoxy)ethyl)-2-(cyclooct-2-yn-1-yloxy) acetamido Group (EX8-A2)

[C94]

EX8-A2

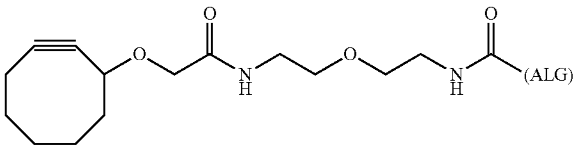

<Step 1>

Synthesis of tert-butyl (2-(2-(2,2,2-trifluoroacetamido)ethoxy)ethyl)carbamate (8-2)

[C95]

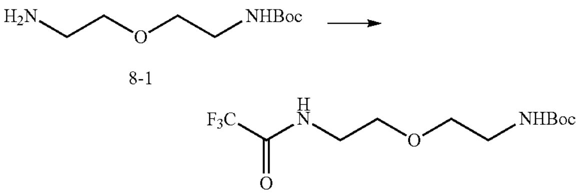

8-1

8-2

Ethyl trifluoroacetate (0.6 mL) was dripped into 4.0 mL of a tetrahydrofuran solution of tert-butyl (2-(2-aminoethoxy) ethyl)carbamate (8-1, 1.0 g, [CAS Registry No. 127828-22-2]). The reaction mixture was stirred for 3.5 hours at room temperature and concentrated under reduced pressure to obtain the title compound 8-2 (1.5 g) as a colorless oily substance.

<Step 2>

Synthesis of N-(2-(2-aminoethoxy)ethyl)-2,2,2-trifluoroacetamide hydrochloride (8-3)

[C96]

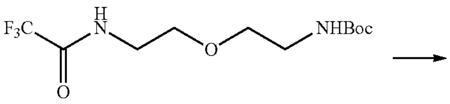

8-2

-continued

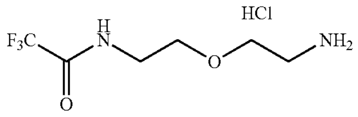

8-3

4N-hydrogen chloride/1,4-dioxane solution (10.3 mL) was added under ice water cooling to the compound 8-2 (1.5 g) obtained in <Step 1> of (Example 8), and this was stirred for 1 hour at room temperature. Diisopropyl ether (30 mL) was added to the reaction solution, which was then stirred for 30 minutes at room temperature. The solvent was distilled off under reduced pressure, and the remainder was azeotropically distilled with diisopropyl ether and dried under reduced pressure to obtain the title compound 8-3 (1.3 g) as a colorless oily substance.

<Step 3>

Synthesis of N-(2-(2-(2-(cyclooct-2-yn-1-yloxy) acetamido)ethoxy)ethyl)-2,2,2-trifluoroacetamide (8-4)

[C97]

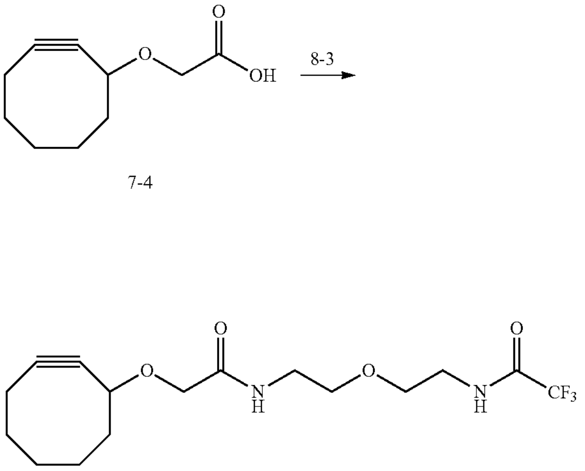

7-4

8-4

Carboxylic acid (7-4, 300 mg) synthesized by methods known in the literature (Org. Process Res. Dev. (2018) 22: 108-110) and the compound 8-3 (443 mg) obtained in <Step 2> of (Example 8) were dissolved in acetonitrile (6.0 mL). O-(7-azabenzotriazol-1-yl)-N,N,N',N'-tetramethyluronium hexafluorophosphoric acid salt (0.75 g) and N,N-diisopropyl ethylamine (920 μL) were added, and this was stirred for 2.5 hours at room temperature. Ethyl acetate (20 mL) and water (10 mL) were added to separate the solution. The organic layer was washed successively with water (10 mL) and brine (5 mL), dried with anhydrous sodium sulfate, and concentrated under reduced pressure. The residue was purified by silica gel column chromatography (50% ethyl acetate/n-heptane to 70% ethyl acetate/n-heptane) to obtain the title compound 8-4 (469 mg) as a colorless gummy substance.

<Step 4>

Synthesis of N-(2-(2-aminoethoxy)ethyl)-2-(cyclooct-2-yn-1-yloxy)acetamide (8-5)

[C98]

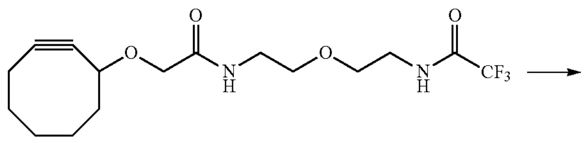

8-4

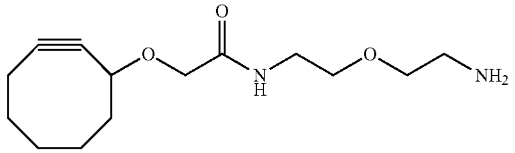

8-5

A water (0.99 mL) solution of potassium carbonate (103 mg) was added to a methanol (3.0 mL) solution of the compound 8-4 (220 mg) obtained in <Step 3> of (Example 8) and stirred for 4.5 hours at room temperature. The methanol was distilled off under reduced pressure, water (2 mL) was added, and the solution was saturated with sodium chloride. This was extracted with ethyl acetate (15 mL, 10 mL×4) and dried with anhydrous sodium sulfate, after which the solvent was distilled off under reduced pressure. The residue was dissolved in ethyl acetate (10 mL), the insoluble mater was removed by filtration, and the remainder was concentrated under reduced pressure to obtain the title crude compound 8-5 (140 mg) as a light-yellow gummy substance.

<Step 5>

Synthesis of Alginic Acid Having Introduced N-(2-(2-aminoethoxy)ethyl)-2-(cyclooct-2-yn-1-yloxy) acetamido Group (EX8-A2)

[C99]

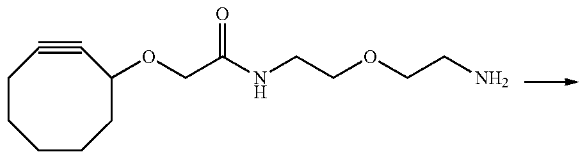

8-5

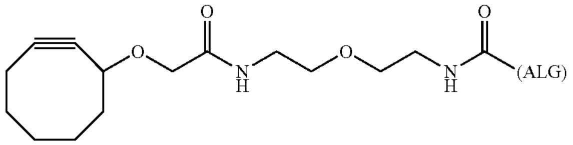

EX8-A2

4-(4,6-dimethoxy-1,3,5-triazin-2-yl)-4-methylmorpholinium chloride (DMT-MM) (112 mg), an ethanol (4.0 mL) solution of the compound 8-5 (30 mg) obtained in <Step 4> of (Example 8) and 1-molar aqueous sodium bicarbonate solution (101 μL) were added successively under stirring at room temperature to 40 mL of an aqueous solution of sodium alginate (MOCHIDA PHARMACEUTICAL CO., LTD.: A-2) adjusted to 1 wt %, and the mixture was stirred for 3 hours at 30° C. Sodium chloride (0.4 g), and then, ethanol (80 mL) were added to the reaction solution, which was then stirred for 30 minutes. The resulting precipitate was collected by filtration, washed with ethanol, and dried under reduced pressure, and the resulting solid was dissolved in water and lyophilized to obtain the title compound EX8-A2 (410 mg) as a white solid.

Examples 9a, 9b

Synthesis of Alginic Acids Having Introduced N-(2-aminoethyl)-2-(2-(cyclooct-2-yn-1-yloxy)acetamido)acetamido Groups (EX9a-A2, EX9b-B2)

[C100]

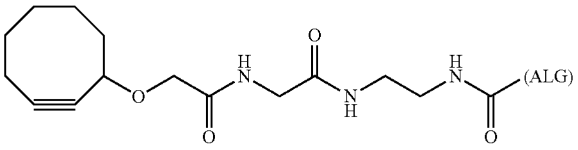

EX9a-A2
EX9b-B2

<Step 1>

Synthesis of tert-butyl (2-oxo-2-((2-(2,2,2-trifluoroacetamido) ethyl)amino)ethyl)carbamate (9-1)

[C101]

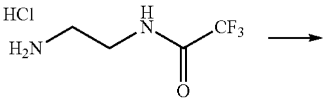

7-3

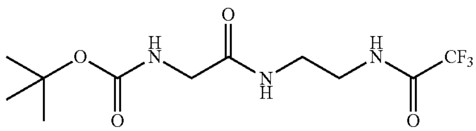

9-1

N-(tert-butoxycarbonyl) glycine (91 mg, [CAS Registry No. 4530-20-5]) and the compound (7-3, 100 mg) obtained in <Step 2> of (Example 7) were dissolved in acetonitrile (3.0 mL). O-(7-azabenzotriazol-1-yl)-N,N,N',N'-tetramethyluronium hexafluorophosphoric acid salt (217 mg) and N,N-diisopropyl ethylamine (281 μL) were added, and the mixture was stirred for 3.5 hours at room temperature. Ethyl acetate (15 mL) and water (5 mL) were added to separate the reaction solution, and the organic layer was washed successively with water and brine. The organic layer was dried with anhydrous sodium sulfate and concentrated under reduced pressure. The residue was purified by column chromatography (elution solvent: 40% ethyl acetate/n-heptane to ethyl acetate) to obtain the title compound 9-1 (180 mg) as a light beige amorphous substance.

<Step 2>

Synthesis of N-(2-(2-aminoacetamido)ethyl)-2,2,2-trifluoroacetamide hydrochloride (9-2)

[C102]

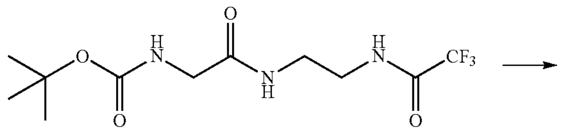

9-1

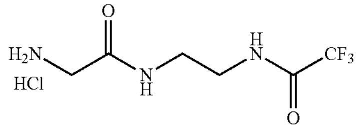

9-2

4N-hydrogen chloride/1,4-dioxane (1.2 mL) was added under ice water cooling to the compound (9-1, 180 mg) obtained in <Step 1> of (Example 9) and stirred for 0.8 hours at room temperature. Diisopropyl ether (3.6 mL) was added to the reaction solution, which was then stirred for 30 minutes. The resulting solid was filtered to obtain the title compound 9-2 (114 mg) as a white solid.

<Step 3>

Synthesis of N-(2-(2-(2-(cyclooct-2-yn-1-yloxy)acetamido)acetamido)ethyl)-2,2,2-trifluoroacetamide (9-3)

[C103]

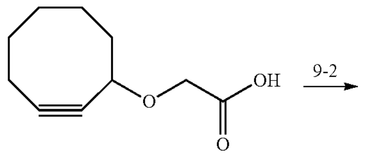

7-4

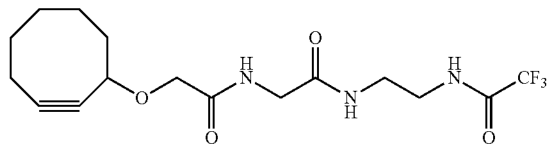

9-3

Ethanol (1.6 mL), 4-(4,6-dimethoxy-1,3,5-triazin-2-yl)-4-methylmorpholinium chloride (DMT-MM) (219 mg) and triethylamine (67 μL) were added to carboxylic acid (7-4, 80 mg) synthesized by methods known in the literature (Org. Process Res. Dev. (2018) 22: 108-110) and the compound (9-2, 110 mg) obtained in <Step 2> of (Example 9), and the mixture was stirred for 3 hours at room temperature. Water (3.2 mL) was added to the reaction solution, which was then stirred for 30 minutes at room temperature, after which the solids were filtered and water washed. Ethyl acetate/ethanol (1/1, 10 mL) was added to the resulting solid, and insoluble matter was removed by filtration. The filtrate was concentrated under reduced pressure to obtain the title compound 9-3 (101 mg) as a white solid.

<Step 4>

Synthesis of N-(2-aminoethyl)-2-(2-(cyclooct-2-yn-1-yloxy)acetamido)acetamide (9-4)

[C104]

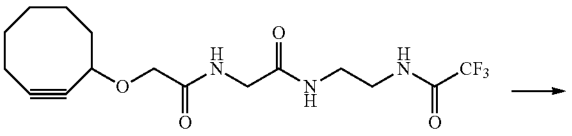

9-3

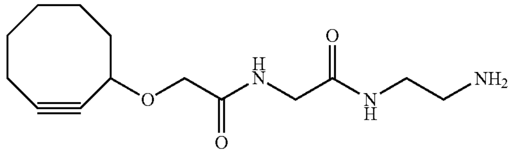

9-4

A water (0.3 mL) solution of potassium carbonate (59 mg) was added to a methanol (1.8 mL) solution of the compound (9-3, 60 mg) obtained in <Step 3> of (Example 9), and the mixture was stirred for 4 hours at room temperature. The reaction solution was concentrated under reduced pressure, water (2 mL) was added, and the solution was saturated with sodium chloride. This was extracted with ethyl acetate (15 mL, 10 mL×4), and the extracted layer was concentrated under reduced pressure. Ethyl acetate (10 mL) and ethanol (1 mL) were added to the residue, and insoluble matter was removed by filtration. The resulting filtrate was concentrated under reduced pressure to obtain the title compound 9-4 (49 mg) as a colorless gummy substance.

<Step 5-1>

Synthesis of Alginic Acid Having Introduced N-(2-aminoethyl)-2-(2-(cyclooct-2-yn-1-yloxy)acetamido)acetamido Group (EX9a-A2)

[C105]

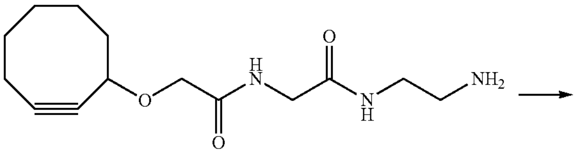

9-4

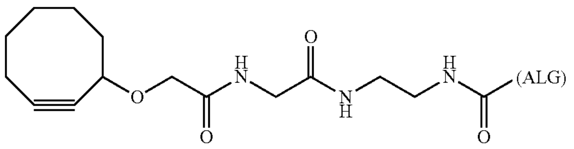

EX9a-A2

4-(4,6-dimethoxy-1,3,5-triazin-2-yl)-4-methylmorpholinium chloride (DMT-MM) (106 mg), an ethanol (3.8 mL) solution of the compound (9-4, 30.3 mg) obtained in <Step 4> of (Example 9), and 1-molar aqueous sodium bicarbonate solution (96 μL) were added to 38 mL of an aqueous solution of sodium alginate (MOCHIDA PHARMACEUTICAL CO., LTD.: A-2) adjusted to 1 wt %. This was stirred for 3.2 hours at 30° C., sodium chloride (0.38 g) and ethanol (76 mL) were added in that order, and the mixture was stirred at room temperature for 30 minutes. The resulting precipitate was collected by filtration, washed with ethanol, and dried under reduced pressure. The resulting solid was dissolved in water and lyophilized to obtain the title compound EX9a-A2 (381 mg) as a white solid.

<Step 5-2>

Synthesis of Alginic Acid Having Introduced N-(2-aminoethyl)-2-(2-(cyclooct-2-yn-1-yloxy)acetamido) acetamido Group (EX9b-B2)

[C106]

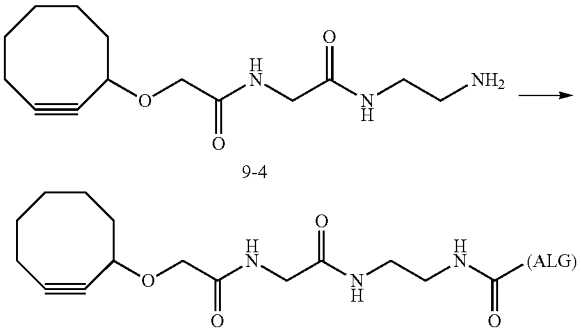

9-4

EX9b-B2

4-(4,6-dimethoxy-1,3,5-triazin-2-yl)-4-methylmorpholinium chloride (DMT-MM) (64 mg), the compound (9-4, 18.2 mg) obtained in <Step 4> of (Example 9), and 1-molar aqueous sodium bicarbonate solution (58 μL) were added to 38 mL of an aqueous solution of sodium alginate (MOCHIDA PHARMACEUTICAL CO., LTD.: B-2) adjusted to 1 wt %. This was stirred for 3.2 hours at 30° C., sodium chloride (0.38 g) and ethanol (76 mL) were added in that order, and the mixture was stirred at room temperature for 30 minutes. The resulting precipitate was collected by filtration, washed with ethanol, and dried under reduced pressure. The resulting solid was dissolved in water and lyophilized to obtain the title compound EX9b-B2 (366 mg) as a white solid.

Example 10

Synthesis of Alginic Acid Having Introduced N-(2-aminoethyl)-3-(2-(cyclooct-2-yn-1-yloxy)acetamido) propanamido Group (EX10-A2)

[C107]

EX10-A2

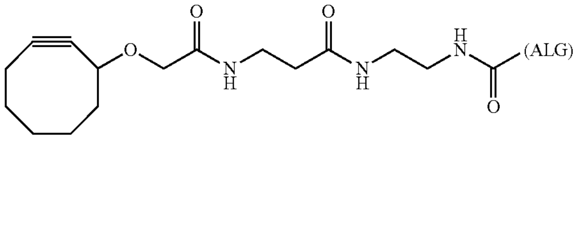

<Step 1>

Synthesis of tert-butyl (3-oxo-3-((2-(2,2,2-trifluoroacetamido)ethyl) amino)propyl)carbamate (10-1)

[C108]

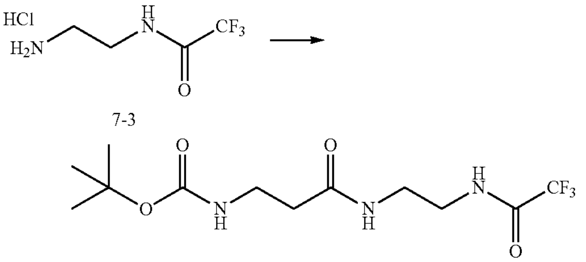

7-3

10-1

Commercial N-(tert-butoxycarbonyl)-beta-alanine (113 mg, [CAS Registry No. 3303-84-2]) and the compound (7-3, 110 mg) obtained in <Step 2> of (Example 7) were dissolved in acetonitrile (3.3 mL). O-(7-azabenzotriazol-1-yl)-N,N,N',N'-tetramethyluronium hexafluorophosphoric acid salt (261 mg) and N,N-diisopropyl ethylamine (319 μL) were added, and the mixture was stirred for 3 hours at room temperature. Ethyl acetate (15 mL) and water (5 mL) were added to separate the solution, and the organic layer was washed successively with water and brine. The organic layer was dried with anhydrous sodium sulfate, concentrated under reduced pressure, and triturated with tert-butyl methyl ether (20 mL). A solid was collected by filtration and dissolved in ethyl acetate (20 mL). The organic layer was washed successively with 1N-citric acid, water and brine, dried with anhydrous sodium sulfate, and concentrated under reduced pressure. The residue was triturated with tert-butyl methyl ether (10 mL), and a solid was collected by filtration to obtain the title compound 10-1 (80 mg) as a white solid.

<Step 2>

Synthesis of 3-amino-N-(2-(2,2,2-trifluoroacetamido)ethyl)propanamide hydrochloride (10-2)

[C109]

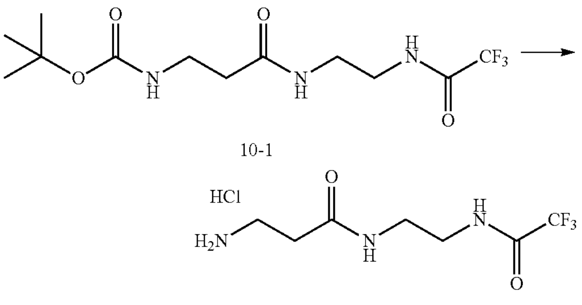

10-1

10-2

4N-hydrogen chloride/1,4-dioxane (1.1 mL) was added under ice water cooling to 80 mg of the compound (10-1) obtained in <Step 1> of (Example 10), and stirred for 2 hours at room temperature. Diisopropyl ether (3.4 mL) was added to the reaction solution, which was then stirred for 1.5 hours. The resulting solid was filtered to obtain the title compound 10-2 (61 mg) as a white solid.

<Step 3>

Synthesis of 3-(2-(cyclooct-2-yn-1-yloxy)acetamido)-N-(2-(2,2,2-trifluoroacetamido)ethyl)propanamide (10-3)

[C110]

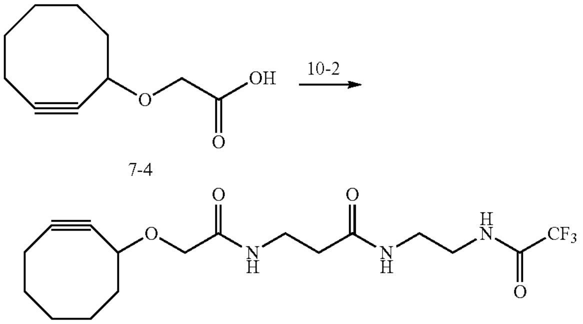

7-4

10-3

Ethanol (1.2 mL), 4-(4,6-dimethoxy-1,3,5-triazin-2-yl)-4-methylmorpholinium chloride (DMT-MM) (115 mg) and triethylamine (39 μL) were added to carboxylic acid (7-4, 44 mg) synthesized by methods known in the literature (Org. Process Res. Dev. (2018) 22: 108-110) and the compound (10-2, 61 mg) obtained in <Step 2> of (Example 10), and the mixture was stirred for 2 hours at room temperature. Water (3.7 mL) was added to the reaction solution, which was then extracted with ethyl acetate (15 mL, 5 mL). The organic layer was washed successively with water and brine, dried with anhydrous sodium sulfate, and concentrated under reduced pressure. Tert-butyl methyl ether (10 mL) was added to the resulting solid, which was then triturated and filtered. The resulting solid was purified by column chromatography (80% ethyl acetate/n-heptane to ethyl acetate to 20% methanol/ethyl acetate) to obtain the title compound 10-3 (60 mg) as a light-yellow solid.

<Step 4>

Synthesis of N-(2-aminoethyl)-3-(2-(cyclooct-2-yn-1-yloxy)acetamido)propanamide (10-4)

[C111]

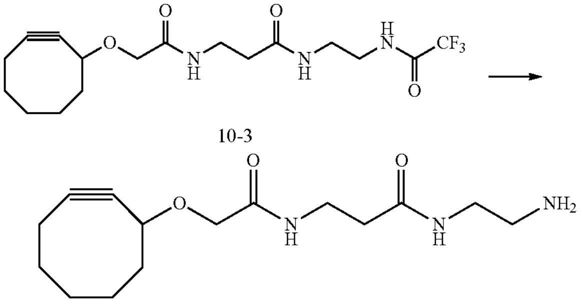

10-3

10-4

A water (0.3 mL) solution of potassium carbonate (42 mg) was added to a methanol (3.0 mL) solution of the compound (10-3, 60 mg) obtained in <Step 3> of (Example 10), and the mixture was stirred for 3 hours at room temperature, after which a water (0.3 mL) solution of potassium carbonate (42 mg) was added, and the mixture was stirred for 16.5 hours at room temperature. The reaction solution was concentrated under reduced pressure, brine (2 mL) was added, and the solution was saturated with sodium chloride. This was extracted with ethyl acetate (15 mL, 10 mL×4), and the extracted layer was dried with anhydrous sodium sulfate and concentrated under reduced pressure. Ethyl acetate (5 mL) and a few drops of methanol were added to the residue, and the insoluble matter was removed by filtration. The resulting filtrate was concentrated under reduced pressure to obtain the title compound 10-4 (31 mg) as a colorless oily substance.

<Step 5>

Synthesis of Alginic Acid Having Introduced N-(2-aminoethyl)-3-(2-(cyclooct-2-yn-1-yloxy)acetamido)propanamido Group (EX10-A2)

[C112]

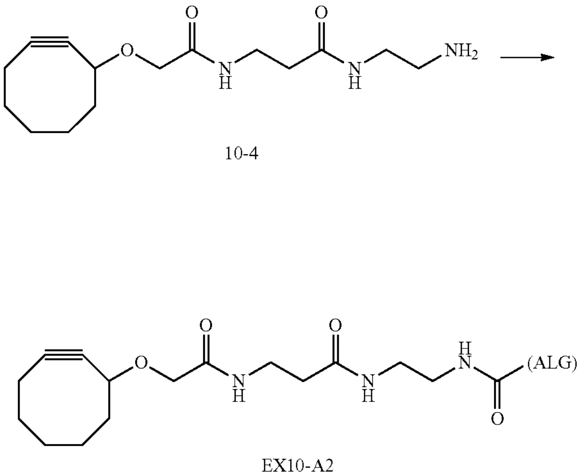

10-4

EX10-A2

4-(4,6-dimethoxy-1,3,5-triazin-2-yl)-4-methylmorpholinium chloride (DMT-MM) (114 mg), an ethanol (4.1 mL) solution of the compound (10-4, 30.5 mg) obtained in <Step 4> of (Example 10), and 1-molar aqueous sodium bicarbonate solution (103 μL) were added to 41 mL of an aqueous solution of sodium alginate (MOCHIDA PHARMACEUTICAL CO., LTD.: A-2) adjusted to 1 wt %. This was stirred for 3 hours at 30° C., sodium chloride (0.41 g) and ethanol (82 mL) were added in that order, and this was stirred at room temperature for 30 minutes. The resulting precipitate was collected by filtration, washed with ethanol, and dried under reduced pressure. The resulting solid was dissolved in water and lyophilized to obtain the title compound EX10-A2 (406 mg) as a white solid.

(Examples 11a, 11b)

Synthesis of Alginic Acids Having Introduced 2-(cyclooct-2-yn-1-yloxy)ethan-1-amino Groups (EX11a-A2, EX11b-B2)

[C113]

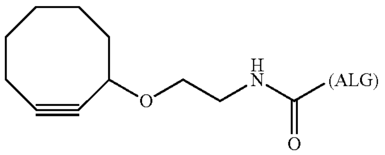

EX11a-A2
EX11b-B2

<Step 1>

Synthesis of (E)-N-(2-((2-bromocyclooct-2-en-1-yl)oxy)ethyl)-2,2,2-trifluoroacetamide (11-3)

[C114]

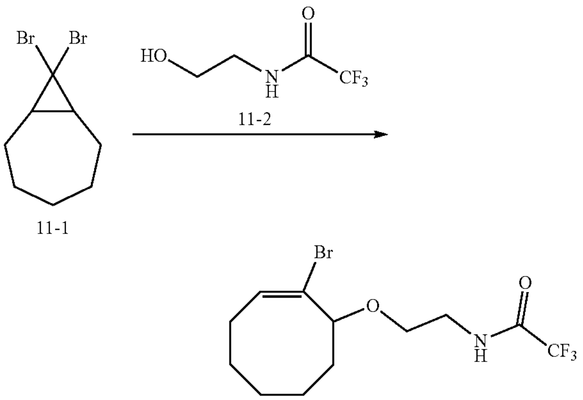

11-1
11-2
11-3

Dichloromethane (2 mL) was added at room temperature to a mixture of a dibromo form (11-1, 1 g) synthesized by methods known in the literature (Org. Process Res. Dev. (2018) 22: 108-110) and an alcohol form (11-2, 5.28 g) synthesized by methods known in the literature (WO 2015/140807). The internal temperature was maintained at room temperature as the reaction vessel was wrapped in aluminum foil and shielded from light. Silver trifluoromethanesulfonate (1.92 g) was then added once at room temperature, and the mixture was stirred for 1 hour at that temperature. After stirring, brine (5 mL) was added under ice cooling, the precipitated silver salt was removed by celite filtration, and the residue was washed with methyl tert-butyl ether (10 mL). The filtrate was separated, and the organic layer was washed twice with water (5 mL). This was then dried with anhydrous sodium sulfate, filtered, and concentrated under reduced pressure to obtain a crude product. The crude product was purified by silica gel column chromatography (n-heptane/ethyl acetate) to obtain a fraction containing a compound 11-3 (0.46 g).

<Step 2>

Synthesis of 2-(cyclooct-2-yn-1-yloxy)ethan-1-amine (11-4)

[C115]

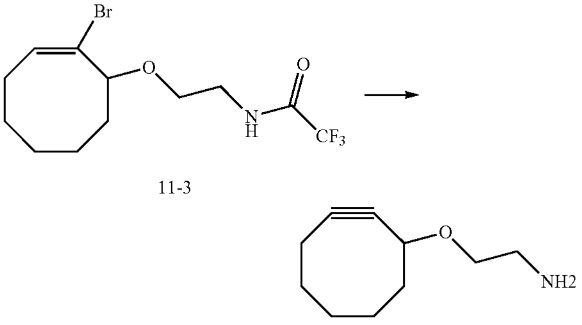

11-3
11-4

A 28% sodium methoxide methanol solution (1.82 mL) was added under water cooling and stirring to a mixture of dimethyl sulfoxide (1.38 mL) and the fraction containing the compound (11-3, 0.46 g) obtained in <Step 1> of (Example 11), and the mixture was stirred at room temperature for 16 hours. Water (10 mL) was added to stop the reaction, and the methanol was concentrated under reduced pressure. The resulting solution was extracted 3 times with methyl tert-butyl ether (10 mL), and the organic layer was dried with anhydrous sodium sulfate, filtered, and concentrated under reduced pressure to obtain a crude product of the title compound 11-4 (0.196 g) as a brown oily substance.

<Step 3-1>

Synthesis of Alginic Acid Having Introduced 2-(cyclooct-2-yn-1-yloxy)ethan-1-amino Group (EX11a-A2)

[C116]

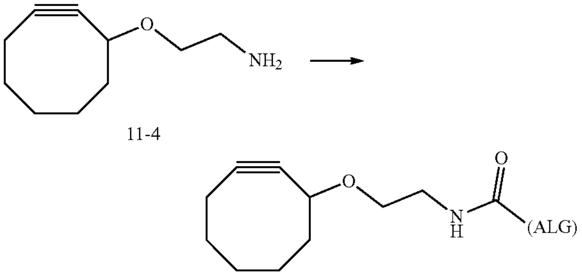

11-4
EX11a-A2

4-(4,6-dimethoxy-1,3,5-triazin-2-yl)-4-methylmorpholinium chloride (DMT-MM) (213.55 mg) was added at room temperature to 69.2 mL of an aqueous solution of sodium alginate (MOCHIDA PHARMACEUTICAL CO., LTD.: A-2) adjusted to 1 wt %. A water (1 mL) and ethanol (1 mL) solution of the compound (11-4, 26.78 mg) obtained in <Step 2> of (Example 11) was then added at room temperature, and then stirred for 24 hours at that temperature, after which sodium chloride (700 mg) and ethanol (138.4 mL) were added in that order, and the mixture was stirred for 30 minutes at room temperature. The resulting precipitate was collected by filtration, washed with ethanol, and dried under reduced pressure. The resulting solid was dissolved in water and then lyophilized to obtain the title compound EX11a-A2 (661 mg) as a white solid.

<Step 3-2>

Synthesis of Alginic Acid Having Introduced 2-(cyclocto-2-in-1-yloxy) ethane-1-amino Group (EX11b-B2)

[C117]

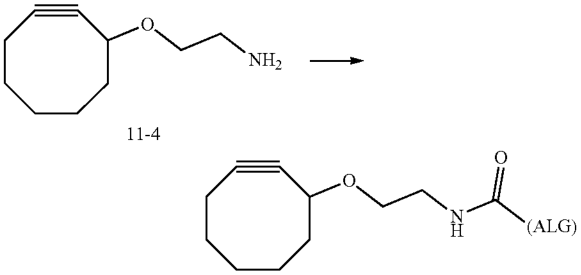

11-4

EX11b-B2

The title compound EX11b-B2 (648 mg) was obtained as a white solid by the same operations as in <Step 3-1> of (Example 11) using 70.1 mL of an aqueous solution of sodium alginate (MOCHIDA PHARMACEUTICAL CO., LTD.: B-2) adjusted to 1 wt %, 4-(4,6-dimethoxy-1,3,5-triazin-2-yl)-4-methylmorpholinium chloride (DMT-MM) (216.4 mg), and the compound (11-4, 27.14 mg) obtained in <Step 2> of (Example 11).

Example 12

Synthesis of Alginic Acid Having Introduced 2-(2-(cyclooct-2-yn-1-yloxy)ethoxy)ethan-1-amino Group (EX12-A2)

[C118]

EX12-A2

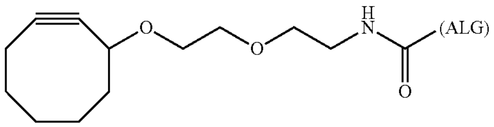

<Step 1>

Synthesis of 2,2,2-trifluoro-N-(2-(2-hydroxyethoxy) ethyl) acetamide (12-2)

[C119]

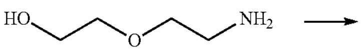

12-1

-continued

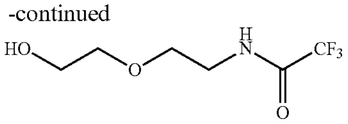

12-2

Ethyl 2,2,2-trifluoroacetate (2.5 mL) was dripped over the course of 5 minutes into a tetrahydrofuran (8.0 mL) solution of commercial 2-(2-aminoethoxy) ethanol [CAS Registry No. 929-06-6] (12-1, 2.0 mL), and stirred for 20 hours at room temperature. The reaction solution was concentrated under reduced pressure, and separated by addition of ethyl acetate (30 mL) and water (10 mL). The water layer was extracted with ethyl acetate (10 mL), and the combined organic layer was washed successively with water and brine. The organic layer was dried with anhydrous sodium sulfate and concentrated under reduced pressure to obtain the title compound 12-2 (3.7 g) as a colorless oily substance.

<Step 2>

Synthesis of (E)-N-(2-(2-((2-bromocyclooct-2-en-1-yl)oxy)ethoxy)ethyl)-2,2,2-trifluoroacetamide (12-3)

[C120]

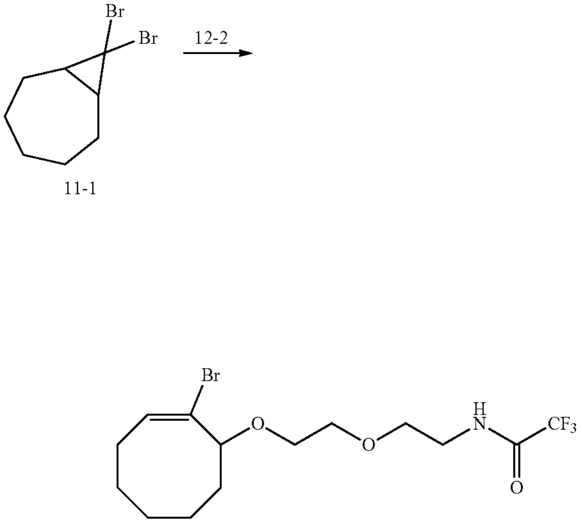

11-1

12-3

A dibromo form (11-1, 0.30 g) synthesized by methods known in the literature (Org. Process Res. Dev. (2018) 22: 108-110) was dissolved in methylene chloride (0.54 mL), and the compound (12-2, 1.86 g) obtained in <Step 1> of (Example 12) and silver trifluoromethane sulfonate (0.52 g) were added under light shielding with aluminum foil. This was stirred for 1.5 hours at room temperature under light shielding, and saturated aqueous sodium bicarbonate solution (2.0 mL) and brine (3.0 mL) were added successively to the reaction solution under ice water cooling. The solids were celite filtered and washed with tert-butyl methyl ether (10 mL×3). The filtrate was separated, and the organic layer was washed successively with water and brine. The organic layer was dried with anhydrous sodium sulfate and concentrated under reduced pressure to obtain the title compound 12-3 (424 mg) as a light brown oily substance.

<Step 3>

Synthesis of N-(2-(2-(cyclooct-2-yn-1-yloxy)ethoxy)ethyl)-2,2,2-trifluoroacetamide (12-4)

[C121]

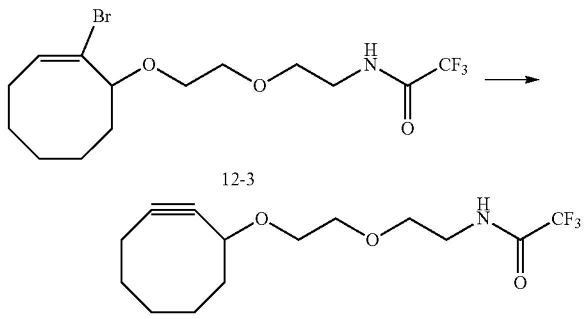

12-3

12-4

The compound (12-3, 100 mg) obtained in <Step 2> of (Example 12) was dissolved in tetrahydrofuran (0.7 mL) and N,N-dimethyl formamide (0.7 mL). 60% sodium hydride (21 mg) was added under ice water cooling, and the mixture was stirred for 3 hours at that temperature. 60% sodium hydride (10 mg) was added, and the mixture was stirred for 1 hour at room temperature, after which 60% sodium hydride was added (10 mg), and the mixture was stirred for 20 hours at room temperature. Water (3 mL) was added, the mixture was extracted with ethyl acetate (15 mL, 10 mL), and the organic layer was washed successively with water and brine. The organic layer was dried with anhydrous sodium sulfate and concentrated under reduced pressure. The residue was purified by column chromatography (n-heptane to 50% ethyl acetate/n-heptane) to obtain the title compound 12-4 (37 mg) as a colorless oily substance.

<Step 4>

Synthesis of 2-(2-(cyclooct-2-yn-1-yloxy)ethoxy)ethan-1-amine (12-5)

[C122]

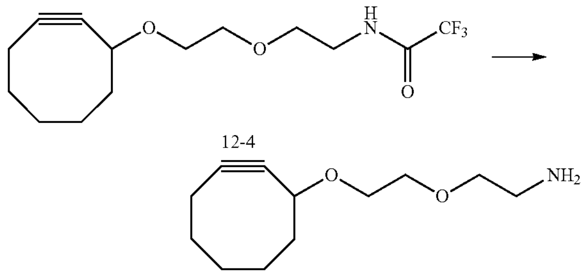

12-4

12-5

A water (185 μL) solution of potassium carbonate (50 mg) was added to a methanol (555 μL) solution of the compound (12-4, 37 mg) obtained in <Step 3> of (Example 12), and the mixture was stirred for 17 hours at room temperature. The reaction solution was concentrated under reduced pressure, water (1 mL) was added, and the solution was saturated with sodium chloride. This was extracted with ethyl acetate (10 mL×4), and the extracted layer was dried with anhydrous sodium sulfate and concentrated under reduced pressure. Ethyl acetate (10 mL) and a few drops of methanol were added to the residue, and the insoluble matter was removed by filtration. The resulting filtrate was concentrated under reduced pressure to obtain the title compound 12-5 (30 mg) as a colorless oily substance.

<Step 5>

Synthesis of Alginic Acid Having Introduced 2-(2-(cyclooct-2-yn-1-yloxy)ethoxy)ethan-1-amino Group (EX12-A2)

[C123]

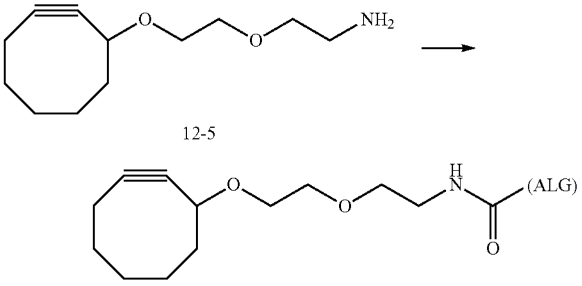

12-5

EX12-A2

4-(4,6-dimethoxy-1,3,5-triazin-2-yl)-4-methylmorpholinium chloride (DMT-MM) (145 mg), an ethanol (5.2 mL) solution of the compound (12-5, 29 mg) obtained in <Step 4> of (Example 12) and 1-molar aqueous sodium bicarbonate solution (131 μL) were added to 52 mL of an aqueous solution of sodium alginate (MOCHIDA PHARMACEUTICAL CO., LTD.: A-2) adjusted to 1 wt %. This was stirred for 3.2 hours at 30° C., sodium chloride (0.52 g) and ethanol (104 mL) were added in that order, and the mixture was stirred at room temperature for 30 minutes. The resulting precipitate was collected by filtration, washed with ethanol, and dried under reduced pressure. The resulting solid was dissolved in water and lyophilized to obtain the title compound EX12-A2 (522 mg) as a white solid.

Example 13

Synthesis of Alginic Acid Having Introduced 3-amino-N-(2-(2-(2-(cyclooct-2-yn-1-yloxy)acetamido)ethoxy)ethyl)propanamido Group (EX13-A2)

[C124]

EX13-A2

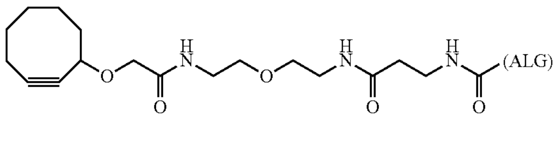

<Step 1>

Synthesis of 3-(2,2,2-trifluoroacetamido) propanoic acid (13-2)

[C125]

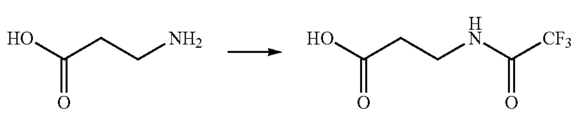

13-1 13-2

Commercial/3-alanine [CAS Registry No. 107-95-9] (13-1, 2.0 g) was dissolved in methanol (40.0 mL), and triethylamine (3.3 mL) was added. Ethyl 2,2,2-trifluoroacetate (3.4 mL) was dripped in under ice cooling over the course of 5 minutes, and the mixture was stirred for 20.5 hours at room temperature. The reaction solution was concentrated under reduced pressure, water (20 mL) was added, and the pH was adjusted to 4 with 1N-hydrochloric acid. This was extracted with ethyl acetate (100 mL×2, 50 mL), and the organic layer was washed with brine. The organic layer was dried with anhydrous sodium sulfate and concentrated under reduced pressure to obtain the title compound 13-2 (2.9 g) as a white solid.

<Step 2>

Synthesis of tert-butyl (2-(2-(3-(2,2,2-trifluoroacetamido)propanamido) ethoxy)ethyl)carbamate (13-3)

[C126]

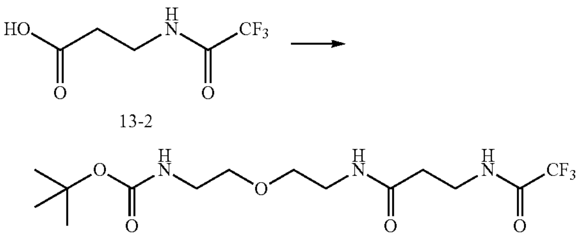

13-2

13-3

4-(4,6-dimethoxy-1,3,5-triazin-2-yl)-4-methylmorpholinium chloride (DMT-MM) (897 mg) was added to an ethanol (4.0 mL) solution of the compound (13-2, 400 mg) obtained in <Step 1> of (Example 13) and tert-butyl (2-(2-aminoethoxy)ethyl)carbamate (8-1, 441 mg, [CAS Registry No. 127828-22-2]), and the mixture was stirred for 3.5 hours. Water (5 mL) was added to the reaction solution, which was then extracted with ethyl acetate (20 mL, 10 mL), and the organic layer was washed successively with water and brine. The organic layer was dried with anhydrous sodium sulfate and concentrated under reduced pressure, and the residue was purified by column chromatography (30% ethyl acetate/n-heptane to ethyl acetate) to obtain the title compound 13-3 (451 mg) as a colorless oily sub stance.

<Step 3>

Synthesis of N-(2-(2-aminoethoxy)ethyl)-3-(2,2,2-trifluoroacetamido)propanamide hydrochloride (13-4)

[C127]

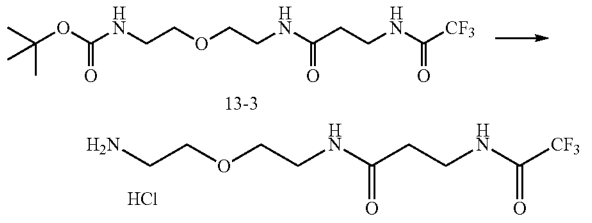

13-3

13-4

4N-hydrogen chloride/1,4-dioxane (3.16 mL) was added under ice water cooling to the compound (13-3, 451 mg) obtained in <Step 2> of (Example 13) and stirred for 3 hours at room temperature. Diisopropyl ether (6.4 mL) was added to the reaction solution, which was then concentrated under reduced pressure to obtain the title compound 13-4 (433 mg) as a colorless gummy substance.

<Step 4>

Synthesis of N-(2-(2-(2-(cyclooct-2-yn-1-yloxy) acetamido)ethoxy)ethyl)-3-(2,2,2-trifluoroacetamido)propanamide (13-5)

[C128]

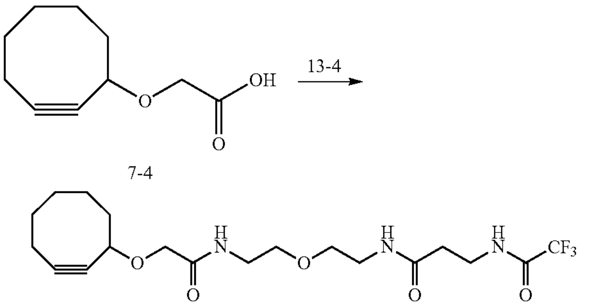

7-4

13-5

Ethanol (1.7 mL), 4-(4,6-dimethoxy-1,3,5-triazin-2-yl)-4-methylmorpholinium chloride (DMT-MM) (253 mg) and triethylamine (102 μL) were added to carboxylic acid (7-4, 111 mg) synthesized by methods known in the literature (Org. Process Res. Dev. (2018) 22: 108-110) and the compound (13-4, 215 mg) obtained in <Step 3> of (Example 13), and the mixture was stirred for 21 hours at room temperature. Water (5 mL) was added to the reaction solution, which was then extracted with ethyl acetate (15 mL). The organic layer was washed successively with water and brine, dried with anhydrous sodium sulfate, and concentrated under reduced pressure. The resulting residue was purified by column chromatography (30% ethyl acetate/n-heptane to ethyl acetate to 15% methanol/ethyl acetate) to obtain the title compound 13-5 (35 mg) as a colorless oily substance.

<Step 5>

Synthesis of 3-amino-N-(2-(2-(2-(cyclooct-2-yn-1-yloxy)acetamido)ethoxy)ethyl)propanamide (13-6)

[C129]

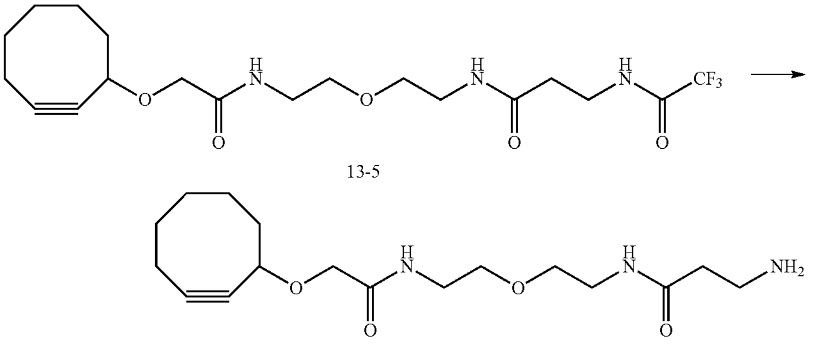

13-5

13-6

A water (175 μL) solution of potassium carbonate (33 mg) was added to a methanol (700 μL) solution of the compound (13-5, 35 mg) obtained in <Step 4> of (Example 13), and the mixture was stirred for 16.5 hours at room temperature. The reaction solution was concentrated under reduced pressure, water (2 mL) was added, and the solution was saturated with sodium chloride. This was extracted with ethyl acetate (10 mL×5), and the extracted layer was dried with anhydrous sodium sulfate and concentrated under reduced pressure. Ethyl acetate (10 mL) and a few drops of methanol were added to the residue, and the insoluble matter was removed by filtration. The resulting filtrate was concentrated under reduced pressure to obtain the title compound 13-6 (24 mg) as a colorless gummy substance.

<Step 6>

Synthesis of Alginic Acid Having Introduced 3-amino-N-(2-(2-(2-(cyclooct-2-yn-1-yloxy)acetamido)ethoxy)ethyl)propanamido Group (EX13-A2)

[C130]

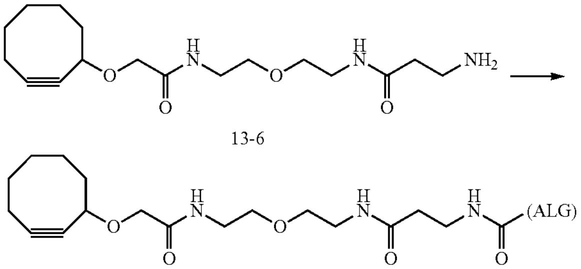

13-6

EX13-A2

4-(4,6-dimethoxy-1,3,5-triazin-2-yl)-4-methylmorpholinium chloride (DMT-MM) (78 mg), an ethanol (2.8 mL) solution of the compound (13-6, 24 mg) obtained in <Step 5> of (Example 13), and 1-molar aqueous sodium bicarbonate solution (71 μL) were added to 28 mL of an aqueous solution of sodium alginate (MOCHIDA PHARMACEUTICAL CO., LTD.: A-2) adjusted to 1 wt %. This was stirred for 3.5 hours at 30° C., sodium chloride (0.28 g) and ethanol (56 mL) were added in that order, and the mixture was stirred at room temperature for 30 minutes. The resulting precipitate was collected by filtration, washed with ethanol, and dried under reduced pressure. The resulting solid was dissolved in water and lyophilized to obtain the title compound EX13-A2 (272 mg) as a white solid.

Example 14

Synthesis of Alginic Acids Having Introduced N-(4-(2-aminoethoxy)benzyl)-2-(cyclooct-2-yn-1-yloxy)acetamido Groups (EX14a-A2, EX14b-B2)

[C131]

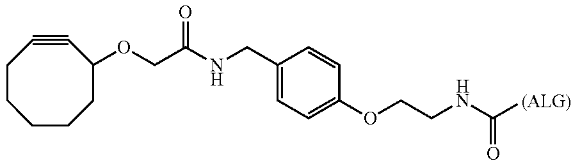

EX14a-A2
EX14b-B2

<Step 1>

Synthesis of N-(2-bromoethyl)-2,2,2-trifluoroacetamide (14-2)

[C132]

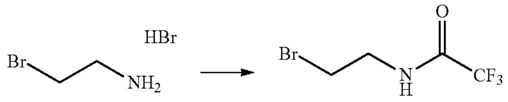

14-1

14-2

Triethylamine (4.29 mL) was added under ice cooling and stirring to a methanol (30 mL) solution of commercial 2-bromoethylamine hydrobromide [CAS Registry No. 2576-47-8] (14-1, 3 g). Ethyl trifluoroacetate (1.92 mL) was gradually added to this mixture at the same temperature, and the mixture was stirred for 42 hours at room temperature. After completion of the reaction, the reaction solution was concentrated under reduced pressure, and water (10 mL) was added. This was extracted 3 times with ethyl acetate (10 mL), and the organic layer was washed successively with water (5 mL) and brine (5 mL), dried with anhydrous sodium sulfate, filtered, and then concentrated under reduced pressure to obtain the title compound 14-2 (2.457 g) as a light brown solid.

<Step 2>

Synthesis of tert-butyl (4-(2-(2,2,2-trifluoroacetamido)ethoxy)benzyl)carbamate (14-4)

[C133]

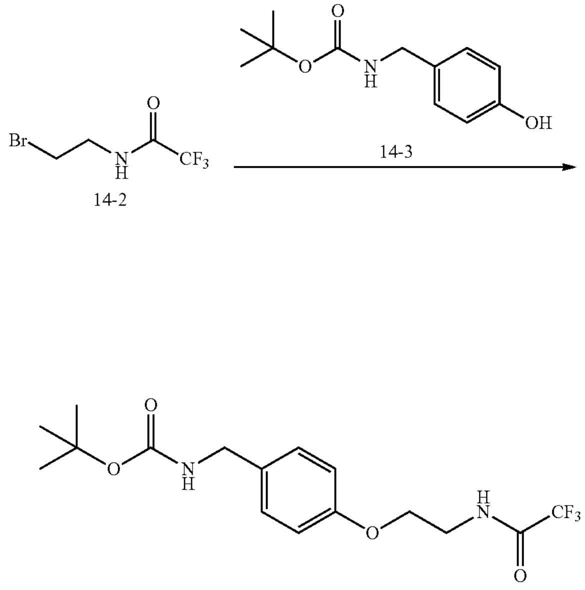

14-2

14-3

14-4

Potassium carbonate (0.45 g) was added at room temperature to a mixture of commercial tert-butyl (4-hydroxybenzyl)carbamate [CAS Registry No. 149505-94-2] (14-3, 0.36 g), the compound (14-2, 0.46 g) obtained in <Step 1> of (Example 14), potassium iodide (0.35 g) and N-methylpyrrolidone (3.6 mL), and the mixture was stirred for 5 hours at 140° C. After completion of the reaction, this was cooled to room temperature and diluted with water (10 mL). This was extracted 3 times with methyl tert-butyl ether (10 mL), and the organic layer was washed successively with 1N-sodium hydroxide aqueous solution (5 mL, twice), water (5 mL) and brine (5 mL) and dried with anhydrous sodium sulfate. The organic layer was filtered and concentrated under reduced pressure to obtain a crude product. The crude product was purified by silica gel column chromatography (n-heptane/ethyl acetate) to obtain the title compound 14-4 (0.202 g) as a white amorphous substance.

<Step 3>

Synthesis of N-(2-(4-(aminomethyl)phenoxy)ethyl)-2,2,2-trifluoroacetamide hydrochloride (14-5)

[C134]

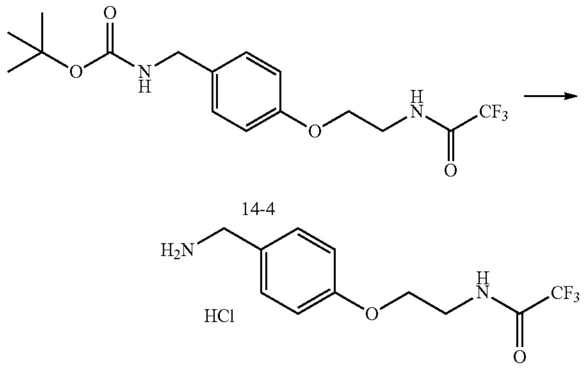

14-4

14-5

The title compound 14-5 (0.147 g) was obtained as a white solid by the same operations as in <Step 2> of (Example 6) using the compound (14-4, 0.2 g) obtained in <Step 2> of (Example 14).

<Step 4>

Synthesis of N-(2-(4-((2-(cyclooct-2-yn-1-yloxy)acetamido)methyl)phenoxy)ethyl)-2,2,2-trifluoroacetamide (14-6)

[C135]

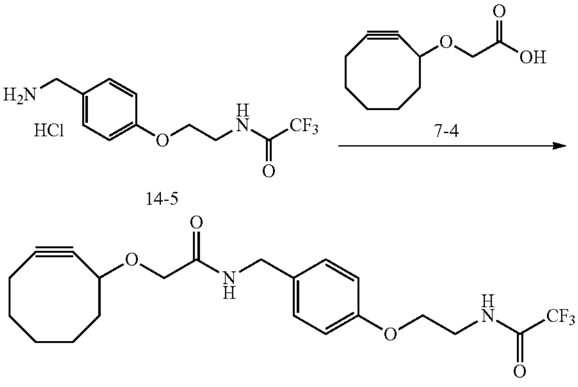

7-4

14-5

14-6

4-(4,6-dimethoxy-1,3,5-triazin-2-yl)-4-methylmorpholinium chloride (DMT-MM) (137.22 mg) and triethylamine (38.25 μL) were added under ice cooling and stirring to a mixture of carboxylic acid (7-4, 50 mg) synthesized by methods known in the literature (Org. Process Res. Dev. (2018) 22: 108-110), the compound (14-5, 81.96 mg) synthesized in <Step 3> of (Example 14) and ethanol, and this was stirred for 1 hour and 30 minutes at room temperature. After completion of the reaction, water (2 mL) was added, the suspension was stirred, and methyl tert-butyl ether (0.5 mL) was added. The separated water layer was extracted twice with methyl tert-butyl ether (5 mL), washed successively with water (5 mL) and brine (5 mL), and dried with anhydrous sodium sulfate. The dried organic layer was filtered and concentrated under reduced pressure. The crude product was purified by silica gel column chromatography (n-heptane/ethyl acetate) to obtain the title compound 14-6 (99 mg) as a white amorphous substance.

<Step 5>

Synthesis of N-(4-(2-aminoethoxy)benzyl)-2-(cyclooct-2-yn-1-yloxy)acetamide (14-7)

[C136]

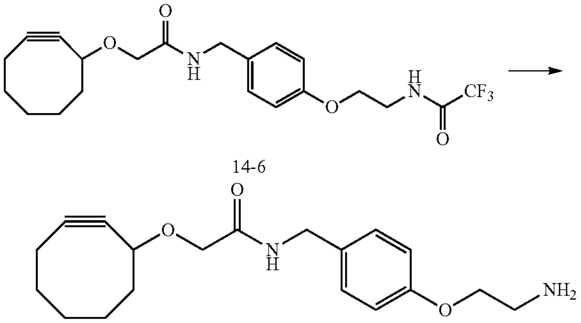

14-6

14-7

Potassium carbonate (64.17 mg) and water (495 μL) were added under water cooling and stirring to a mixture of the compound (14-6, 99 mg) obtained in <Step 4> of (Example 14) and methanol (1485 μL), and this was stirred for 15 hours at room temperature. After completion of the reaction, the methanol was concentrated under reduced pressure, and the resulting water layer was extracted 3 times with ethyl acetate (5 mL). The organic layer was washed successively with water (5 mL) and brine (5 mL), and dried with anhydrous sodium sulfate. The dried organic layer was filtered and concentrated under reduced pressure to obtain a crude product of the title compound 14-7 (68 mg) as a yellow oily substance.

<Step 6-1>

Synthesis of Alginic Acid Having Introduced N-(4-(2-aminoethoxy)benzyl)-2-(cyclooct-2-yn-1-yloxy) acetamido Group (EX14a-A2)

[C137]

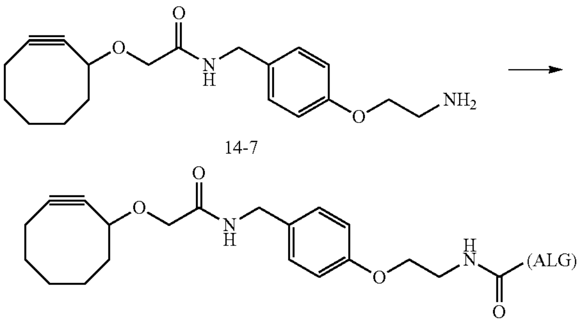

14-7

EX14a-A2

The title compound EX14a-A2 (479 mg) was obtained as a white solid by the same operations as in <Step 3-1> of (Example 11) using an aqueous solution of sodium alginate (MOCHIDA PHARMACEUTICAL CO., LTD.: A-2) adjusted to 1 wt % (49.44 mL), 4-(4,6-dimethoxy-1,3,5-triazin-2-yl)-4-methylmorpholinium chloride (DMT-MM) (152.54 mg) and the compound (14-7, 37.79 mg) obtained in <Step 5> of (Example 14).

<Step 6-2>

Synthesis of Alginic Acid Having Introduced N-(4-(2-aminoethoxy)benzyl)-2-(cyclooct-2-yn-1-yloxy) acetamido Group (EX14b-B2)

[C138]

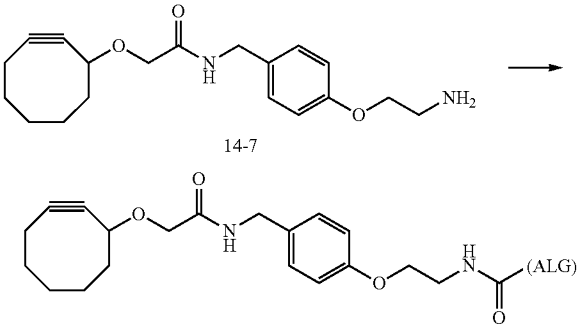

14-7

EX14b-B2

The title compound EX14b-B2 (356 mg) was obtained as a white solid by the same operations as in <Step 3-1> of (Example 11) using an aqueous solution of sodium alginate (MOCHIDA PHARMACEUTICAL CO., LTD.: B-2) adjusted to 1 wt % (40.08 mL), 4-(4,6-dimethoxy-1,3,5-triazin-2-yl)-4-methylmorpholinium chloride (DMT-MM) (123.66 mg) and the compound (14-7, 30.64 mg) obtained in <Step 5> of (Example 14).

Example 15

Synthesis of Alginic Acid Having Introduced 2-amino-N-[3-(11,12-didehydrodibenz[b,f]azocine-5(6H)-yl)-3-oxopropyl]acetamido Group (EX15-A2)

[C139]

EX15-A2

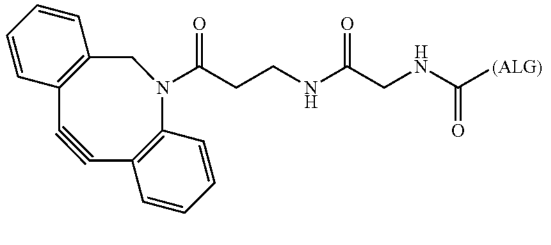

<Step 1>

Synthesis of (9H-fluoren-9-yl) methyl-N-[3-(11,12-didehydrodibenz[b,f]azocine-5(6H)-yl)-3-oxopropyl] acetamido-2-carbamate group (15-2)

[C140]

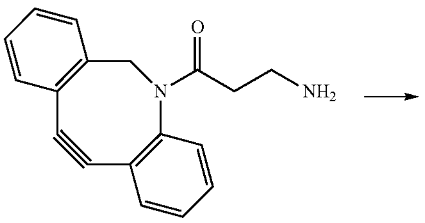

15-1

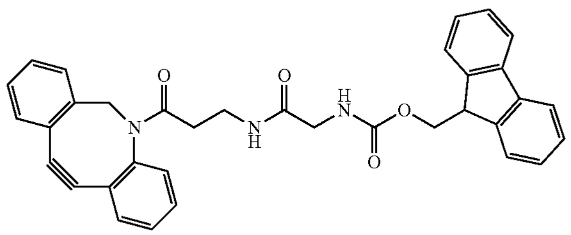

15-2

Commercial 3-amino-1-(11,12-didehydrodibenz[b,f] azocine-5-(6H)-yl)-1-propanone [CAS Registry No. 1255942-06-3] (15-1, 50 mg) and N-[(9H-fluoren-9-ylmethoxy)carbonyl] glycine [CAS Registry No. 29022-11-5] (54 mg) were dissolved in acetonitrile (1.5 mL). 0-(7-azabenzotriazol-1-yl)-N,N,N',N'-tetramethyluronium hexafluorophosphoric acid salt (76 mg) and N,N-diisopropyl ethylamine (70 μL) were added, and this was stirred for 4.5 hours at room temperature. Ethyl acetate (15 mL) and water (5 mL) were added to separate the reaction solution, after which the organic layer was washed successively with water and brine. The organic layer was then dried with anhydrous sodium sulfate, concentrated under reduced pressure, and purified by column chromatography to obtain the title compound 15-2 (63 mg) as a light beige amorphous substance.

<Step 2>

Synthesis of 2-amino-N-[3-(11,12-didehydrobenz[b,f]azocine-5(6H)-yl)-3-oxopropyl] acetamide (15-3)

[C141]

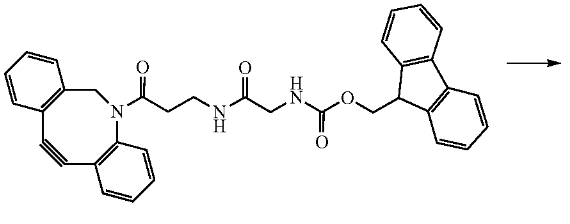

15-2

-continued

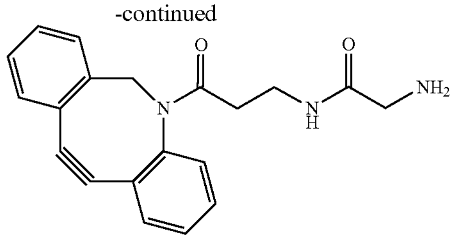

15-3

An N,N-dimethyl formamide (315 μL) solution of piperidine (56 μL) was added to the compound (15-2, 63 mg) obtained in <Step 1> of (Example 15), and this was stirred for 30 minutes at room temperature. Ethyl acetate (15 mL) and water (5 mL) were added to separate the reaction solution, after which the organic layer was washed successively with water and brine. The organic layer was then dried with anhydrous sodium sulfate and concentrated under reduced pressure. Tert-butyl methyl ether (5 mL) was added to the resulting solid, which was then triturated and filtered to obtain the title compound 15-3 (10 mg) as a light beige solid. More was collected from the filtrate and added to obtain the title compound 15-3 (11 mg) as a light-yellow gummy substance.

<Step 3>

Synthesis of Alginic Acid Having Introduced 2-amino-N-[3-11,12-didehydrodibenz[b,f]azocine-5 (6H)-yl)-3-oxopropyl]acetamido group (EX15-A2)

[C142]

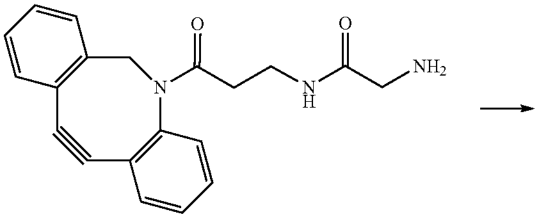

15-3

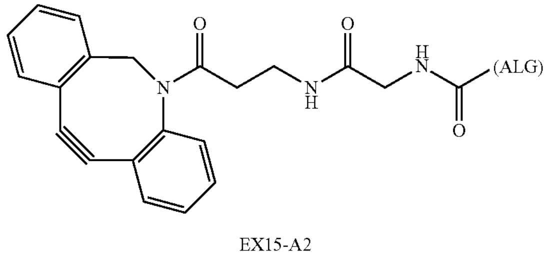

EX15-A2

4-(4,6-dimethoxy-1,3,5-triazin-2-yl)-4-methylmorpholinium chloride (DMT-MM) (106 mg), an ethanol (1.9 mL) solution of the compound (15-3, 21 mg) obtained in <Step 2> of (Example 15), and 1-molar aqueous sodium bicarbonate solution (48 μL) were added to 19 mL of an aqueous solution of sodium alginate (MOCHIDA PHARMACEUTICAL CO., LTD.: A-2) adjusted to 1 wt %. This was stirred for 3 hours at 30° C., sodium chloride (0.19 g) and ethanol (38 mL) were added in that order, and the mixture was stirred at room temperature for 30 minutes. The resulting precipitate was collected by filtration, washed with ethanol, and concentrated under reduced pressure. The resulting solid was dissolved in water and lyophilized to obtain the title compound EX15-A2 (188 mg) as a white solid.

Example 16

Synthesis of Alginic Acid Having Introduced 2-amino-N-(2-(cyclooct-2-yn-1-yloxy)ethyl)acetamido Group (EX16-A2)

[C143]

EX16-A2

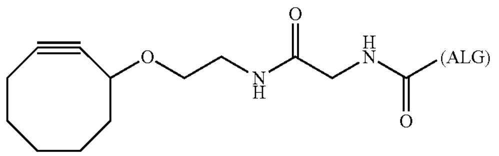

<Step 1>

Synthesis of (2,2,2-trifluoroacetyl) glycine (16-2)

[C144]

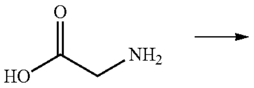

16-1

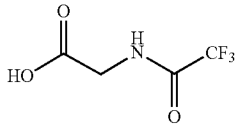

16-2

Glycine (16-1, 2 g) was suspended in methanol (10 mL), and cooled to 4° C. Ethyl trifluoroacetate (3.5 mL) and triethylamine (3.71 mL) were added at that temperature, and the mixture was stirred for 23 hours at room temperature. After completion of the reaction, 1N-hydrochloric acid (20 mL) was added gradually until the pH reached 2, and the mixture was extracted 3 times with ethyl acetate (10 mL) and washed successively with water (5 mL) and brine (5 mL). The organic layer was dried with anhydrous sodium sulfate, filtered, and concentrated under reduced pressure to obtain a light-yellow oily substance. The resulting oily substance was dissolved in ethyl acetate (20 mL), and n-heptane (10 mL) was added. The solution was concentrated under reduced pressure to obtain the title compound 16-2 (3.22 g) as a white amorphous substance.

<Step 2>

Synthesis of N-(2-((2-(cyclooct-2-yn-1-yloxy)ethyl)amino)-2-oxoethyl)-2,2,2-trifluoroacetamide (16-3)

[C145]

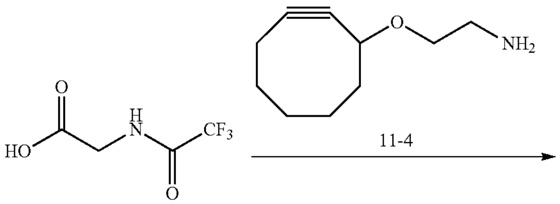

16-2

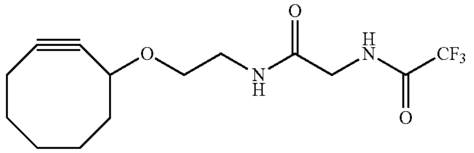

16-3

Ethanol (1600 μL) and 4-(4,6-dimethoxy-1,3,5-triazin-2-yl)-4-methylmorpholinium chloride (DMT-MM) (239.21 mg) were added under ice cooling and stirring to a mixture of the compound 11-4 (80 mg) and the compound (16-2, 81.83 mg) obtained in <Step 1> of (Example 16), and this was stirred for 3 hours at room temperature. Water (2 mL) was added to stop the reaction, and the mixture was extracted 3 times with methyl tert-butyl ether (5 mL). The organic layer was washed successively with water (5 mL) and brine (5 mL), and dried with anhydrous sodium sulfate. The organic layer was filtered and concentrated under reduced pressure to obtain a crude product. This crude product was triturated in n-heptane (10 mL), filtered, and dried and under reduced pressure to obtain the title compound 16-3 (95.1 mg) as a white solid.

<Step 3>

Synthesis of 2-amino-N-(2-(cyclooct-2-yn-1-yloxy)ethyl)acetamide (16-4)

[C146]

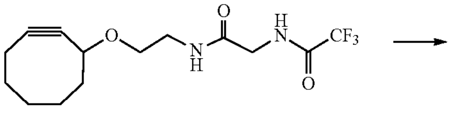

16-3

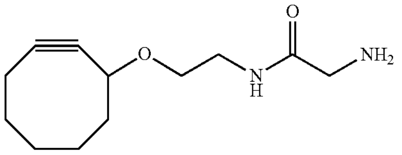

16-4

The title compound 16-4 (15 mg) was obtained as a light-yellow oily substance by the same operations as in <Step 5> of (Example 14) using the compound (16-3, 60 mg) obtained in <Step 2> of (Example 16), methanol (900 μL), potassium carbonate (51.78 mg) and water (300 μL).

<Step 4>

Synthesis of Alginic Acid Having Introduced 2-amino-N-(2-(cyclooct-2-yn-1-yloxy)ethyl)acetamido Group (EX16-A2)

[C147]

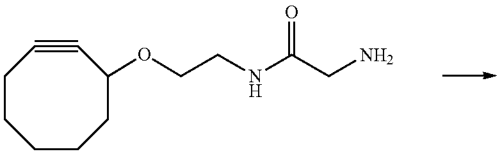

16-4

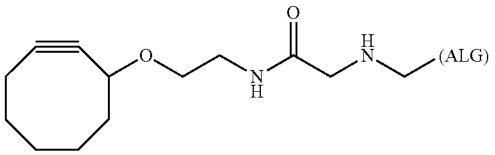

EX16-A2

The title compound EX16-A2 (279 mg) was obtained as a white solid by the same operations as in <Step 3-1> of (Example 11) using 29.66 mL of an aqueous solution of sodium alginate (MOCHIDA PHARMACEUTICAL CO., LTD.: A-2) adjusted to 1 wt %, 4-(4,6-dimethoxy-1,3,5-triazin-2-yl)-4-methylmorpholinium chloride (DMT-MM) (91.52 mg) and the compound (16-4, 15 mg) obtained in <Step 3> of (Example 16).

Example 17

Synthesis of Alginic Acid Having Introduced (2S)-2-amino-N-(2-(cyclooct-2-yn-1-yloxy)ethyl)-3-phenylpropanamido Group (EX17-A2)

[C148]

EX17-A2

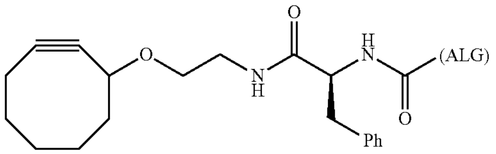

<Step 1>

Synthesis of (2,2,2-trifluoroacetyl)-L-phenylalanine (17-2)

[C149]

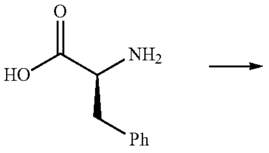

17-1

-continued

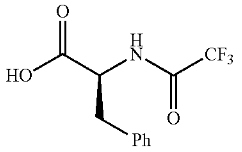

17-2

L-phenylalanine [CAS Registry No. 63-91-2] (17-1, 2 g) was dissolved in methanol (10 mL), and cooled to 4° C. Ethyl trifluoroacetate (1.59 mL) and triethylamine (1.69 mL) were then added at that temperature, and the mixture was stirred for 16 hours at room temperature. After completion of the reaction, 1N-hydrochloric acid (10 mL) was added gradually until the pH reached 1, and the suspension was stirred for 30 minutes. The suspension was filtered, and the collected solid was dried under reduced pressure to obtain the title compound 17-2 (2.53 g) as a white solid.

<Step 2>

Synthesis of (2S)—N-(2-(cyclooct-2-yn-1-yloxy)ethyl)-3-phenyl-2-(2,2,2-trifluoroacetamido)propanamide (17-3)

[C150]

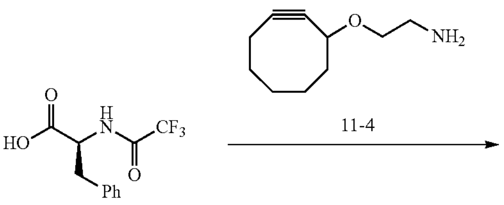

11-4

17-2

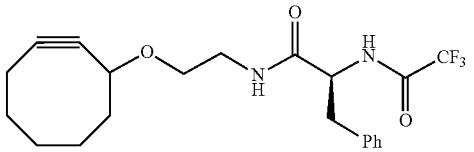

17-3

Ethanol (1200 μL) and 4-(4,6-dimethoxy-1,3,5-triazin-2-yl)-4-methylmorpholinium chloride (DMT-MM) (179.41 mg) were added under ice cooling to the compound 11-4 (60 mg) and the compound (17-2, 93.7 mg) obtained in <Step 1> of (Example 17), and this was stirred for 3 hours at room temperature. Water (2 mL) was added to stop the reaction, and the mixture was extracted 3 times with methyl tert-butyl ether (5 mL). The organic layer was washed successively with water (5 mL) and brine (5 mL), and dried with anhydrous sodium sulfate. The organic layer was filtered and concentrated under reduced pressure to obtain a crude product. This crude product was purified by silica gel column chromatography (n-heptane/ethyl acetate) to obtain the title compound 17-3 (57 mg) as a white amorphous sub stance.

<Step 3>

Synthesis of (2S)-2-amino-N-(2-(cyclooct-2-yn-1-yloxy)ethyl)-3-phenylpropanamide (17-4)

[C151]

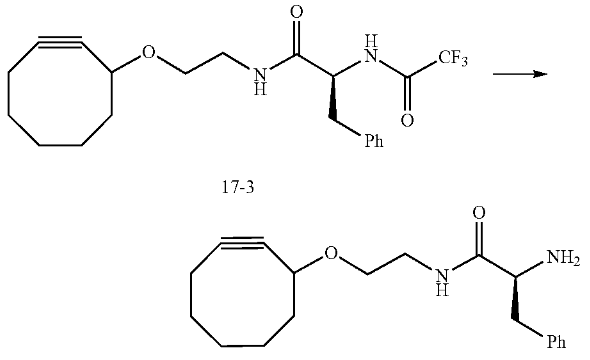

17-3

17-4

The title compound 17-4 (35 mg) was obtained as a light-yellow oily substance by the same operations as in <Step 5> of (Example 14) using the compound (17-3, 57 mg) obtained in <Step 2> of (Example 17), methanol (855 μL), potassium carbonate (38.39 mg) and water (285 μL).

<Step 4>

Synthesis of Alginic Acid Having Introduced (2S)-2-amino-N-(2-(cyclooct-2-yn-1-yloxy)ethyl)-3-phenylpropanamido Group (EX17-A2)

[C152]

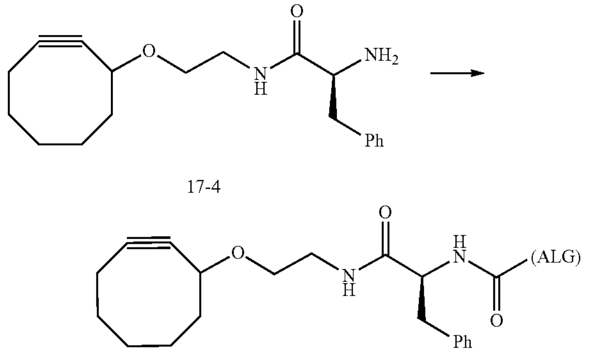

17-4

EX17-A2

The title compound EX17-A2 (383 mg) was obtained as a white solid by the same operations as in <Step 3-1> of (Example 11) using 47.46 mL of an aqueous solution of sodium alginate (MOCHIDA PHARMACEUTICAL CO., LTD.: A-2) adjusted to 1 wt %, 4-(4,6-dimethoxy-1,3,5-triazin-2-yl)-4-methylmorpholinium chloride (DMT-MM) (146.44 mg) and the compound (17-4, 34.53 mg) obtained in <Step 3> of (Example 17).

Example 18

Synthesis of Alginic Acid Having Introduced 4-(2-aminoethoxy)-N-(3-azidopropyl) benzamido Group (EX18-A2)

[C153]

EX18-A2

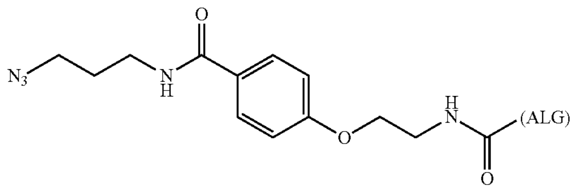

<Step 4>

Synthesis of methyl 4-(2-((tert-butoxycarbonyl) amino)ethoxy) benzoate (18-2)

[C154]

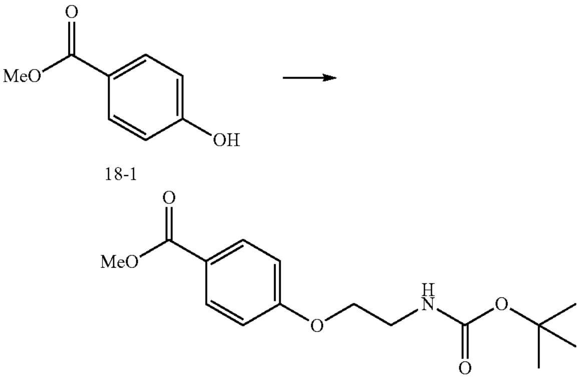

18-1

18-2

A diethyl azodicarboxylate solution (40% toluene solution, 1.92 mL) was added under ice cooling and stirring to a tetrahydrofuran (2.59 mL) solution of triphenylphosphine (0.96 g), and stirred for 20 minutes at room temperature. A tetrahydrofuran (1.1 mL) solution of commercial methyl 4-hydroxybenzoate (Compound 18-1, 0.37 g) and 2-(tert-butoxycarbonyl) ethanolamine (0.39 g) was added to this solution under ice cooling and stirring, and the mixture was stirred for 17 hours at room temperature. The reaction solution was concentrated under reduced pressure, and the residue was purified by silica gel column chromatography (5% ethyl acetate/n-heptane to 40% ethyl acetate/n-heptane) to obtain a mixture of a Compound 18-1 and Compound 18-2. This mixture was dissolved in methyl tert-butyl ether (20 mL) and washed twice with 1N-sodium hydroxide aqueous solution (5 mL) and once with brine (5 mL). The organic layer was dried with anhydrous sodium sulfate, and the solvent was distilled off under reduced pressure to obtain the compound 18-2 (0.45 g) as a pink oily substance.

<Step 2>

Synthesis of 4-(2-aminoethoxy)-N-(3-azidopropyl) benzamide hydrochloride (Compound 18-4)

[C155]

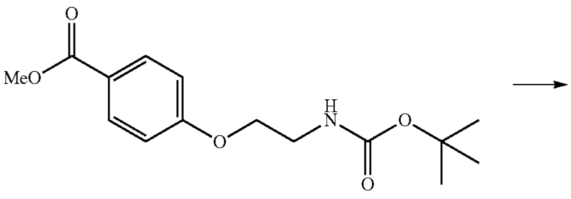

18-2

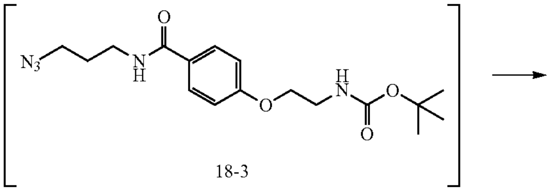

18-3

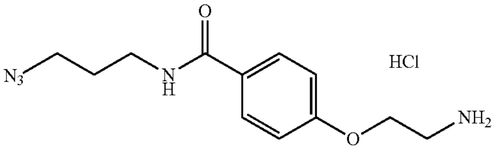

18-4

Lithium hydroxide monohydrate (0.25 g) was added to a methanol (4.4 mL) solution of the compound 18-2 (0.44 g) obtained in <Step 1> of (Example 18), and stirred for 3 hours and 30 minutes at 60° C. 1N-hydrochloric acid (5 mL) was added to the reaction solution, which was then extracted three times with ethyl acetate (10 mL). The organic layer was washed successively with water (5 mL) and brine (5 mL) and dried with anhydrous sodium sulfate, and the solvent was distilled off under reduced pressure. The residue was dissolved in acetonitrile (4.4 mL), and 3-azidopropane-1-amine (0.15 g) and O-(7-azabenzotriazole-1-yl)-N,N,N',N'-tetramethyluronium hexafluorophosphate salt (0.57 g) were added. N,N-diisopropylethylamine (0.52 mL) was then added under ice cooling and stirring, and the mixture was stirred for 5 hours at room temperature. Water (10 mL) was added to the reaction solution, which was then extracted 3 times with ethyl acetate (15 mL), the organic layer was dried with anhydrous sodium sulfate, and the solvent was distilled off under reduced pressure. The residue was purified by silica gel column chromatography (16% ethyl acetate/n-heptane to 100% ethyl acetate) to obtain a fraction containing the compound 18-3 (0.71 g).

4N-hydrogen chloride/1,4-dioxane (4.9 mL) was added to the fraction (0.71 g) containing the compound 18-3, and stirred for 20 minutes at room temperature. Diisopropyl ether was added to the reaction solution, and the precipitate was filtered out to obtain the title compound 18-4 (0.49 g) as a white solid.

<Step 3>

Synthesis of Alginic Acid Having Introduced 4-(2-aminoethoxy)-N-(3-azidopropyl) benzamido Group (EX18-A2)

[C156]

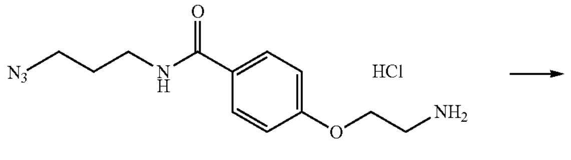

18-4

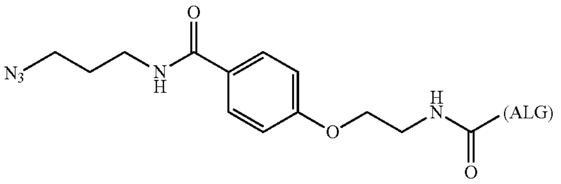

EX18-A2

The title compound EX18-A2 (198 mg) was obtained as a white solid by the same operations as in <Step 3-1> of (Example 11) using 19.6 mL of an aqueous solution of sodium alginate (MOCHIDA PHARMACEUTICAL CO., LTD.: A-2) adjusted to 1 wt %, 4-(4,6-dimethoxy-1,3,5-triazin-2-yl)-4-methylmorpholinium chloride (DMT-MM) (50.19 mg), the compound 18-4 (54.37 mg) obtained in <Step 2> of (Example 18), and 1-molar aqueous sodium bicarbonate solution (181.4 μL).

Example 19

Synthesis of Alginic Acid Having Introduced 3-amino-1-(11,12-didehydrodibenz[b,f]azocine-5-(6H)-yl)-1-propanone Group (EX19-A2)

[C157]

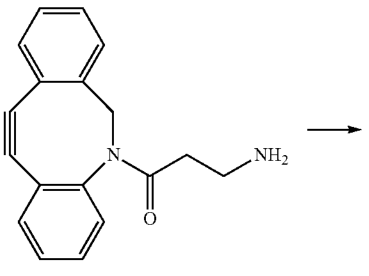

19-1

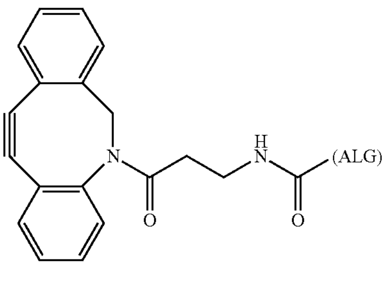

EX19-A2

The title compound EX19-A2 (376 mg) was obtained as a light-yellow solid by the same operations as in <Step 3-1> of (Example 11) using 43.6 mL of an aqueous solution of sodium alginate (MOCHIDA PHARMACEUTICAL CO., LTD.: A-2) adjusted to 1 wt %, 4-(4,6-dimethoxy-1,3,5-triazin-2-yl)-4-methylmorpholinium chloride (DMT-MM) (111.7 mg), 1-molar aqueous sodium bicarbonate solution (403.5 μL) and commercial 3-amino-1-(11,12-didehydrodibenz[b,f]azocine-5-(6H)-yl)-1-propanone [CAS Registry No. 1255942-06-3] (19-1, 83.6 mg).

Example 20

Synthesis of Alginic Acid Having Introduced N-(4-(aminomethyl)benzyl)-2-(cyclooct-2-yn-1-yloxy) acetamido Group (EX20-B2)

[C158]

EX20-B2

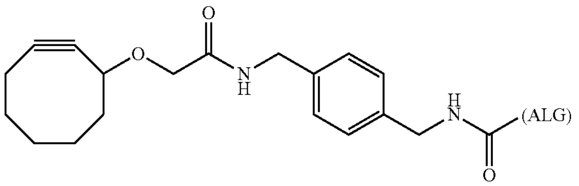

<Step 1>

Synthesis of tert-butyl (4-((2,2,2-trifluoroacetamido) methyl)benzyl)carbamate (Compound 20-2)

[C159]

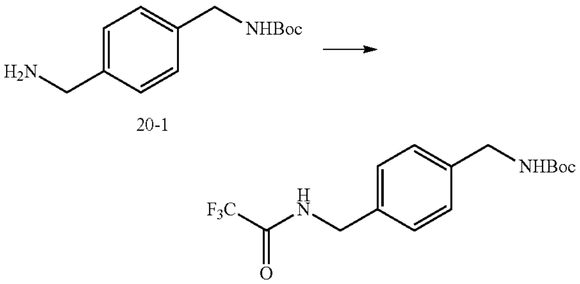

20-1

20-2

With reference to methods known in the literature (Bioorganic & Medicinal Chemistry (2003) 11: 4189-4206), ethyl trifluoroacetate (0.44 mL) was dipped under ice cooling and stirring into a mixture of triethylamine (0.39 mL), methanol (6.67 mL) and tert-butyl (4-(aminomethyl)benzyl) carbamate (20-1, 0.67 g) synthesized. The reaction mixture was warmed to room temperature and stirred for 5 hours at that temperature. The reaction was stopped with water (10 mL), and the mixture was extracted 3 times with ethyl acetate (10 mL). The collected organic layer was washed with brine (5 mL) and dried with anhydrous sodium sulfate, and the dried organic layer was filtered and then concentrated to obtain the title crude compound 20-2 (0.67 g) as a light-yellow amorphous substance.

<Step 2>

Synthesis of N-(4-(aminomethyl)benzyl)-2,2,2-trifluoroacetamide hydrochloride (Compound 20-3)

[C160]

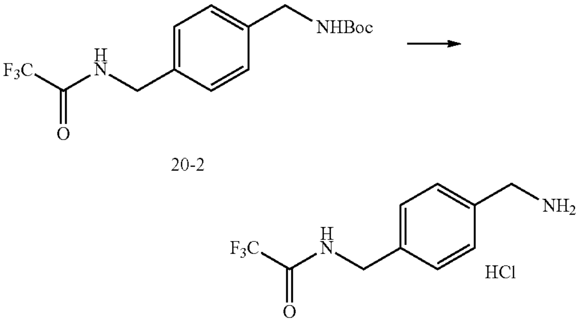

20-2

20-3

4N-hydrogen chloride/1,4-dioxane (3.5 mL) was added under water cooling and stirring to a 1,4-dioxane solution (3.5 mL) of the compound 20-2 (0.5 g) obtained in <Step 1> of (Example 20), and stirred for 3 hours at room temprature. Diisopropyl ether (40 mL) was added to the reaction solution, and the precipitate was filtered out to obtain the title compound 20-3 (0.4 g) as a white solid.

<Step 3>

Synthesis of N-(4-((2-(cyclooct-2-yn-1-yloxy)acetamido)methyl)benzyl)-2,2,2-trifluoroacetamide (Compound 20-4)

[C161]

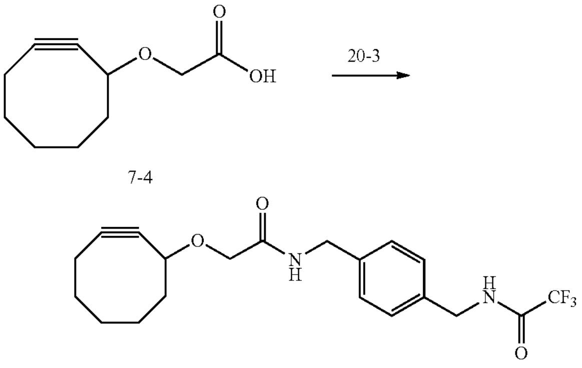

7-4

20-4

The compound 20-3 (0.26 g) obtained in <Step 2> of (Example 20) and N,N-diisopropylethylamine (0.51 mL) were dripped under ice-cooling and stirring into an acetonitrile (1.7 mL) solution of O-(7-azabenzotriazol-1-yl)-N,N,N',N'-tetramethyluronium hexafluorophosphate salt (0.26 g) and a carboxylic acid (7-4, 0.17 g) synthesized by methods known in the literature (Org. Process Res. Dev. (2018) 22: 108-110), and stirred for 1 hour and 30 minutes at room temperature. Water (5 mL) was added to stop the reaction, and the mixture was extracted 3 times with ethyl acetate (5 mL). The organic layer was washed with brine (3 mL) and dried with anhydrous sodium sulfate. The dried organic layer was filtered, and the solvent was distilled off under reduced pressure. The residue was purified by silica gel column chromatography (12% ethyl acetate/n-heptane to 100% ethyl acetate) to obtain the title compound 20-4 (0.19 g) as a white amorphous substance.

<Step 4>

Synthesis of N-(4-(aminomethyl)benzyl)-2-(cyclooct-2-yn-1-yloxy)acetamide (Compound 20-5)

[C162]

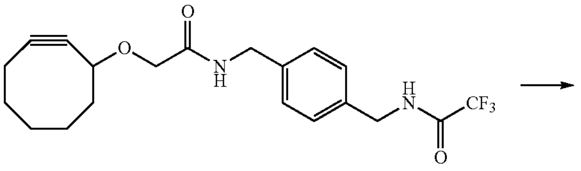

20-4

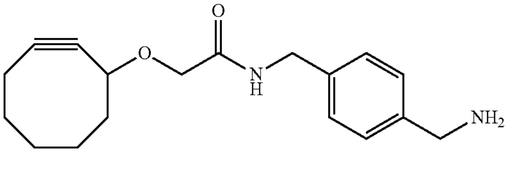

20-5

A potassium carbonate (0.13 g) aqueous solution (0.9 mL) was dripped under ice cooling and stirring into a mixture of the compound 20-4 (0.18 g) obtained in <Step 3> of (Example 20) and methanol (1.8 mL), and stirred for 17 hours and 30 minutes at room temperature. The methanol was distilled off under reduced pressure, and the mixture was extracted 3 times with ethyl acetate (5 mL). The organic layer was washed with brine (5 mL), and dried with anhydrous sodium sulfate. The organic layer was filtered and the solvent was distilled off under reduced pressure to obtain the title crude compound 20-5 (0.13 g) as a light yellow oily substance.

<Step 5>

Synthesis of Alginic Acid Having Introduced N-(4-(aminomethyl)benzyl)-2-(cyclooct-2-yn-1-yloxy) acetamido Group (EX20-B2)

[C163]

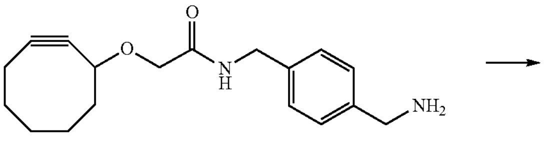

20-5

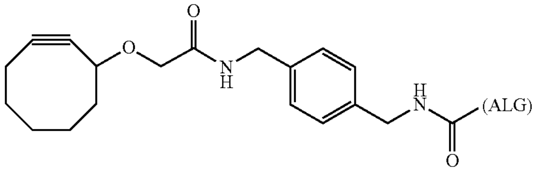

EX20-B2

The title compound EX20-B2 (521 mg) was obtained as a white solid by the same operations as in <Step 3-1> of (Example 11) using 50.9 mL of an aqueous solution of sodium alginate (MOCHIDA PHARMACEUTICAL CO., LTD.: B-2) adjusted to 1 wt %, 4-(4,6-dimethoxy-1,3,5-triazin-2-yl)-4-methylmorpholinium chloride (DMT-MM) (0.12 g) and an ethanol (3 mL) solution of the compound 20-5 (35 mg) obtained in <Step 4> of (Example 20).

Examples P1 to P7

The alginic acid derivatives of (Example P1) to (Example P7) in the table below are manufactured by the methods shown in the examples using the corresponding amino compounds (which may be pharmaceutically acceptable salts or solvates of these) and alginic acids.

TABLE 47

| Example | Alginic acid derivative | Corresponding amino compound |
|---|---|---|
| P1 | 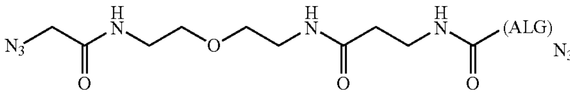 | 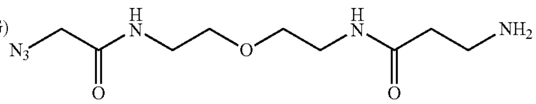 |
| P2 | 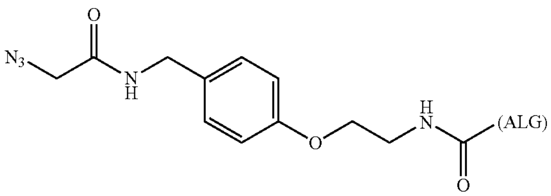 | 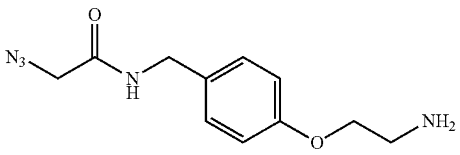 [SMILES: [N-]=[N+]=NCC(=O)NCc1ccc(OCCN)cc1] |

TABLE 47-continued

| Example | Alginic acid derivative | Corresponding amino compound |
|---|---|---|
| P3 | 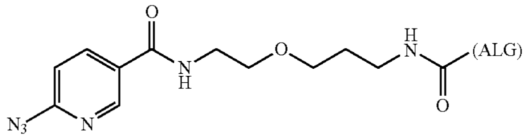 | 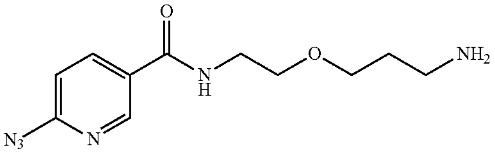 [SMILES: [N-]=[N+]=Nc1ccc(C(=O)NCCOCCCN)cn1] |
| P4 | 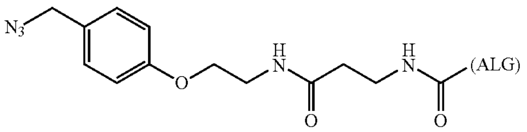 | 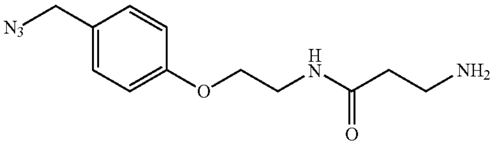 [SMILES: [N-]=[N+]=NCc1ccc(OCCNC(=O)CCN)cc1] |
| P5 | 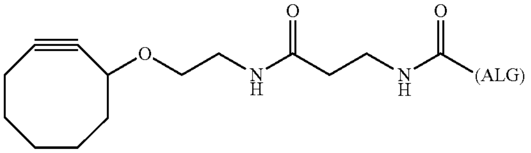 | 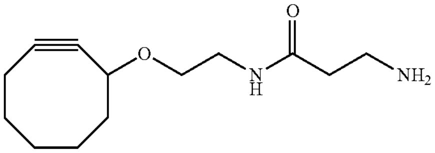 [SMILES: NCCC(=O)NCCOC1C#CCCCCC1] |
| P6 | 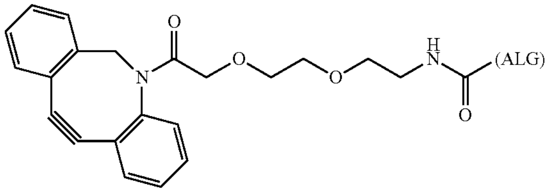 | 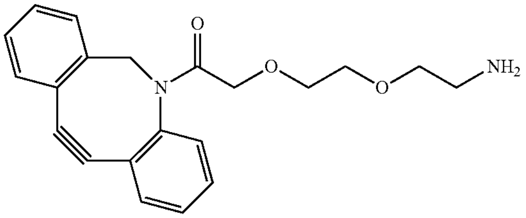 [SMILES: NCCOCCOCC(=O)N1Cc2ccccc2C#Cc2ccccc21] |
| P7 | 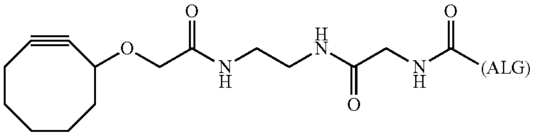 | 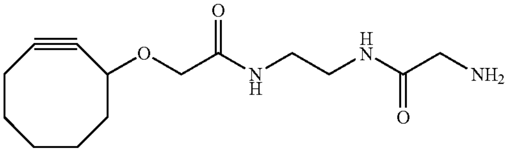 [SMILES: NCC(=O)NCCNC(=O)COC1C#CCCCCC1] |

Physical Property Data for Alginic Acid Derivatives

TABLE 48

| Compound | Measurement wavelength (nm) | Molecular weight (Da) | Weight-average molecular weight (Da) | Introduction rate of reactive group (mol %) (NMR integration ratio) |
|---|---|---|---|---|
| EX1-A2 | Differential refractometer | 14,000 to 2,660,000 | 1,370,000 | 3.2 |
| EX2-A2 | Differential refractometer | 22,000 to 2,760,000 | 1,480,000 | 3.1 |
| EX3-A2 | Differential refractometer | 12,000 to 2,490,000 | 1,340,000 | 4.9 |
| EX4-A2 | Differential refractometer | 13,000 to 2,610,000 | 1,350,000 | 4.0 |
| EX5-A2 | 220 | 7,000 to 2,650,000 | 1,420,000 | 3.6 |
| EX6-A2 | 250 | 7,000 to 2,730,000 | 1,410,000 | 4.7 |
| EX7-B2 | Differential refractometer | 13,000 to 2,590,000 | 1,790,000 | 4.2 |
| EX8-A2 | Differential refractometer | 13,000 to 3,640,000 | 1,400,000 | 3.2 |
| EX9a-A2 | Differential refractometer | 13,000 to 2,660,000 | 1,370,000 | 5.0 |
| EX9b-B2 | Differential refractometer | 17,000 to 2,540,000 | 1,380,000 | 2.4 |
| EX10-A2 | Differential refractometer | 14,000 to 2,720,000 | 1,370,000 | 4.3 |
| EX11a-A2 | Differential refractometer | 15,000 to 2,530,000 | 1,350,000 | 3.4 |
| EX11b-B2 | Differential refractometer | 14,000 to 2,580,000 | 1,360,000 | 2.8 |
| EX12-A2 | Differential refractometer | 13,000 to 2,700,000 | 1,360,000 | 3.6 |
| EX13-A2 | Differential refractometer | 13,000 to 2,580,000 | 1,350,000 | 4.4 |
| EX14a-A2 | 220 | 8,000 to 2,650,000 | 1,420,000 | 4.6 |
| EX14b-B2 | 220 | 5,000 to 2,680,000 | 1,400,000 | 4.1 |
| EX15-A2 | 290 | 1,000 to 2,690,000 | 1,260,000 | 4.3 |
| EX16-A2 | Differential refractometer | 13,000 to 2,660,000 | 1,350,000 | 3.5 |
| EX17-A2 | Differential refractometer | 13,000 to 2,530,000 | 1,350,000 | 4.4 |
| EX18-A2 | 255 | 15,000 to 2,520,000 | 1,520,000 | 6.1 |
| EX19-A2 | 280 | 12,000 to 2,640,000 | 1,530,000 | 6.9 |
| EX20-B2 | 215 | 19,000 to 2,830,000 | 1,380,000 | 4.5 |

NMR Data for Intermediate Compounds

TABLE 49-1

| Compound | NMR data (δ: ppm) |
|---|---|
| 3-2 | $CDCl_3$: 6.30(1H, brs), 5.07(1H, brs), 3.77(2H, d, J = 6 Hz), 3.40-3.35(4H, m), 1.84-1.77(2H, m), 1.46(9H, s) |
| 3-3 | DMSO-$d_6$: 8.47(1H, t, J = 5 Hz), 8.06(3H, brs), 3.52(2H, q, J = 6 Hz), 3.39(2H, t, J = 7 Hz), 3.18(2H, q, J = 6 Hz), 1.71-1.64(2H, m) |
| 4-2 | $CDCl_3$: 5.97(1H, brs), 5.12(1H, brs), 3.43-3.33(6H, m), 2.41(2H, t, J = 6 Hz), 1.83-1.76(2H, m), 1.44(9H, s) |
| 4-3 | DMSO-$d_6$: 8.23(1H, t, J = 6 Hz), 7.94(3H, brs), 3.36(2H, t, J = 7 Hz), 3.12(2H, q, J = 6 Hz), 3.01-2.92(2H, m), 2.47(2H, t, J = 7 Hz), 1.69-1.63(2H, m) |
| 5-2 | $CDCl_3$: 7.31-7.20(4H, m), 6.57(1H, brs), 4.84(1H, brs), 4.45(2H, d, J = 6 Hz), 4.30(2H, d, J = 6 Hz), 4.05(2H, s), 1.46(9H, s) |
| 5-3 | DMSO-$d_6$: 8.69(1H, t, J = 6 Hz), 8.20(3H, brs), 7.41(2H, d, J – 8 Hz), 7.30(2H, d, J = 8 Hz), 4.31(2H, d, J = 6 Hz), 4.04-3.96(2H, m), 3.90(2H, s) |
| 6-3 | $CDCl_3$: 6.95 (2H, d, J = 9 Hz), 6.87 (2H, d, J = 9 Hz), 4.97 (1H, brs), 3.99 (2H, t, J = 5 Hz), 3.52 (2H, q, J = 5 Hz), 1.45 (9H, s) |
| 6-4 | DMSO-$d_6$: 8.11 (3H, brs), 7.09 (2H, d, J = 9 Hz), 7.03 (2H, t, J = 9 Hz), 4.15 (2H, t, J = 5 Hz), 3.22-3.16 (2H, m) |
| 7-2 | $CDCl_3$: 7.80(1H, brs), 4.93(1H, brs), 3.45(2H, q, J = 5 Hz), 3.41-3.34(2H, m), 1.44(9H, s) |
| 7-3 | DMSO-$d_6$: 9.56(1H, brs), 8.00(3H, brs), 3.45(2H, d, J = 6 Hz), 2.95(2H, d, J = 6 Hz) |
| 7-5 | $CDCl_3$: 7.95(1H, brs), 6.95(1H, brs), 4.28-4.23(1H, m), 4.08(2H, d, J = 15 Hz), 3.91(1H, d, J = 15 Hz), 3.56-3.50(4H, m), 2.31-2.12(3H, m), 2.03-1.78(4H, m), 1.75-1.61(2H, m), 1.52-1.42(1H, m) |
| 7-6 | $CDCl_3$: 6.82(1H, brs), 4.28-4.22(1H, m), 4.06(1H, d, J = 15 Hz), 3.90(1H, d, J = 15 Hz), 3.40-3.31(2H, m), 2.86(2H, t, J = 6 Hz), 2.31-2.12(3H, m), 2.02-1.78(4H, m), 1.75-1.57(2H, m), 1.52-1.41(1H, m) |
| 8-2 | $CDCl_3$: 7.01(1H, brs), 4.84 (1H, brs), 3.62-3.51(6H, m), 3.31(2H, q, J = 5 Hz), 1.45(9H, s) |
| 8-3 | DMSO-$d_6$: 9.55(1H, brs), 8.05(3H, brs), 3.61(2H, t, J = 5 Hz), 3.54(2H, t, J = 6 Hz), 3.39(2H, q, J = 6 Hz), 3.00-2.91(2H, m) |
| 8-4 | DMSO-$d_6$: 9.45(1H, brs), 7.61(1H, t, J = 6 Hz), 4.29-4.25(1H, m), 3.87(2H, d, J = 15 Hz), 3.75(1H, d, J = 15 Hz), 3.50(2H, t, J = 6 Hz), 3.43(2H, t, J = 6 Hz), 3.37-3.31(2H, m), 3.24(2H, q, J = 6 Hz), 2.27-2.03(3H, m), 1.96-1.69(4H, m), 1.67-1.50(2H, m), 1.43-1.35(1H, m) |

TABLE 49-2

| Compound | NMR data (δ: ppm) |
|---|---|
| 8-5 | $CDCl_3$: 6.89(1H, brs), 4.27-4.22(1H, m), 4.07(1H, d, J = 15 Hz), 3.88(1H, d, J = 15 Hz), 3.58-3.47(6H, m), 2.87(2H, t, J = 5 Hz), 2.31-2.10(3H, m ), 2.03-1.77(4H, m), 1.73-1.59(2H, m), 1.51-1.43(1H, m) |
| 9-1 | DMSO-$d_6$: 9.39(1H, brs), 7.93(1H, brs), 6.92 (1H, t, J = 6 Hz), 3.49(2H, d, J = 6 Hz), 3.25-3.17(4H, m), 1.38(9H, s) |
| 9-2 | DMSO-$d_6$: 9.50(1H, brs), 8.54(1H, brs), 8.01(3H, brs), 3.49(2H, s), 3.28-3.24(4H, m) |
| 9-3 | DMSO-$d_6$: 9.41(1H, brs), 8.03(1H, t, J = 6 Hz), 7.78(1H, t, J = 6 Hz), 4.35-4.29(1H, m), 3.93(1H, d, J = 15 Hz), 3.79(1H, d, J = 15 Hz), 3.68(2H, dd, J = 6, 2 Hz), 3.27-3.16(4H, m), 2.28-2.05(3H, m), 1.99-1.69(4H, m), 1.65-1.54(2H, m), 1.46-1.36(1H, m) |

TABLE 49-2-continued

| Compound | NMR data (δ: ppm) |
|---|---|
| 9-4 | DMSO-$d_6$: 7.83(1H, t, J = 6 Hz), 7.78(1H, t, J = 6 Hz), 4.33-4.29(1H, m), 3.92(1H, d, J = 15 Hz), 3.79(1H, d, J = 15 Hz), 3.69(2H, dd, J = 6, 2 Hz), 3.05(2H, q, J = 6 Hz), 2.55(2H, t, J = 6 Hz), 2.28-2.05(3H, m), 1.99-1.69(4H, m), 1.63-1.56(2H, m), 1.46-1.36(1H, m) |
| 10-1 | DMSO-$d_6$: 9.39(1H, t, J = 5 Hz), 8.00(1H, t, J = 6 Hz), 6.74(1H, t, J = 6 Hz), 3.21(2H, t, J = 6 Hz), 3.17(2H, t, J = 6 Hz), 3.14-3.07 (2H, m), 2.20(2H, t, J = 7 Hz), 1.37(9H, s) |
| 10-2 | DMSO-$d_6$: 9.47(1H, brs), 8.27(1H, t, J = 6 Hz), 7.74(3H, brs), 3.27-3.17(4H, m), 2.96(2H, t, J = 7 Hz), 2.43(2H, t, J = 7 Hz) |
| 10-3 | DMSO-$d_6$: 9.40(1H, t, J = 5 Hz), 8.04(1H, t, J = 6 Hz), 7.68(1H, t, J = 6 Hz), 4.29-4.23(1H, m), 3.85(1H, d, J = 15 Hz), 3.73(1H, d, J = 15 Hz), 3.32-3.13(6H, m), 2.25(2H, t, J = 7 Hz), 2.23-2.03(3H, m), 1.95-1.70(4H, m), 1.66-1.50(2H, m), 1.43-1.35(1H, m) |
| 10-4 | DMSO-$d_6$: 7.85(1H, t, J = 6 Hz), 7.68(1H, t, J = 6 Hz), 4.30-4.25(1H, m), 3.86(1H, d, J = 15 Hz), 3.74(1H, d, J = 15 Hz), 3.32-3.25(2H, m), 3.04(2H, q, J = 6 Hz), 2.55(2H, t, J = 6 Hz), 2.27(2H, t, J = 7 Hz), 2.25-2.04(3H, m), 1.96-1.71(4H, m), 1.67-1.51(2H, m), 1.45-1.35(1H, m) |
| 11-4 | $CDCl_3$: 4.20-4.16(1H, m), 3.61-3.56(1H, m), 3.38-3.33(1H, m), 2.88-2.82(2H, m), 2.30-2.09(3H, m), 2.01-1.41(7H, m) |
| 12-2 | $CDCl_3$: 7.28(1H, brs), 3.80-3.75(2H, m), 3.66-3.56(6H, m), 2.42(1H, brs) |
| 12-3 | $CDCl_3$: 7.04(1H, brs), 6.20(1H, dd, J = 11, 4 Hz), 3.90(1H, dd, J = 10, 5 Hz), 3.71-3.55(7H, m), 3.51-3.44(1H, m), 2.80-2.69(1H, m), 2.34-2.27(1H, m), 2.09-1.82(4H, m), 1.79-1.67(1H, m), 1.55-1.44(1H, m), 1.35-1.23(1H, m), 0.87-0.76(1H, m) |

TABLE 49-3

| Compound | NMR data (δ: ppm) |
|---|---|
| 12-4 | $CDCl_3$: 7.04(1H, brs), 4.24-4.19(1H, m), 3.75-3.68(1H, m), 3.67-3.61(4H, m), 3.58-3.49(3H, m), 2.30-2.11(3H, m), 2.00-1.66(5H, m), 1.63-1.54(1H, m), 1.47-1.38(1H, m) |
| 12-5 | $CDCl_3$: 4.25-4.21(1H, m), 3.76-3.70(1H, m), 3.64-3.61(2H, m), 3.55-3.49(3H, m), 2.87(2H, t, J = 5 Hz), 2.30-2.10(3H, m), 2.02-1.55(6H, m), 1.47-1.38(1H, m) |
| 13-2 | DMSO-$d_6$: 12.30(1H, brs), 9.47(1H, brs), 3.37((2H, q, J = 7 Hz), 2.49(2H, t, J = 7 Hz) |
| 13-3 | $CDCl_3$: 7.73(1H, brs), 6.40(1H, brs), 4.86 (1H, brs), 3.64(2H, q, J = 6 Hz), 3.56-3.50(4H, m), 3.47-3.43(2H, m), 3.30(2H, q, J = 5 Hz), 2.53-2.50(2H, m), 1.45(9H, s) |
| 13-4 | DMSO-$d_6$: 9.50(1H, t, J = 5 Hz), 8.15(1H, t, J = 6 Hz), 8.01(3H, brs), 3.58((2H, t, J = 5 Hz), 3.43(2H, t, J = 6 Hz), 3.38(2H, q, J = 7 Hz), 3.24(2H, q, J = 6 Hz), 3.00-2.92(2H, m), 2.39(2H, t, J = 7 Hz) |
| 13-5 | $CDCl_3$: 7.80(1H, brs), 6.80(1H, brs), 6.58(1H, brs), 4.29-4.23(1H, m), 4.06(1H, d, J = 15 Hz), 3.89(1H, d, J = 15 Hz), 3.64(2H, q, J = 6 Hz), 3.60-3.55(4H, m), 3.52-3.46(2H, m), 3.44(2H, q, J = 5 Hz), 2.52(2H, t, J = 6 Hz), 2.31-2.11(3H, m), 2.02-1.78(4H, m), 1.76-1.61(2H, m), 1.51-1.42(1H, m) |

TABLE 49-3-continued

| Compound | NMR data (δ: ppm) |
|---|---|
| 13-6 | $CDCl_3$: 7.33(1H, brs), 6.82(1H, brs), 4.28-4.23 (1H, m), 4.06(1H, d, J = 15 Hz), 3.90(1H, d, J = 15 Hz), 3.56(4H, t, J = 5 Hz), 3.51-3.44 (4H, m), 3.01(2H, t, J = 6 Hz), 2.35(2H, t, J = 6 Hz), 2.31-2.12(3H, m), 2.02-1.79(4H, m), 1.77-1.60(2H, m), 1.50-1.42(1H, m) |
| 14-2 | $CDCl_3$: 6.66(1H, brs), 3.80(2H, q, J = 6 Hz), 3.53(2H, t, J = 6 Hz) |
| 14-4 | $CDCl_3$: 7.22(2H, d, J = 8 Hz), 6.85(2H, d, J = 8 Hz), 6.74(1H, brs), 4.79(1H, brs), 4.25(2H, d, J = 6 Hz), 4.09(2H, t, J = 5 Hz), 3.78(2H, q, J = 5 Hz), 1.46(9H, s). |
| 14-5 | DMSO-$d_6$: 9.67(1H, brs), 8.14(3H, brs), 7.38 (2H, d, J = 9 Hz), 6.98(2H, d, J = 9 Hz), 4.10(2H, t, J = 6 Hz), 3.94(2H, brs), 3.57 (2H, q, J = 6 Hz) |
| 14-6 | $CDCl_3$: 7.23(2H, d, J = 9 Hz), 6.94(1H, brs), 6.85(2H, d, J = 9 Hz), 6.80-6.77(1H, m), 4.42(2H, d, J = 6 Hz), 4.25-4.21(1H, m), 4.11-4.05(3H, m), 3.92(1H, d, J = 15 Hz), 3.78(2H, q, J = 5 Hz), 2.28-2.05(3H, m), 1.99-1.55(6H, m), 1.48-1.39(1H, m) |
| 14-7 | $CDCl_3$: 7.22(2H, d, J = 9 Hz), 6.87(2H, d, J = 9 Hz), 6.75(1H, brs), 4.42(2H, d, J = 6 Hz), 4.25-4.20(1H, m), 4.10(1H, d, J = 15 Hz), 4.03-3.90(3H, m), 3.08(2H, t, J = 5 Hz), 2.28-2.07(3H, m), 1.99-1.55(6H, m), 1.48-1.40(1H, m) |

TABLE 49-4

| Compound | NMR data (δ: ppm) |
|---|---|
| 15-2 | DMSO-$d_6$: 7.88(2H, d, J = 8 Hz), 7.73-7.66 (3H, m), 7.61-7.57(2H, m), 7.50-7.29(11H, m), 5.02(1H, d, J = 14 Hz), 4.29-4.18(3H, m), 3.62(1H, d, J = 14 Hz), 3.46(2H, d, J = 6 Hz), 3.18-3.08(1H, m), 3.02-2.89(1H, m), 2.47-2.39(1H, m), 1.85-1.74(1H, m) |
| 15-3 | DMSO-$d_6$: 7.73(1H, brs), 7.64-7.58(2H, m), 7.51-7.29(6H, m), 5.04(1H, d, J = 14 Hz), 3.63(1H, d, J = 14 Hz), 3.18-3.06(1H, m), 3.04-2.95(1H, m), 2.95(2H, s), 2.47-2.39(1H, m), 1.87-1.78(1H, m) |
| 16-2 | $CDCl_3$: 6.80(1H, brs), 4.21(2H, d, J = 5 Hz). |
| 16-3 | $CDCl_3$: 6.03(1H, brs), 4.20-4.16(1H, m), 4.05-4.01(2H, m), 3.64-3.60(1H, m), 3.54-3.44(3H, m), 2.29-2.09(3H, m), 1.98-1.67(6H, m), 1.48-1.40(1H, m) |
| 16-4 | $CDCl_3$: 7.43(1H, brs), 4.21-4.17(1H, m), 3.66-3.62(1H, m), 3.55-3.41(3H, m), 3.36(2H, s), 2.30-2.08(3H, m), 2.01-1.77(4H, m), 1.72-1.59(2H, m), 1.50-1.42(1H, m) |
| 17-2 | $CDCl_3$: 7.35-7.28(3H, m), 7.14-7.12(2H, m), 6.69(1H, d, J = 7 Hz), 4.96-4.91(1H, m), 4.64(1H, brs), 3.31(1H, dd, J = 14, 6 Hz), 3.22(1H, dd, J = 14, 6 Hz) |
| 17-3 | $CDCl_3$: 7.35-7.26(4H, m), 7.22-7.20(2H, m), 5.71-5.63(1H, m), 4.59-4.53(1H, m), 4.11-3.99(1H, m), 3.54-3.14(5H, m), 3.07-2.96 (1H, m), 2.27-2.12(2H, m), 2.10-1.64(6H, m), 1.60-1.55(1H, m), 1.46-1.37(1H, m) |
| 17-4 | $CDCl_3$: 7.51-7.47(1H, m), 7.33-7.30(2H, m), 7.24-7.21(3H, m), 4.17-4.13(1H, m), 3.63-3.58(2H, m), 3.51-3.38(3H, m), 3.30-3.25 (1H, m), 2.71-2.65(1H, m), 2.29-2.05(3H, m), 1.98-1.76(4H, m), 1.70-1.41(3H, m) |
| 18-2 | $CDCl_3$: 7.98 (2H, d, J = 9 Hz), 6.90 (2H, d, J = 9 Hz), 4.97 (1H, brs), 4.07 (2H, t, J = 5 Hz), 3.88 (3H, s), 3.56 (2H, q, J = 5 Hz), 1.45 (9H, s) |
| 18-4 | $D_2O$: 7.60 (2H, d, J = 9 Hz), 6.93 (2H, d, J = 9 Hz), 4.19 (2H, t, J = 5 Hz), 3.31-3.29 (6H, m), 1.77-1.71 (2H, m) |

TABLE 49-5

| Compound | NMR data (δ: ppm) |
|---|---|
| 20-2 | $CDCl_3$: 7.29 (2H, d, J = 8 Hz), 7.25 (2H, d, J = 8 Hz), 6.51 (1H, br s), 4.86 (1H, brs), 4.51 (2H, d, J = 5 Hz), 4.31 (2H, d, J = 6 Hz), 1.46 (9H, s) |
| 20-3 | $D_2O$: 7.29 (2H, d, J = 8 Hz), 7.25 (2H, d, J = 8 Hz), 4.38 (2H, s), 4.02 (2H, s) |
| 20-4 | $CDCl_3$: 7.31 (2H, d, J = 8 Hz), 7.26 (2H, d, J = 8 Hz), 6.84 (1H, brs), 6.52 (1H, brs), 4.52 (2H, d, J = 6 Hz), 4.49 (2H, d, J = 6 Hz), 4.26-4.23 (1H, m), 4.11 (1H, d, J = 15 Hz), 3.94 (1H, d, J = 15 Hz), 2.26-2.09 (3H, m), 2.00-1.58 (6H, m), 1.48-1.44 (1H, m) |
| 20-5 | $CDCl_3$: 7.31-7.26 (4H, m), 6.80 (1H, brs), 4.48 (2H, d, J = 6 Hz), 4.26-4.21 (1H, m), 4.11 (1H, d, J = 15 Hz), 3.93 (1H, d, J = 15 Hz), 3.86 (2H, s), 2.28-2.07 (3H, m), 1.99-1.40 (7H, m) |

LC-Mass Data for Intermediate Compounds

TABLE 50

| Compound | MS-ESI (m/z) $[M + H]^+$ | Retention time (minutes) |
|---|---|---|
| 6-3 | 279 | 1.13 |
| 6-4 | 179 | 0.63 |
| 8-5 | 269 | 0.60 |
| 9-3 | 378 | 0.84 |
| 9-4 | 282 | 0.62 |
| 10-3 | 392, *414 | 0.83 |
| 10-4 | 296 | 0.62 |
| 12-2 | *410, *412 | 1.15 |
| 12-3 | *330 | 1.03 |
| 13-5 | 436, *458 | 0.82 |
| 13-6 | 340 | 0.64 |
| 14-5 | *285 | 0.59 |
| 14-6 | 427 | 1.02 |
| 14-7 | 331 | 0.72 |
| 15-3 | 334, *356 | 0.74 |
| 16-3 | *343 | 0.90 |
| 17-3 | 411 | 1.10 |
| 17-4 | 315 | 0.77 |
| 18-4 | 264 | 0.54 |
| 20-2 | *355 | 0.97 |
| 20-3 | 233 | 0.53 |
| 20-4 | 397 | 0.99 |
| 20-5 | 301 | 0.68 |

*[M + Na]

[Measuring Introduction Rate of Reactive Group or Complementary Reactive Group]

The introduction rate of the reactive group or complementary reactive group is a percentage value representing the number of introduced reactive groups or complementary reactive groups relative to the total uronic acid monosaccharidxe units that are repeating units of the alginic acid.

In these examples, the introduction rate of the reactive group or complementary reactive group (mol %) is calculated based on the $^1$H-NMR integration ratio. An amount of alginic acid necessary for calculating the introduction rate is measured by the carbazole-sulfuric acid method using a calibration curve, and the amount of the reactive group or complementary reactive group is measured by the absorbance measurement method using a calibration curve.

[Molecular Weight Measurement]

The alginic acid solids having introduced reactive groups or complementary reactive groups obtained in the examples were each dissolved in 10 mmol/L phosphate buffer, (pH 7.4) containing 0.15 mol/L NaCl to prepare 0.1% or 0.2% solutions, which were then passed through a polyether sulfone filter (Minisart High Flow Filter, Sartorius) with a pore size of 0.22 microns to remove insoluble matter, after which samples for gel filtration were prepared. The spectrum of each sample was measured with a DU-800 spectrophotometer (Beckman-Coulter), and the measurement wavelength for each compound in gel filtration was determined. A differential refractometer was used for compounds lacking characteristic absorption wavelengths.

200 μL of each sample for gel filtration was supplied to a Superose 6 Increase 10/300 GL column (GE Health Care Sciences). Gel filtration was performed at room temperature at a flow rate of 0.8 mL/min using an AKTA Explorer 10S as the chromatograph unit and 10 mmol/L phosphate buffer, (pH 7.4) containing 0.15 mol/L NaCl as the developing solvent. An elution profile was prepared for each sample by monitoring absorbance at the wavelength determined for that compound. The resulting chromatogram was analyzed with Unicorn 5.31 software (GE Health Care Sciences) to determine the peak range.

To determine the molecular weights of the alginic acids having introduced reactive groups or complementary reactive groups, gel filtration was performed using blue dextran (molecular weight 2,000,000 Da, SIGMA), thyroglobulin (molecular weight 669,000 Da, GE Health Care Sciences), ferritin (molecular weight 440,000 Da, GE Health Care Sciences), aldolase (molecular weight 158,000 Da, GE Health Care Sciences), conalbumin (molecular weight 75,000 Da, GE Health Care Sciences), ovalbumin (molecular weight 44,000 Da, GE health Care Sciences), ribonuclease A (molecular weight 13,700 Da, GE Health Care Sciences) and aprotinin (molecular weight 6,500 Da, GE Health Care Sciences) as standard substances under the same conditions used for the alginic acids having introduced reactive groups or complementary reactive groups, and the elution volume of each component was determined with Unicorn software. The elution volume of each component was plotted on the horizontal axis and the logarithm of the molecular weight on the vertical axis, and a calibration curve was prepared by linear regression. Two curves were prepared, one for blue dextran to ferritin and one for ferritin to aprotinin.

The calibration curves were used to calculate the molecular weight (Mi) at elution time i in the chromatogram obtained above. Absorbance at elution time i was then read and given as Hi. The weight-average molecular weight (Mw) was determined by the following formula from these data.

$$Mw = \frac{\sum_{i=1}^{\infty}\left(H^{i \times Mi}\right)}{\sum_{i=1}^{\infty} Hi}$$ [Math. 1]

[Measuring Gel Stability]

(Gel Stability Measurement (1)): Stability in PBS

The alginic acid derivatives (Ex1-A2), (Ex4-A2), (Ex5-A2) and (Ex19-A2) obtained in Examples 1, 4, 5 and 19 were each dissolved in water to a concentration of 1.0% to obtain aqueous alginic acid solutions (1-1), (4-1), (5-1) and (19-1). (1-1) was combined with (19-1), (4-1) with (19-1) and (5-1) with (19-1) in equal amounts, each combination was filled in a syringe equipped with an 18-gauge needle, the syringe was attached to a syringe pump set to a flow rate of 1 mL/minute, and the mixture was dripped for 30 seconds into a 30 mmol/L calcium chloride solution and stirred for 5 minutes to obtain an alginic acid gel. This gel was washed once with 10 mL of PBS and left standing for 10 minutes at 37° C. in PBS to perform a crosslinking reaction and obtain a chemically crosslinked alginic acid gel. A crosslinked alginic acid gel (beads) using (Ex18-A2)/(Ex19-A2) was also prepared in the same way. 19.5 mL of PBS was added to this gel and shaken at 37° C., the aqueous solution was collected over time, and the gel was replenished with PBS in the same amount as the collected amount. After completion of testing, 10 μL of alginate lyase (Nippon Gene, 319-08261) was added to the test solution, which was then shaken for at least 3 hours at 37° C. to completely collapse the gel, and the aqueous solution was collected. The alginic acid concentration in the collected aqueous solution was measured by the carbazole-sulfuric acid method, the eluted amount of alginic acid at each point in time was divided by the total amount of alginic acid as calculated from the alginic acid concentration at all time points and the alginic acid concentration after completion of testing, and the resulting value represented as a percentage was given as the collapse rate and used as an indicator of gel stability.

The results of FIG. 1 were obtained. The crosslinked alginic acid gel (beads) did not collapse even after 96 hours, confirming gel stability. That is, this suggests that the prepared structure (beads) maintains its structure over a long period of time due to chemical crosslinking formed by a Huisgen reaction. The crosslinked alginic acid gel (beads) prepared with (Ex18-A2)/(Ex19-A2) is the control in this test.

(Measuring Gel Stability (2)): Stability with EDTA

The alginic acid aqueous solutions obtained in (measuring gel stability (1)) were mixed in equal amounts combining (1-1) with (19-1), (4-1) with (19-1) and (5-1) with (19-1), each combination was filled in a syringe equipped with an 18-gauge needle, the syringe was attached to a syringe pump set to a flow rate of 1 mL/minute, and the mixture was dripped for 30 seconds into a 30 mmol/L calcium chloride solution and stirred for 5 minutes to obtain an alginic acid gel. A crosslinked alginic acid gel (beads) using (Ex18-A2)/(Ex19-A2) was also prepared in the same way. This gel was washed once with 10 mL of saline and left standing for 10 minutes in saline at 37° C. to obtain a chemically crosslinked alginic acid gel. 19.5 mL of 5 mM ethylenediamine tetraacetic acid dipotassium salt dihydrate (EDTA·2K)/saline solution was added to this gel and shaken at 37° C., the aqueous solution was collected over time, and the gel was replenished with 5 mM EDTA 2K/saline solution in the same amount as the collected amount. After completion of testing, 10 μL of alginate lyase (Nippon Gene, 319-08261) was added to the test solution, which was then shaken for at least 3 hours at 37° C. to completely collapse the gel, and the aqueous solution was collected. The alginic acid concentration in the collected aqueous solution was measured by the carbazole-sulfuric acid method, the eluted amount of alginic acid at each point in time was divided by the total amount of alginic acid as calculated from the alginic acid concentration at all time points and the alginic acid concentration after completion of testing, and the resulting value represented as a percentage was given as the collapse rate and used as an indicator of gel stability.

Figure 2:
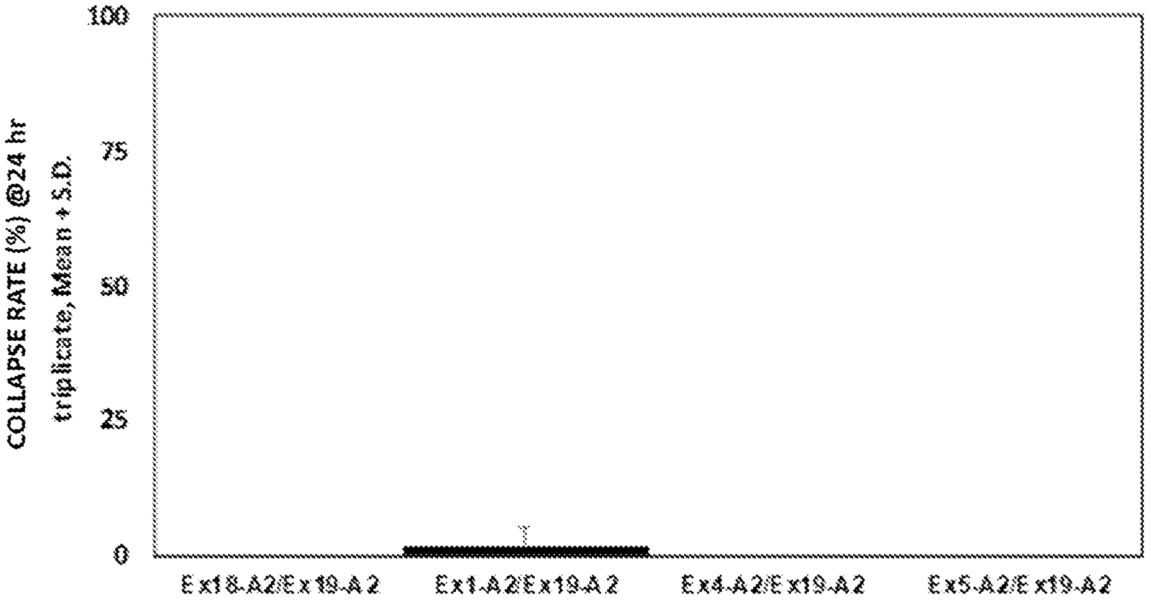
FIG. 2 shows an evaluation of the stability of gels of crosslinked alginic acid structures in the presence of EDTA.

The results are shown in FIG. 2. The crosslinked alginic acid gel (beads) had a collapse rate of not more than 2% even after 24 hours. This suggests that the prepared structure maintained its structure over a long period of time even in a solution containing no calcium ions (not more than physiological concentration in vivo) due to crosslink formation by a Huisgen reaction. The crosslinked alginic acid gel (beads) prepared with (Ex18-A2)/(Ex19-A2) is the control in this test.

(Measuring Gel Stability (3)): Stability in PBS

The alginic acid derivatives (Ex3-A2), (Ex5-A2), (Ex6-A2), (Ex9a-A2), (Ex10-A2), (Ex12-A2) and (Ex18-A2) obtained in Examples 3, 5, 6, 9, 10, 12 and 18 were each dissolved in water to a concentration of 1.0% to obtain the respective alginic acid aqueous solutions (3-1), (5-1), (6-1), (9-1), (10-1), (12-1) and (18-1). (6-1) was combined with (9-1), (3-1) with (10-1), (5-1) with (10-1) and (18-1) with (12-1) in equal amounts, each combination was filled in a syringe equipped with an 18-gauge needle, the syringe was attached to a syringe pump set to a flow rate of 1 mL/minute, and the mixture was dripped for 30 seconds into a 30 mmol/L calcium chloride solution and stirred for 5 minutes to obtain an alginic acid gel. This gel was washed once with 10 mL of PBS and left standing for 10 minutes at 37° C. in PBS to perform a crosslinking reaction and obtain a chemically crosslinked alginic acid gel. A crosslinked alginic acid gel (beads) using (Ex18-A2)/(Ex19-A2) was also prepared in the same way. 19.5 mL of PBS was added to this gel and shaken at 37° C., the aqueous solution was collected over time, and the gel was replenished with PBS in the same amount as the collected amount. After completion of testing, 10 μL of alginate lyase (Nippon Gene, 319-08261) was added to the test solution, which was then shaken for at least 3 hours at 37° C. to completely collapse the gel, and the aqueous solution was collected. The alginic acid concentration in the collected aqueous solution was measured by the carbazole-sulfuric acid method, the eluted amount of alginic acid at each point in time was divided by the total amount of alginic acid as calculated from the alginic acid concentration at all time points and the alginic acid concentration after completion of testing, and the resulting value represented as a percentage was given as the collapse rate and used as an indicator of gel stability.

Figure 3:
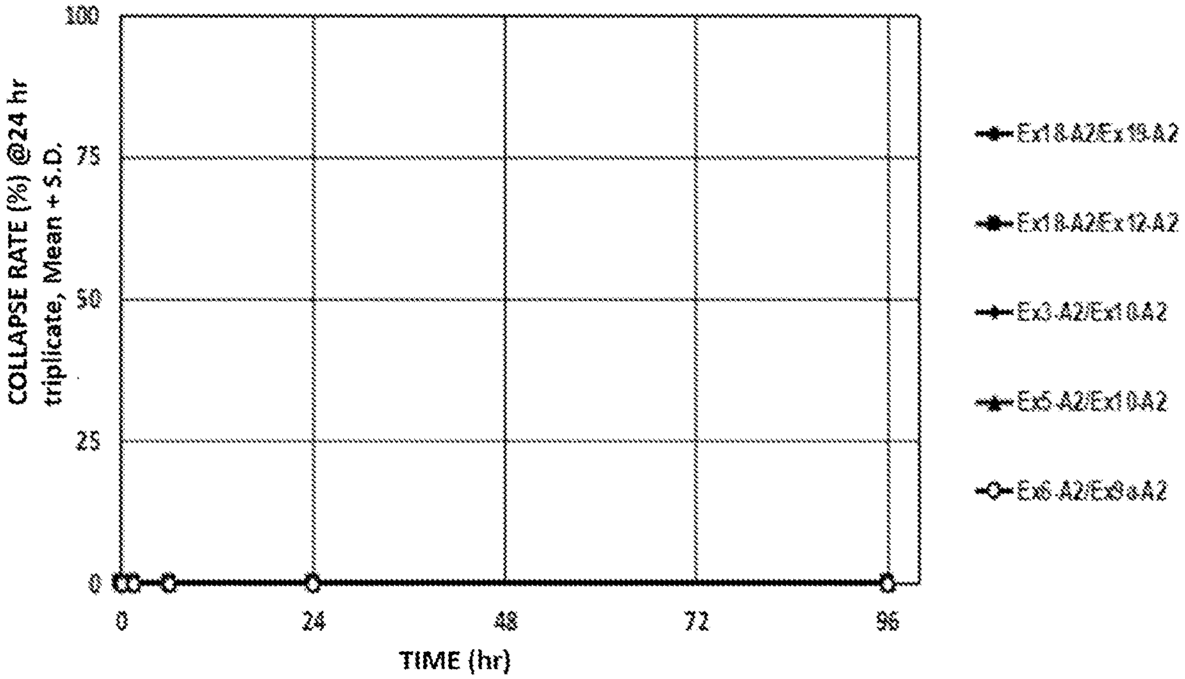
FIG. 3 shows an evaluation of the stability of gels of crosslinked alginic acid structures.

The results are shown in FIG. 3. The crosslinked alginic acid (beads) did not collapse even after 96 hours, confirming gel stability. This suggests that the prepared structure (beads) maintains its structure over a long period of time due to crosslink formation by a Huisgen reaction. The crosslinked alginic acid gel (beads) prepared with (Ex18-A2)/(Ex19-A2) is the control in this test.

(Measuring Gel Stability (4)): Stability with EDTA

The alginic acid aqueous solutions obtained in (measuring gel stability (3)) were mixed in equal amounts combining (6-1) with (9-1), (3-1) with (10-1), (5-1) with (10-1) and (18-1) with (12-1), each combination was filled in a syringe equipped with an 18-gauge needle, the syringe was attached to a syringe pump set to a flow rate of 1 mL/minute, and the mixture was dripped for 30 seconds into a 30 mmol/L calcium chloride solution and stirred for 5 minutes to obtain an alginic acid gel. This gel was washed once with 10 mL of saline and left standing for 10 minutes at 37° C. in saline to perform a crosslinking reaction and obtain a chemically crosslinked alginic acid gel. A crosslinked alginic acid gel (beads) using (Ex18-A2)/(Ex19-A2) was also prepared in the same way. 19.5 mL of 5 mM ethylenediamine tetraacetic acid dipotassium salt dihydrate (EDTA 2K)/saline solution was added to this gel and shaken at 37° C., the aqueous solution was collected over time, and the gel was replenished with 5 mM EDTA 2K/saline solution in the same amount as the collected amount. After completion of testing, 10 μL of alginate lyase (Nippon Gene, 319-08261) was added to the test solution, which was then shaken for at least 3 hours at 37° C. to completely collapse the gel, and the aqueous solution was collected. The alginic acid concentration in the collected aqueous solution was measured by the carbazole-sulfuric acid method, the eluted amount of alginic acid at each point in time was divided by the total amount of alginic acid as calculated from the alginic acid concentration at all time points and the alginic acid concentration after completion of testing, and the resulting value represented as a percentage was given as the collapse rate and used as an indicator of gel stability.

Figure 4:
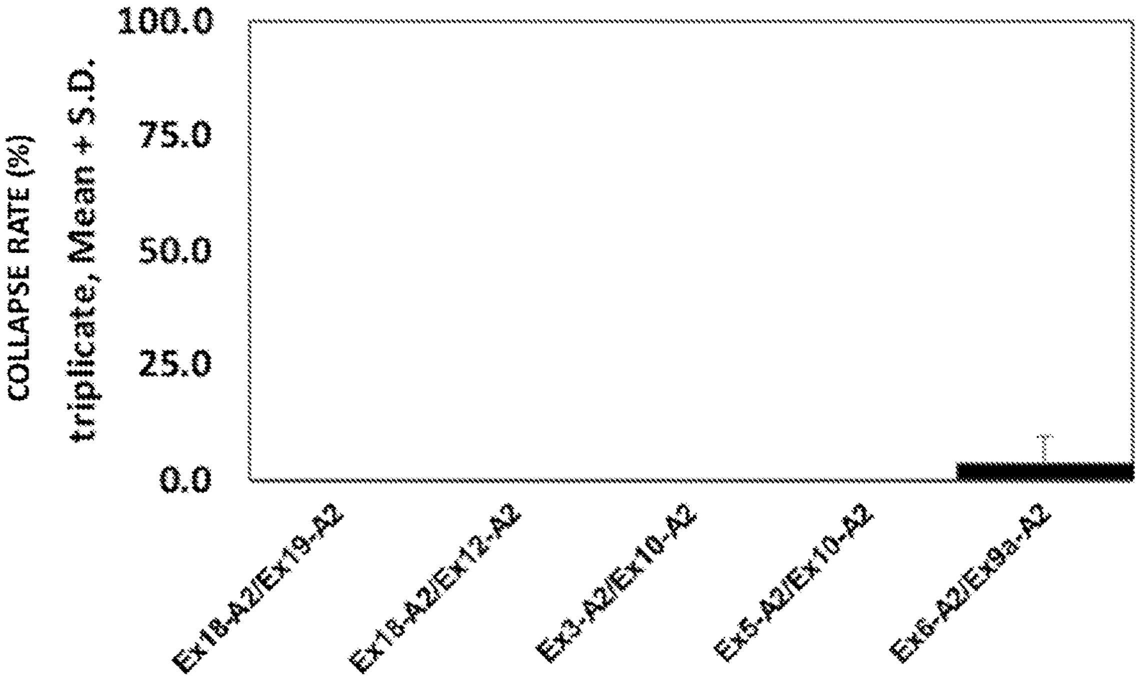
FIG. 4 shows an evaluation of the stability of gels of crosslinked alginic acid structures in the presence of EDTA.

The results are shown in FIG. 4. The crosslinked alginic acid gel (beads) had a collapse rate of not more than 4% even after 24 hours. This suggests that the prepared structure (beads) maintained its structure over a long period of time even in a solution containing no calcium ions (not more than physiological concentration in vivo) due to crosslink formation by a Huisgen reaction. The crosslinked alginic acid gel (beads) prepared with (Ex18-A2)/(Ex19-A2) is the control in this test.

(Measuring Gel Stability (5)): Stability in PBS)

The alginic acid derivatives (Ex4-A2), (Ex9a-A2), (Ex16-A2), (Ex18-A2) and (Ex20-B2) obtained in Examples 4, 9, 16, 18 and 20) were each dissolved in water to a concentration of 1.0% to obtain the respective alginic acid aqueous solutions (4-1), (9-1), (16-1), (18-1) and (20-1). (4-1) was combined with (20-1), (18-1) with (9-1) and (18-1) with (16-1) in equal amounts, each combination was filled in a syringe equipped with an 18-gauge needle, the syringe was attached to a syringe pump set to a flow rate of 1 mL/minute, and the mixture was dripped for 30 seconds into a 30 mmol/L calcium chloride solution and stirred for 5 minutes to obtain an alginic acid gel. This gel was washed once with 10 mL of PBS and left standing for 10 minutes at 37° C. in PBS to perform a crosslinking reaction and obtain a chemically crosslinked alginic acid gel. A crosslinked alginic acid gel (beads) using (Ex18-A2)/(Ex19-A2) was also prepared in the same way. 19.5 mL of PBS was added to this gel and shaken at 37° C., the aqueous solution was collected over time, and the gel was replenished with PBS in the same amount as the collected amount. After completion of testing, 10 μL of alginate lyase (Nippon Gene, 319-08261) was added to the test solution, which was then shaken for at least 3 hours at 37° C. to completely collapse the gel, and the aqueous solution was collected. The alginic acid concentration in the collected aqueous solution was measured by the carbazole-sulfuric acid method, the eluted amount of alginic acid at each point in time was divided by the total amount of alginic acid as calculated from the alginic acid concentration at all time points and the alginic acid concentration after completion of testing, and the resulting value represented as a percentage was given as the collapse rate and used as an indicator of gel stability.

Figure 5:
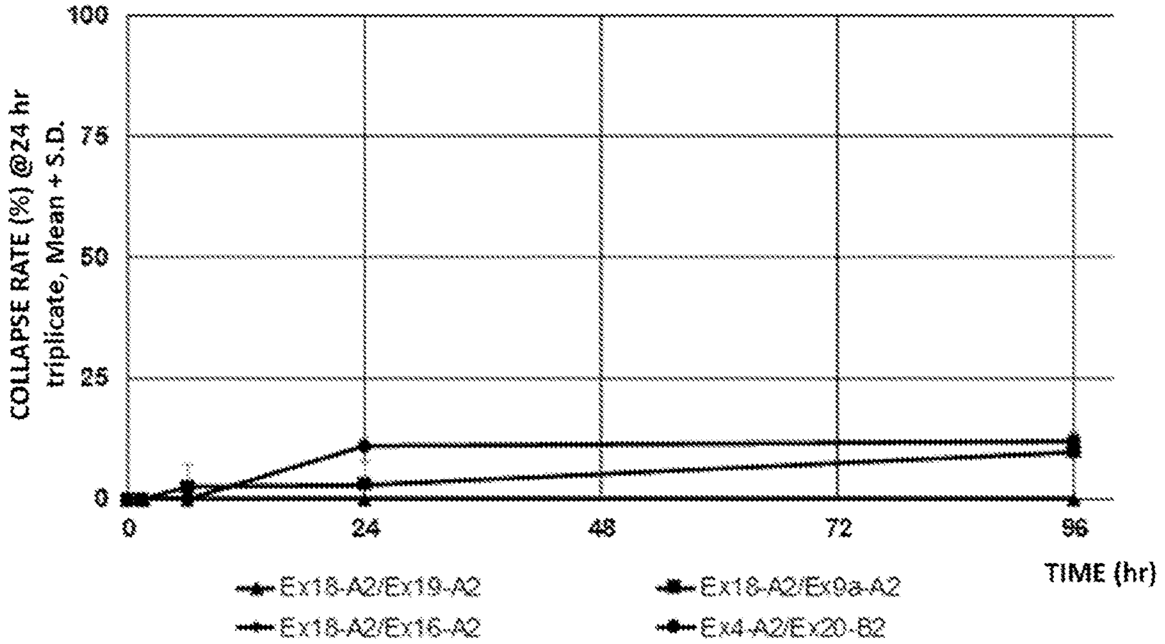
FIG. 5 shows an evaluation of the stability of gels of crosslinked alginic acid structures.

The results are shown in FIG. 5. The crosslinked alginic acids prepared by this method had a collapse rate of not more than about 12% even after 96 hours. This suggests that the prepared structure (beads) maintains its structure over a long period of time due to crosslink formation by a Huisgen reaction. The crosslinked alginic acid gel (beads) prepared with (Ex18-A2)/(Ex19-A2) is the control in this test.

(Measuring Gel Stability (6)): Stability with EDTA

The alginic acid aqueous solutions obtained in (measuring gel stability (5)) were mixed in equal amounts combining (4-1) with (20-1), (18-1) with (9-1) and (18-1) with (16-1), each combination was filled in a syringe equipped with an 18-gauge needle, the syringe was attached to a syringe pump set to a flow rate of 1 mL/minute, and the mixture was dripped for 30 seconds into a 30 mmol/L calcium chloride solution and stirred for 5 minutes to obtain an alginic acid gel. This gel was washed once with 10 mL of saline and left standing for 10 minutes at 37° C. in saline to perform a crosslinking reaction and obtain a chemically crosslinked alginic acid gel. A crosslinked alginic acid gel (beads) using (Ex18-A2)/(Ex19-A2) was also prepared in the same way. 19.5 mL of 5 mM ethylenediamine tetraacetic acid dipotassium salt dihydrate (EDTA 2K)/saline solution was added to this gel and shaken at 37° C., the aqueous solution was collected over time, and the gel replenished with 5 mM EDTA 2K/saline solution in the same amount as the collected amount. After completion of testing, 10 μL of alginate lyase (Nippon Gene, 319-08261) was added to the test solution, which was then shaken for at least 3 hours at 37° C. to completely collapse the gel, and the aqueous solution was collected. The alginic acid concentration in the collected aqueous solution was measured by the carbazole-sulfuric acid method, the eluted amount of alginic acid at each point in time was divided by the total amount of alginic acid as calculated from the alginic acid concentration at all time points and the alginic acid concentration after completion of testing, and the resulting value represented as a percentage was given as the collapse rate and used as an indicator of gel stability.

Figure 6:
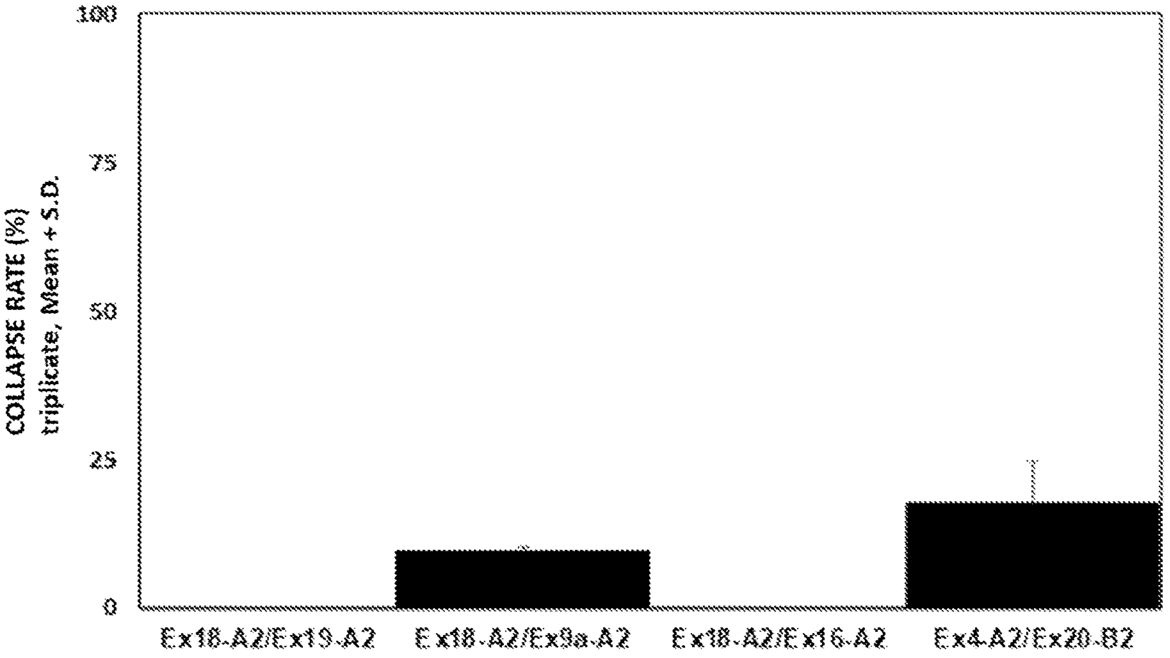
FIG. 6 shows an evaluation of the stability of gels of crosslinked alginic acid structures in the presence of EDTA.

The results are shown in FIG. 6. The crosslinked alginic acid gel (beads) had a collapse rate of not more than 18% even after 24 hours. This suggests that the prepared structure (beads) maintained its structure over a long period of time even in a solution containing no calcium ions (not more than physiological concentration in vivo) due to crosslink formation by a Huisgen reaction. The crosslinked alginic acid gel (beads) prepared with (Ex18-A2)/(Ex19-A2) is the control in this test.

[Measuring Gel Permeability]

(Measuring Gel Permeability (1))

The alginic acid derivatives (Ex1-A2), (Ex3-A2), (Ex4-A2), (Ex5-A2) and (Ex18-A2) obtained in Examples 1, 3, 4, 5 and 18 were each dissolved in water to a concentration of 2.0% to prepare alginic acid aqueous solutions, and 3/5 the volume of water and 2/5 the volume of fluorescein isothiocyanate-dextran (Sigma Aldrich, FD150S) with a molecular weight of 150,000 adjusted to a concentration of 1 mg/mL were added to each alginic acid aqueous solution to obtain 1.0% alginic acid aqueous solutions (1-2), (3-2), (4-2), (5-2) and (18-2) containing 0.2 mg/mL of fluorescein isothiocyanate-dextran.

The alginic acid derivatives (Ex10-A2), (Ex12-A2) and (Ex19-A2) obtained in Examples 10, 12 and 19 were also dissolved in water to a concentration of 1.0% to prepare alginic acid aqueous solutions (10-1), (12-1) and (19-1).

These were mixed in equal amounts combining (1-2) with (19-1), (4-2) with (19-1), (5-2) with (19-1), (3-2) with (10-1) and (18-2) with (12-1), and 40 mL of a 30 mmol/L calcium chloride solution was added to each and shaken for 5 minutes to prepare an alginic acid gel. This gel was washed once with 10 mL of saline and left standing for 10 minutes at 37° C. in saline to perform a crosslinking reaction and obtain a chemically crosslinked alginic acid gel containing fluorescein isothiocyanate-dextran. A chemically crosslinked alginic acid gel containing fluorescein isothiocyanate-dextran was also prepared in the same way using (Ex18-A2)/(Ex19-A2). 19.5 mL of saline was added to this gel and shaken at 37° C., the aqueous solution was collected over time, and the gel was replenished with saline in the same amount as the collected amount. After completion of testing, 10 μL of alginate lyase (Nippon Gene, 319-08261) was added to the test solution, which was then shaken for at least 3 hours at 37° C. to completely collapse the gel, and the aqueous solution was collected. The dextran concentration in the collected aqueous solution was measured by fluorescence assay (excitation light: 485 nm, fluorescence: 535 nm), the amount of dextran up to each time point was divided by the total amount of dextran after completion of testing, and the resulting value expressed as a percentage was given as the permeation rate.

Figure 7:
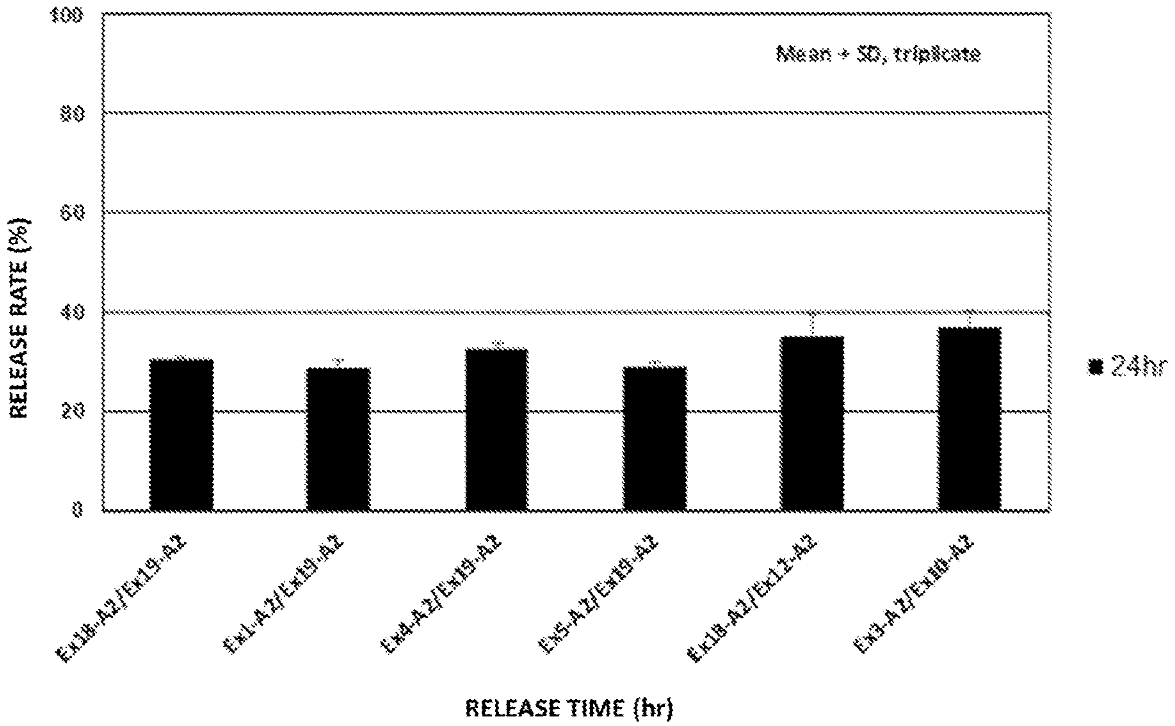
FIG. 7 shows an evaluation of the permeability of gels of crosslinked alginic acid structures.

The results are shown in FIG. 7. The permeation rate after 24 hours was in the range of from 25% to 40%. The chemically crosslinked alginic acid gel containing fluorescein isothiocyanate-dextran prepared using (Ex18-A2)/(Ex19-A2) the control in this test.

(Measuring Gel Permeability (2))

The alginic acid derivatives (Ex4-A2), (Ex5-A2), (Ex6-A2) and (Ex18-A2) obtained in Examples 4, 5, 6 and 18 were each dissolved in water to a concentration of 2.0% to prepare alginic acid aqueous solutions, and 3/5 the volume of water and 2/5 the volume of fluorescein isothiocyanate-dextran (Sigma Aldrich, FD150S) with a molecular weight of 150,000 adjusted to a concentration of 1 mg/mL were added to each alginic acid aqueous solution to obtain 1.0% alginic acid aqueous solutions (4-2), (5-2), (6-2) and (18-2) containing 0.2 mg/mL of fluorescein isothiocyanate-dextran.

The alginic acid derivatives (Ex9a-A2), (Ex10-A2), (Ex16-A2) and (Ex20-B2) obtained in Examples 9, 10, 16 and 20 were also dissolved in water to a concentration of 1.0% to prepare alginic acid aqueous solutions (9-1), (10-1), (16-1) and (20-1).

These were mixed in equal amounts combining (4-2) with (20-1), (5-2) with (10-1), (6-2) with (9-1), (18-2) with (9-1) and (18-2) with (16-1), and 40 mL of a 30 mmol/L calcium chloride solution was added to each and shaken for 5 minutes to prepare an alginic acid gel. This gel was washed once with 10 mL of saline and left standing for 10 minutes at 37° C. in saline to perform a crosslinking reaction and obtain a chemically crosslinked alginic acid gel containing fluorescein isothiocyanate-dextran. A chemically crosslinked alginic acid gel containing fluorescein isothiocyanate-dextran was also prepared in the same way using (Ex18-A2)/(Ex19-A2). 19.5 mL of saline was added to this gel and shaken at 37° C., the aqueous solution was collected over time, and the gel was replenished with saline in the same amount as the collected amount. After completion of testing, 10 μL of alginate lyase (Nippon Gene, 319-08261) was added to the test solution, which was then shaken for at least 3 hours at 37° C. to completely collapse the gel, and the aqueous solution was collected. The dextran concentration in the collected aqueous solution was measured by fluorescence assay (excitation light: 485 nm, fluorescence: 535 nm), the total amount of dextran up to each time point was divided by the total amount of dextran after completion of testing, and the resulting value expressed as a percentage was given as the permeation rate.

Figure 8:
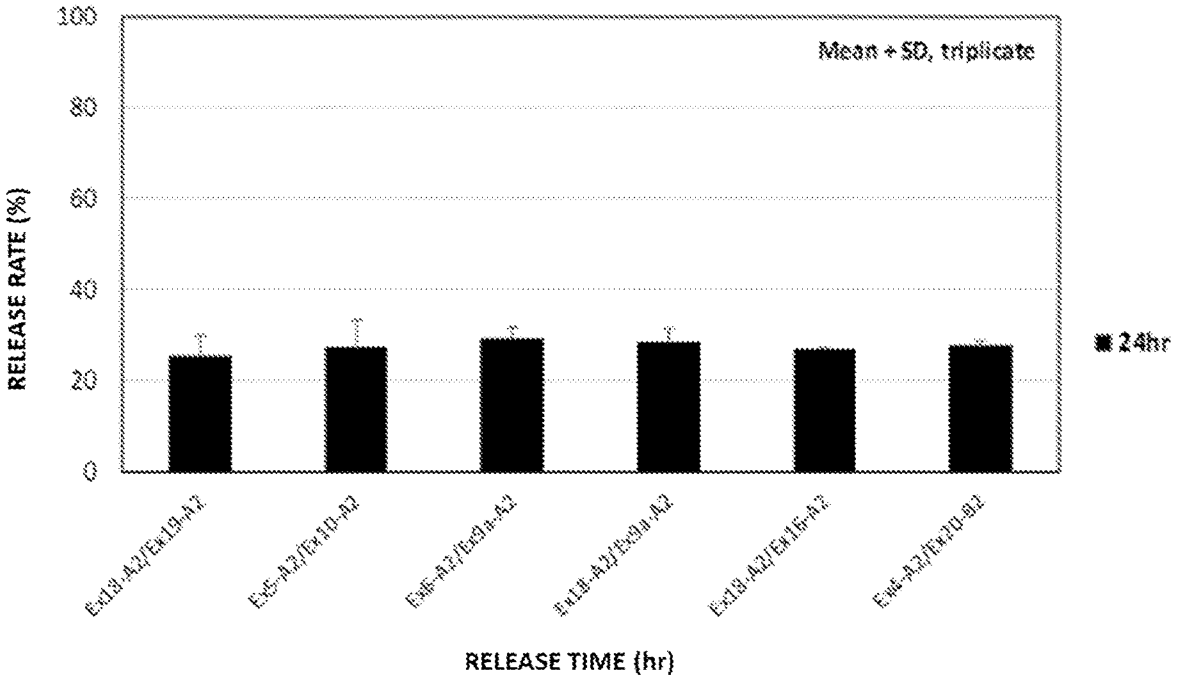
FIG. 8 shows an evaluation of the permeability of gels of crosslinked alginic acid structures.

The results are shown in FIG. 8. The permeation rate after 24 hours was in the range of from 25% to 30%. The chemically crosslinked alginic acid gel containing fluorescein isothiocyanate-dextran prepared using (Ex18-A2)/(Ex19-A2) is the control in this test.

[Evaluating Biocompatibility of Crosslinked Alginic Acid Derivatives (Gels)]

The alginic acid derivatives (EX4-A2), (EX5-A2), (EX12-A2), (EX16-A2), (EX18-A2), (EX19-A2) and (EX20-B2) obtained in Examples 4, 5, 12, 16, 18, 19 and 20 were each dissolved in water to obtain alginic acid solutions with introduced reactive groups. Each was filter sterilized with a Minisart High Flow (Sartorius, 16532GUK), after which 1.0% reactive group-introduced alginic acid/saline aqueous solutions were prepared. Combining (EX18-A2) with (EX19-A2), (Ex5-A2) with (Ex19-A2), (Ex4-A2) with (Ex20-B2) and (Ex18-A2) with (Ex12-A2) or (Ex16-A2), the 1.0% reactive group-introduced alginic acid/saline aqueous solutions were added to a final concentration of 0.1% to HeLa cells that had been seeded on 96-well plates to a concentration of $5\times10^3$ cells/well and then cultured for 1 day, and these were further cultured for 1 day and ATP activity was evaluated by CellTiter-Glo Luminescent Cell Viability Assay (Promega, G7571) as a measure of cell toxicity.

Figure 9:
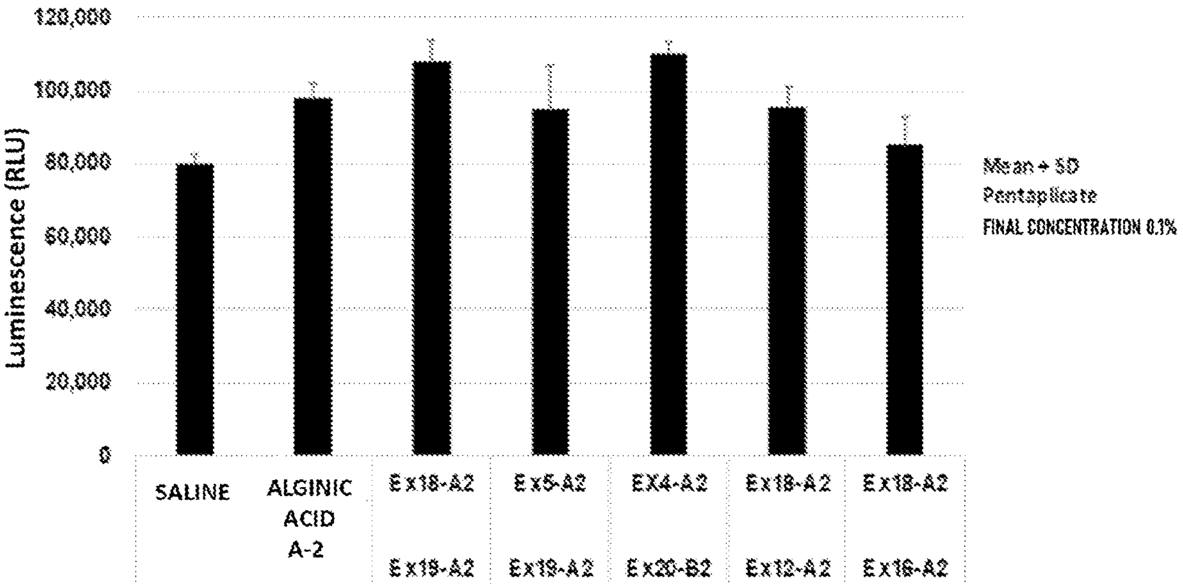
FIG. 9 shows a biocompatibility evaluation of gels of crosslinked alginic acid structures.

The results are shown in FIG. 9. ATP activity could be confirmed with all of the crosslinked alginic acid gels evaluated by this method, indicating that the crosslinked alginic acid gels had no cell toxicity, which suggests that an alginic acid structure (bead) formed by chemical crosslinking by a Huisgen reaction is biocompatible.

The invention claimed is:

1. A crosslinked alginic acid obtained by performing a crosslinking reaction using an alginic acid derivative of formula (I) below comprising a cyclic alkyne group (Akn) introduced via an amide bond and a divalent linker ($-L^1-$) at any one or more carboxyl groups of alginic acid and an alginic acid derivative of formula (II) below comprising an azide group introduced via an amide bond and a divalent linker ($-L^2-$) at any one or more carboxyl groups of alginic acid:

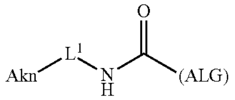

(I)

in formula (I), (ALG) consists of alginic acid; —NHCO— is an amide bond via any carboxyl group of alginic acid; $-L^1-$ is a linker selected from the group consisting of partial structural formulae shown in the following tables, excluding the parts outside the broken lines at both ends of each formula:

TABLE 51-1

| No. | —$L^1$— | |
|---|---|---|
| (L1-1) | 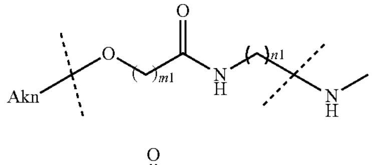 | m1 = 1-6 n1 = 2-6 |
| (L1-2a) | 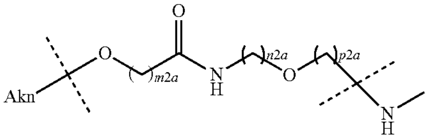 | m2a = 1-6 n2a = 2-6 p2a = 2-6 |
| (L1-2b) | 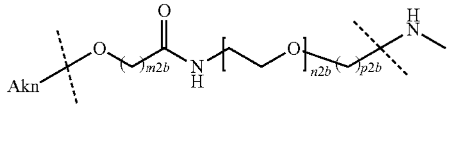 | m2b = 1-6 n2b = 2-6 p2b = 2-6 |
| (L1-3) | 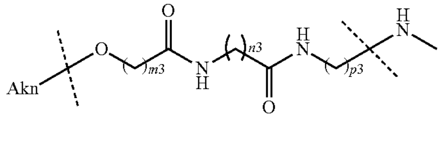 | m3 = 1-6 n3 = 1-6 p3 = 2-6 |

TABLE 51-1-continued

| No. | —$L^1$— | |
|---|---|---|
| (L1-4a) | 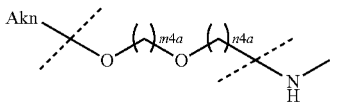 | m4a = 2-6 n4a = 2-6 |
| (L1-4b) | 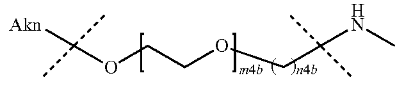 | m4b = 0-6 n4b = 2-6 |
| (L1-5a) | 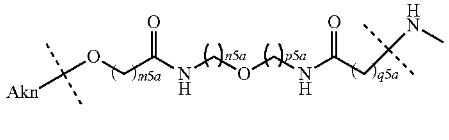 | m5a = 1-6 n5a = 2-6 p5a = 2-6 q5a = 1-6 |
| (L1-5b) | 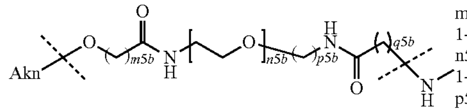 | m5b = 1-6 n5b = 1-6 p5b = 2-6 q5b = 1-6 |
| (L1-6a) | 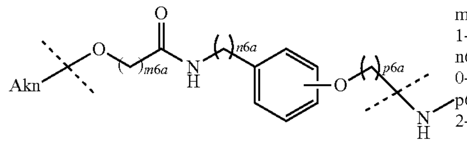 | m6a = 1-6 n6a = 0-6 p6a = 2-6 |
| (L1-6b) | 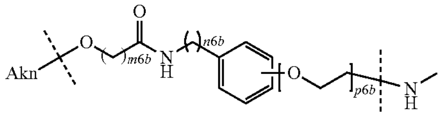 | m6b = 1-6 n6b = 1-6 p6b = 2-6 |

TABLE 51-2

| No. | —$L^1$— | |
|---|---|---|
| (L1-7) | 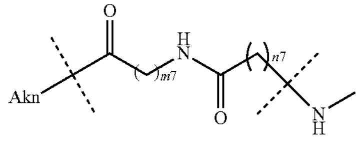 | m7 = 1-6 n7 = 1-6 |
| (L1-8a) | 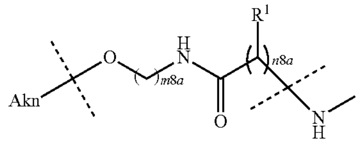 | m8a = 2-6 n8a = 1-6 $R^1$ = H, Me, Et, Bn |
| (L1-8b) | 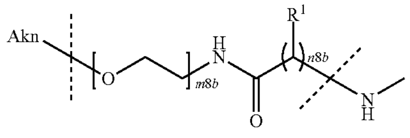 | m8b = 1-6 n8b = 1-6 $R^1$ = H, Me, Et, Bn |

TABLE 51-2-continued
| No. | —$L^1$— | |
|---|---|---|
| (L1-9a) | 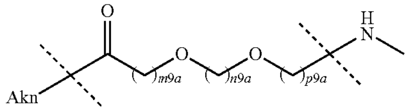 | m9a = 1-6 n9a = 2-6 p9a = 2-6 |
| (L1-9b) | 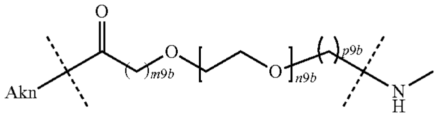 | m9b = 1-6 n9b = 1-6 p9b = 2-6 |
| (L1-10) | 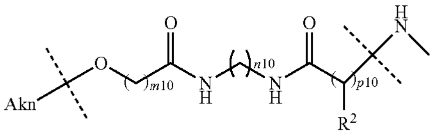 | m10 = 1-6 n10 = 2-6 p10 = 1-6 $R^2$ = H, Me, Et, Bn |
| (L1-11) | 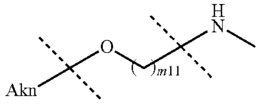 | m11 = 2-6 |
| (L1-12) | 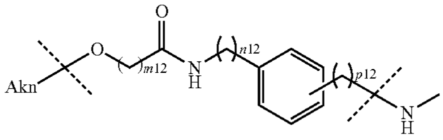 | m12 = 1-6 n12 = 0-6 p12 = 1-6 |
and Akn is a cyclic alkyne group selected from the group consisting of partial structural formulae shown in the following table, excluding the part to the right of the broken line in each formula:
TABLE 52
| No. | Akn |
|---|---|
| (AK-1) | 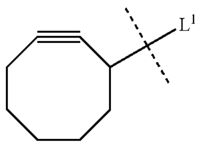 |
| (AK-2) | 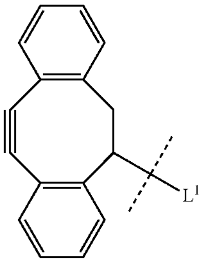 |
TABLE 52-continued
| No. | Akn |
|---|---|
| (AK-3) | 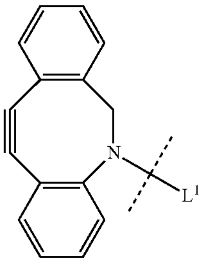 |
| (AK-4) | 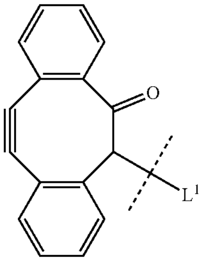 |
| (AK-5) | 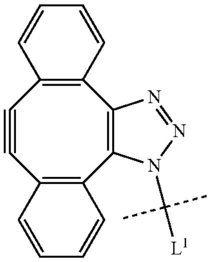 |
| (AK-6) | 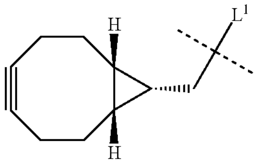 |
| (AK-7) | 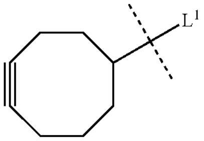 |
| (AK-8) | 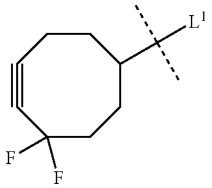 |
| (AK-9) | 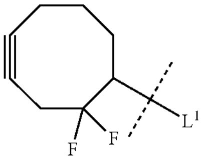 |

TABLE 52-continued

| No. | Akn |
|---|---|
| (AK-10) | 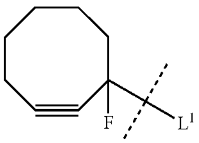 |
| (AK-11) | 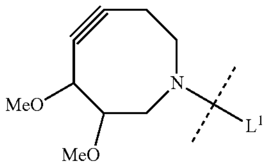 |
| (AK-12) | 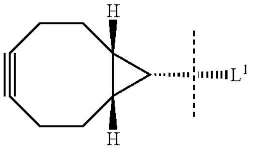 |

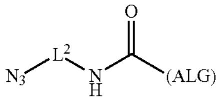

(II)

in formula (II), (ALG) consists of alginic acid; —NHCO— is an amide bond via any carboxyl group of alginic acid; and -$L^2$- is a linker selected from the group consisting of partial structural formulae shown in the following tables, excluding the parts outside the broken lines at both ends of each formula:

TABLE 53-1

| No. | —$L^2$ | |
|---|---|---|
| (L2-1) | 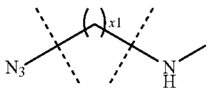 | x1 = 2-6 |
| (L2-2a) | 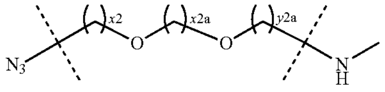 | x2 = 2-6 x2a = 2-6 y2a = 2-6 |
| (L2-2b) | 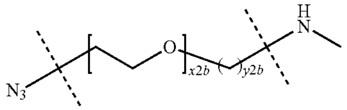 | x2b = 1-6 y2b = 2-6 |
| (L2-3) | 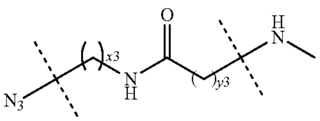 | x3 = 2-6 y3 = 1-6 |

TABLE 53-1-continued

| No. | —$L^2$ | |
|---|---|---|
| (L2-4) | 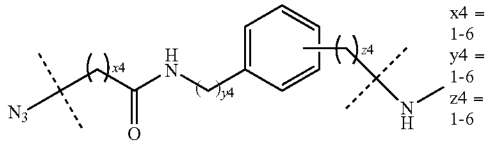 | x4 = 1-6 y4 = 1-6 z4 = 1-6 |
| (L2-5a) | 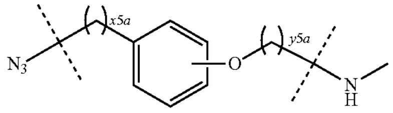 | x5a = 0-4 y5a = 2-6 |
| (L2-5b) | 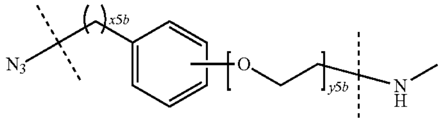 | x5b = 0-4 y5b = 1-6 |
| (L2-6a) | 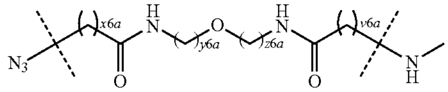 | x6a = 1-6 y6a = 2-6 z6a = 2-6 v6a = 1-6 |
| (L2-6b) | 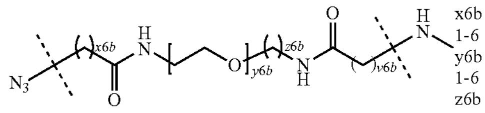 | x6b = 1-6 y6b = 1-6 z6b = 2-6 v6b = 1-6 |

TABLE 53-2

| No. | -$L^2$- | |
|---|---|---|
| (L2-7a) | 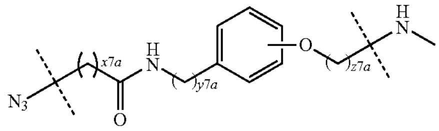 | x7a = 1-6 y7a = 1-6 z7a = 2-6 |
| (L2-7b) | 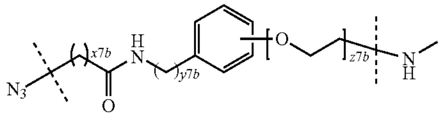 | x7b = 1-6 y7b = 1-6 z7b = 1-6 |
| (L2-8a) | 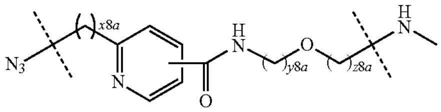 | x8a = 0-4 y8a = 2-6 z8a = 3-6 |
| (L2-8b) | 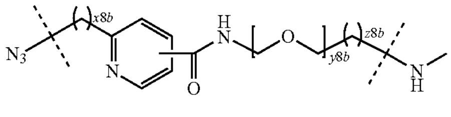 | x8b = 0-4 y8b = 1-6 z8b = 3-6 |
| (L2-9a) | 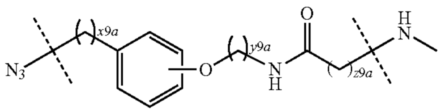 | x9a = 0-4 y9a = 2-6 z9a = 1-6 |

TABLE 53-2-continued

| No. | -$L^2$- | |
|---|---|---|
| (L2-9b) | 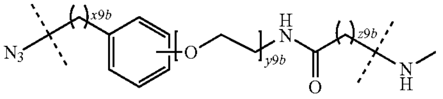 | x9b = 0-4<br>z9b = 1-6<br>y9b = 1-6 |
| (L2-10) | 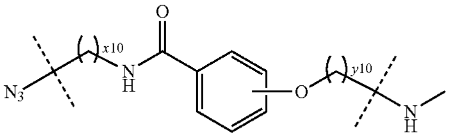 | x10 = 2-6<br>y10 = 2-6 |

with the proviso that crosslinked alginic acids obtained by performing a crosslinking reaction using a derivative in which -$L^1$- is any one linker selected from the group consisting of (L1-1), (L1-2a), (L1-2b), (L1-11) or (L1-12) in the alginic acid derivative of formula (I) and a derivative in which -$L^2$- is the linker (L2-10) in the alginic acid derivative of formula (II) are excluded.

2. The crosslinked alginic acid according to claim 1, wherein any carboxyl group of a first alginic acid of formula (I) and any carboxyl group of a second alginic acid of formula (II) are crosslinked together via the following formula (III-L):

(III-L)

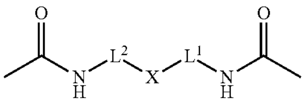

wherein in formula (III-L), the —CONH— and —NHCO— at either end are amide bonds via any carboxyl group of alginic acid; -$L^1$- is defined above; -$L^2$- is defined above; and X is a cyclic group selected from the group consisting of partial structural formulae shown in the following tables, excluding the parts outside the broken lines at both ends of each formula:

TABLE 57-1

| No. | X | No. | X |
|---|---|---|---|
| (TZ-1) | 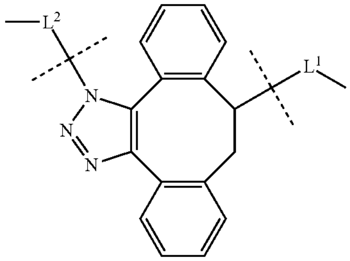 | (TZ-1-r) | 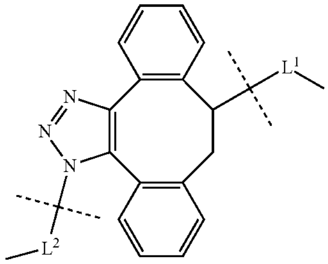 |
| (TZ-2) | 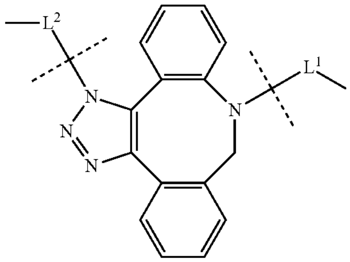 | (TZ-2-r) | 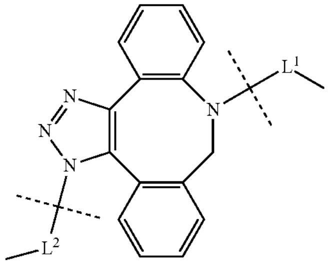 |
| (TZ-3) | 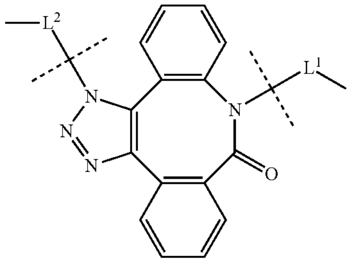 | (TZ-3-r) | 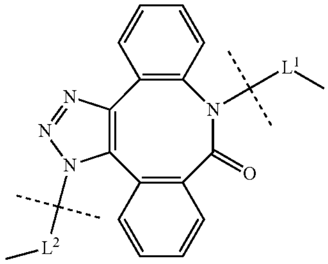 |

TABLE 57-1-continued
| No. | X | No. | X |
|---|---|---|---|
| (TZ-4) | 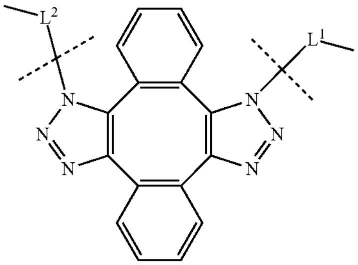 | (TZ-4-r) | 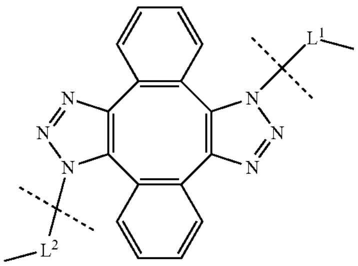 |
| (TZ-5) | 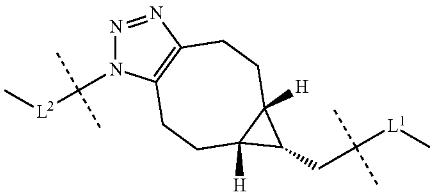 | (TZ-5-r) | 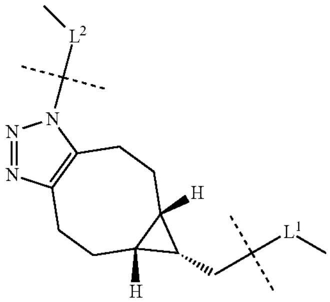 |
| (TZ-6) | 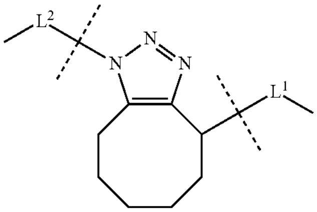 | (TZ-6-r) | 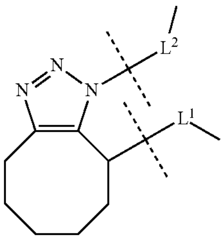 |
TABLE 57-2
| No. | X | No. | X |
|---|---|---|---|
| (TZ-7) | 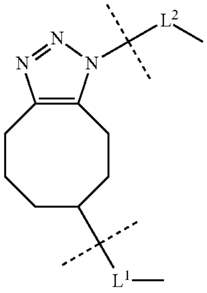 | (TZ-7-r) | 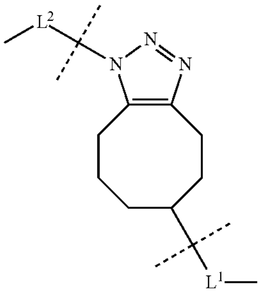 |

TABLE 57-2-continued
| No. | X | No. | X |
|---|---|---|---|
| (TZ-8) | 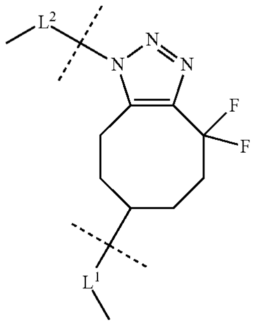 | (TZ-8-r) | 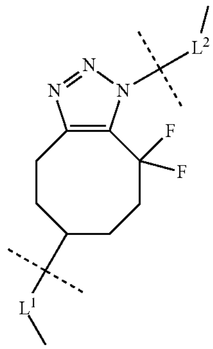 |
| (TZ-9) | 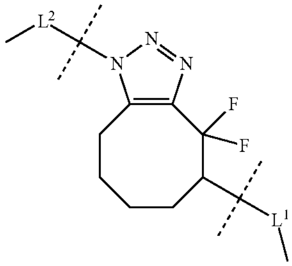 | (TZ-9-r) | 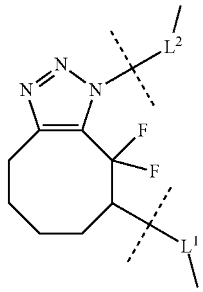 |
| (TZ-10) | 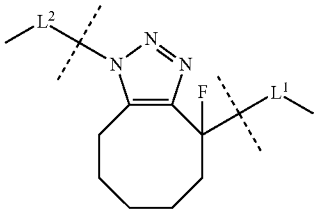 | (TZ-10-r) | 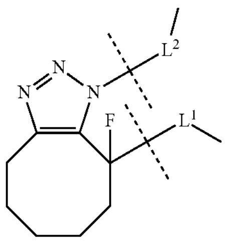 |
| (TZ-11) | 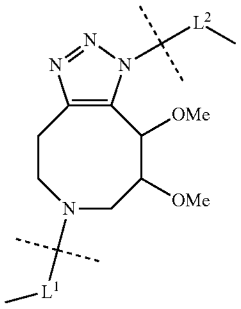 | (TZ-11-r) | 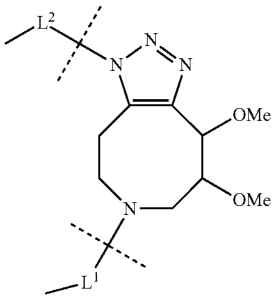 |
| (TZ-12) | 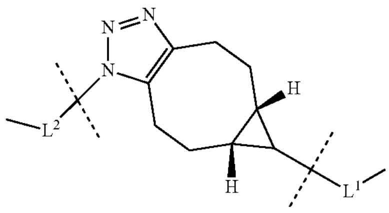 | (TZ-12-r) | 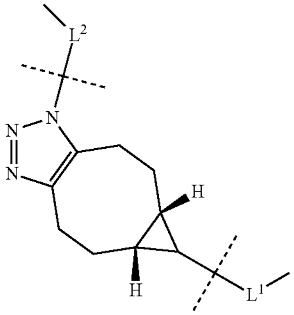 |
with the proviso that in formula (III-L) the linker (L2-10) is excluded from the corresponding $-L^2-$ when $-L^1-$ is any one linker selected from the group consisting of (L1-1), (L1-2a), (L1-2b), (L1-11) and (L1-12).

3. A crosslinked alginic acid structure obtained by mixing the alginic acid derivative of formula (I) and the alginic acid derivative of formula (II) according to claim 1 to obtain a mixed solution that is then dripped into a solution containing a divalent metal ion.

4. The crosslinked alginic acid structure according to claim 3, wherein the structure is obtained via both chemical crosslinking by triazole rings formed by a Huisgen reaction and ionic crosslinking partially formed by a divalent metal ion.

5. The crosslinked alginic acid structure according to claim 3, wherein the structure is obtained by subjecting the alginic acid derivative of formula (I) and the alginic acid derivative by of formula (II) to ionic crosslinking by a divalent metal ion and chemical crosslinking by a Huisgen reaction.

6. The crosslinked alginic acid structure according to claim 3, wherein the chemical crosslinking formed by performing a Huisgen reaction using the alginic acid derivative of formula (I) and the alginic acid derivative of formula (II) has the structure of formula (III-L) below:

(III-L)

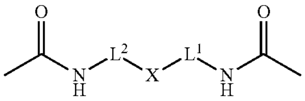

wherein in formula (III-L), the —CONH— and —NHCO— at either end are amide bonds via any carboxyl group of alginic acid; $-L^1-$ is defined above; $-L^2-$ is defined above; and X is a cyclic group selected from the group consisting of partial structural formulae shown in the following tables, excluding the parts outside the broken lines at both ends of each formula:

TABLE 57-1

| No. | X | No. | X |
|---|---|---|---|
| (TZ-1) | 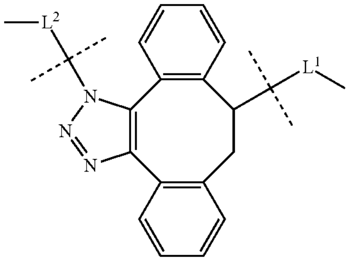 | (TZ-1-r) | 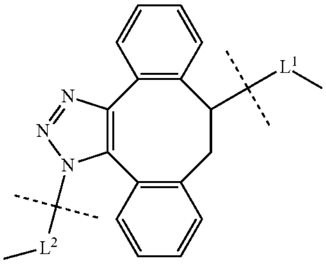 |
| (TZ-2) | 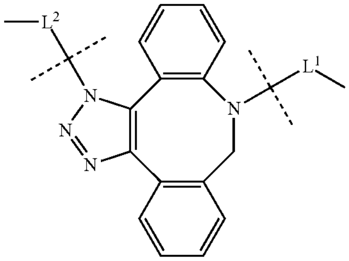 | (TZ-2-r) | 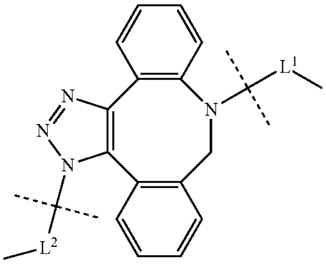 |
| (TZ-3) | 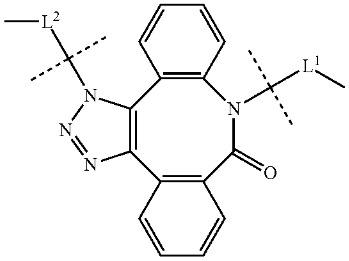 | (TZ-3-r) | 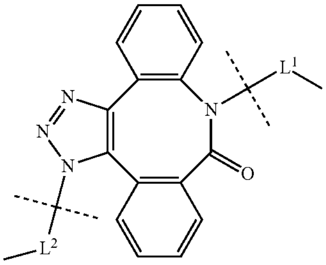 |
| (TZ-4) | 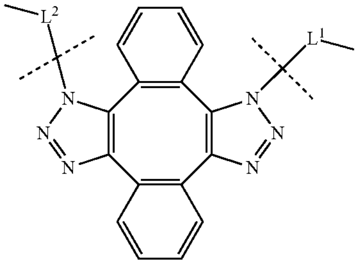 | (TZ-4-r) | 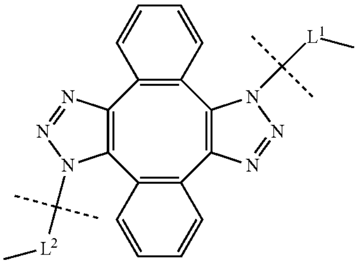 |

TABLE 57-1-continued
| No. | X | No. | X |
|---|---|---|---|
| (TZ-5) | 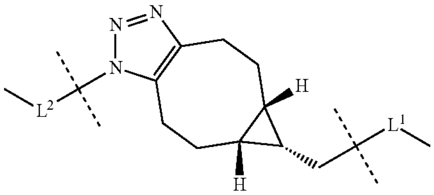 | (TZ-5-r) | 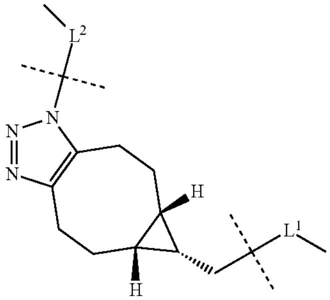 |
| (TZ-6) | 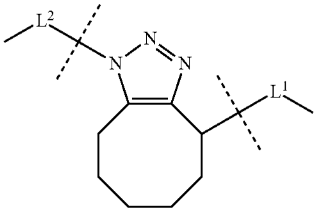 | (TZ-6-r) | 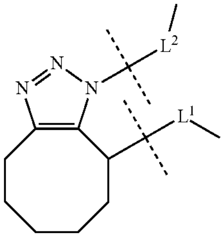 |
TABLE 57-2
| No. | X | No. | X |
|---|---|---|---|
| (TZ-7) | 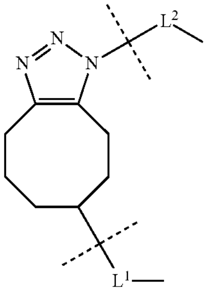 | (TZ-7-r) | 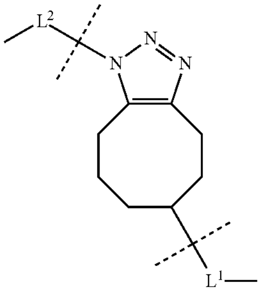 |
| (TZ-8) | 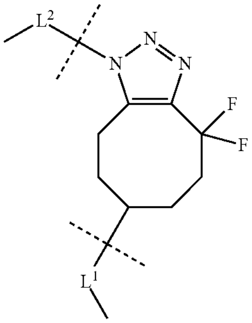 | (TZ-8-r) | 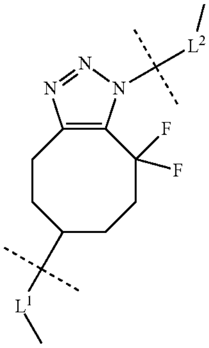 |

TABLE 57-2-continued

| No. | X | No. | X |
|---|---|---|---|
| (TZ-9) | 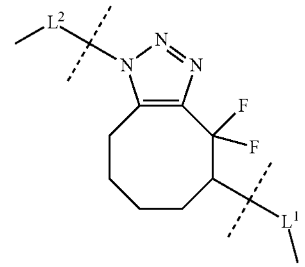 | (TZ-9-r) | 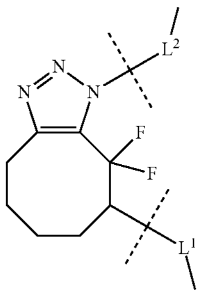 |
| (TZ-10) | 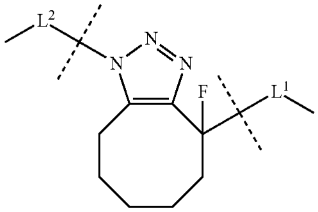 | (TZ-10-r) | 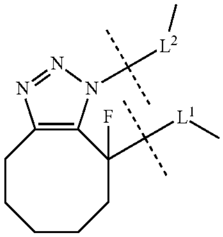 |
| (TZ-11) | 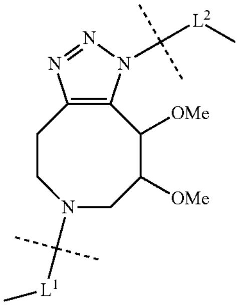 | (TZ-11-r) | 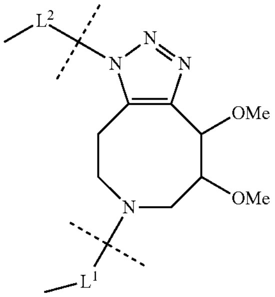 |
| (TZ-12) | 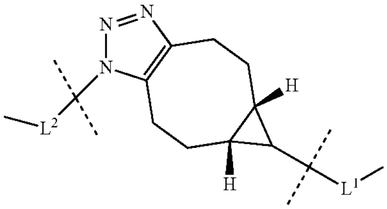 | (TZ-12-r) | 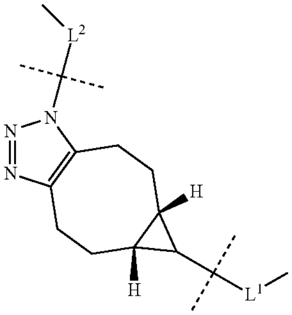 |

with the proviso that in formula (III-L) the linker (L2-10) is excluded from the corresponding -$L^2$- when -$L^1$- is any one linker selected from the group consisting of (L1-1), (L1-2a), (L1-2b), (L1-11) and (L1-12).

7. The crosslinked alginic acid structure according to claim 3, wherein the structure is beads or a semi-spherical gel.

8. The crosslinked alginic acid according to claim 1, wherein the crosslinked alginic acid has biocompatibility.

9. The crosslinked alginic acid structure according to claim 3, wherein the structure has biocompatibility.

* * * * *